(12) United States Patent
Takahashi et al.

(10) Patent No.: US 11,110,793 B2
(45) Date of Patent: Sep. 7, 2021

(54) WHEEL DRIVING APPARATUS

(71) Applicant: DENSO CORPORATION, Kariya (JP)

(72) Inventors: Yuki Takahashi, Kariya (JP); Ryo Tanie, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/915,348

(22) Filed: Jun. 29, 2020

(65) Prior Publication Data

US 2020/0331343 A1 Oct. 22, 2020

Related U.S. Application Data

(63) Continuation of application No. PCT/JP2018/048247, filed on Dec. 27, 2018.

(30) Foreign Application Priority Data

Dec. 28, 2017 (JP) .............................. JP2017-255064
Dec. 28, 2017 (JP) .............................. JP2017-255065
(Continued)

(51) Int. Cl.
*B60K 17/16* (2006.01)
*B60K 17/08* (2006.01)
(Continued)

(52) U.S. Cl.
CPC .............. *B60K 17/08* (2013.01); *B60K 1/04* (2013.01); *B60K 17/165* (2013.01); *F16H 1/28* (2013.01);
(Continued)

(58) Field of Classification Search
CPC .............................. B60K 17/165; F16H 48/08
See application file for complete search history.

(56) References Cited

U.S. PATENT DOCUMENTS 4,463,276 A 7/1984 Nakamura
5,128,574 A 7/1992 Koizumi et al.
(Continued)

FOREIGN PATENT DOCUMENTS

CN 105305756 A 2/2016
EP 0668651 A1 8/1995
(Continued)

OTHER PUBLICATIONS

Apr. 16, 2019 Search Report issued in International Patent Application No. PCT/JP2018/048247.
(Continued)

*Primary Examiner* — Derek D Knight
(74) *Attorney, Agent, or Firm* — Oliff PLC

(57) ABSTRACT

A rotating electrical machine includes a cylindrical rotor and a cylindrical stator. The rotor includes a magnet portion. The stator includes a multiple-phase stator winding. The rotor and the stator are arranged in a state in which the magnet portion and the stator winding oppose each other inward and outward in a radial direction. A differential apparatus includes a differential case, side gears, and a pinion gear. The differential case rotates with a rotation of a rotor. The side gears are housed in the differential case and respectively connected to the pair of axles. The pinion gear is housed in the differential case and mutually meshes with the side gears. The differential apparatus is concentrically arranged
(Continued)

with the rotor in a hollow portion provided on an inner side in a radial direction of a magnetic circuit portion configured by the rotor and the stator in the rotating electrical machine.

21 Claims, 41 Drawing Sheets

(30) Foreign Application Priority Data

| Dec. 28, 2017 | (JP) | ................ JP2017-255066 |
|---|---|---|
| Aug. 2, 2018 | (JP) | ................ JP2018-146309 |
| Aug. 7, 2018 | (JP) | ................ JP2018-148736 |

(51) Int. Cl.

| *B60K 1/04* | (2019.01) |
|---|---|
| *F16H 48/08* | (2006.01) |
| *F16H 1/28* | (2006.01) |
| *F16H 37/08* | (2006.01) |
| *F16H 57/04* | (2010.01) |
| *H02K 5/20* | (2006.01) |
| *H02K 7/00* | (2006.01) |
| *H02K 7/08* | (2006.01) |
| *H02K 7/116* | (2006.01) |
| *H02K 9/19* | (2006.01) |
| *H02K 11/33* | (2016.01) |
| *H02K 21/22* | (2006.01) |
| *B60L 50/60* | (2019.01) |
| *B60K 1/00* | (2006.01) |
| *B60L 15/00* | (2006.01) |

(52) U.S. Cl.
CPC ............ *F16H 37/082* (2013.01); *F16H 48/08* (2013.01); *F16H 57/0476* (2013.01); *F16H 57/0483* (2013.01); *F16H 57/0486* (2013.01); *H02K 5/20* (2013.01); *H02K 7/006* (2013.01); *H02K 7/085* (2013.01); *H02K 7/116* (2013.01); *H02K 9/19* (2013.01); *H02K 11/33* (2016.01); *H02K 21/22* (2013.01); *B60K 2001/006* (2013.01); *B60L 15/007* (2013.01); *B60L 50/60* (2019.02); *H02K 2213/03* (2013.01)

(56) References Cited

U.S. PATENT DOCUMENTS

| 5,478,222 | A | 12/1995 | Heidelberg et al. |
|---|---|---|---|
| 5,637,048 | A | 6/1997 | Maeda et al. |
| 5,723,933 | A | 3/1998 | Grundl et al. |
| 5,759,128 | A * | 6/1998 | Mizutani ............ H02K 7/116 475/149 |
| 5,787,567 | A | 8/1998 | Miyazaki |
| 5,821,653 | A | 10/1998 | Kinto et al. |
| 5,880,544 | A | 3/1999 | Ikeda et al. |
| 6,882,077 | B2 | 4/2005 | Neet |
| 9,255,633 | B2 * | 2/2016 | Markl ................ B60K 7/0007 |
| 9,595,851 | B2 | 3/2017 | Hazeyama et al. |
| 2002/0050395 | A1 | 5/2002 | Kusumoto et al. |
| 2002/0180294 | A1 | 12/2002 | Kaneda et al. |
| 2004/0090130 | A1 | 5/2004 | Kaneko et al. |
| 2004/0119362 | A1 | 6/2004 | Neet |
| 2004/0263016 | A1 | 12/2004 | Neet |
| 2006/0113857 | A1 | 6/2006 | Honkura et al. |
| 2006/0197397 | A1 | 9/2006 | Stiesdal |
| 2008/0073992 | A1 | 3/2008 | Kusama |
| 2009/0079277 | A1 | 3/2009 | Nakamura et al. |
| 2009/0230353 | A1 | 9/2009 | Shimazu et al. |
| 2009/0267441 | A1 | 10/2009 | Hiramatsu et al. |
| 2010/0007230 | A1 | 1/2010 | Suzuki et al. |
| 2010/0194231 | A1 | 8/2010 | Rippel et al. |
| 2011/0012440 | A1 | 1/2011 | Toyota et al. |
| 2011/0057533 | A1 | 3/2011 | Murakami et al. |
| 2011/0210558 | A1 | 9/2011 | Stiesdal |
| 2011/0285243 | A1 | 11/2011 | Taniguchi |
| 2011/0304236 | A1 | 12/2011 | Nishiyama et al. |
| 2012/0001521 | A1 | 1/2012 | Shiraki et al. |
| 2012/0293035 | A1 | 11/2012 | Nakamura et al. |
| 2013/0127289 | A1 | 5/2013 | Koga |
| 2013/0300241 | A1 | 11/2013 | Wedman et al. |
| 2014/0125182 | A1 | 5/2014 | Takahashi |
| 2014/0174856 | A1 | 6/2014 | Takagi et al. |
| 2014/0197709 | A1 | 7/2014 | Hasegawa |
| 2014/0312718 | A1 | 10/2014 | Li et al. |
| 2016/0149454 | A1 | 5/2016 | Haga et al. |
| 2016/0204728 | A1 | 7/2016 | Notohara et al. |
| 2016/0211707 | A1 | 7/2016 | Yamada et al. |
| 2016/0277397 | A1 | 9/2016 | Watanabe |
| 2017/0162311 | A1 | 6/2017 | Shimbo et al. |
| 2017/0187258 | A1 | 6/2017 | Fujikawa et al. |
| 2017/0222583 | A1 | 8/2017 | Akimatsu et al. |
| 2017/0237310 | A1 | 8/2017 | Nakamura et al. |
| 2017/0271941 | A1 | 9/2017 | Kaneko et al. |
| 2017/0288489 | A1 | 10/2017 | Shiraki et al. |
| 2018/0062471 | A1 | 3/2018 | Shiraki et al. |
| 2018/0108464 | A1 | 4/2018 | Fujikawa et al. |
| 2018/0269733 | A1 | 9/2018 | Mikami et al. |
| 2018/0287445 | A1 | 10/2018 | Ishizuka et al. |
| 2018/0323673 | A1 | 11/2018 | Shiraki et al. |
| 2018/0336981 | A1 | 11/2018 | Fujihara et al. |
| 2019/0157954 | A1 | 5/2019 | Takahashi et al. |
| 2020/0161939 | A1 | 5/2020 | Takahashi et al. |
| 2020/0162003 | A1 | 5/2020 | Takahashi et al. |

FOREIGN PATENT DOCUMENTS

| FR | 2036866 A1 | 12/1970 |
|---|---|---|
| JP | S55-173264 U | 12/1980 |
| JP | S61-14865 U | 1/1986 |
| JP | S61-180567 U | 11/1986 |
| JP | S61-258643 A | 11/1986 |
| JP | S62-196053 A | 8/1987 |
| JP | H06-070522 A | 3/1994 |
| JP | H08-242564 A | 9/1996 |
| JP | H08-265995 A | 10/1996 |
| JP | H08-275419 A | 10/1996 |
| JP | H11-215749 A | 8/1999 |
| JP | H11-308793 A | 11/1999 |
| JP | 2000-245089 A | 9/2000 |
| JP | 2001-333555 A | 11/2001 |
| JP | 2002-171735 A | 6/2002 |
| JP | 2003-104076 A | 4/2003 |
| JP | 2003-324866 A | 11/2003 |
| JP | 2004-15906 A | 1/2004 |
| JP | 2004-159453 A | 6/2004 |
| JP | 2004-187344 A | 7/2004 |
| JP | 2005-065385 A | 3/2005 |
| JP | 2005-117751 A | 4/2005 |
| JP | 2005-253146 A | 9/2005 |
| JP | 2005-312214 A | 11/2005 |
| JP | 2006-288187 A | 10/2006 |
| JP | 2006-320109 A | 11/2006 |
| JP | 2006-325338 A | 11/2006 |
| JP | 2007-202324 A | 8/2007 |
| JP | 2007-267565 A | 10/2007 |
| JP | 2007-274869 A | 10/2007 |
| JP | 2008-148375 A | 6/2008 |
| JP | 2008-237021 A | 10/2008 |
| JP | 2008-245475 A | 10/2008 |
| JP | 2008-278648 A | 11/2008 |
| JP | 2009-291040 A | 12/2009 |
| JP | 2010-022192 A | 1/2010 |
| JP | 2010-041753 A | 2/2010 |
| JP | 2010-130819 A | 6/2010 |
| JP | 2010-130871 A | 6/2010 |
| JP | 2011-024324 A | 2/2011 |
| JP | 2011-244627 A | 12/2011 |
| JP | 2012-125088 A | 6/2012 |
| JP | 2012-165614 A | 8/2012 |
| JP | 2012-175755 A | 9/2012 |

(56) References Cited

FOREIGN PATENT DOCUMENTS

| | | |
|---|---|---|
| JP | 2012-228072 A | 11/2012 |
| JP | 2013-051765 A | 3/2013 |
| JP | 2013-108986 A | 6/2013 |
| JP | 2013-162668 A | 8/2013 |
| JP | 2013-201853 A | 10/2013 |
| JP | 2013-207858 A | 10/2013 |
| JP | 2014-093835 A | 5/2014 |
| JP | 2014-213622 A | 11/2014 |
| JP | 2014-239586 A | 12/2014 |
| JP | 2015-015906 A | 1/2015 |
| JP | 2015-018633 A | 1/2015 |
| JP | 2015-033173 A | 2/2015 |
| JP | 2015-092792 A | 5/2015 |
| JP | 2015-122834 A | 7/2015 |
| JP | 2015-142484 A | 8/2015 |
| JP | 2015-177725 A | 10/2015 |
| JP | 2015-211492 A | 11/2015 |
| JP | 2015-216714 A | 12/2015 |
| JP | 2016-026465 A | 2/2016 |
| JP | 2016-052210 A | 4/2016 |
| JP | 2016-072457 A | 5/2016 |
| JP | 2016-092995 A | 5/2016 |
| JP | 2016-126992 A | 7/2016 |
| JP | 2016-129439 A | 7/2016 |
| JP | 2016-226226 A | 12/2016 |
| JP | 2017-022914 A | 1/2017 |
| JP | 2017-060321 A | 3/2017 |
| JP | 2017-070140 A | 4/2017 |
| JP | 2017-169316 A | 9/2017 |
| JP | 2018-074767 A | 5/2018 |
| JP | 2019-140368 A | 8/2019 |
| WO | 2002/015229 A1 | 2/2002 |
| WO | 2013/179476 A1 | 12/2013 |
| WO | 2016/058870 A1 | 4/2016 |

OTHER PUBLICATIONS

Apr. 9, 2019 International Search Report issued in International Patent Application No. PCT/JP2018/048246.
Oct. 23, 2018 International Search Report issued in Application No. PCT/JP2018/027409.
Oct. 16, 2018 International Search Report issued in Application No. PCT/JP2018/027408.
U.S. Appl. No. 16/914,605, filed Jun. 29, 2020 in the name of Takahashi.
U.S. Appl. No. 16/914,570, filed Jun. 29, 2020 in the name of Takahashi.
U.S. Appl. No. 16/915,027, filed Jun. 29, 2020 in the name of Takahashi.
U.S. Appl. No. 16/915,238, filed Jun. 29, 2020 in the name of Takahashi.
U.S. Appl. No. 16/915,566, filed Jun. 29, 2020 in the name of Takahashi.
U.S. Appl. No. 16/915,116, filed Jun. 29, 2020 in the name of Takahashi et al.
U.S. Appl. No. 16/914,532, filed Jun. 29, 2020 in the name of Takahashi.
U.S. Appl. No. 16/748,535, filed Jan. 21, 2020 in the name of Takahashi et al.
U.S. Appl. No. 16/748,195, filed Jan. 21, 2020 in the name of Takahashi et al.
Apr. 2, 2019 International Search Report issued in International Patent Application No. PCT/JP2018/048254.
Apr. 9, 2019 International Search Report issued in International Patent Application No. PCT/JP2018/048248.

* cited by examiner

COMPARATIVE EXAMPLES

WHEEL DRIVING APPARATUS

CROSS-REFERENCE TO RELATED APPLICATIONS

The present application is a continuation application of International Application No. PCT/JP2018/048247, filed on Dec. 27, 2018, which claims the benefit of priority of Japanese Patent Application Nos. 2017-255064 filed on Dec. 28, 2017, 2017-255065 filed on Dec. 28, 2017, 2017-255066 filed on Dec. 28, 2017, 2018-146309 filed on Aug. 2, 2018, and 2018-148736 filed on Aug. 7, 2018. The contents of these applications are incorporated herein by reference in their entirety.

BACKGROUND

Technical Field

The present disclosure relates to a wheel driving apparatus that includes a rotating electrical machine and a differential apparatus.

Related Art

A technology is known as a wheel driving apparatus that includes a rotating electrical machine as a power source. In this technology, an in-wheel motor apparatus includes a bearing that supports a wheel, a motor, and a reduction gear that decelerates rotation of the motor. The in-wheel motor apparatus is configured such that a portion thereof is positioned inside the wheel. The rotation of the motor is transmitted to the wheel through the reduction gear.

SUMMARY

One aspect of the present disclosure provides a wheel driving apparatus that includes: a pair of axles that rotate left and right wheels of a vehicle; a differential apparatus that is provided so as to be coupled with the axles; and a rotating electrical machine that rotates the axles. The rotating electrical machine includes: a cylindrical rotor that includes a magnet portion that includes a plurality of magnetic poles of which polarities alternate in a circumferential direction; and a cylindrical stator that includes a multiple-phase stator winding, in which the rotor and the stator are arranged in a state in which the magnet portion and the stator winding oppose each other inward and outward in a radial direction. The differential apparatus includes: a differential case that rotates in accompaniment with a rotation of a rotor, side gears that are housed in the differential case and respectively connected to the pair of axles, and a pinion gear that is housed in the differential case and mutually meshes with the side gears. The differential apparatus is concentrically arranged with the rotor in a hollow portion that is provided on an inner side in a radial direction of a magnetic circuit portion that is configured by the rotor and the stator in the rotating electrical machine.

DESCRIPTION OF THE EMBODIMENTS

Figure 1:
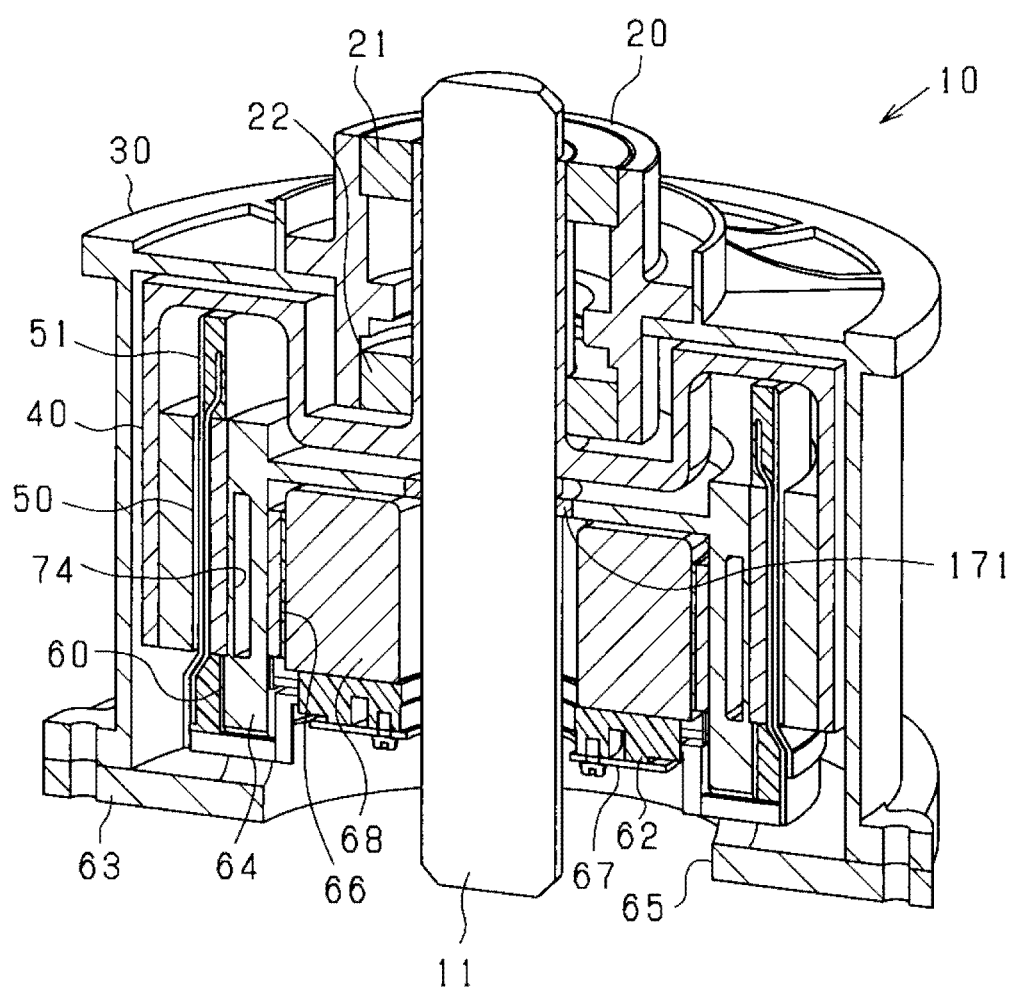
FIG. 1 is a perspective longitudinal sectional view of a rotating electrical machine.

Conventionally, for example, a technology described in JP-A-2016-092995 is known as a wheel driving apparatus that includes a rotating electrical machine as a power source. In this technology, an in-wheel motor apparatus includes a bearing that supports a wheel, a motor, and a reduction gear that decelerates rotation of the motor. The in-wheel motor apparatus is configured such that a portion thereof is positioned inside the wheel. In addition, the rotation of the motor is transmitted to the wheel through the reduction gear.

Here, for example, in a vehicle such as an automobile, use of a rotating electrical machine as a power source that rotates left and right wheels can be considered. In this case, a differential apparatus is typically provided between axles that are connected to the left and right wheels. As a result of the differential apparatus, a difference in rotation is applied while a same driving force is transmitted to each axle, during turning of the vehicle. Here, in a case in which the differential apparatus is arranged in combination with the rotating electrical machine as the wheel driving apparatus, it is thought that there is room for technical improvement, including improvement in layout when the rotating electrical machine and the differential apparatus are arranged in proximity.

It is thus desired to enable a differential apparatus to be suitably arranged in relation to a rotating electrical machine in a wheel driving apparatus.

An embodiment A1 provides a wheel driving apparatus that includes: a pair of axles that rotate left and right wheels of a vehicle; a differential apparatus that is provided so as to be coupled with the axles; and a rotating electrical machine that rotates the axles. The rotating electrical machine includes: a cylindrical rotor that includes a magnet portion that includes a plurality of magnetic poles of which polarities alternate in a circumferential direction; and a cylindrical stator that includes a multiple-phase stator winding, in which the rotor and the stator are arranged in a state in which the magnet portion and the stator winding oppose each other inward and outward in a radial direction. The differential apparatus includes: a differential case that rotates in accompaniment with a rotation of a rotor, side gears that are housed in the differential case and respectively connected to the pair of axles, and a pinion gear that is housed in the differential case and mutually meshes with the side gears. The differential apparatus is concentrically arranged with the rotor in a hollow portion that is provided on an inner side in a radial direction of a magnetic circuit portion that is configured by the rotor and the stator in the rotating electrical machine.

In the wheel driving apparatus configured as described above, in the rotating electrical machine, the rotor and the stator are arranged in a state in which the magnet portion and the stator winding oppose each other inward and outward in a radial direction. Furthermore, the differential apparatus is concentrically arranged with the rotor in the hollow portion that is provided on the inner side in the radial direction of the magnetic circuit portion that is configured by the rotor and the stator. That is, the rotor and the stator of the rotating electrical machine, and the differential apparatus are arranged in a stacked state in the radial direction and concentrically arranged with the axles as an axial center. In this case, through effective use of an annular space that is formed around the axles inside the rotating electrical machine, a wheel driving apparatus in which the rotating electrical machine and the differential apparatus are integrated can be suitably actualized while increase in physical size is suppressed.

According to an embodiment A2, in the embodiment A1, the stator winding has conductor portions that are arranged in a position that opposes the rotor at a predetermined interval in the circumferential direction. In the stator, an inter-conductor member may not be provided between the conductor portions in the circumferential direction. A magnetic material or a non-magnetic material is used as the inter-conductor member. The magnetic material meets a relation of $Wt \times Bs \leq Wm \times Br$ where Wt is a width dimension in the circumferential direction of the inter-conductor member for a single magnetic pole, B s is a saturation magnetic flux density of the inter-conductor member, Wm is a width dimension in the circumferential direction of the magnet portion for a single magnetic pole, and Br is a remanent flux density of the magnet portion. Alternatively, in the stator, an inter-conductor member may not be provided between the conductor portions in the circumferential direction. The conductor portion has a thickness dimension in a radial direction thereof that is less than a width dimension in a circumferential direction thereof for a single phase within a single magnetic pole.

In the rotating electrical machine configured as described above, as a result of teeth (iron core) between the conductor portions arranged in the circumferential direction in the stator being made smaller or eliminated, torque limitation that is attributed to magnetic saturation that occurs between the conductor portions is suppressed. In addition, as a result of the conductor portion being formed into a thin, flat shape, torque reduction is suppressed. In this case, even when an outer-diameter dimension of the rotating electrical machine is identical, a hollow portion on the inner side in the radial direction of the magnetic circuit portion can be expanded as a result of the stator being made thinner. The differential apparatus can be suitably arranged using the hollow portion.

In addition, inductance is reduced compared to that in a typical teeth structure in which the teeth (iron core) between the conductor portions are provided in the stator. Specifically, the inductance can be reduced to 1/10 or less. Therefore, reduction in mechanical time constant in the rotating electrical machine can be achieved. For example, improvement in responsiveness when the vehicle is started can be actualized.

According to a embodiment A3, in the embodiment A1 or A2, the magnet portion has a magnet magnetic path that is oriented to be parallel to a d-axis or close to parallel to the d-axis at portions closer to the d-axis and oriented to be orthogonal to a q-axis or close to orthogonal to the q-axis at portions closer to the q-axis.

In the rotating electrical machine configured as described above, as a result of magnet magnetic flux being concentrated on the d-axis side in the rotor, the magnet magnetic flux on the d-axis side is made stronger and increase in torque that occurs in accompaniment becomes possible. In this case, in accompaniment with a thickness dimension in the radial direction of the magnet portion being able to be reduced (made thinner), the hollow portion on the inner side in the radial direction of the magnetic circuit portion can be expanded. The differential apparatus can be suitably arranged using the hollow portion. Here, as a result of thickness also being made thinner on the stator side, the effect thereof becomes even more significant.

According to an embodiment A4, in the embodiment A1 or A2, in the magnet portion, orientation is set such that a circular arc-shaped magnet magnetic path is formed such that an easy axis of magnetization is oriented to be parallel to a d-axis or close to parallel to the d-axis at portions located closer to the d-axis, and an easy axis of magnetization is oriented to be orthogonal to a q-axis or close to orthogonal to the q-axis at portions located closer to the q-axis.

In the rotating electrical machine configured as described above, as a result of the magnet magnetic flux being concentrated on the d-axis side in the rotor, the magnet magnetic flux on the d-axis side is made stronger and increase in torque that occurs in accompaniment becomes possible. In addition, because the magnet magnetic path is formed into a circular arc shape by the orientation, further strengthening of the magnetic flux in a thin magnet becomes possible. As a result, the hollow portion on the inner side in the radial direction of the magnetic circuit portion can be expanded. The differential apparatus can be suitably arranged using the hollow portion. Here, as a result of thickness also being made thinner on the stator side, the effect thereof becomes even more significant.

According to an embodiment A5, in any one of the embodiments A1 to A4, the rotating electrical machine is an outer-rotor-type rotating electrical machine in which the rotor is arranged on an outer side in the radial direction of the stator.

In a configuration in which the outer-rotor-type rotating electrical machine is used, inertia in a rotating state is greater than that of an inner-rotor-type rotating electrical machine. Therefore, a low-vibration wheel driving apparatus can be actualized.

According to an embodiment A6, in any one of the embodiments A1 to A5, the wheel driving apparatus includes an electrical unit that includes: an annular case member that is provided in an annular space, the annular space being formed in a position on an inner side in the radial direction of the magnetic circuit portion and an outer side in the radial direction of the differential case; and an electrical component that is housed in a housing space inside the case member and configures an electric power converter that is electrically connected to the stator winding.

As a result of the above-described configuration, in the rotating electrical machine, the rotor, the stator, the electrical unit that configures the electric power converter, and the differential apparatus are arranged in a stacked state in the radial direction of the rotating electrical machine. In this case, a functionally consolidated wheel driving apparatus can be suitably actualized while the annular space that is formed around the axles inside the rotating electrical machine is even more effectively used.

According to an embodiment A7, in the embodiment A6, the case member is fixed to a vehicle body portion of the vehicle. An annular inner wall portion of the case member opposes an outer peripheral surface of the differential case. The differential case is supported so as to freely rotate by a bearing that is provided so as to surround the differential case between the inner wall portion and the differential case.

In the above-described configuration, the case member of the electrical unit is fixed to the vehicle body portion of the vehicle. The differential case is supported so as to freely rotate by the bearing on the inner side in the radial direction of the case member. In this case, the bearing can be suitably arranged in the stacked state in addition to the rotor and the stator of the rotating electrical machine, the differential apparatus, and the electrical unit.

According to an embodiment A8, in the embodiment A6 or A7, in the annular outer wall portion of the case member, the stator is fixed to an outer peripheral surface thereof and the electrical component is arranged so as to be placed along an inner peripheral surface. A coolant path through which a coolant flows is formed in the outer wall portion.

In the above-described configuration, the coolant path is provided in a position that is on the inner side in the circumferential direction of the stator and the outer side in the radial direction of the electric power converter, using the outer wall portion of the case member that is positioned in an annular shape around the axles. The electrical component can be suitably cooled by the coolant being sent through the coolant path.

According to an embodiment A9, in the embodiment A8, the wheel driving apparatus includes: a housing member that forms a closed space, and houses the rotor, the stator, and the differential apparatus inside the closed space; a circulating portion that circulates a lubricating oil that fills an interior of the housing member; and a heat releasing portion that performs heat releasing of the lubricating oil. The lubricating oil flows so as to pass through an outer side in the radial direction of the coolant path inside the housing member.

As a result of the above-described configuration, in the wheel driving apparatus, cooling of the electrical component by the coolant, and lubrication and cooling of each section by the lubricating oil inside the housing member can be suitably performed. In this case, the electrical component and the stator are mainly cooled by the coolant that flows through the coolant path. At the same time, the electrical component and the stator are cooled by the lubricating oil that flows on the outer side in the radial direction of the coolant path (a periphery of the case member). In addition, in this case, lubrication and cooling of each section by the lubricating oil can be suitably performed while the lubricating oil is shared between the rotating electrical machine and the differential apparatus.

According to an embodiment A10, in any one of the embodiments A1 to A8, the wheel driving apparatus includes: a housing member that forms a closed space, and houses the rotor, the stator, and the differential apparatus in the closed space; a circulating portion that circulates a lubricating oil that fills an interior of the housing member; and a heat releasing portion that performs heat releasing of the lubricating oil.

As a result of the above-described configuration, in the wheel driving apparatus, lubrication and cooling by the lubricating oil can be suitably performed while the lubricating oil is shared between the rotating electrical machine and the differential apparatus.

According to an embodiment A11, in any one of the embodiment A1 to A10, the rotor is fixed to the differential case, and the rotor and the differential case integrally rotate.

In the above-described configuration, the rotor is fixed to the differential case. The differential case rotates by the rotation of the rotor at a same rotation speed. In this case, the axles can be rotated at a reduction ratio of 1 in relation to the rotation of the rotating electrical machine.

According to an embodiment A12, in any one of the embodiments A1 to A10, a transmission apparatus that changes a speed of rotation of the rotor at a predetermined gear ratio is arranged in an annular space that is provided on an outer side in the radial direction of the differential case and on an inner side in the radial direction of the magnetic circuit portion.

As a result of the above-described configuration, in the rotating electrical machine, the rotor, the stator, the transmission apparatus, and the differential apparatus are arranged in a stacked state in the radial direction of the rotating electrical machine. In this case, a functionally consolidated wheel driving apparatus can be suitably actualized while the annular space that is formed around the axles inside the rotating electrical machine is even more effectively used.

According to an embodiment A13, in the embodiment A12, the transmission apparatus is a planetary gear mechanism that includes: a ring gear that has internal teeth; a sun gear that has external teeth; a plurality of pinion gears that are arranged between the ring gear and the sun gear, and mesh with the gears; and a carrier that rotatably supports the plurality of pinion gears. Either of the ring gear and the sun gear is fixed to the vehicle body portion of the vehicle, the other of the ring gear and the sun gear is fixed to the rotor, and the carrier is fixed to the differential case.

As a result of the above-described configuration, during rotation of the rotor, the pinion gears rotate based on the rotation of the sun gear or the ring gear. In addition, the differential case integrally rotates with the carrier in accompaniment with the rotation of the pinion gears. In this case, the rotation of the rotating electrical machine, that is, the rotation of the rotor is decelerated at a predetermined reduction rate prescribed by the planetary gear mechanism. The axles rotate together with the differential case at the rotation speed after deceleration.

The planetary gear mechanism is concentrically provided in an annular space between the differential case and the magnetic circuit portion in the radial direction. In a manner similar to the rotor and the stator of the rotating electrical machine, and the differential apparatus, the planetary gear mechanism is suitably arranged in a stacked state.

An embodiment B1 provides a wheel driving apparatus that includes: a pair of axles that are connected to left and right wheels of a vehicle; a differential apparatus that is provided so as to be coupled with the axles; and a rotating electrical machine that rotates the axles. The rotating electrical machine includes: a rotor that includes a magnet portion that includes a plurality of magnetic poles of which polarities alternate in a circumferential direction, and is provided so as to be capable of integrally rotating with a rotation shaft; a cylindrical stator that includes a multiple-phase stator winding; a first gear that is fixed to the rotation shaft; and a first housing that houses the rotor, the stator, and the first gear. The rotor and the stator are arranged in a state in which the magnet portion and the stator winding oppose each other inward and outward in a radial direction. The differential apparatus includes: a differential case that rotates in accompaniment with a rotation of a rotor; side gears that are housed in the differential case and respectively connected to the pair of axles; a pinion gear that is housed in the differential case and mutually meshes with the side gears; a second gear that is fixed to the differential case; and a second housing that is provided so as to surround the differential case and the second gear. The first housing and the second housing are fixed to each other, and spaces inside the housings are interconnected by a communicating portion. The first gear and the second gear are in the meshed state through the communicating portion.

In the wheel driving apparatus configured as described above, the first housing on the rotating electrical machine side and the second housing on the differential apparatus side are connected, and the first gear on the rotating electrical machine side and the second gear on the differential apparatus side are meshed. In this case, in particular, the spaces inside the housings are interconnected by the communicating portion, and the first gear and the second gear are in the meshed state through the communicating portion. As a result, power transmission between the rotating electrical machine and the differential apparatus can be suitably performed in a state in which the rotating electrical machine and the differential apparatus are arranged in proximity.

According to an embodiment B2, in the embodiment B1, the first housing and the second housing are arranged side-by-side in a direction orthogonal to an axial direction of the axles. The rotating electrical machine is provided at an orientation at which the rotation shaft is parallel to the axles.

As a result of the above-described configuration, in the wheel driving apparatus in which the rotating electrical machine and the differential apparatus are arranged side-by-side in a direction orthogonal to the axial direction of the axles, width dimensions in the axial direction of the axles can be minimized. As a result, in the vehicle in which the wheel driving apparatus is mounted, effective use of space on both sides sandwiching the wheel driving apparatus in the axial direction of the axles can be made. Here, the position of the rotation shaft of the rotating electrical machine in relation to the axles may be arbitrary in a vertical direction and a horizontal direction. For example, a configuration in which the rotation shaft of the rotating electrical machine is arranged so as to be either of above the axles in the vertical direction and below the axles in the vertical direction, a configuration in which the rotation shaft of the rotating electrical machine is arranged towards either of the front of the vehicle and the rear of the vehicle in relation to the axles, or the like can be actualized.

According to an embodiment B3, in the embodiment B1, the first housing and the second housing are arranged side-by-side in a direction orthogonal to an axial direction of the axles. The rotating electrical machine is provided at an orientation at which the rotation shaft intersects the axles.

As a result of the above-described configuration, in the wheel driving apparatus in which the rotating electrical machine and the differential apparatus are arranged side-by-side in a direction orthogonal to the axial direction of the axles, width dimensions in the direction orthogonal to the axial direction of the axles can be minimized. As a result, in the vehicle in which the wheel driving apparatus is mounted, effective use of space in the direction orthogonal to the axial direction of the axles can be made. Here, a direction in which the rotation shaft of the rotating electrical machine extends in relation to the axles may be arbitrary in a vertical direction and a horizontal direction. For example, a configuration in which the rotation shaft of the rotating electrical machine extends so as to be either of above the axles in the vertical direction and below the axles in the vertical direction, a configuration in which the rotation shaft of the rotating electrical machine extends towards either of the front of the vehicle and the rear of the vehicle in relation to the axles, or the like can be actualized.

According to an embodiment B4, in any one of the embodiments B1 to B3, the stator winding has conductor portions that are arranged in a position that opposes the rotor at a predetermined interval in the circumferential direction. In the stator, an inter-conductor member may be provided between the conductor portions in the circumferential direction. A magnetic material or a non-magnetic material is used as the inter-conductor member. The magnetic material meets a relation of Wt×Bs≤Wm×Br where Wt is a width dimension in the circumferential direction of the inter-conductor member for a single magnetic pole, Bs is a saturation magnetic flux density of the inter-conductor member, Wm is a width dimension in the circumferential direction of the magnet portion for a single magnetic pole, and Br is a remanent flux density of the magnet portion. Alternatively, in the stator, an inter-conductor member may not be provided between the conductor portions in the circumferential direction. The conductor portion has a thickness dimension in a radial direction thereof that is less than a width dimension in a circumferential direction thereof for a single phase within a single magnetic pole.

In the rotating electrical machine configured as described above, as a result of teeth (iron core) between the conductor portions arranged in the circumferential direction in the stator being made smaller or eliminated, torque limitation that is attributed to magnetic saturation that occurs between the conductor portions is suppressed. In addition, as a result of the conductor portion being formed into a thin, flat shape, torque reduction is suppressed. In this case, an outer-shape dimension of the rotating electrical machine can be reduced by the stator being made thinner, while torque performance of the rotating electrical machine is maintained. Therefore, in the wheel driving apparatus in which the rotating electrical machine and the differential apparatus are arranged side-by-side, reduction of overall dimensions can be actualized.

According to an embodiment B5, in any one of the embodiments B1 to B4, the magnet portion has a magnet magnetic path that is oriented to be parallel to a d-axis or close to parallel to the d-axis at portions closer to the d-axis and oriented to be orthogonal to a q-axis or close to orthogonal to the q-axis at portions closer to the q-axis.

In the rotating electrical machine configured as described above, as a result of the magnet magnetic flux being concentrated on the d-axis side in the rotor, the magnet magnetic flux on the d-axis side is made stronger and increase in torque that occurs in accompaniment becomes possible. In this case, in accompaniment with a thickness dimension in the radial direction of the magnet portion being able to be reduced (made thinner), the outer-shape dimension of the rotating electrical machine can be reduced. The rotating electrical machine and the differential apparatus can be compactly arranged in a consolidated manner. Here, as a result of thickness also being made thinner on the stator side, the effect thereof becomes even more significant.

According to an embodiment B6, in any one of the embodiments B1 to B4, in the magnet portion, orientation is set such that a circular arc-shaped magnet magnetic path in which an easy axis of magnetization is oriented to be parallel to a d-axis or close to parallel to the d-axis at portions located closer to the d-axis, and an easy axis of magnetization is oriented to be orthogonal to a q-axis or close to orthogonal to the q-axis at portions located closer to the q-axis is formed.

In the rotating electrical machine configured as described above, as a result of the magnet magnetic flux being concentrated on the d-axis side in the rotor, the magnet magnetic flux on the d-axis side is made stronger and increase in torque that occurs in accompaniment becomes possible. In addition, because the magnet magnetic path is formed into a circular arc shape by the orientation, further strengthening of the magnetic flux in a thin magnet becomes possible. As a result, the outer-shape dimension of the rotating electrical machine can be reduced. The rotating electrical machine and the differential apparatus can be compactly arranged in a consolidated manner. Here, as a result of the thickness also being reduced on the stator side, the effect thereof becomes even more significant.

According to an embodiment B7, in any one of the embodiment B1 to B6, an electrical component that configures an electric power converter that is electrically connected to the stator winding is arranged in an annular shape in a hollow portion that is provided on an inner side in the radial direction of the magnetic circuit portion that is configured by the rotor and the stator in the rotating electrical machine.

As a result of the above-described configuration, in the rotating electrical machine, the rotor, the stator, and the electric power converter (specifically, the electrical component that configures the electric power converter) are arranged in a stacked state in the radial direction of the rotating electrical machine. In this case, in the rotating electrical machine, the electric power converter can be suitably arranged using the hollow portion that is further towards the inner side in the radial direction than the rotor and the stator. As a result, reduction in size as the rotating electrical machine can be achieved. Moreover, size reduction of the wheel driving apparatus can be achieved.

According to an embodiment B8, in any one of the embodiments B1 to B7, the wheel driving apparatus is that in which a lubricating oil is circulated. The lubricating oil can flow through the communicating portion from one housing to the other housing, of the first housing and the second housing.

According to the above-described configuration, in the wheel driving apparatus in which the lubricating oil is circulated, the lubricating oil can be sent between the rotating electrical machine and the differential apparatus, via the first gear and the second gear. As a result, lubrication and cooling can be suitably performed using the lubricating oil that is shared among the rotating electrical machine, the differential apparatus, and the transmission apparatus (the first gear and the second gear).

According to an embodiment B9, in the embodiment B8, the wheel driving apparatus includes: a circulation path of which one end side is connected to the one housing and another end side is connected to the other housing; a pump that circulates the lubricating oil through the circulation path; and a heat releasing portion that is provided on the circulation path. The lubricating oil that flows in from the circulation path to the one housing is sent to the other housing through the communicating portion, and flows out from the other housing to the circulation path.

As a result of the above-described configuration, the lubricating oil is circulated over a series of paths that is the circulation path→the one housing→the communicating portion→the other housing→the circulation path. In this case, if the lubricating oil flows into the first housing (the housing of the rotating electrical machine) from the circulation path and flows out to the circulation path from the second housing (the housing of the differential apparatus), cooling by the lubricating oil can be preferentially performed on the rotating electrical machine side. In addition, if the lubricating oil flows into the second housing (the housing of the differential apparatus) from the circulation path and flows out to the circulation path from the first housing (the housing of the rotating electrical machine), cooling by the lubricating oil can be preferentially performed on the differential apparatus side.

The embodiments will be described below with reference to the drawings. Parts of the embodiments functionally or structurally corresponding to each other or associated with each other will be denoted by the same reference numbers or by reference numbers which are different in the hundreds place from each other. The corresponding or associated parts may refer to the explanation in the other embodiments.

The rotating electrical machine in the embodiments is configured to be used, for example, as a power source for vehicles. The rotating electrical machine may, however, be used widely for industrial, automotive, domestic, office automation, or game applications. In the following embodiments, the same or equivalent parts will be denoted by the same reference numbers in the drawings, and explanation thereof in detail will be omitted.

First Embodiment

Figure 2:
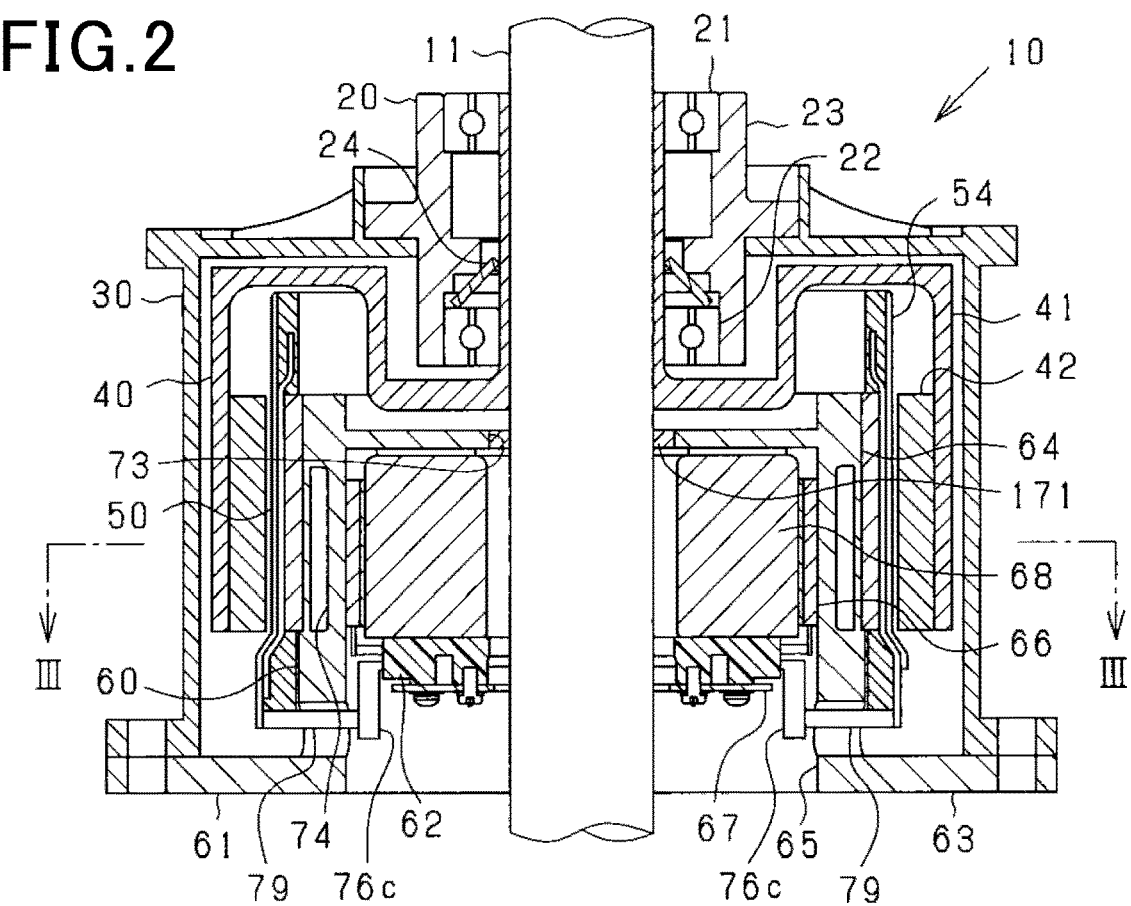
FIG. 2 is a longitudinal sectional view of a rotating electrical machine.
Figure 3:
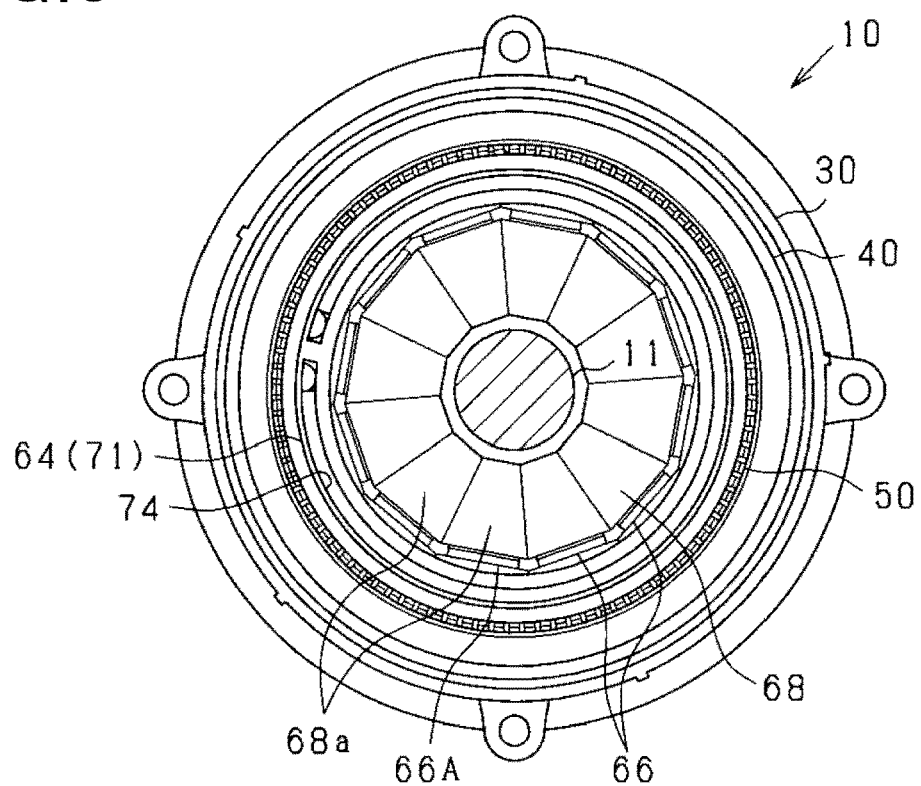
FIG. 3 is a sectional view taken along the line III-III in FIG. 2.
Figure 4:
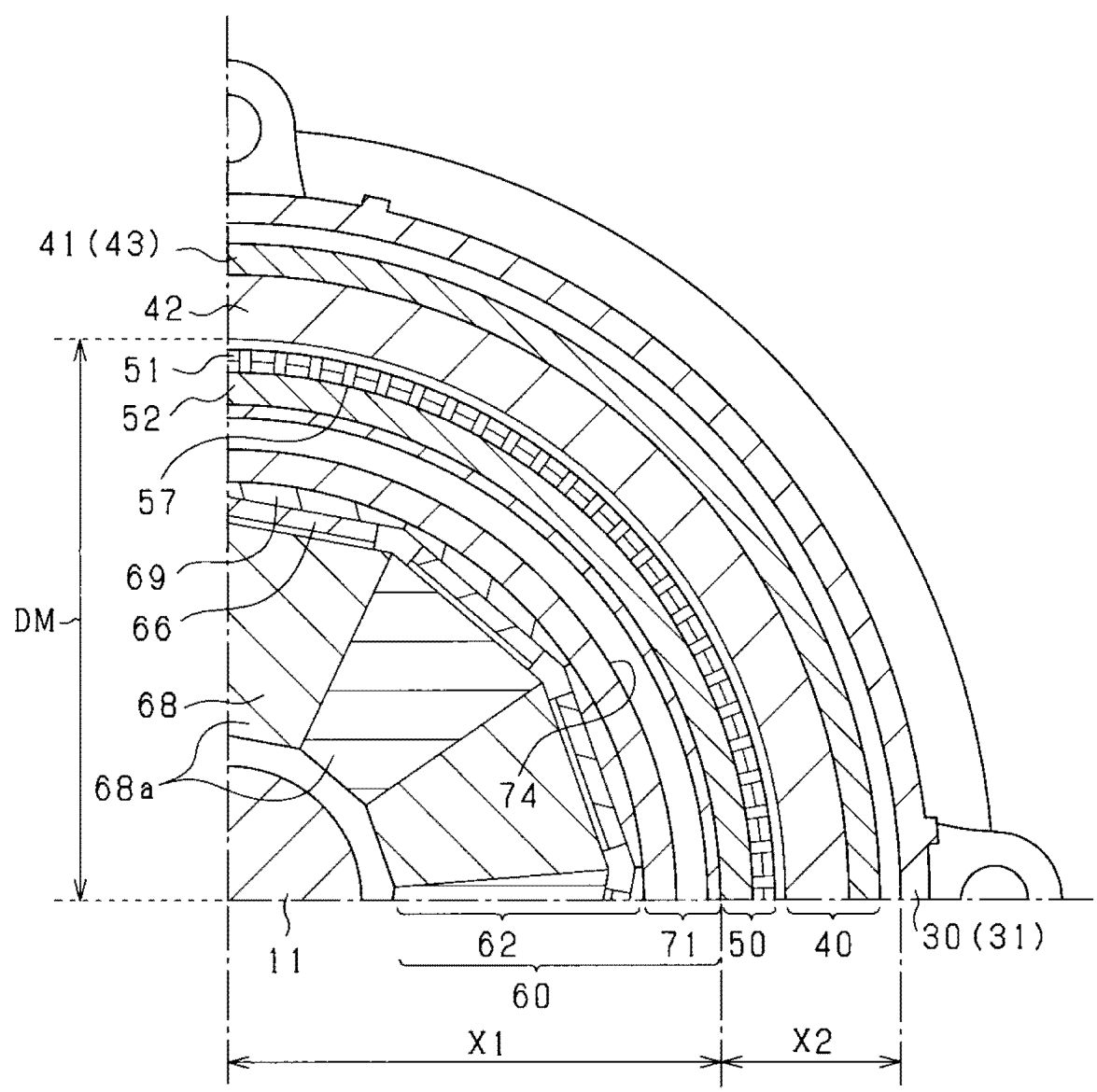
FIG. 4 is a partial enlarged sectional view of FIG. 3.
Figure 5:
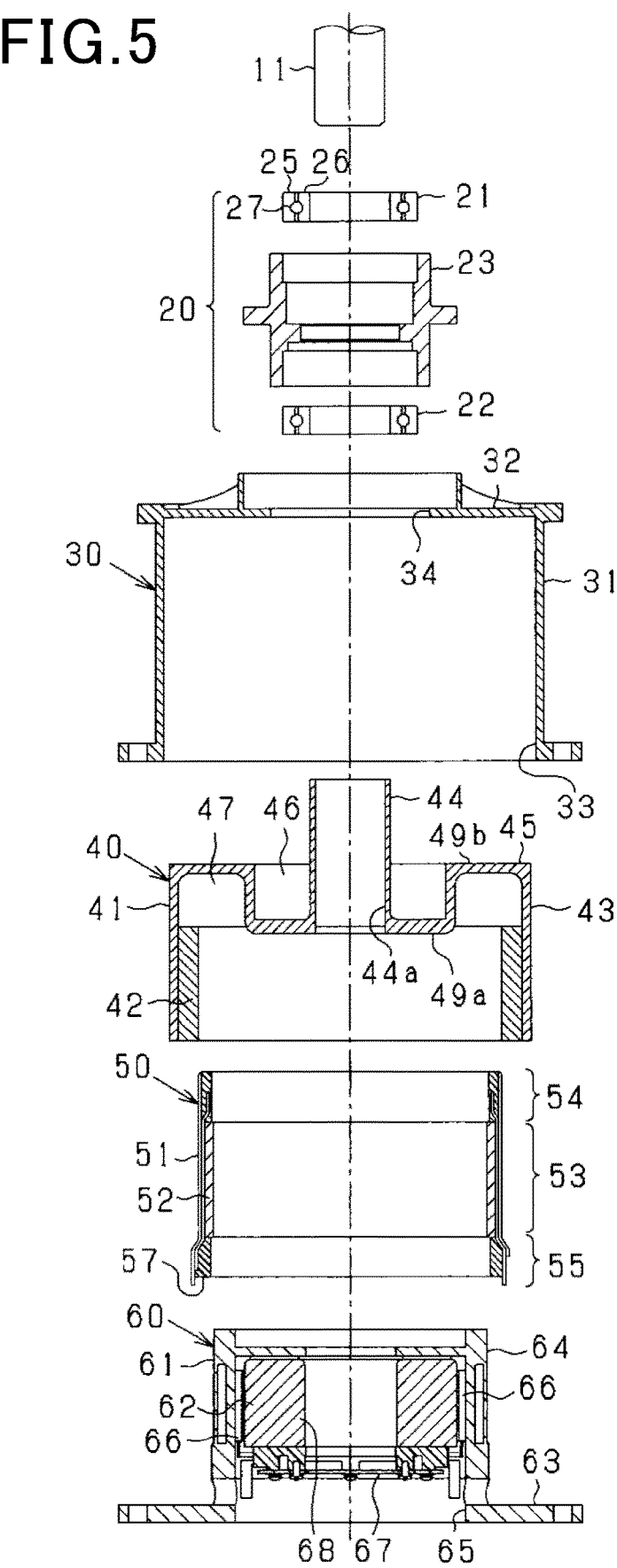
FIG. 5 is an exploded view of a rotating electrical machine.

The rotating electrical machine 10 in this embodiment is a synchronous polyphase ac motor having an outer rotor structure (i.e., an outer rotating structure). The outline of the rotating electrical machine 10 is illustrated in FIGS. 1 to 5. FIG. 1 is a perspective longitudinal sectional view of the rotating electrical machine 10. FIG. 2 is a longitudinal sectional view along the rotating shaft 11 of the rotating electrical machine 10. FIG. 3 is a traverse sectional view (i.e., sectional view taken along the line III-III in FIG. 2) of the rotating electrical machine 10 perpendicular to the rotating shaft 11. FIG. 4 is a partially enlarged sectional view of FIG. 3. FIG. 5 is an exploded view of the rotating electrical machine 10. FIG. 3 omits hatching showing a section except the rotating shaft 11 for the sake of simplicity of the drawings. In the following discussion, a lengthwise direction of the rotating shaft 11 will also be referred to as an axial direction. A radial direction from the center of the rotating shaft 11 will be simply referred to as a radial direction. A direction along a circumference of the rotating shaft 11 about the center thereof will be simply referred to as a circumferential direction.

The rotating electrical machine 10 includes the bearing unit 20, the housing 30, the rotor 40, the stator 50, and the inverter unit 60. These members are arranged coaxially with each other together with the rotating shaft 11 and assembled in a given sequence to complete the rotating electrical machine 10. The rotating electrical machine 10 in this embodiment is equipped with the rotor 40 working as a magnetic field-producing unit or a field system and the stator 50 working as an armature and engineered as a revolving-field type rotating electrical machine.

The bearing unit 20 includes two bearings 21 and 22 arranged away from each other in the axial direction and the retainer 23 which retains the bearings 21 and 22. The bearings 21 and 22 are implemented by, for example, radial ball bearings each of which includes the outer race 25, the inner race 26, and a plurality of balls 27 disposed between the outer race 25 and the inner race 26. The retainer 23 is of a cylindrical shape. The bearings 21 and 22 are disposed radially inside the retainer 23. The rotating shaft 11 and the rotor 40 are retained radially inside the bearings 21 and 22 to be rotatable. The bearings 21 and 22 are used as a set of bearings to rotatably retain the rotating shaft 11.

Each of the bearings 21 and 22 holds the balls 27 using a retainer, not shown, to keep a pitch between the balls 27 constant. Each of the bearings 21 and 22 is equipped with seals on axially upper and lower ends of the retainer and also has non-conductive grease (e.g., non-conductive urease grease) installed inside the seals. The position of the inner race 26 is mechanically secured by a spacer to exert constant inner precompression on the inner race 26 in the form of a vertical convexity.

The housing 30 includes the cylindrical peripheral wall 31. The peripheral wall 31 has a first end and a second end opposed to each other in an axial direction thereof. The peripheral wall 31 has the end surface 32 on the first end and the opening 33 in the second end. The opening 33 occupies the entire area of the second end. The end surface 32 has formed in the center thereof the circular hole 34. The bearing unit 20 is inserted into the hole 34 and fixed using a fastener, such as a screw or a rivet. The hollow cylindrical rotor 40 and the hollow cylindrical stator 50 are disposed in an inner space defined by the peripheral wall 31 and the end surface 32 within the housing 30. In this embodiment, the rotating electrical machine 10 is of an outer rotor type, so that the stator 50 is arranged radially inside the cylindrical rotor 40 within the housing 30. The rotor 40 is retained in a cantilever form by a portion of the rotating shaft 11 close to the end surface 32 in the axial direction.

The rotor 40 includes the hollow cylindrical magnetic holder 41 and the annular magnet unit 42 disposed radially inside the magnet holder 41. The magnet holder 41 is of substantially a cup-shape and works as a magnet holding member. The magnet holder 41 includes the cylinder 43, the attaching portion 44 which is of a cylindrical shape and smaller in diameter than the cylinder 43, and the intermediate portion 45 connecting the cylinder 43 and the attaching portion 44 together. The cylinder 43 has the magnet unit 42 secured to an inner peripheral surface thereof.

The magnet holder 41 is made of cold rolled steel (SPCC), forging steel, or carbon fiber reinforced plastic (CFRP) which have a required degree of mechanical strength.

The rotating shaft 11 passes through the through-hole 44a of the attaching portion 44. The attaching portion 44 is secured to a portion of the rotating shaft 11 disposed inside the through-hole 44a. In other words, the magnet holder 41 is secured to the rotating shaft 11 through the attaching portion 44. The attaching portion 44 may preferably be joined to the rotating shaft 11 using concavities and convexities, such as a spline joint or a key joint, welding, or crimping, so that the rotor 40 rotates along with the rotating shaft 11.

The bearings 21 and 22 of the bearing unit 20 are secured radially outside the attaching portion 44. The bearing unit 20 is, as described above, fixed on the end surface 32 of the housing 30, so that the rotating shaft 11 and the rotor 40 are retained by the housing 30 to be rotatable. The rotor 40 is, thus, rotatable within the housing 30.

The rotor 40 is equipped with the attaching portion 44 arranged at only one of ends thereof opposed to each other in the axial direction of the rotor 40. This cantilevers the rotor 40 on the rotating shaft 11. The attaching portion 44 of the rotor 40 is rotatably retained at two points of supports using the bearings 21 and 22 of the bearing unit 20 which are located away from each other in the axial direction. In other words, the rotor 40 is held to be rotatable using the two bearings 21 and 22 which are separate at a distance away from each other in the axial direction on one of the axially opposed ends of the magnet holder 41. This ensures the stability in rotation of the rotor 40 even though the rotor 40 is cantilevered on the rotating shaft 11. The rotor 40 is retained by the bearings 21 and 22 at locations which are away from the center intermediate between the axially opposed ends of the rotor 40 in the axial direction thereof.

The bearing 22 of the bearing unit 20 which is located closer to the center of the rotor 40 (a lower one of the bearings 21 and 22 in the drawings) is different in dimension of a gap between each of the outer race 25 and the inner race and the balls 27 from the bearing 21 which is located farther away from the center of the rotor 40 (i.e., an upper one of the bearings 21 and 22). For instance, the bearing 22 closer to the center of the rotor 40 is greater in the dimension of the gap from the bearing 21. This minimizes adverse effects on the bearing unit 20 which arise from deflection of the rotor 40 or mechanical vibration of the rotor 40 due to imbalance resulting from parts tolerance at a location close to the center of the rotor 40. Specifically, the bearing 22 closer to the center of the rotor 40 is engineered to have dimensions of the gaps or plays increased using precompression, thereby absorbing the vibration generating in the cantilever structure. The precompression may be provided by either fixed position preload or constant pressure preload. In the case of the fixed position preload, the outer race 25 of each of the bearings 21 and 22 is joined to the retainer 23 using press-fitting or welding. The inner race 26 of each of the bearings 21 and 22 is joined to the rotating shaft 11 by press-fitting or welding. The precompression may be created by placing the outer race 25 of the bearing 21 away from the inner race 26 of the bearing 21 in the axial direction or alternatively placing the outer race 25 of the bearing 22 away from the inner race 26 of the bearing 22 in the axial direction.

In the case of the constant pressure preload, a preload spring, such as a wave washer 24, is arranged between the bearing 22 and the bearing 21 to create the preload directed from a region between the bearing 22 and the bearing 21 toward the outer race 25 of the bearing 22 in the axial direction. In this case, the inner race 26 of each of the bearing 21 and the bearing 22 is joined to the rotating shaft 11 using press fitting or bonding. The outer race 25 of the bearing 21 or the bearing 22 is arranged away from the outer race 25 through a given clearance. This structure exerts pressure, as produced by the preload spring, on the outer race 25 of the bearing 22 to urge the outer race 25 away from the bearing 21. The pressure is then transmitted through the rotating shaft 11 to urge the inner race 26 of the bearing 21 toward the bearing 22, thereby bringing the outer race 25 of each of the bearings 21 and 22 away from the inner race 26 thereof in the axial direction to exert the preload on the bearings 21 and 22 in the same way as the fixed position preload.

The constant pressure preload does not necessarily need to exert the spring pressure, as illustrated in FIG. 2, on the outer race 25 of the bearing 22, but may alternatively be created by exerting the spring pressure on the outer race 25 of the bearing 21. The exertion of the preload on the bearings 21 and 22 may alternatively be achieved by placing the inner race 26 of one of the bearings 21 and 22 away from the rotating shaft 11 through a given clearance therebetween and joining the outer race 25 of each of the bearings 21 and 22 to the retainer 23 using press-fitting or bonding.

Further, in the case where the pressure is created to bring the inner race 26 of the bearing 21 away from the bearing 22, such pressure is preferably additionally exerted on the inner race 26 of the bearing 22 away from the bearing 21. Conversely, in the case where the pressure is created to bring the inner race 26 of the bearing 21 close to the bearing 22, such pressure is preferably additionally exerted on the inner race 26 of the bearing 22 to bring it close to the bearing 21.

In a case where the rotating electrical machine 10 is used as a power source for a vehicle, there is a risk that mechanical vibration having a component oriented in a direction in which the preload is created may be exerted on the preload generating structure or that a direction in which the force of gravity acts on an object to which the preload is applied may be changed. In order to alleviate such a problem, the fixed position preload is preferably used in the case where the rotating electrical machine 10 is mounted in the vehicle.

The intermediate portion 45 includes the annular inner shoulder 49a and the annular outer shoulder 49b. The outer shoulder 49b is arranged outside the inner shoulder 49a in the radial direction of the intermediate portion 45. The inner shoulder 49a and the outer shoulder 49b are separate from each other in the axial direction of the intermediate portion 45. This layout results in a partial overlap between the cylinder 43 and the attaching portion 44 in the radial direction of the intermediate portion 45. In other words, the cylinder 43 protrudes outside a base end portion (i.e., a lower portion, as viewed in the drawing) of the attaching portion 44 in the axial direction. The structure in this embodiment enables the rotor 40 to be retained by the rotating shaft 11 at a location closer to the center of gravity of the rotor 40 than a case where the intermediate portion 45 is shaped to be flat without any shoulder, thereby ensuring the stability in operation of the rotor 40.

In the above described structure of the intermediate portion 45, the rotor 40 has the annular bearing housing recess 46 which is formed in an inner portion of the intermediate portion 45 and radially surrounds the attaching portion 44. The bearing housing recess 46 has a portion of the bearing unit 20 disposed therein. The rotor 40 also has the coil housing recess 47 which is formed in an outer portion of the intermediate portion 45 and radially surrounds the bearing housing recess 46. The coil housing recess 47 has disposed therein the coil end 54 of the stator winding 51 of the stator 50, which will be described later in detail. The housing recesses 46 and 47 are arranged adjacent each other in the axial direction. In other words, a portion of the bearing unit 20 is laid to overlap the coil end 54 of the stator winding 51 in the axial direction. This enables the rotating electrical machine 10 to have a length decreased in the axial direction.

The intermediate portion 45 extends or overhangs outward from the rotating shaft 11 in the radial direction. The intermediate portion 45 is equipped with a contact avoider which extends in the axial direction and avoids a physical contact with the coil end 54 of the stator winding 51 of the stator 50. The intermediate portion 45 will also be referred to as an overhang.

The coil end 54 may be bent radially inwardly or outwardly to have a decreased axial dimension, thereby enabling the axial length of the stator 50 to be decreased. A direction in which the coil end 54 is bent is preferably determined depending upon installation thereof in rotor 40. In the case where the stator 50 is installed radially inside the rotor 40, a portion of the coil end 54 which is inserted into the rotor 40 is preferably bent radially inwardly. A coil end opposite the coil end 54 may be bent either inwardly or outwardly, but is preferably bent to an outward side where there is an enough space in terms of the production thereof.

The magnet unit 42 working as a magnetic portion is made up of a plurality of permanent magnets which are disposed radially inside the cylinder 43 to have different magnetic poles arranged alternately in a circumferential direction thereof. The magnet unit 42, thus, has a plurality of magnetic poles arranged in the circumferential direction. The magnet unit 42 will also be described later in detail.

The stator 50 is arranged radially inside the rotor 40. The stator 50 includes the stator winding 51 wound in a substantially cylindrical (annular) form and the stator core 52 used as a base member arranged radially inside the stator winding 51. The stator winding 51 is arranged to face the annular magnet unit 42 through a given air gap therebetween. The stator winding 51 includes a plurality of phase windings each of which is made of a plurality of conductors which are arranged at a given pitch away from each other in the circumferential direction and joined together. In this embodiment, two three-phase windings: one including a U-phase winding, a V-phase winding, and a W-phase winging and the other including an X-phase winding, a Y-phase winding, and a Z-phase winding are used to complete the stator winding 51 as a six-phase winding.

The stator core 52 is formed by an annular stack of magnetic steel plates made of soft magnetic material and mounted radially inside the stator winding 51. The magnetic steel plates are, for example, silicon steel plates made by adding a small percent (e.g., 3%) of silicon to iron. The stator winding 51 corresponds to an armature winding. The stator core 52 corresponds to an armature core.

The stator winding 51 overlaps the stator core 52 in the radial direction and includes the coil side portion 53 disposed radially outside the stator core 52 and the coil ends 54 and 55 overhanging at ends of the stator core 52 in the axial direction. The coil side portion 53 faces the stator core 52 and the magnet unit 42 of the rotor 40 in the radial direction. The stator 50 is arranged inside the rotor 40. The coil end 54 that is one (i.e., an upper one, as viewed in the drawings) of the axially opposed coil ends 54 and 55 and arranged close to the bearing unit 20 is disposed in the coil housing recess 47 defined by the magnet holder 41 of the rotor 40. The stator 50 will also be described later in detail.

The inverter unit 60 includes the unit base 61 secured to the housing 30 using fasteners, such as bolts, and a plurality of electrical components 62 mounted on the unit base 61. The unit base 61 is made from, for example, carbon fiber reinforced plastic (CFRP). The unit base 61 includes the end plate 63 secured to an edge of the opening 33 of the housing 30 and the casing 64 which is formed integrally with the end plate 63 and extends in the axial direction. The end plate 63 has the circular opening 65 formed in the center thereof. The casing 64 extends upward from a peripheral edge of the opening 65.

The stator 50 is arranged on an outer peripheral surface of the casing 64. Specifically, an outer diameter of the casing 64 is selected to be identical with or slightly smaller than an inner diameter of the stator core 52. The stator core 52 is attached to the outer side of the casing 64 to complete a unit made up of the stator 50 and the unit base 61. The unit base 61 is secured to the housing 30, so that the stator 50 is unified with the housing 50 in a condition where the stator core 52 is installed on the casing 64.

The stator core 52 may be bonded, shrink-fit, or press-fit on the unit base 61, thereby eliminating positional shift of the stator core 52 relative to the unit base 61 both in the circumferential direction and in the axial direction.

The casing 64 has a radially inner storage space in which the electrical components 62 are disposed. The electrical components 62 are arranged to surround the rotating shaft 11 within the storage space. The casing 64 functions as a storage space forming portion. The electrical components 62 include the semiconductor modules 66, the control board 67, and the capacitor module 68 which constitute an inverter circuit.

The unit base 61 serves as a stator holder (i.e., an armature holder) which is arranged radially inside the stator 50 and retains the stator 50. The housing 30 and the unit base 61 define a motor housing for the rotating electrical machine 10. In the motor housing, the retainer 23 is secured to a first end of the housing 30 which is opposed to a second end of the housing 30 through the rotor 40 in the axial direction. The second end of the housing 30 and the unit base 61 are joined together. For instance, in an electric-powered vehicle, such as an electric automobile, the motor housing is attached to a side of the vehicle to install the rotating electrical machine 10 in the vehicle.

Figure 6:
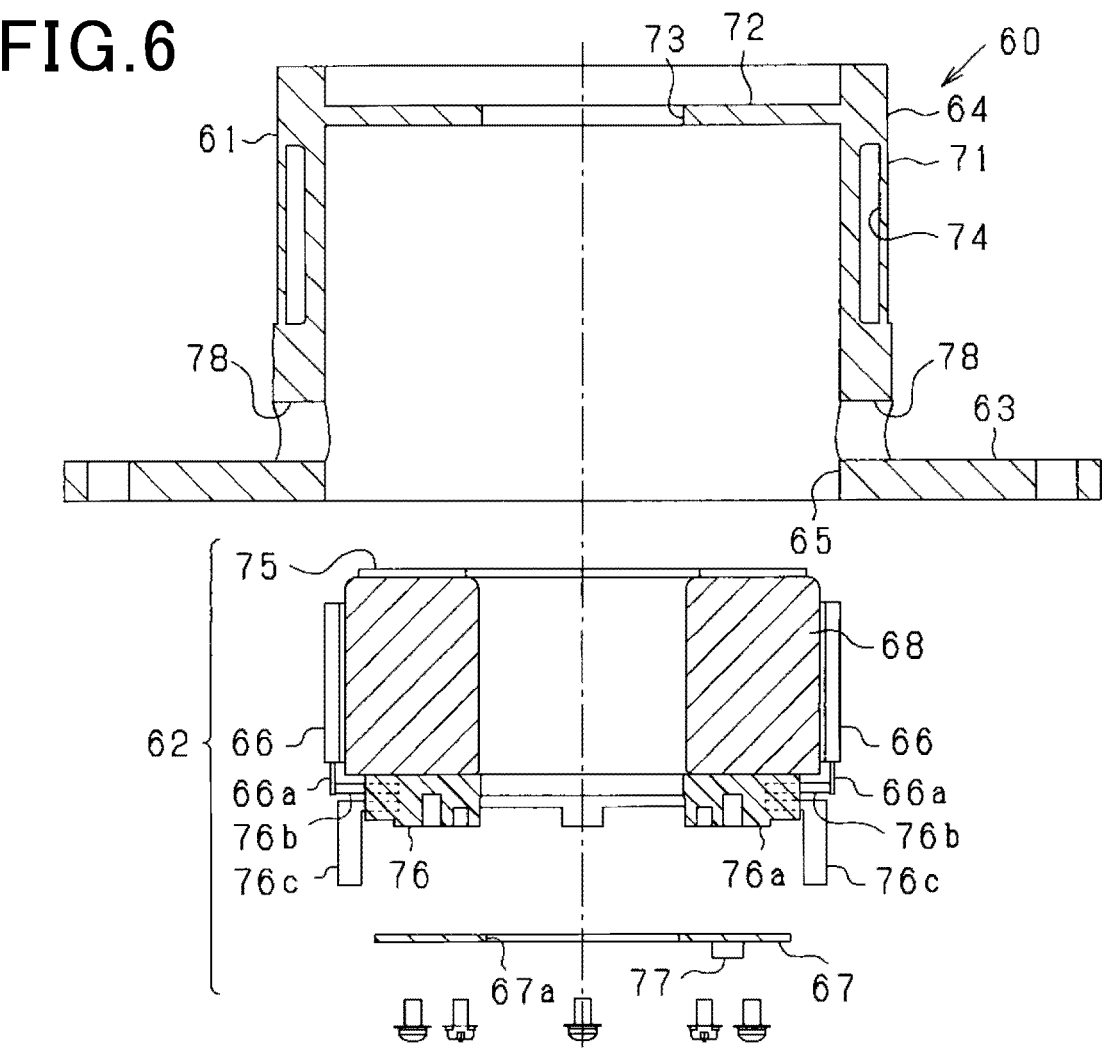
FIG. 6 is an exploded view of an inverter unit.

The inverter unit 60 will be also be described using FIG. 6 that is an exploded view in addition to FIGS. 1 to 5.

The casing 64 of the unit base 61 includes the cylinder 71 and the end surface 72 that is one of ends of the cylinder 71 which are opposed to each other in the axial direction of the cylinder 71 (i.e., the end of the casing 64 close to the bearing unit 20). The end of the cylinder 71 opposed to the end surface 72 in the axial direction is shaped to fully open to the opening 65 of the end plate 63. The end surface 72 has formed in the center thereof the circular hole 73 through which the rotating shaft 11 is insertable. The hole 73 has fitted therein the sealing member 171 which hermetically seals an air gap between the hole 73 and the outer periphery of the rotating shaft 11. The sealing member 171 is preferably implemented by, for example, a resinous slidable seal.

The cylinder 71 of the casing 64 serves as a partition which isolates the rotor 40 and the stator 50 arranged radially outside the cylinder 71 from the electrical components 62 arranged radially inside the cylinder 71. The rotor 40, the stator 50, and the electrical components 62 are arranged radially inside and outside the cylinder 71.

The electrical components 62 are electrical devices making up the inverter circuit equipped with a motor function and a generator function. The motor function is to deliver electrical current to the phase windings of the stator winding 51 in a given sequence to turn the rotor 40. The generator function is to receive a three-phase ac current flowing through the stator winding 51 in response to the rotation of the rotating shaft 11 and generate and output electrical power. The electrical components 62 may be engineered to perform either one of the motor function and the generator function. In a case where the rotating electrical machine 10 is used as a power source for a vehicle, the generator function serves as a regenerative function to output a regenerated electrical power.

Specifically, the electrical components 62, as demonstrated in FIG. 4, include the hollow cylindrical capacitor module 68 arranged around the rotating shaft 11 and the semiconductor modules 66 mounted on the capacitor module 68. The capacitor module 68 has a plurality of smoothing capacitors 68*a* connected in parallel to each other. Specifically, each of the capacitors 68*a* is implemented by a stacked-film capacitor which is made of a plurality of film capacitors stacked in a trapezoidal shape in cross section. The capacitor module 68 is made of the twelve capacitors 68*a* arranged in an annular shape.

The capacitors 68*a* may be produced by preparing a long film which has a given width and is made of a stack of films and cutting the long film into isosceles trapezoids each of which has a height identical with the width of the long film and whose short bases and long bases are alternately arranged. Electrodes are attached to the thus produced capacitor devices to complete the capacitors 68*a*.

The semiconductor module 66 includes, for example, a semiconductor switch, such as a MOSFET or an IGBT and is of substantially a planar shape. In this embodiment, the rotating electrical machine 10 is, as described above, equipped with two sets of three-phase windings and has the inverter circuits, one for each set of the three-phase windings. The electrical components 62, therefore, include a total of twelve semiconductor modules 66 which are arranged in an annular form to make up the semiconductor module group 66A.

The semiconductor modules 66 are interposed between the cylinder 71 of the casing 64 and the capacitor module 68. The semiconductor module group 66A has an outer peripheral surface placed in contact with an inner peripheral surface of the cylinder 71. The semiconductor module group 66A also has an inner peripheral surface placed in contact with an outer peripheral surface of the capacitor module 68. This causes heat, as generated in the semiconductor modules 66, to be transferred to the end plate 63 through the casing 64, so that it is dissipated from the end plate 63.

The semiconductor module group 66A preferably has the spacers 69 disposed radially outside the outer peripheral surface thereof, i.e., between the semiconductor modules 66 and the cylinder 71. A combination of the capacitor modules 68 is so arranged as to have a regular dodecagonal section extending perpendicular to the axial direction thereof, while the inner periphery of the cylinder 71 has a circular transverse section. The spacers 69 are, therefore, each shaped to have a flat inner peripheral surface and a curved outer peripheral surface. The spacers 69 may alternatively be formed integrally with each other in an annular shape and disposed radially outside the semiconductor module group 66A. The spacers 69 are highly thermally conductive and made of, for example, metal, such as aluminum or heat dissipating gel sheet. The inner periphery of the cylinder 71 may alternatively be shaped to have a dodecagonal transverse section like the capacitor modules 68. In this case, the spacers 69 are each preferably shaped to have a flat inner peripheral surface and a flat outer peripheral surface.

In this embodiment, the cylinder 71 of the casing 64 has formed therein the coolant path 74 through which coolant flows. The heat generated in the semiconductor modules 66 is also released to the coolant flowing in the coolant path 74. In other words, the casing 64 is equipped with a cooling mechanism. The coolant path 74 is, as clearly illustrated in FIGS. 3 and 4, formed in an annular shape and surrounds the electrical components 62 (i.e., the semiconductor modules 66 and the capacitor module 68). The semiconductor modules 66 are arranged along the inner peripheral surface of the cylinder 71. The coolant path 74 is laid to overlap the semiconductor modules 66 in the radial direction.

The stator 50 is arranged outside the cylinder 71. The electrical components 62 are arranged inside the cylinder 71. This layout causes the heat to be transferred from the stator 50 to the outer side of the cylinder 71 and also transferred from the electrical components 62 (e.g., the semiconductor modules 66) to the inner side of the cylinder 71. It is possible to simultaneously cool the stator 50 and the semiconductor modules 66, thereby facilitating dissipation of thermal energy generated by heat-generating members of the rotating electrical machine 10.

Further, at least one of the semiconductor modules 66 which constitute part or all of the inverter circuits serving to energize the stator winding 51 to drive the rotating electrical machine is arranged in a region surrounded by the stator core 52 disposed radially outside the cylinder 71 of the casing 64. Preferably, one of the semiconductor modules 66 may be arranged fully inside the region surrounded by the stator core 52. More preferably, all the semiconductor modules 66 may be arranged fully in the region surrounded by the stator core 52.

At least a portion of the semiconductor modules 66 is arranged in a region surrounded by the coolant path 74. Preferably, all the semiconductor modules 66 may be arranged in a region surrounded by the yoke 141.

The electrical components 62 include the insulating sheet 75 disposed on one of axially opposed end surfaces of the capacitor module 68 and the wiring module 76 disposed on the other end surface of the capacitor module 68. The capacitor module 68 has two axially-opposed end surfaces: a first end surface and a second end surface. The first end surface of the capacitor module 68 closer to the bearing unit 20 faces the end surface 72 of the casing 64 and is laid on the end surface 72 through the insulating sheet 75. The second end surface of the capacitor module 68 closer to the opening 65 has the wiring module 76 mounted thereon.

The wiring module 76 includes the resin-made circular plate-shaped body 76*a* and a plurality of bus bars 76*b* and 76*c* embedded in the body 76*a*. The bus bars 76*b* and 76*c* electrically connect the semiconductor modules 66 and the capacitor module 68 together. Specifically, the semiconductor modules 66 are equipped with the connecting pins 66*a* extending from axial ends thereof. The connecting pins 66*a* connect with the bus bars 76*b* radially outside the body 76*a*. The bus bars 76*c* extend away from the capacitor module 68 radially outside the body 76*a* and have top ends connecting with the wiring members 79 (see FIG. 2).

The capacitor module 68, as described above, has the insulating sheet 75 mounted on the first end surface thereof. The capacitor module 68 also has the wiring module 76 mounted on the second end surface thereof. The capacitor module 68, therefore, has two heat dissipating paths which extend from the first and second end surfaces of the capacitor module 68 to the end surface 72 and the cylinder 71. Specifically, the heat dissipating path is defined which extends from the first end surface to the end surface 72. The heat dissipating path is defined which extends from the second end surface to the cylinder 71. This enables the heat to be released from the end surfaces of the capacitor module 68 other than the outer peripheral surface on which the semiconductor modules 66 are arranged. In other words, it is possible to dissipate the heat not only in the radial direction, but also in the axial direction.

The capacitor module 68 is of a hollow cylindrical shape and has the rotating shaft 11 arranged therewithin at a given interval away from the inner periphery of the capacitor module 68, so that heat generated by the capacitor module 68 will be dissipated from the hollow cylindrical space. The rotation of the rotating shaft 11 usually produces a flow of air, thereby enhancing cooling effects.

The wiring module 76 has the disc-shaped control board 67 attached thereto. The control board 67 includes a printed circuit board (PCB) on which given wiring patterns are formed and also has ICs and the control device 77 mounted thereon. The control device 77 serves as a controller and is made of a microcomputer. The control board 67 is secured to the wiring module 76 using fasteners, such as screws. The control board 67 has formed in the center thereof the hole 67a through which the rotating shaft 11 passes.

The wiring module 76 has a first surface and a second surface opposed to each other in the axial direction, that is, a thickness-wise direction of the wiring module 76. The first surface faces the capacitor module 68. The wiring module 76 has the control board 67 mounted on the second surface thereof. The bus bars 76c of the wiring module 76 extend from one of surfaces of the control board 67 to the other. The control board 67 may have cut-outs for avoiding physical interference with the bus bars 76c. For instance, the control board 67 may have the cut-outs formed in portions of the circular outer edge thereof.

The electrical components 62 are, as described already, arranged inside the space surrounded by the casing 64. The housing 30, the rotor 40, and the stator 50 are disposed outside the space in the form of layers. This structure serves to shield against electromagnetic noise generated in the inverter circuits. Specifically, the inverter circuit works to control switching operations of the semiconductor modules 66 in a PWM control mode using a given carrier frequency. The switching operations usually generate electromagnetic noise against which the housing 30, the rotor 40, and the stator 50 which are arranged outside the electrical components 62 shield.

Further, at least a portion of the semiconductor modules 66 is arranged inside the region surrounded by the stator core 52 located radially outside the cylinder 71 of the casing 64, thereby minimizing adverse effects of magnetic flux generated by the semiconductor modules 66 on the stator winding 51 as compared with a case where the semiconductor modules 66 and the stator winding 51 are arranged without the stator core 52 interposed therebetween. The magnetic flux created by the stator winding 51 also hardly affects the semiconductor modules 66. It is more effective that the whole of the semiconductor modules 66 are located in the region surrounded by the stator core 52 disposed radially outside the cylinder 71 of the casing 64. When at least a portion of the semiconductor modules 66 is surrounded by the coolant path 74, it offers a beneficial advantage that the heat produced by the stator winding 51 or the magnet unit 42 is prevented from reaching the semiconductor modules 66.

The cylinder 71 has the through-holes 78 which are formed near the end plate 63 and through which the wiring members 79 (see FIG. 2) pass to electrically connect the stator 50 disposed outside the cylinder 71 and the electrical components 62 arranged inside the cylinder 71. The wiring members 79, as illustrated in FIG. 2, connect with ends of the stator winding 51 and the bus bars 76c of the wiring module 76 using crimping or welding techniques. The wiring members 79 are implemented by, for example, bus bars whose joining surfaces are preferably flattened. A single through-hole 78 or a plurality of through-holes 78 are preferably provided. This embodiment has two through-holes 78. The use of the two through-holes 78 facilitates the ease with which terminals extending from the two sets of the three-phase windings are connected by the wiring members 79, and is suitable for achieving multi-phase wire connections.

The rotor 40 and the stator 50 are, as described already in FIG. 4, arranged within the housing 30 in this order in a radially inward direction. The inverter unit 60 is arranged radially inside the stator 50. If a radius of the inner periphery of the housing 30 is defined as d, the rotor 40 and the stator 50 are located radially outside a distance of d×0.705 away from the center of rotation of the rotor 40. If a region located radially inside the inner periphery of the stator 50 (i.e., the inner circumferential surface of the stator core 52) is defined as a first region X1, and a region radially extending from the inner periphery of the stator 50 to the housing 30 is defined as a second region X2, an area of a transverse section of the first region X1 is set greater than that of the second region X2. As viewed in a region where the magnet unit 42 of the rotor 40 overlaps the stator winding 51, the volume of the first region X1 is larger than that of the second region X2.

The rotor 40 and the stator 50 are fabricated as a magnetic circuit component assembly. In the housing 30, the first region X1 which is located radially inside the inner peripheral surface of the magnetic circuit component assembly is larger in volume than the region X2 which lies between the inner peripheral surface of the magnetic circuit component assembly and the housing 30 in the radial direction.

Next, the structures of the rotor 40 and the stator 50 will be described below in more detail.

Typical rotating electrical machines are known which are equipped with a stator with an annular stator core which is made of a stack of steel plates and has a stator winding wound in a plurality of slots arranged in a circumferential direction of the stator core. Specifically, the stator core has teeth extending in a radial direction thereof at a given interval away from a yoke. Each slot is formed between the two radially adjacent teeth. In each slot, a plurality of conductors are arranged in the radial direction in the form of layers to form the stator winding.

However, the above described stator structure has a risk that when the stator winding is energized, an increase in magnetomotive force in the stator winding may result in magnetic saturation in the teeth of the stator core, thereby restricting torque density in the rotating electrical machine. In other words, rotational flux, as created by the energization of the stator winding of the stator core, is thought of as concentrating on the teeth, which has a risk of causing magnetic saturation.

Generally, IPM (Interior Permanent Magnet) rotors are known which have a structure in which permanent magnets are arranged on a d-axis of a d-q axis coordinate system, and a rotor core is placed on a q-axis of the d-q axis coordinate system. Excitation of a stator winding near the d-axis will cause an excited magnetic flux to flow from a stator to a rotor according to Fleming's rules. This causes magnetic saturation to occur widely in the rotor core on the q-axis.

Figure 7:
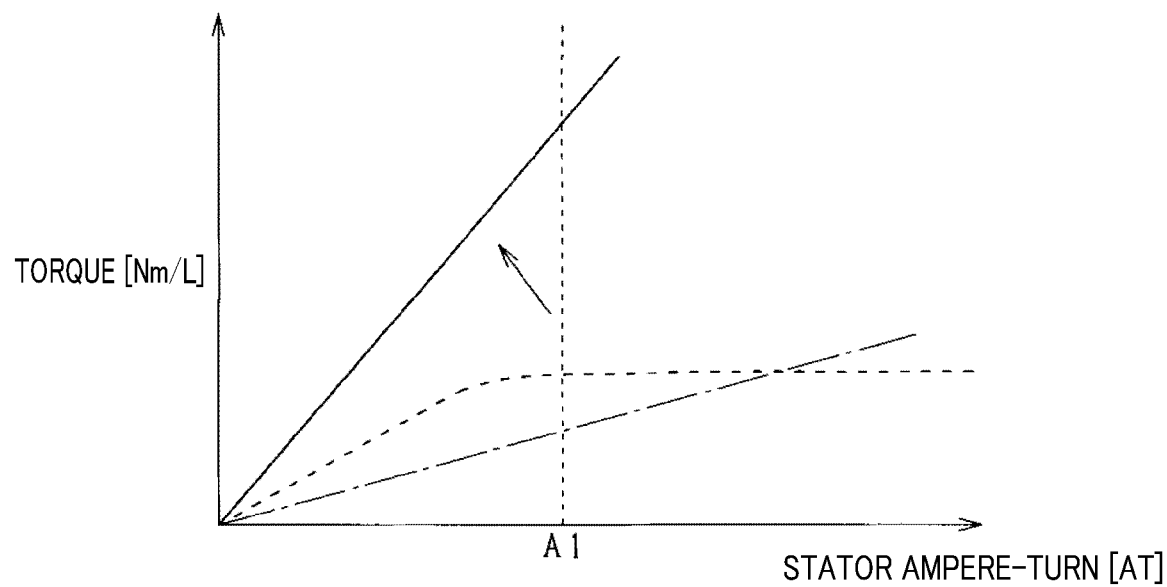
FIG. 7 is a torque diagrammatic view which demonstrates a relationship between an ampere-turn and a torque density in a stator winding.

FIG. 7 is a torque diagrammatic view which demonstrates a relationship between an ampere-turn (AT) representing a magnetomotive force created by the stator winding and a torque density (Nm/L). A broken line indicates characteristics of a typical IPM rotor-rotating electrical machine. FIG. 7 shows that in the typical rotating electrical machine, an increase in magnetomotive force in the stator will cause magnetic saturation to occur at two places: the tooth between the slots and the q-axis rotor (i.e., the rotor core on the q-axis), thereby restricting an increase in torque. In this way, a design value of the ampere-turn is restricted at A1 in the typical rotating electrical machine.

In order to alleviate the above problem in this embodiment, the rotating electrical machine 10 is designed to have an additional structure, as will be described below, in order to eliminate the restriction arising from the magnetic saturation. Specifically, as a first measure, the stator 50 is designed to have a slot-less structure for eliminating the magnetic saturation occurring in the teeth of the stator core of the stator and also to use an SPM (Surface Permanent Magnet) rotor for eliminating the magnetic saturation occurring in a q-axis core of the IPM rotor. The first measure serves to eliminate the above described two places where the magnetic saturation occurs, but however, may result in a decrease in torque in a low-current region (see an alternate long and short dash line in FIG. 7). In order to alleviate this problem, as a second measure, a polar anisotropic structure is employed to increase a magnetic path of magnets in the magnet unit 42 of the rotor 40 to enhance a magnetic force in order to increase a magnetic flux in the SPM rotor to minimize the torque decrease.

Additionally, as a third measure, a flattened conductor structure is employed to decrease a thickness of conductors of the coil side portion 53 of the stator winding 51 in the radial direction of the stator 50 for compensating for the torque decrease. The above magnetic force-enhanced anisotropic structure is thought of as resulting in a flow of large eddy current in the stator winding 51 facing the magnet unit 42. The third measure is, however, to employ the flattened conductor structure in which the conductors have a decreased thickness in the radial direction, thereby minimizing the generation of the eddy current in the stator winding 51 in the radial direction. In this way, the above first to third structures are, as indicated by a solid line in FIG. 7, expected to greatly improve the torque characteristics using high-magnetic force magnets and also alleviate a risk of generation of a large eddy current resulting from the use of the high-magnetic force magnets.

Additionally, as a fourth measure, a magnet unit is employed which has a polar anisotropic structure to create a magnetic density distribution approximating a sine wave. This increases a sine wave matching percentage using pulse control, as will be described later, to enhance the torque and also results in a moderate change in magnetic flux, thereby minimizing an eddy-current loss (i.e., a copper loss caused by eddy current) as compared with radial magnets.

The sine wave matching percentage will be described below. The sine wave matching percentage may be derived by comparing a waveform, a cycle, and a peak value of a surface magnetic flux density distribution measured by actually moving a magnetic flux probe on a surface of a magnet with those of a sine wave. The since wave matching percentage is given by a percentage of an amplitude of a primary waveform that is a waveform of a fundamental wave in a rotating electrical machine to that of the actually measured waveform, that is, an amplitude of the sum of the fundamental wave and a harmonic component. An increase in the sine wave matching percentage will cause the waveform in the surface magnetic flux density distribution to approach the waveform of the sine wave. When an electrical current of a primary sine wave is delivered by an inverter to a rotating electrical machine equipped with magnets having an improved sine wave matching percentage, it will cause a large degree of torque to be produced, combined with the fact that the waveform in the surface magnetic flux density distribution of the magnet is close to the waveform of a sine wave. The surface magnetic flux density distribution may alternatively be derived using electromagnetic analysis according to Maxwell's equations.

As a fifth measure, the stator winding 51 is designed to have a conductor strand structure made of a bundle of wires. In the conductor strand structure of the stator winding 51, the wires are connected parallel to each other, thus enabling a high current or large amount of current to flow in the stator winding 51 and also minimizing an eddy current occurring in the conductors widened in the circumferential direction of the stator 50 more effectively than the third measure in which the conductors are flattened in the radial direction because each of the wires has a decreased transverse sectional area. The use of the bundle of the wires will cancel an eddy current arising from magnetic flux occurring according to Ampere's circuital law in response to the magnetomotive force produced by the conductors.

The use of the fourth and fifth measures minimizes the eddy-current loss resulting from the high magnetic force produced by the high-magnetic force magnets provided by the second measure and also enhance the torque.

Figure 8:
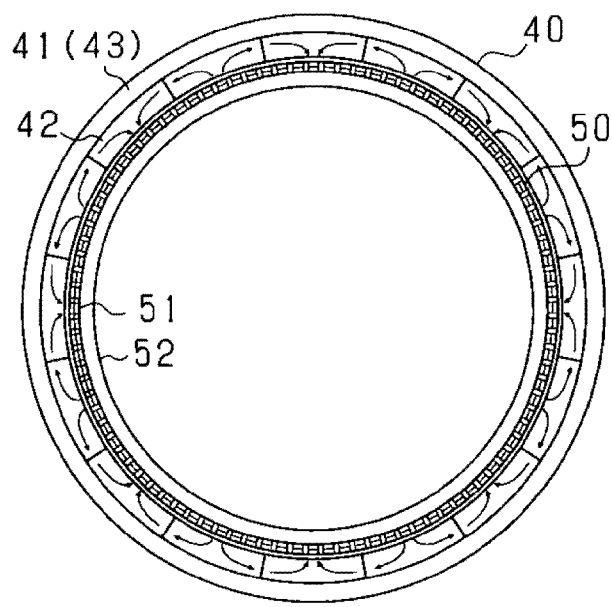
FIG. 8 is a transverse sectional view of a rotor and a stator.
Figure 9:
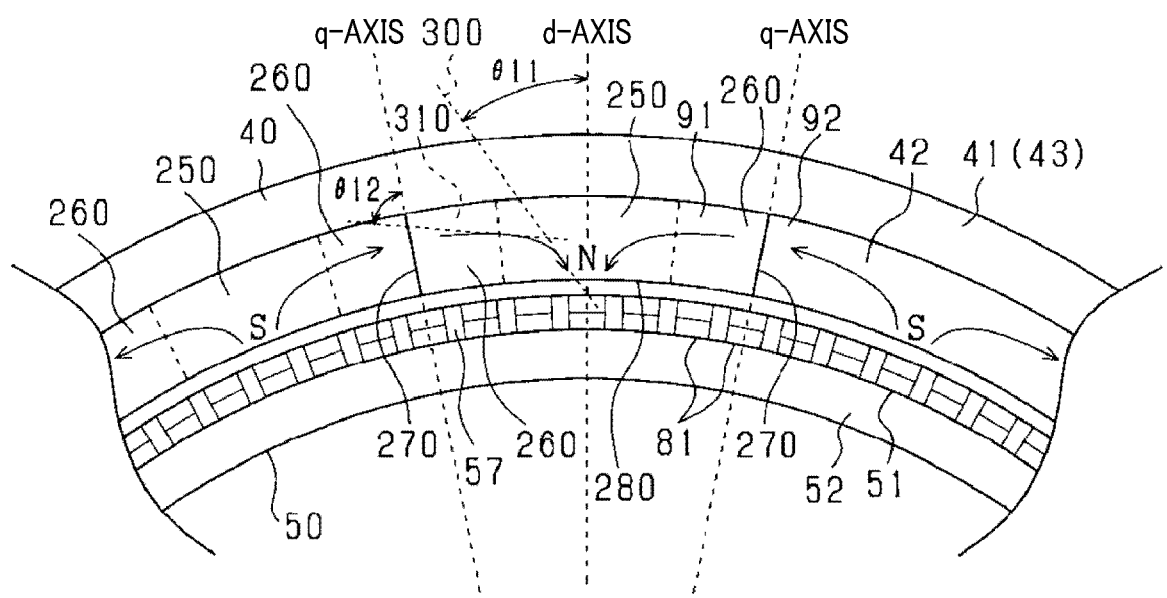
FIG. 9 is an enlarged view of part of FIG. 8.
Figure 10:
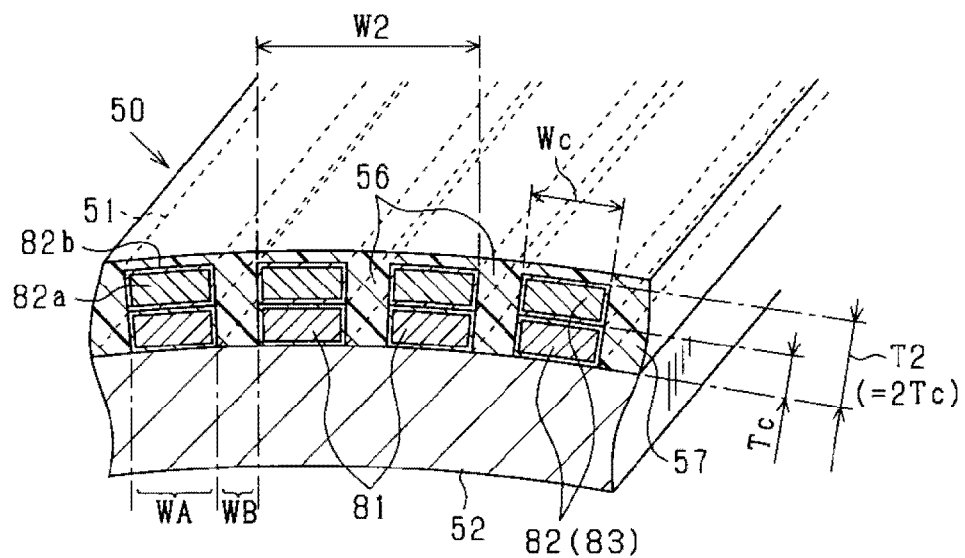
FIG. 10 is a transverse sectional view of a stator.
Figure 11:
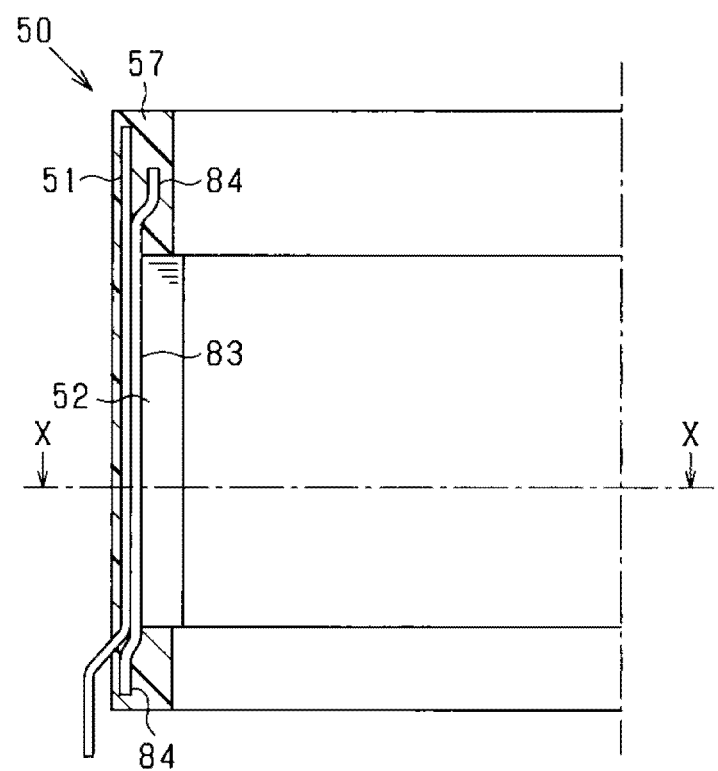
FIG. 11 is a longitudinal sectional view of a stator.
Figure 12:
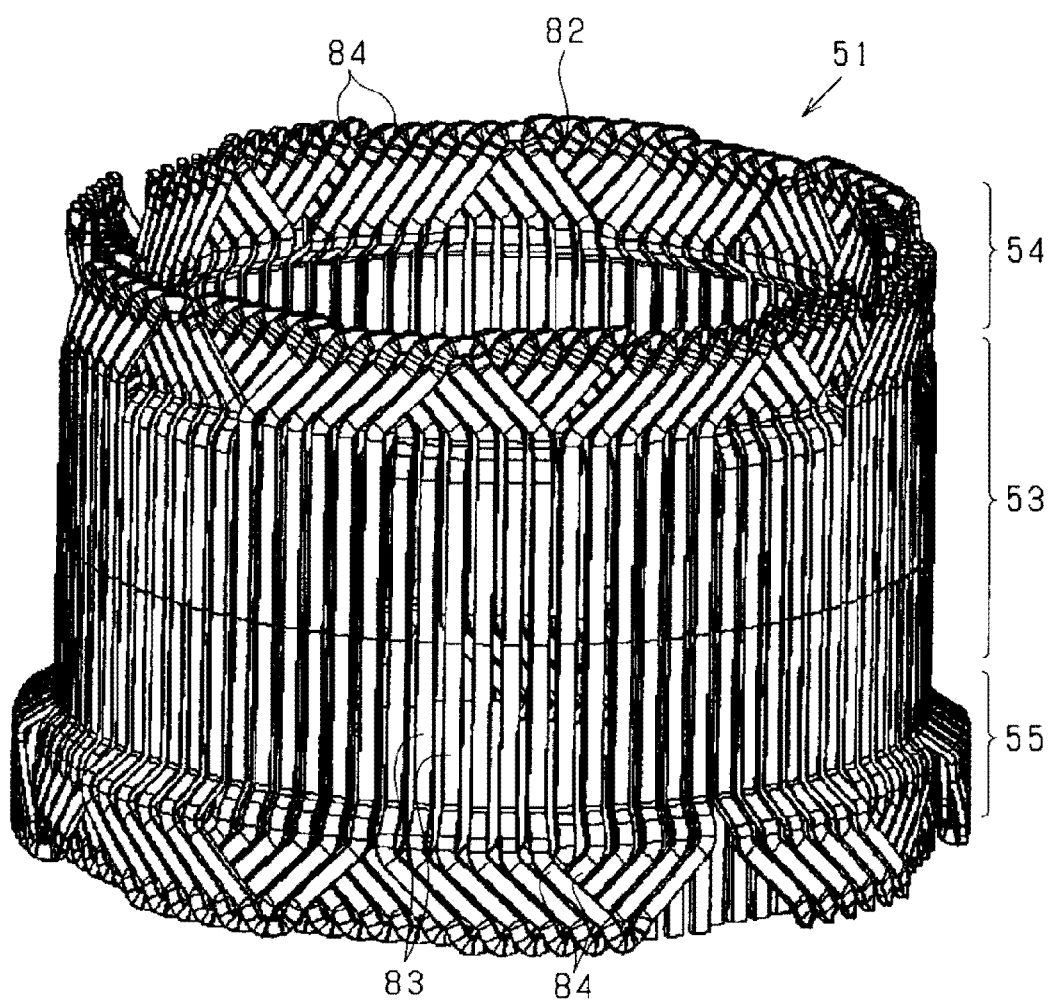
FIG. 12 is a perspective view of a stator winding.

The slot-less structure of the stator 50, the flattened conductor structure of the stator winding 51, and the polar anisotropic structure of the magnet unit 42 will be described below. The slot-less structure of the stator 50 and the flattened conductor structure of the stator winding 51 will first be discussed. FIG. 8 is a transverse sectional view illustrating the rotor 40 and the stator 50. FIG. 9 is a partially enlarged view illustrating the rotor 40 and the stator 50 in FIG. 8. FIG. 10 is a transverse sectional view of the stator 50 taken along the line X-X in FIG. 11. FIG. 11 is a longitudinal sectional view of the stator 50. FIG. 12 is a perspective view of the stator winding 51. FIGS. 8 and 9 indicate directions of magnetization of magnets of the magnet unit 42 using arrows.

The stator core 52 is, as clearly illustrated in FIGS. 8 to 11, of a cylindrical shape and made of a plurality of magnetic steel plates stacked in the axial direction of the stator core 52 to have a given thickness in a radial direction of the stator core 52. The stator winding 51 is mounted on the outer periphery of the stator core 52 which faces the rotor 40. The outer peripheral surface of the stator core 52 facing the rotor 40 serves as a conductor mounting portion (i.e., a conductor area). The outer peripheral surface of the stator core 52 is shaped as a curved surface without any irregularities. A plurality of conductor groups 81 are arranged on the outer peripheral surface of the stator core 52 at given intervals away from each other in the circumferential direction of the stator core 52. The stator core 52 functions as a back yoke that is a portion of a magnetic circuit working to rotate the rotor 40. The stator 50 is designed to have a structure in which a tooth (i.e., a core) made of a soft magnetic material is not disposed between a respective two of the conductor groups 81 arranged adjacent each other in the circumferential direction (i.e., the slot-less structure). In this embodiment, a resin material of the sealing member 57 is disposed in the space or gap 56 between a respective adjacent two of the conductor groups 81. In other words, the stator 50 has a conductor-to-conductor member which is disposed between the conductor groups 81 arranged adjacent each other in the circumferential direction of the stator 50 and made of a non-magnetic material. The conductor-to-conductor members serve as the sealing members 57. Before the sealing members 57 are placed to seal the gaps 56, the conductor groups 81 are arranged in the circumferential direction radially outside the stator core 52 at a given interval away from each other through the gaps 56 that are conductor-to-conductor regions. This makes up the slot-less structure of the stator 50. In other words, each of the conductor groups 81 is, as described later in detail, made of two conductors 82. An interval between a respective two of the conductor groups 81 arranged adjacent each other in the circumferential direction of the stator 50 is occupied only by a non-magnetic material. The non-magnetic material, as referred to herein, includes a non-magnetic gas, such as air, or a non-magnetic liquid. In the following discussion, the sealing members 57 will also be referred to as conductor-to-conductor members.

The structure, as referred to herein, in which the teeth are respectively disposed between the conductor groups 81 arrayed in the circumferential direction means that each of the teeth has a given thickness in the radial direction and a given width in the circumferential direction of the stator 50, so that a portion of the magnetic circuit, that is, a magnet magnetic path lies between the adjacent conductor groups 81. In contrast, the structure in which no tooth lies between the adjacent conductor groups 81 means that there is no magnetic circuit between the adjacent conductor groups 81.

The stator winding (i.e., the armature winding) 51, as illustrated in FIG. 10, has a given thickness T2 (which will also be referred to below as a first dimension) and a width W2 (which will also be referred to below as a second dimension). The thickness T2 is given by a minimum distance between an outer side surface and an inner side surface of the stator winding 51 which are opposed to each other in the radial direction of the stator 50. The width W2 is given by a dimension of a portion of the stator winding 51 which functions as one of multiple phases (i.e., the U-phase, the V-phase, the W-phase, the X-phase, the Y-phase, and the Z-phase in this embodiment) of the stator winding 51 in the circumferential direction. Specifically, in a case where the two conductor groups 81 arranged adjacent each other in the circumferential direction in FIG. 10 serve as one of the three phases, for example, the U-phase winding, a distance between circumferentially outermost ends of the two circumferentially adjacent conductor groups 81 is the width W2. The thickness T2 is smaller than the width W2.

The thickness T2 is preferably set smaller than the sum of widths of the two conductor groups 81 within the width W2. If the stator winding 51 (more specifically, the conductor 82) is designed to have a true circular transverse section, an oval transverse section, or a polygonal transverse section, the cross section of the conductor 82 taken in the radial direction of the stator 50 may be shaped to have a maximum dimension W12 in the radial direction of the stator 50 and a maximum dimension W11 in the circumferential direction of the stator 50.

The stator winding 51 is, as can be seen in FIGS. 10 and 11, sealed by the sealing members 57 which are formed by a synthetic resin mold. Specifically, the stator winding 51 and the stator core 52 are put in a mold together when the sealing members 57 are molded by the resin. The resin may be considered as a non-magnetic material or an equivalent thereof whose Bs (saturation magnetic flux density) is zero.

As a transverse section is viewed in FIG. 10, the sealing members 57 are provided by placing synthetic resin in the gaps 56 between the conductor groups 81. The sealing members 57 serve as insulators arranged between the conductor groups 81. In other words, each of the sealing members 57 functions as an insulator in one of the gaps 56. The sealing members 57 occupy a region which is located radially outside the stator core 52, and includes all the conductor groups 81, in other words, which is defined to have a dimension larger than that of each of the conductor groups 81 in the radial direction.

As a longitudinal section is viewed in FIG. 11, the sealing members 57 lie to occupy a region including the turns 84 of the stator winding 51. Radially inside the stator winding 51, the sealing members 57 lie in a region including at least a portion of the axially opposed ends of the stator core 52. In this case, the stator winding 51 is fully sealed by the resin except for the ends of each phase winding, i.e., terminals joined to the inverter circuits.

The structure in which the sealing members 57 are disposed in the region including the ends of the stator core 52 enables the sealing members 57 to compress the stack of the steel plates of the stator core 52 inwardly in the axial direction. In other words, the sealing members 57 work to firmly retain the stack of the steel plates of the stator core 52. In this embodiment, the inner peripheral surface of the stator core 52 is not sealed using resin, but however, the whole of the stator core 52 including the inner peripheral surface may be sealed using resin.

In a case where the rotating electrical machine 10 is used as a power source for a vehicle, the sealing members 57 are preferably made of a high heat-resistance fluororesin, epoxy resin, PPS resin, PEEK resin, LCP resin, silicone resin, PAI resin, or PI resin. In terms of a linear coefficient expansion to minimize breakage of the sealing members 57 due to an expansion difference, the sealing members 57 are preferably made of the same material as that of an outer film of the conductors of the stator winding 51. The silicone resin whose linear coefficient expansion is twice or more those of other resins is preferably excluded from the material of the sealing members 57. In a case of electrical products, such as electric vehicles equipped with no combustion engine, PPO resin, phenol resin, or FRP resin which resists 180° C. may be used, except in fields where an ambient temperature of the rotating electrical machine is expected to be lower than 100° C.

The degree of torque outputted by the rotating electrical machine 10 is usually proportional to the degree of magnetic flux. In a case where a stator core is equipped with teeth, a maximum amount of magnetic flux in the stator core is restricted depending upon the saturation magnetic flux density in the teeth, while in a case where the stator core is not equipped with teeth, the maximum amount of magnetic flux in the stator core is not restricted. Such a structure is, therefore, useful for increasing an amount of electrical current delivered to the stator winding 51 to increase the degree of torque produced by the rotating electrical machine 10.

This embodiment employs the slot-less structure in which the stator 50 is not equipped with teeth, thereby resulting in a decrease in inductance of the stator 50. Specifically, a stator of a typical rotating electrical machine in which conductors are disposed in slots isolated by teeth from each other has an inductance of approximately 1 mH, while the stator 50 in this embodiment has a decreased inductance of 5 to 60 µH. The rotating electrical machine 10 in this embodiment is of an outer rotor type, but has a decreased inductance of the stator 50 to decrease a mechanical time constant Tm. In other words, the rotating electrical machine 10 is capable of outputting a high degree of torque and designed to have a decreased value of the mechanical time constant Tm. If inertia is defined as J, inductance is defined as L, torque constant is defined as Kt, and back electromotive force constant is defined as Ke, the mechanical time constant Tm is calculated according to the equation of Tm=(J×L)/(Kt×Ke). This shows that a decrease in inductance L will result in a decrease in mechanical time constant Tm.

Each of the conductor groups 81 arranged radially outside the stator core 52 is made of a plurality of conductors 82 whose transverse section is of a flattened rectangular shape and which are disposed on one another in the radial direction of the stator core 52. Each of the conductors 82 is oriented to have a transverse section meeting a relation of radial dimension<circumferential dimension. This causes each of the conductor groups 81 to be thin in the radial direction. A conductive region of the conductor group 81 also extends inside a region occupied by teeth of a typical stator. This creates a flattened conductive region structure in which a sectional area of each of the conductors 82 is increased in the circumferential direction, thereby alleviating a risk that the amount of thermal energy may be increased by a decrease in sectional area of a conductor arising from flattening of the conductor. A structure in which a plurality of conductors are arranged in the circumferential direction and connected in parallel to each other is usually subjected to a decrease in sectional area of the conductors by a thickness of a coated layer of the conductors, but however, has beneficial advantages obtained for the same reasons as described above. In the following discussion, each of the conductor groups 81 or each of the conductors 82 will also be referred to as a conductive member.

The stator 50 in this embodiment is, as described already, designed to have no slots, thereby enabling the stator winding 51 to be designed to have a conductive region of an entire circumferential portion of the stator 50 which is larger in size than a non-conductive region unoccupied by the stator winding 51 in the stator 50. In typical rotating electrical machines for vehicles, a ratio of the conductive region/the non-conductive region is usually one or less. In contrast, this embodiment has the conductor groups 81 arranged to have the conductive region substantially identical in size with or larger in size than the non-conductive region. If the conductor region, as illustrated in FIG. 10, occupied by the conductor 82 (i.e., the straight section 83 which will be described later in detail) in the circumferential direction is defined as WA, and a conductor-to-conductor region that is an interval between a respective adjacent two of the conductors 82 is defined as WB, the conductor region WA is larger in size than the conductor-to-conductor region WB in the circumferential direction.

The conductor group 81 of the stator winding 51 has a thickness in the radial direction thereof which is smaller than a circumferential width of a portion of the stator winding 51 which lies in a region of one magnetic pole and serves as one of the phases of the stator winding 51. In the structure in which each of the conductor groups 81 is made up of the two conductors 82 stacked in the form of two layers lying on each other in the radial direction, and the two conductor groups 81 are arranged in the circumferential direction within a region of one magnetic pole for each phase, a relation of Tc×2<Wc×2 is met where Tc is the thickness of each of the conductors 82 in the radial direction, and Wc is the width of each of the conductors 82 in the circumferential direction. In another structure in which each of the conductor groups 81 is made up of the two conductors 82, and each of the conductor groups 81 lies within the region of one magnetic pole for each phase, a relation of Tc×2<Wc is preferably met. In other words, in the stator winding 51 which is designed to have conductor portions (i.e., the conductor groups 81) arranged at a given interval away from each other in the circumferential direction, the thickness of each conductor portion (i.e., the conductor group 81) in the radial direction is set smaller than the width of a portion of the stator winding 51 lying in the region of one magnetic pole for each phase in the circumferential direction.

In other words, each of the conductors 82 is preferably shaped to have the thickness Tc in the radial direction which is smaller than the width Wc in the circumferential direction. The thickness 2Tc of each of the conductor groups 81 each made of a stack of the two conductors 82 in the radial direction is preferably smaller than the width Wc of each of the conductor groups 81 in the circumferential direction.

The degree of torque produced by the rotating electrical machine 10 is substantially inversely proportional to the thickness of the stator core 52 in the radial direction. The conductor groups 81 arranged radially outside the stator core 52 are, as described above, designed to have the thickness decreased in the radial direction. This design is useful in increasing the degree of torque outputted by the rotating electrical machine 10. This is because a distance between the magnet unit 42 of the rotor 40 and the stator core 52 (i.e., a distance in which there is no iron) may be decreased to decrease the magnetic resistance. This enables interlinkage magnetic flux in the stator core 52 produced by the permanent magnets to be increased to enhance the torque.

The decrease in thickness of the conductor groups 81 facilitates the ease with which a magnetic flux leaking from the conductor groups 81 is collected in the stator core 52, thereby preventing the magnetic flux from leaking outside the stator core 52 without being used for enhancing the torque. This avoids a drop in magnetic force arising from the leakage of the magnetic flux and increases the interlinkage magnetic flux in the stator core 52 produced by the permanent magnets, thereby enhancing the torque.

Each of the conductors 82 is made of a coated conductor formed by covering the surface of the conductor body 82a with the coating 82b. The conductors 82 stacked on one another in the radial direction are, therefore, insulated from each other. Similarly, the conductors 82 are insulated from the stator core 52. The insulating coating 82b may be a coating of each wire 86, as will be described later in detail, in a case where each wire 86 is made of wire with a self-bonded coating or may be made by an additional insulator disposed on a coating of each wire 86. Each phase winding made of the conductors 82 is insulated by the coating 82b except an exposed portion thereof for joining purposes. The exposed portion includes, for example, an input or an output terminal or a neutral point in a case of a star connection. The conductor groups 81 arranged adjacent each other in the radial direction are firmly adhered to each other using resin or self-bonding coated wire, thereby minimizing a risk of insulation breakdown, mechanical vibration, or noise caused by rubbing of the conductors 82.

Figure 13:
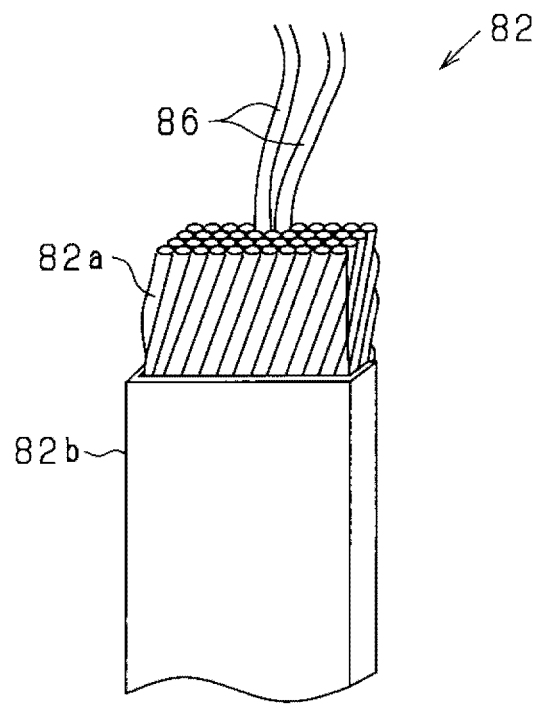
FIG. 13 is a perspective view of a conductor.
Figure 14:
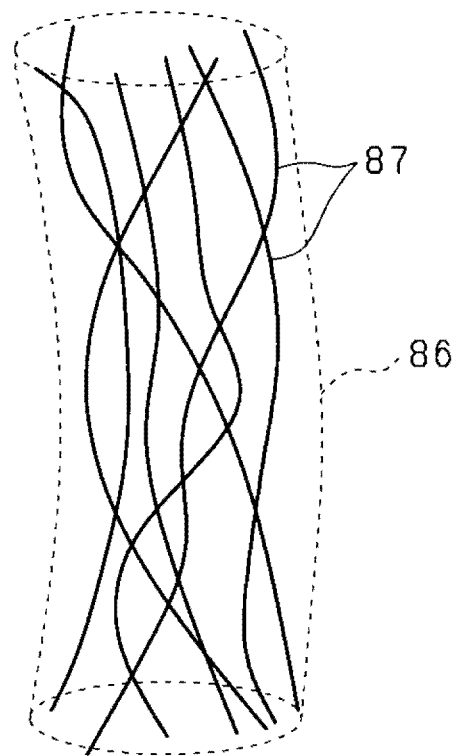
FIG. 14 is a schematic view illustrating a structure of wire.

In this embodiment, the conductor body 82a is made of a collection of a plurality of wires 86. Specifically, the conductor body 82a is, as can be seen in FIG. 13, made of a strand of the twisted wires 86. Each of the wires 86 is, as can be seen in FIG. 14, made of a bundle of a plurality of thin conductive fibers 87. For instance, each of the wires 86 is made of a complex of CNT (carbon nanotube) fibers. The CNT fibers include boron-containing microfibers in which at least a portion of carbon is substituted with boron. Instead of the CNT fibers that are carbon-based microfibers, vapor grown carbon fiber (VGCF) may be used, but however, the CNT fiber is preferable. The surface of the wire 86 is covered with a layer of insulating polymer, such as enamel.

The surface of the wire 86 is preferably covered with an enamel coating, such as polyimide coating or amide-imide coating.

The conductors 82 constitute n-phase windings of the stator winding 51. The wires 86 of each of the conductors 82 (i.e., the conductor body 82a) are placed in contact with each other. Each of the conductors 82 has one of more portions which are formed by twisting the wires 86 and define one or more portions of a corresponding one of the phase-windings. A resistance value between the twisted wires 86 is larger than that of each of the wires 86. In other words, the respective adjacent two wires 86 have a first electrical resistivity in a direction in which the wires 86 are arranged adjacent each other. Each of the wires 86 has a second electrical resistivity in a lengthwise direction of the wire 86. The first electrical resistivity is larger than the second electrical resistivity. Each of the conductors 82 may be made of an assembly of wires, i.e., the twisted wires 86 covered with insulating members whose first electrical resistivity is very high. The conductor body 82a of each of the conductors 82 is made of a strand of the twisted wires 86.

The conductor body 82a is, as described above, made of the twisted wires 86, thereby reducing an eddy current created in each of the wires 86, which reduces an eddy current in the conductor body 82a. Each of the wires 86 is twisted, thereby causing each of the wires 86 to have portions where directions of applied magnetic field are opposite each other, which cancels a back electromotive force. This results in a reduction in the eddy current. Particularly, each of the wires 86 is made of the conductive fibers 87, thereby enabling the conductive fibers 87 to be thin and also enabling the number of times the conductive fibers 87 are twisted to be increased, which enhances the reduction in eddy current.

How to insulate the wires 86 from each other is not limited to the above described use of the polymer insulating layer, but the contact resistance may be used to resist a flow of current between the wires 86. In other words, the above beneficial advantage is obtained by a difference in potential arising from a difference between the resistance between the twisted wires 86 and the resistance of each of the wires 86 as long as the resistance between the wires 86 is larger than that of each of the wires 86. For instance, the contact resistance may be increased by using production equipment for the wires 86 and production equipment for the stator 50 (i.e., an armature) of the rotating electrical machine 10 as discrete devices to cause the wires 86 to be oxidized during a transport time or a work interval.

Each of the conductors 82 is, as described above, of a low-profile or flattened rectangular shape in cross section. The more than one conductors 82 are arranged in the radial direction. Each of the conductors 82 is made of a strand of the wires 86 each of which is formed by a self-bonding coating wire equipped with, for example, a fusing or bonding layer or an insulating layer and which are twisted with the bonding layers fused together. Each of the conductors 82 may alternatively be made by forming twisted wires with no bonding layer or twisted self-bonding coating wires into a desired shape using synthetic resin. The insulating coating 82b of each of the conductors 82 may have a thickness of 80 µm to 100 µm which is larger than that of a coating of typical wire (i.e., 5 µm to 40 µm). In this case, a required degree of insulation between the conductors 82 is achieved even if no insulating sheet is interposed between the conductors 82.

It is also advisable that the insulating coating 82b be higher in degree of insulation than the insulating layer of the wire 86 to achieve insulation between the phase windings. For instance, the polymer insulating layer of the wire 86 has a thickness of, for example, 5 µm. In this case, the thickness of the insulating coating 82b of the conductor 82 is preferably selected to be 80 µm to 100 µm to achieve the insulation between the phase windings.

Each of the conductors 82 may alternatively be made of a bundle of the untwisted wires 86. In brief, each of the conductors 82 may be made of a bundle of the wires 86 whose entire lengths are twisted, whose portions are twisted, or whose entire lengths are untwisted. Each of the conductors 82 constituting the conductor portion is, as described above, made of a bundle of the wires 86. The resistance between the wires 86 is larger than that of each of the wires 86.

The conductors 82 are each bent and arranged in a given pattern in the circumferential direction of the stator winding 51, thereby forming the phase-windings of the stator winding 51. The stator winding 51, as illustrated in FIG. 12, includes the coil side portion 53 and the coil ends 54 and 55. The conductors 82 have the straight sections 83 which extend straight in the axial direction of the stator winding 51 and form the coil side portion 53. The conductors 82 have the turns 84 which are arranged outside the coil side portion 53 in the axial direction and form the coil ends 54 and 55. Each of the conductor 82 is made of a wave-shaped string of conductor formed by alternately arranging the straight sections 83 and the turns 84. The straight sections 83 are arranged to face the magnet unit 42 in the radial direction. The straight sections 83 are arranged at a given interval away from each other and joined together using the turns 84 located outside the magnet unit 42 in the axial direction. The straight sections 83 correspond to a magnet facing portion.

In this embodiment, the stator winding 51 is shaped in the form of an annular distributed winding. In the coil side portion 53, the straight sections 83 are arranged at an interval away from each other which corresponds to each pole pair of the magnet unit 42 for each phase. In each of the coil ends 54 and 55, the straight sections 83 for each phase are joined together by the turn 84 which is of a V-shape. The straight sections 83 which are paired for each pole pair are opposite to each other in a direction of flow of electrical current. A respective two of the straight sections 83 which are joined together by each of the turns 84 are different between the coil end 54 and the coil end 55. The joints of the straight sections 83 by the turns 84 are arranged in the circumferential direction on each of the coil ends 54 and 55 to complete the stator winding in a hollow cylindrical shape.

More specifically, the stator winding 51 is made up of two pairs of the conductors 82 for each phase. The stator winding 51 is equipped with a first three-phase winding set including the U-phase winding, the V-phase winding, and the W-phase winding and a second three-phase phase winding set including the X-phase winding, the Y-phase winding, and the Z-phase winding. The first three-phase phase winding set and the second three-phase winding set are arranged adjacent each other in the radial direction in the form of two layers. If the number of phases of the stator winding 51 is defined as S (i.e., 6 in this embodiment), the number of the conductors 82 for each phase is defined as m, 2×S×m=2Sm conductors 82 are used for each pole pair in the stator winding 51. The rotating electrical machine in this embodiment is designed so that the number of phases S is 6, the number m is 4, and 8 pole pairs are used. 6×4×8=192 conductors 82 are arranged in the circumferential direction of the stator core 52.

The stator winding 51 in FIG. 12 is designed to have the coil side portion 53 which has the straight sections 82 arranged in the form of two overlapping layers disposed adjacent each other in the radial direction. Each of the coil ends 54 and 55 has a respective two of the turns 84 which extend from the radially overlapping straight sections 82 in opposite circumferential directions. In other words, the conductors 82 arranged adjacent each other in the radial direction are opposite to each other in direction in which the turns 84 extend except for ends of the stator winding 51.

Figure 15:
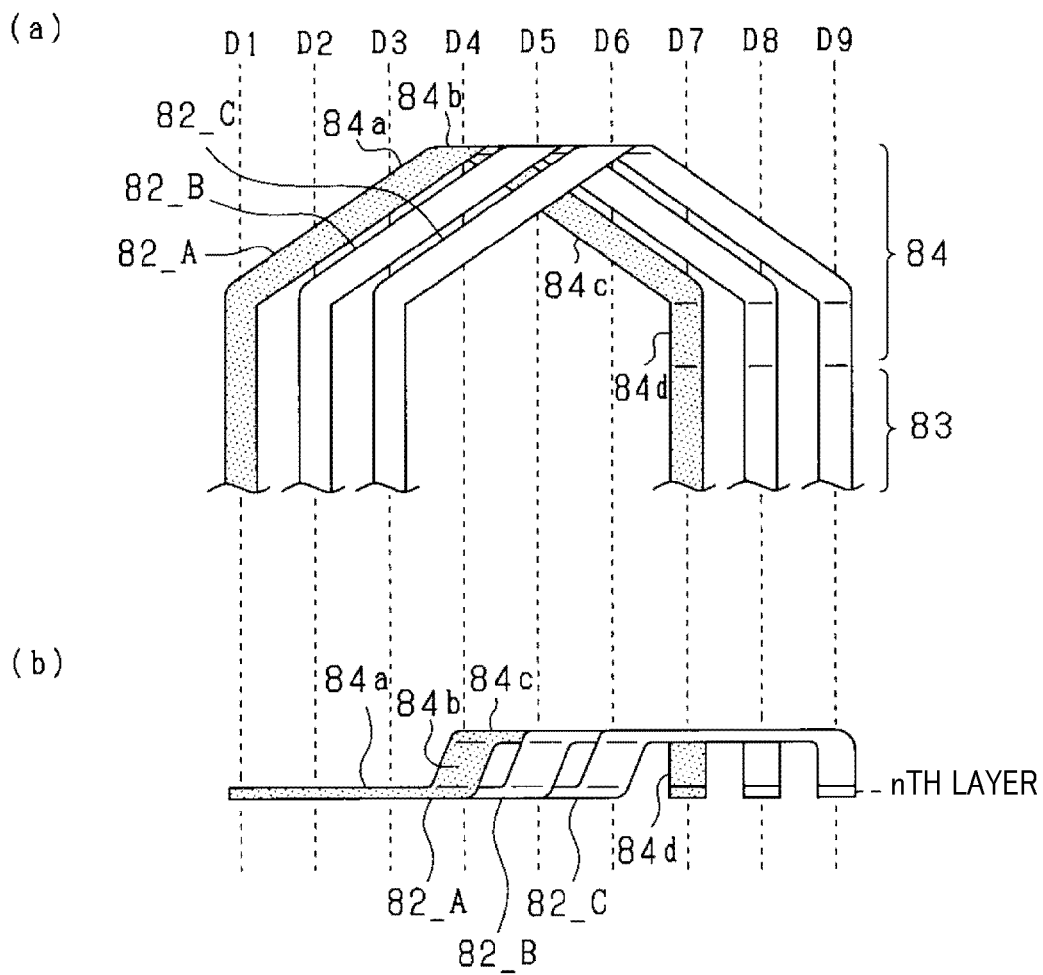
FIG. 15 is a view showing the layout of conductors at the $n^{th}$ layer position.

A winding structure of the conductors 82 of the stator winding 51 will be described below in detail. In this embodiment, the conductors 82 formed in the shape of a wave winding are arranged in the form of a plurality of layers (e.g., two layers) disposed adjacent or overlapping each other in the radial direction. FIGS. 15(a) and 15(b) illustrate the layout of the conductors 82 which form the $n^{th}$ layer. FIG. 15(a) shows the configurations of the conductor 82, as the side of the stator winding 51 is viewed. FIG. 15(b) shows the configurations of the conductors 82 as viewed in the axial direction of the stator winding 51. In FIGS. 15(a) and 15(b), locations of the conductor groups 81 are indicated by symbols D1, D2, D3 . . . , and D9. For the sake of simplicity of disclosure, FIGS. 15(a) and 15(b) show only three conductors 82 which will be referred to herein as the first conductor 82_A, the second conductor 82_B, and the third conductor 82_C.

The conductors 82_A to 82_C have the straight sections 83 arranged at a location of the $n^{th}$ layer, in other words, at the same position in the circumferential direction. Every two of the straight sections 82 which are arranged at 6 pitches (corresponding to 3×m pairs) away from each other are joined together by one of the turns 84. In other words, in the conductors 82_A to 82_C, an outermost two of the seven straight sections 83 arranged in the circumferential direction of the stator winding 51 on the same circle defined about the center of the rotor 40 are joined together using one of the turns 84. For instance, in the first conductor 82_A, the straight sections 83 placed at the locations D1 and D7 are joined together by the inverse V-shaped turn 84. The conductors 82_B and 82_C are arranged at an interval equivalent to an interval between a respective adjacent two of the straight sections 83 away from each other in the circumferential direction at the location of the $n^{th}$ layer. In this layout, the conductors 82_A to 82_C are placed at a location of the same layer, thereby resulting in a risk that the turns 84 thereof may physically interfere with each other. In order to alleviate such a risk, each of the turns 84 of the conductors 82_A to 82_C in this embodiment is shaped to have an interference avoiding portion formed by offsetting a portion of the turn 84 in the radial direction.

Specifically, the turn 84 of each of the conductors 82_A to 82_C includes the slant portion 84a, the head portion 84b, the slant portion 84c, and the return portion 84d. The slant portion 84a extends in the circumferential direction of the same circle (which will also be referred to as a first circle). The head portion 84 extends from the slant portion 84a radially inside the first circle (i.e., upward in FIG. 15(b)) to reach another circle (which will also be referred to as a second circle). The slant portion 84c extends in the circumferential direction of the second circle. The return portion 84d returns from the second circle back to the first circle. The head portion 84b, the slant portion 84c, and the return portion 84d define the interference avoiding portion. The slant portion 84c may be arranged radially outside the slant portion 84a.

In other words, each of the conductors 82_A to 82_C has the turn 84 shaped to have the slant portion 84a and the slant portion 84c which are arranged on opposite sides of the head portion 84b at the center in the circumferential direction. The locations of the slant portions 84a and 84b are different from each other in the radial direction (i.e., a direction perpendicular to the drawing of FIG. 15(a) or a vertical direction in FIG. 15(b)). For instance, the turn 84 of the first conductor 82_A is shaped to extend from the location D1 on the $n^{th}$ layer in the circumferential direction, be bent at the head portion 84b that is the center of the circumferential length of the turn 84 in the radial direction (e.g., radially inwardly), be bent again in the circumferential direction, extend again in the circumferential direction, and then be bent at the return portion 84d in the radial direction (e.g., radially outwardly) to reach the location D7 on the $n^{th}$ layer.

With the above arrangements, the slant portions 84a of the conductors 82_A to 82_C are arranged vertically or downward in the order of the first conductor 82_A, the second conductor 82_B, and the third conductor 82_C. The head portions 84b change the order of the locations of the conductors 82_A to 82_C in the vertical direction, so that the slant portions 84c are arranged vertically or downward in the order of the third conductor 82_3, the second conductor 82_B, and the first conductor 82_A. This layout achieves an arrangement of the conductors 82_A to 82_C in the circumferential direction without any physical interference with each other.

In the structure wherein the conductors 82 are laid to overlap each other in the radial direction to form the conductor group 81, the turns 84 leading to a radially innermost one and a radially outermost one of the straight sections 83 forming the two or more layers are preferably located radially outside the straight sections 83. In a case where the conductors 83 forming the two or more layers are bent in the same radial direction near boundaries between ends of the turns 84 and the straight sections 83, the conductors 83 are preferably shaped not to deteriorate the insulation therebetween due to physical interference of the conductors 83 with each other.

Figure 16:
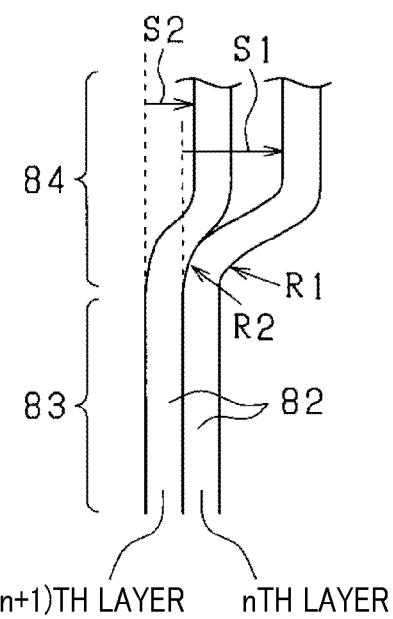
FIG. 16 is a side view showing conductors at the $n^{th}$ layer position and the $(n+1)^{th}$ layer position.

In the example of FIGS. 15(a) and 15(b), the conductors 82 laid on each other in the radial direction are bent radially at the return portions 84d of the turns 84 at the location D7 to D9. It is advisable that the conductor 82 of the $n^{th}$ layer and the conductor 82 of the $n+1^{th}$ layer be bent, as illustrated in FIG. 16, at radii of curvature different from each other. Specifically, the radius of curvature R1 of the conductor 82 of the $n^{th}$ layer is preferably selected to be smaller than the radius of curvature R2 of the conductor 82 of the $n+1^{th}$ layer.

Additionally, radial displacements of the conductor 82 of the $n^{th}$ layer and the conductor 82 of the $n+1^{th}$ layer are preferably selected to be different from each other. If the amount of radial displacement of the conductor 82 of the $n^{th}$ layer is defined as S1, and the amount of radial displacement of the conductor 82 of the $n+1^{th}$ layer located radially outside the nth layer defined as S2, the amount of radial displacement S1 is preferably selected to be greater than the amount of radial displacement S2.

The above layout of the conductors 82 eliminates the risk of interference with each other, thereby ensuring a required degree of insulation between the conductors 82 even when the conductors 82 laid on each other in the radial direction are bent in the same direction.

The structure of the magnet unit 42 of the rotor 40 will be described below. In this embodiment, the magnet unit 42 is made of permanent magnets in which a remanent flux density Br=1.0 T, and an intrinsic coercive force Hcj=400 kA/m. The permanent magnets used in this embodiment are implemented by sintered magnets formed by sintering grains of magnetic material and compacting them into a given shape and have the following specifications. The intrinsic coercive force Hcj on a J-H curve is 400 kA/m or more. The remanent flux density Br on the J-H curve is 1.0 T or more. Magnets designed so that when 5,000 to 10,000 AT is applied thereto by phase-to-phase excitation, a magnetic distance between paired poles, i.e., between a N-pole and an S-pole, in other words, of a path in which a magnetic flux flows between the N-pole and the S-pole, a portion lying in the magnet has a length of 25 mm may be used to meet a relation of Hcj=10000 A without becoming demagnetized.

In other words, the magnet unit 42 is engineered so that a saturation magnetic flux density Js is 1.2 T or more, a grain size is 10 μm or less, and a relation of Js×α≥1.0 T is met where a is an orientation ratio.

The magnet unit 42 will be additionally described below. The magnet unit 42 (i.e., magnets) has a feature that Js meets a relation of 2.15 T≥Js≥1.2 T. In other words, magnets used in the magnet unit 42 may be FeNi magnets having NdFe11TiN, Nd2Fe14B, Sm2Fe17N3, or L10 crystals. Note that samarium-cobalt magnets, such as SmCo5, FePt, Dy2Fe14B, or CoPt magnets can not be used. Magnets in which high Js characteristics of neodymium are slightly lost, but a high degree of coercive force of Dy is ensured using the heavy rare earth dysprosium, like in homotopic compounds, such as Dy2Fe14B and Nd2Fe14B, sometimes meet a relation of 2.15 T≥Js≥1.2 T, and these may be used in the magnet unit 42. Such a type of magnet will also be referred to herein as [Nd1−xDyx]2Fe14B]. Further, a magnet contacting different types of compositions, in other words, a magnet made from two or more types of materials, such as FeNi and Sm2Fe17N3, may be used to meet a relation of 2.15 T≥Js≥1.2 T. A mixed magnet made by adding a small amount of, for example, Dy2Fe14B in which Js<1 T to an Nd2Fe14B magnet in which Js=1.6 T, meaning that Js is sufficient to enhance the coercive force, may also be used to meet a relation of 2.15 T≥Js≥1.2 T.

In use of the rotating electrical machine at a temperature outside a temperature range of human activities which is higher than, for example, 60° C. exceeding temperatures of deserts, for example, within a passenger compartment of a vehicle where the temperature may rise to 80° C. in summer, the magnet preferably contains FeNi or Sm2Fe17N3 components which are less dependent on temperature. This is because motor characteristics are greatly changed by temperature-dependent factors thereof in motor operations within a range of approximately −40° which is within a range experienced by societies in Northern Europe to 60° C. or more experienced in desert region or at 180 to 240° C. that is a heat resistance temperature of the enamel coating, which leads to a difficulty in achieving a required control operation using the same motor driver. The use of FeNi containing the above described L10 crystals or Sm2Fe17N3 magnets will result in a decrease in load on the motor driver because characteristics thereof have temperature-dependent factors lower than half that of Nd2Fe14B magnets.

Additionally, the magnet unit 42 is engineered to use the above described magnet mixing so that a particle size of fine powder before being magnetically oriented is lower than or equal to 10 μm and higher than or equal to a size of single-domain particles. The coercive force of a magnet is usually increased by decreasing the size of powered particles thereof to a few hundred nm. In recent years, the smallest possible particles have been used. If the particles of the magnet are too small, the BHmax (i.e., the maximum energy product) of the magnet will be decreased due to oxidization thereof. It is, thus, preferable that the particle size of the magnet is higher than or equal to the size of the single-domain particles. The particle size being only up to the size of the single-domain particles is known to increase the coercive force of the magnet. The particle size, as referred to herein, refers to the diameter or size of fine powdered particles in a magnetic orientation operation in production processes of magnets.

Each of the first magnet 91 and the second magnet 92 of the magnet unit 42 are made of sintered magnets formed by firing or heating magnetic powder at high temperatures and compacting it. The sintering is achieved so as to meet conditions where the saturation magnetization Js of the magnet unit 42 is 1.2 T (Tesla) or more, the particle size of the first magnet 91 and the second magnet 92 is 10 μm or less, and Js×α is higher than or equal to 1.0 T (Tesla) where a is an orientation ratio. Each of the first magnet 91 and the second magnet 92 are also sintered to meet the following conditions. By performing the magnetic orientation in the magnetic orientation operation in the production processes of the first magnet 91 and the second magnet 92, they have an orientation ratio different to the definition of orientation of magnetic force in a magnetization operation for isotropic magnets. The magnet unit 42 in this embodiment is designed to have the saturation magnetization Js more than or equal to 1.2 T and the orientation ratio α of the first magnet 91 and the second magnet 92 which is high to meet a relation of Jr≥Js×α≥1.0 T. The orientation ratio α, as referred to herein, is defined in the following way. If each of the first magnet 91 and the second magnet 92 has six easy axes of magnetization, five of the easy axes of magnetization are oriented in the same direction A10, and a remaining one of the easy axes of magnetization is oriented in the direction B10 angled at 90 degrees to the direction A10, then a relation of α=5/6 is met. Alternatively, if each of the first magnet 91 and the second magnet 92 has six easy axes of magnetization, five of the easy axes of magnetization are oriented in the same direction A10, and a remaining one of the easy axes of magnetization is oriented in the direction B10 angled at 45 degrees to the direction A10, then a relation of α=(5+ 0.707)/6 is met since a component oriented in the direction A10 is expressed by cos 45°=0.707. The first magnet 91 and the second magnet 92 in this embodiment are, as described above, each made using sintering techniques, but however, they may be produced in another way as long as the above conditions are satisfied. For instance, a method of forming an MQ3 magnet may be used.

In this embodiment, permanent magnets are used which are magnetically oriented to control the easy axis of magnetization thereof, thereby enabling a magnetic circuit length within the magnets to be longer than that within typical linearly oriented magnets which produces a magnetic flux density of 1.0 T or more. In other words, the magnetic circuit length for one pole pair in the magnets in this embodiment may be achieved using magnets with a small volume. Additionally, a range of reversible flux loss in the magnets is not lost when subjected to severe high temperatures, as compared with use of typical linearly oriented magnets. The inventors of this application have found that characteristics similar to those of anisotropic magnets are obtained even using prior art magnets.

The easy axis of magnetization represents a crystal orientation in which a crystal is easy to magnetize in a magnet. The orientation of the easy axis of magnetization in the magnet, as referred to herein, is a direction in which an orientation ratio is 50% or more where the orientation ratio indicates the degree to which easy axes of magnetization of crystals are aligned with each other or a direction of an average of magnetic orientations in the magnet.

The magnet unit 42 is, as clearly illustrated in FIGS. 8 and 9, of an annular shape and arranged inside the magnet holder 41 (specifically, radially inside the cylinder 43). The magnet unit 42 is equipped with the first magnets 91 and the second magnets 92 which are each made of a polar anisotropic magnet. Each of the first magnets 91 and each of the second magnets 92 are different in polarity from each other. The first magnets 91 and the second magnets 92 are arranged alternately in the circumferential direction of the magnet unit 42. Each of the first magnets 91 is engineered to have a portion creating an N-pole near the stator winding 51. Each of the second magnets 92 is engineered to have a portion creating an S-pole near the stator winding 51. The first magnets 91 and the second magnets 92 are each made of, for example, a permanent rare earth magnet, such as a neodymium magnet.

Each of the magnets 91 and 92 is engineered to have a direction of magnetization (which will also be referred to below as a magnetization direction) which extends in an annular shape in between a d-axis (i.e., a direct-axis) and a q-axis (i.e., a quadrature-axis) in a known d-q coordinate system where the d-axis represents the center of a magnetic pole, and the q-axis represents a magnetic boundary between the N-pole and the S-pole, in other words, where a density of magnetic flux is zero Tesla. In each of the magnets 91 and 92, the magnetization direction is oriented in the radial direction of the annular magnet unit 42 close to the d-axis and also oriented in the circumferential direction of the annular magnet unit 42 closer to the q-axis. This layout will also be described below in detail. Each of the magnets 91 and 92, as can be seen in FIG. 9, includes a first portion 250 and two second portions 260 arranged on opposite sides of the first portion 250 in the circumferential direction of the magnet unit 42. In other words, the first portion 250 is located closer to the d-axis than the second portions 260 are. The second portions 260 are arranged closer to the q-axis than the first portion 250 is. The direction in which the easy axis of magnetization 300 extends in the first portion 250 is oriented more parallel to the d-axis than the direction in which the easy axis of magnetization 310 extends in the second portions 260. In other words, the magnet unit 42 is engineered so that an angle θ11 which the easy axis of magnetization 300 in the first portion 250 makes with the d-axis is selected to be smaller than an angle θ12 which the easy axis of magnetization 310 in the second portion 260 makes with the q-axis.

More specifically, if a direction from the stator 50 (i.e., an armature) toward the magnet unit 42 on the d-axis is defined to be positive, the angle θ11 represents an angle which the easy axis of magnetization 300 makes with the d-axis. Similarly, if a direction from the stator 50 (i.e., an armature) toward the magnet unit 42 on the q-axis is defined to be positive, the angle θ12 represents an angle which the easy axis of magnetization 310 makes with the q-axis. In this embodiment, each of the angle θ11 and the angle θ12 is set to be 90° or less. Each of the easy axes of magnetization 300 and 310, as referred to herein, is defined in the following way. If in each of the magnets 91 and 92, a first one of the easy axes of magnetization is oriented in a direction A11, and a second one of the easy axes of magnetization is oriented in a direction B11, an absolute value of cosine of an angle θ which the direction A11 and the direction B11 make with each other (i.e., |cos θ|) is defined as the easy axis of magnetization 300 or the easy axis of magnetization 310.

The magnets 91 are different in easy axis of magnetization from the magnets 92 in regions close to the d-axis and the q-axis. Specifically, in the region close to the d-axis, the direction of the easy axis of magnetization is oriented approximately parallel to the d-axis, while in the region close to the q-axis, the direction of the easy axis of magnetization is oriented approximately perpendicular to the q-axis. Annular magnetic paths are created according to the directions of easy axes of magnetization. In each of the magnets 91 and 92, the easy axis of magnetization in the region close to the d-axis may be oriented parallel to the d-axis, while the easy axis of magnetization in the region close to the q-axis may be oriented perpendicular to the q-axis.

Each of the magnets 91 and 92 is shaped to have a first peripheral surface facing the stator 50 (i.e., a lower surface viewed in FIG. 9 which will also be referred to as a stator-side outer surface) and a second peripheral surface facing the q-axis in the circumferential direction. The first and second peripheral surfaces function as magnetic flux acting surfaces into and from which magnetic flux flows. The magnetic paths are each created to extend between the magnetic flux acting surfaces (i.e., between the stator-side outer surface and the second peripheral surface facing the q-axis).

Figure 17:
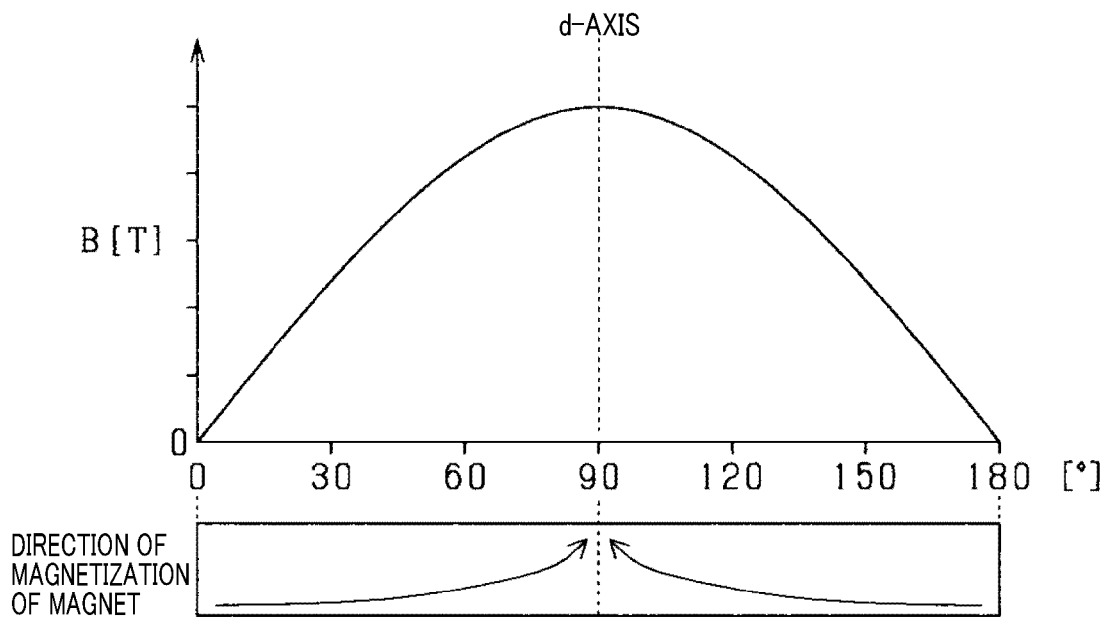
FIG. 17 is a view representing a relation between an electrical angle and a magnetic flux density in magnets of an embodiment.
Figure 18:
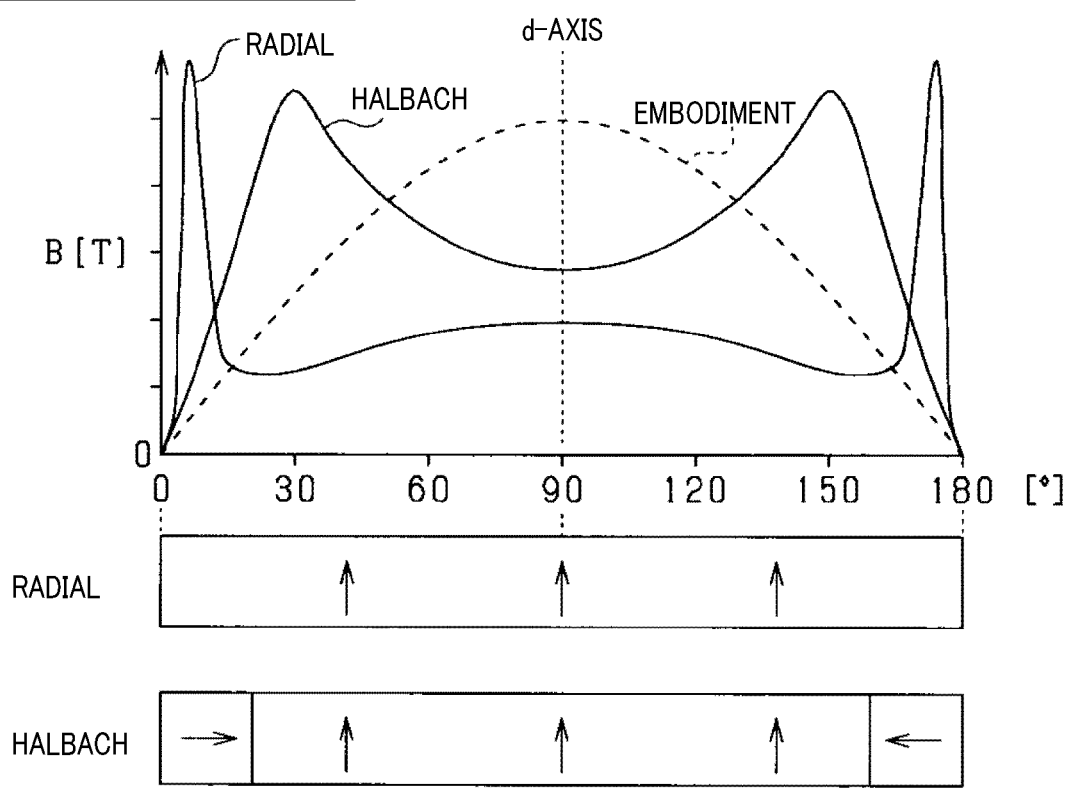
FIG. 18 is a view which represents a relation between an electrical angle and a magnetic flux density in a comparative example of magnet arrangement.

In the magnet unit 42, a magnetic flux flows in an annular shape between a respective adjacent two of the N-poles and the S-poles of the magnets 91 and 92, so that each of the magnetic paths has an increased length, as compared with, for example, radial anisotropic magnets. A distribution of the magnetic flux density will, therefore, exhibit a shape similar to a sine wave illustrated in FIG. 17. This facilitates concentration of magnetic flux around the center of the magnetic pole unlike a distribution of magnetic flux density of a radial anisotropic magnet demonstrated in FIG. 18 as a comparative example, thereby enabling the degree of torque produced by the rotating electrical machine 10 to be increased. It has also been found that the magnet unit 42 in this embodiment has the distribution of the magnetic flux density distinct from that of a typical Halbach array magnet. In FIGS. 17 and 18, a horizontal axis indicates the electrical angle, while a vertical axis indicates the magnetic flux density. 90° on the horizontal axis represents the d-axis (i.e., the center of the magnetic pole). 0° and 180° on the horizontal axis represent the q-axis.

Accordingly, the above described structure of each of the magnets 91 and 92 functions to enhance the magnet magnetic flux thereof on the d-axis and reduce a change in magnetic flux near the q-axis. This enables the magnets 91 and 92 to be produced which have a smooth change in surface magnetic flux from the q-axis to the d-axis on each magnetic pole.

The sine wave matching percentage in the distribution of the magnetic flux density is preferably set to, for example, 40% or more. This improves the amount of magnetic flux around the center of a waveform of the distribution of the magnetic flux density as compared with a radially oriented magnet or a parallel oriented magnet in which the sine wave matching percentage is approximately 30%. By setting the sine wave matching percentage to be 60% or more, the amount of magnetic flux around the center of the waveform is improved, as compared with a concentrated magnetic flux array, such as the Halbach array.

In the radial anisotropic magnet demonstrated in FIG. 18, the magnetic flux density changes sharply near the q-axis. The more sharp the change in magnetic flux density, the more an eddy current generating in the stator winding 51 will increase. The magnetic flux close to the stator winding 51 also sharply changes. In contrast, the distribution of the magnetic flux density in this embodiment has a waveform approximating a sine wave. A change in magnetic flux density near the q-axis is, therefore, smaller than that in the radial anisotropic magnet near the q-axis. This minimizes the generation of the eddy current.

The magnet unit 42 creates a magnetic flux oriented perpendicular to the magnetic flux acting surface 280 close to the stator 50 near the d-axis (i.e., the center of the magnetic pole) in each of the magnets 91 and 92. Such a magnetic flux extends in an arc-shape farther away from the d-axis as leaving the magnetic flux acting surface 280 close to the stator 50. The more perpendicular to the magnetic flux acting surface the magnetic flux extends, the stronger the magnetic flux is. The rotating electrical machine 10 in this embodiment is, as described above, designed to shape each of the conductor groups 81 to have a decreased thickness in the radial direction, so that the radial center of each of the conductor groups 81 is located close to the magnetic flux-acting surface of the magnet unit 42, thereby causing the strong magnetic flux to be applied to the stator 50 from the rotor 40.

The stator 50 has the cylindrical stator core 52 arranged radially inside the stator winding 51, that is, on the opposite side of the stator winding 51 to the rotor 40. This causes the magnetic flux extending from the magnetic flux-acting surface of each of the magnets 91 and 92 to be attracted by the stator core 52, so that it circulates through the magnetic path partially including the stator core 52. This enables the orientation of the magnetic flux and the magnetic path to be optimized.

Steps to assemble the bearing unit 20, the housing 30, the rotor 40, the stator 50, and the inverter unit 60 illustrated in FIG. 5 will be described below as a production method of the rotating electrical machine 10. The inverter unit 60 is, as illustrated in FIG. 6, equipped with the unit base 61 and the electrical components 62. Operation processes including installation processes for the unit base 61 and the electrical components 62 will be explained. In the following discussion, an assembly of the stator 50 and the inverter unit 60 will be referred to as a first unit. An assembly of the bearing unit 20, the housing 30, and the rotor 40 will be referred to as a second unit.

The production processes include:

a first step of installing the electrical components 62 radially inside the unit base 61;

a second step of installing the unit base 61 radially inside the stator 50 to make the first unit;

a third step of inserting the attaching portion 44 of the rotor 40 into the bearing unit 20 installed in the housing 30 to make the second unit;

a fourth step of installing the first unit radially inside the second unit; and a fifth step of fastening the housing 30 and the unit base 61 together. The order in which the above steps are performed is the first step→the second step→the third step→the fourth step→the fifth step.

In the above production method, the bearing unit 20, the housing 30, the rotor 40, the stator 50, and the inverter unit 60 are assembled as a plurality of sub-assemblies, and the sub-assemblies are assembled, thereby facilitating handling thereof and achieving completion of inspection of each sub-assembly. This enables an efficient assembly line to be established and thus facilitates multi-product production planning.

In the first step, a high thermal conductivity material is applied or adhered to at least one of the radial inside of the unit base 61 and the radial outside of the electrical components 62. Subsequently, the electrical components may be mounted on the unit base 61. This achieves efficient transfer of heat, as generated by the semiconductor modules 66, to the unit base 61.

In the third step, an insertion operation for the rotor 40 may be achieved with the housing 30 and the rotor 40 arranged coaxially with each other. Specifically, the housing 30 and the rotor 40 are assembled while sliding one of the housing 30 and the rotor 40 along a jig which positions the outer peripheral surface of the rotor 40 (i.e., the outer peripheral surface of the magnetic holder 41) or the inner peripheral surface of the rotor 40 (i.e., the inner peripheral surface of the magnet unit 42) with respect to, for example, the inner peripheral surface of the housing 30. This achieves the assembly of heavy-weight parts without exertion of unbalanced load to the bearing unit 20. This results in improvement of reliability in operation of the bearing unit 20.

In the fourth step, the first unit and the second unit may be installed while being placed coaxially with each other. Specifically, the first unit and the second unit are installed while sliding one of the first unit and the second unit along a jig which positions the inner peripheral surface of the unit base 61 with respect to, for example, the inner peripheral surfaces of the rotor 40 and the attaching portion 44. This achieves the installation of the first and second units without any physical interference therebetween within a small clearance between the rotor 40 and the stator 50, thereby eliminating risks of defects caused by the installation, such as physical damage to the stator winding 51 or damage to the permanent magnets.

The above steps may alternatively be scheduled as the second step→the third step→the fourth step→the fifth step→the first step. In this order, the delicate electrical components 62 is finally installed, thereby minimizing stress on the electrical components in the installation processes.

Figure 19:
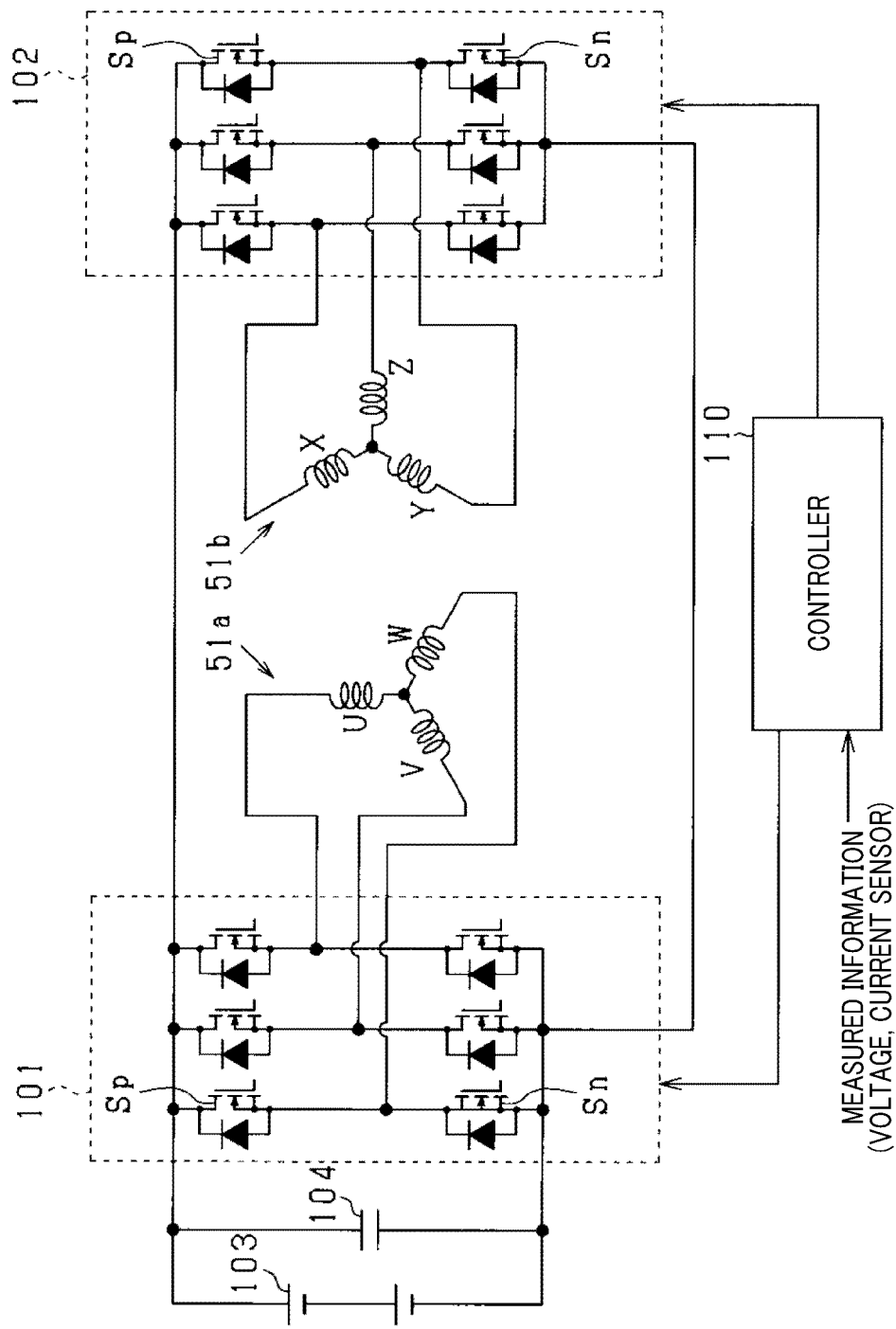
FIG. 19 is an electrical circuit diagram of a control system for a rotating electrical machine.
Figure 20:
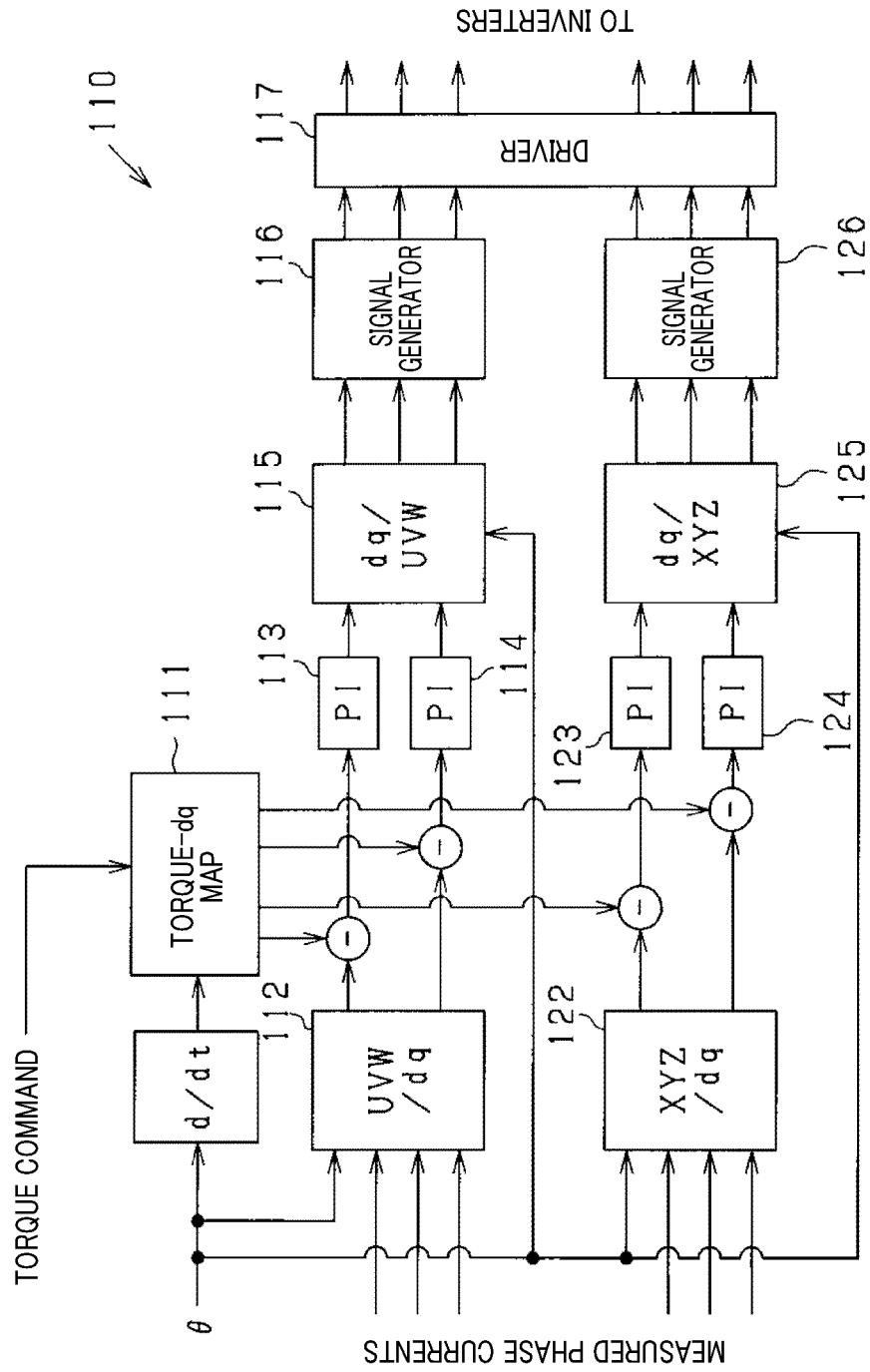
FIG. 20 is a functional block diagram which shows a current feedback control operation of a control device.

The structure of a control system for controlling an operation of the rotating electrical machine 10 will be described below. FIG. 19 is an electrical circuit diagram of the control system for the rotating electrical machine 10. FIG. 20 is a functional block diagram which illustrates control steps performed by the controller 110.

FIG. 19 illustrates two sets of three-phase windings 51*a* and 51*b*. The three-phase winding 51*a* includes a U-phase winding, a V-phase winding, and a W-phase winding. The three-phase winding 51*b* includes an X-phase winding, a Y-phase winding, and a Z-phase winding. The first inverter 101 and the second inverter 102 are provided as electrical power converters for the three-phase windings 51*a* and 51*b*, respectively. The inverters 101 and 102 are made of bridge circuits with as many upper and lower arms as there are the phase-windings. The current delivered to the phase windings of the stator winding 51 is regulated by turning on or off switches (i.e., semiconductor switches) mounted on the upper and lower arms.

The dc power supply 103 and the smoothing capacitor 104 are connected parallel to the inverters 101 and 102. The dc power supply 103 is made of, for example, a plurality of series-connected cells. The switches of the inverters 101 and 102 correspond to the semiconductor modules 66 in FIG. 1. The capacitor 104 corresponds to the capacitor module 68 in FIG. 1.

The controller 110 is equipped with a microcomputer made of a CPU and memories and works to perform control energization by turning on or off the switches of the inverters 101 and 102 using several types of measured information measured in the rotating electrical machine 10 or requests for a motor mode or a generator mode of the rotating electrical machine 10. The controller 110 corresponds to the control device 77 shown in FIG. 6. The measured information about the rotating electrical machine 10 includes, for example, an angular position (i.e., an electrical angle) of the rotor 40 measured by an angular position sensor, such as a resolver, a power supply voltage (i.e., voltage inputted into the inverters) measured by a voltage sensor, and electrical current delivered to each of the phase-windings, as measured by a current sensor. The controller 110 produces and outputs an operation signal to operate each of the switches of the inverters 101 and 102. A request for electrical power generation is a request for driving the rotating electrical machine 10 in a regenerative mode, for example, in a case where the rotating electrical machine 10 is used as a power source for a vehicle.

The first inverter 101 is equipped with a series-connected part made up of an upper arm switch Sp and a lower arm switch Sn for each of the three-phase windings: the U-phase winding, the V-phase winding, and the W-phase winding. The upper arm switches Sp are connected at high-potential terminals thereof to a positive terminal of the dc power supply 103. The lower arm switches Sn are connected at low-potential terminals thereof to a negative terminal (i.e., ground) of the dc power supply 103. Intermediate joints of the upper arm switches Sp and the lower arm switches Sn are connected to ends of the U-phase winding, the V-phase winding, and the W-phase winding. The U-phase winding, the V-phase winding, and the W-phase winding are connected in the form of a star connection (i.e., Y-connection). The other ends of the U-phase winding, the V-phase winding, and the W-phase winding are connected with each other at a neutral point.

The second inverter 102 is, like the first inverter 101, equipped with a series-connected part made up of an upper arm switch Sp and a lower arm switch Sn for each of the three-phase windings: the X-phase winding, the Y-phase winding, and the Z-phase winding. The upper arm switches Sp are connected at high-potential terminals thereof to the positive terminal of the dc power supply 103. The lower arm switches Sn are connected at low-potential terminals thereof to the negative terminal (i.e., ground) of the dc power supply 103. Intermediate joints of the upper arm switches Sp and the lower arm switches Sn are connected to ends of the X-phase winding, the Y-phase winding, and the Z-phase winding. The X-phase winding, the Y-phase winding, and the Z-phase winding are connected in the form of a star connection (i.e., Y-connection). The other ends of the X-phase winding, the Y-phase winding, and the Z-phase winding are connected with each other at a neutral point.

FIG. 20 illustrates a current feedback control operation to control electrical currents delivered to the U-phase winding, the V-phase winding, and the W-phase winding and a current feedback control operation to control electrical currents delivered to the X-phase winding, the Y-phase winding, and the Z-phase winding. The control operation for the U-phase winding, the V-phase winding, and the W-phase winding will first be discussed.

In FIG. 20, the current command determiner 111 uses a torque-dq map to determine current command values for the d-axis and the q-axis using a torque command value in the motor mode of the rotating electrical machine 10 (which will also be referred to as a motor-mode torque command value), a torque command value in the generator mode of the rotating electrical machine 10 (which will be referred to as a generator-mode torque command value), and an electrical angular velocity ω derived by differentiating an electrical angle θ with respect to time. The current command determiner 111 is shared between the U-, V-, and W-phase windings and the X-, Y-, and W-phase windings. The generator-mode torque command value is a regenerative torque command value in a case where the rotating electrical machine 10 is used as a power source of a vehicle.

The d-q converter 112 works to convert currents (i.e., three phase currents), as measured by current sensors mounted for the respective phase windings, into a d-axis current and a q-axis current that are components in a two-dimensional rotating Cartesian coordinate system in which a d-axis is defined as a direction of an axis of a magnetic field or field direction.

The d-axis current feedback control device 113 determines a command voltage for the d-axis as a manipulated variable for bringing the d-axis current into agreement with the current command value for the d-axis in a feedback mode. The q-axis current feedback control device 114 determines a command voltage for the q-axis as a manipulated variable for bringing the q-axis current into agreement with the current command value for the q-axis in a feedback mode. The feedback control devices 113 and 114 calculates the command voltage as a function of a deviation of each of the d-axis current and the q-axis current from a corresponding one of the current command values using PI feedback techniques.

The three-phase converter 115 works to convert the command values for the d-axis and the q-axis into command values for the U-phase, V-phase, and W-phase windings. Each of the devices 111 to 115 is engineered as a feedback controller to perform a feedback control operation for a fundamental current in the d-q transformation theory. The command voltages for the U-phase, V-phase, and W-phase windings are feedback control values.

The operation signal generator 116 uses the known triangle wave carrier comparison to produce operation signals for the first inverter 101 as a function of the three-phase command voltages. Specifically, the operation signal generator 116 works to produce switch operation signals (i.e., duty signals) for the upper and lower arms for the three-phase windings (i.e., the U-, V-, and W-phase windings) under PWM control based on comparison of levels of signals derived by normalizing the three-phase command voltages using the power supply voltage with a level of a carrier signal, such as a triangle wave signal.

The same structure as described above is provided for the X-, Y-, and Z-phase windings. The d-q converter 122 works to convert currents (i.e., three phase currents), as measured by current sensors mounted for the respective phase windings, into a d-axis current and a q-axis current that are components in the two-dimensional rotating Cartesian coordinate system in which the d-axis is defined as the direction of the axis of the magnetic field.

The d-axis current feedback control device 123 determines a command voltage for the d-axis. The q-axis current feedback control device 124 determines a command voltage for the q-axis. The three-phase converter 125 works to convert the command values for the d-axis and the q-axis into command values for the X-phase, Y-phase, and Z-phase windings. The operation signal generator 126 produces operation signals for the second inverter 102 as a function of the three-phase command voltages. Specifically, the operation signal generator 126 works to switch operation signals (i.e., duty signals) for the upper and lower arms for the three-phase windings (i.e., the X-, Y-, and Z-phase windings) based on comparison of levels of signals derived by normalizing the three-phase command voltages using the power supply voltage with a level of a carrier signal, such as a triangle wave signal.

The driver 117 works to turn on or off the switches Sp and Sn in the inverters 101 and 102 in response to the switch operation signals produced by the operation signal generators 116 and 126.

Subsequently, a torque feedback control operation will be described below. This operation is to increase an output of the rotating electrical machine 10 and reduce torque loss in the rotating electrical machine 10, for example, in a high-speed and high-output range wherein output voltages from the inverters 101 and 102 rise. The controller 110 selects one of the torque feedback control operation and the current feedback control operation and perform the selected one as a function of an operating condition of the rotating electrical machine 10.

Figure 21:
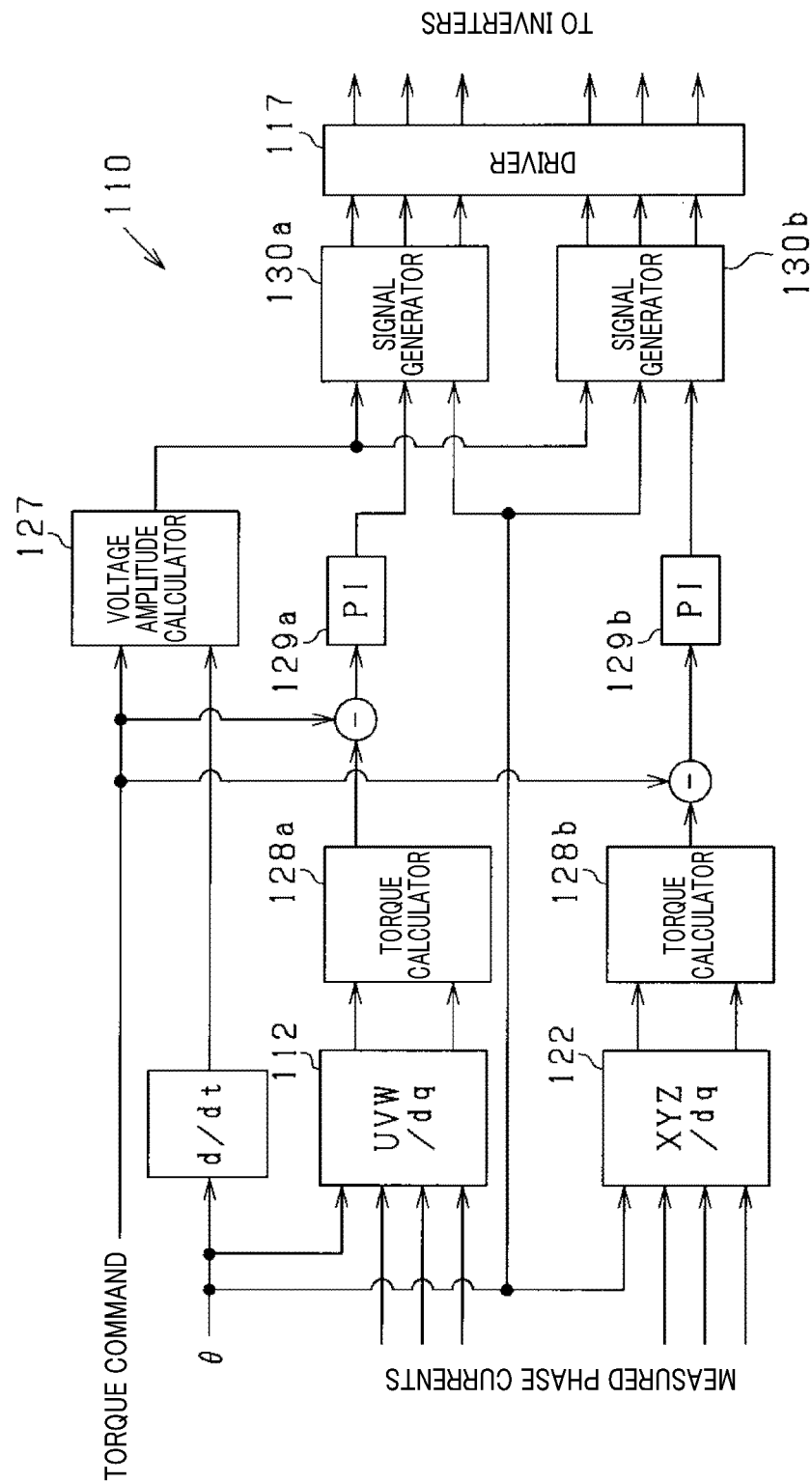
FIG. 21 is a functional block diagram which shows a torque feedback control operation of a control device.

FIG. 21 shows the torque feedback control operation for the U-, V-, and W-phase windings and the torque feedback control operation for the X-, Y-, and Z-phase windings. In FIG. 21, the same reference numbers as employed in FIG. 20 refer to the same parts, and explanation thereof in detail will be omitted here. The control operation for the U-, V-, and W-phase windings will be described first.

The voltage amplitude calculator 127 works to calculate a voltage amplitude command that is a command value of a degree of a voltage vector as a function of the motor-mode torque command value or the generator-mode torque command value for the rotating electrical machine 10 and the electrical angular velocity ω derived by differentiating the electrical angle θ with respect to time.

The torque calculator 128a works to estimate a torque value in the U-phase, V-phase, or the W-phase as a function of the d-axis current and the q-axis current converted by the d-q converter 112. The torque calculator 128a may be designed to calculate the voltage amplitude command using a map listing relations among the d-axis current, the q-axis current, and the voltage amplitude command.

The torque feedback controller 129a calculates a voltage phase command that is a command value for a phase of the voltage vector as a manipulated variable for bringing the estimated torque value into agreement with the motor-mode torque command value or the generator-mode torque command value in the feedback mode. Specifically, the torque feedback controller 129a calculates the voltage phase command as a function of a deviation of the estimated torque value from the motor-mode torque command value or the generator-mode torque command value using PI feedback techniques.

The operation signal generator 130a works to produce the operation signal for the first inverter 101 using the voltage amplitude command, the voltage phase command, and the electrical angle θ. Specifically, the operation signal generator 130a calculates the command values for the three-phase windings based on the voltage amplitude command, the voltage phase command, and the electrical angle θ and then generates switching operation signals for the upper and lower arms for the three-phase windings by means of PWM control based on comparison of levels of signals derived by normalizing the three-phase command voltages using the power supply voltage with a level of a carrier signal, such as a triangle wave signal. The operation signal generator 130a may alternatively be designed to produce the switching operation signals using pulse pattern information that is map information about relations among the voltage amplitude command, the voltage phase command, the electrical angle θ, and the switching operation signal, the voltage amplitude command, the voltage phase command, and the electrical angle θ.

The same structure as described above is provided for the X-, Y-, and Z-phase windings. The torque calculator 128b works to estimate a torque value in the X-phase, Y-phase, or the Z-phase as a function of the d-axis current and the q-axis current converted by the d-q converter 122.

The torque feedback controller 129b calculates a voltage phase command as a manipulated variable for bringing the estimated torque value into agreement with the motor-mode torque command value or the generator-mode torque command value in the feedback mode. Specifically, the torque feedback controller 129b calculates the voltage phase command as a function of a deviation of the estimated torque value from the motor-mode torque command value or the generator-mode torque command value using PI feedback techniques.

The operation signal generator 130b works to produce the operation signal for the second inverter 102 using the voltage amplitude command, the voltage phase command, and the electrical angle θ. Specifically, the operation signal generator 130b calculates the command values for the three-phase windings based on the voltage amplitude command, the voltage phase command, and the electrical angle θ and then generates the switching operation signals for the upper and lower arms for the three-phase windings by means of PWM control based on comparison of levels of signals derived by normalizing the three-phase command voltages using the power supply voltage with a level of a carrier signal, such as a triangle wave signal. The driver 117 then works to turn on or off the switches Sp and Sn for the three-phase windings in the inverters 101 and 102 in response to the switching operation signals derived by the operation signal generators 130a and 130b.

The operation signal generator 130b may alternatively be designed to produce the switching operation signals using pulse pattern information that is map information about relations among the voltage amplitude command, the voltage phase command, the electrical angle θ, and the switching operation signal, the voltage amplitude command, the voltage phase command, and the electrical angle θ.

The rotating electrical machine 10 has a risk that generation of an axial current may result in electrical erosion in the bearing 21 or 22. For example, when the stator winding 51 is excited or de-excited in response to the switching operation, a small switching time gap (i.e., switching unbalance) may occur, thereby resulting in distortion of magnetic flux, which leads to the electrical erosion in the bearings 21 and 22 retaining the rotating shaft 11. The distortion of magnetic flux depends upon the inductance of the stator 50 and creates an electromotive force oriented in the axial direction, which results in dielectric breakdown in the bearing 21 or 22 worsening the electrical erosion.

In order to avoid the electrical erosion, this embodiment is engineered to take three measures as discussed below. The first erosion avoiding measure is to reduce the inductance by designing the stator 50 to have a core-less structure and also to shape the magnetic flux in the magnet unit 42 to be smooth to minimize the electrical erosion. The second erosion avoiding measure is to retain the rotating shaft in a cantilever form to minimize the electrical erosion. The third erosion avoiding measure is to unify the annular stator winding 51 and the stator core 52 using molding techniques using a molding material to minimize the electrical erosion. The first to third erosion avoiding measures will be described below in detail.

In the first erosion avoiding measure, the stator 50 is designed to have no teeth in gaps between the conductor groups 81 in the circumferential direction. The sealing members 57 made of non-magnetic material are arranged in the gaps between the conductor groups 81 instead of teeth (iron cores) (see FIG. 10). This results in a decrease in inductance of the stator 50, thereby minimizing the distortion of magnetic flux caused by the switching time gap occurring upon excitation of the stator winding 51 to reduce the electrical erosion in the bearings 21 and 22. The inductance on the d-axis is preferably less than that on the q-axis.

Additionally, each of the magnets 91 and 92 is magnetically oriented to have the easy axis of magnetization which is directed near the d-axis to be more parallel to the d-axis than that near the q-axis (see FIG. 9). This strengthens the magnetic flux on the d-axis, thereby resulting in a smooth change in surface magnetic flux (i.e., an increase or decrease in magnetic flux) from the q-axis to the d-axis on each magnetic pole of the magnets 91 and 92. This minimizes a sudden voltage change arising from the switching imbalance to avoid the electrical erosion.

In the second erosion avoiding measure, the rotating electrical machine 10 is designed to have the bearings 21 and 22 located away from the axial center of the rotor 40 toward one of the ends of the rotor 40 opposed to each other in the axial direction thereof (see FIG. 2). This minimizes the risk of the electrical erosion as compared with a case where a plurality of bearings are arranged outside axial ends of a rotor. In other words, in the structure wherein the rotor has ends retained by the bearings, generation of a high-frequency magnetic flux results in creation of a closed circuit extending through the rotor, the stator, and the bearings (which are arranged axially outside the rotor). This leads to a risk that the axial current may result in the electrical erosion in the bearings. In contrast, the rotor 40 is retained by the plurality of bearings 21 and 22 in the cantilever form, so that the above closed circuit does not occur, thereby minimizing the electrical erosion in the bearings 21 and 22.

In addition to the above one-side layout of the bearings 21 and 22, the rotating electrical machine 10 also has the following structure. In the magnet holder 41, the intermediate portion 45 extending in the radial direction of the rotor 40 is equipped with the contact avoider which axially extends to avoid physical contact with the stator 50 (see FIG. 2). This enables a closed circuit through which the axial current flows through the magnet holder 41 to be lengthened to increase the resistance thereof. This minimizes the risk of the electrical erosion of the bearings 21 and 22.

The retainer 23 for the bearing unit 20 is secured to the housing 30 and located on one axial end side of the rotor 40, while the housing 30 and the unit base 61 (i.e., a stator holder) are joined together on the other axial end of the rotor 40 (see FIG. 2). These arrangements properly achieve the structure in which the bearings 21 and 22 are located only on the one end of the length of the rotating shaft 11. Additionally, the unit base 61 is connected to the rotating shaft 11 through the housing 30, so that the unit base 61 is located electrically away from the rotating shaft 11. An insulating member such as resin may be disposed between the unit base 61 and the housing 30 to place the unit base 61 and the rotating shaft 11 electrically farther away from each other. This also minimizes the risk of the electrical erosion of the bearings 21 and 22.

The one-side layout of the bearings 21 and 22 in the rotating electrical machine 10 in this embodiment decreases the axial voltage applied to the bearings 21 and 22 and also decreases the potential difference between the rotor 40 and the stator 50. A decrease in the potential difference applied to the bearings 21 and 22 is, thus, achieved without use of conductive grease in the bearings 21 and 22. The conductive grease usually contains fine particles such as carbon particles, thus leading to a risk of generation of acoustic noise. In order to alleviate the above problem, this embodiment uses a non-conductive grease in the bearings 21 and 22 to minimize the acoustic noise in the bearings 21 and 22. For instance, in a case where the rotating electrical machine 10 is used with an electrical vehicle, it is usually required to take a measure to eliminate the acoustic noise. This embodiment is capable of properly taking such a measure.

In the third erosion avoiding measure, the stator winding 51 and the stator core 52 are unified together using a moldling material to minimize a positional error of the stator winding 51 in the stator 50 (see FIG. 11). The rotating electrical machine 10 in this embodiment is designed not to have conductor-to-conductor members (e.g., teeth) between the conductor groups 81 arranged in the circumferential direction of the stator winding 51, thus leading to a concern about the positional error or misalignment of the stator winding 51. The misalignment of the conductor of the stator winding 51 may be minimized by unifying the stator winding 51 and the stator core 52 in the mold. This eliminates risks of the distortion of magnetic flux arising from the misalignment of the stator winding 51 and the electrical erosion in the bearings 21 and 22 resulting from the distortion of the magnetic flux.

The unit base 61 serving as a housing to firmly fix the stator core 52 is made of carbon fiber reinforced plastic (CFRP), thereby minimizing electrical discharge to the unit base 61 as compared with when the unit base 61 is made of aluminum, thereby avoiding the electrical erosion.

An additional erosion avoiding measure may be taken to make at least one of the outer race 25 and the inner race 26 of each of the bearings 21 and 22 using a ceramic material or alternatively to install an insulating sleeve outside the outer race 25.

Other embodiments will be described below in terms of differences between themselves and the first embodiment.

Second Embodiment

In this embodiment, the polar anisotropic structure of the magnet unit 42 of the rotor 40 is changed and will be described below in detail.

Figure 22:
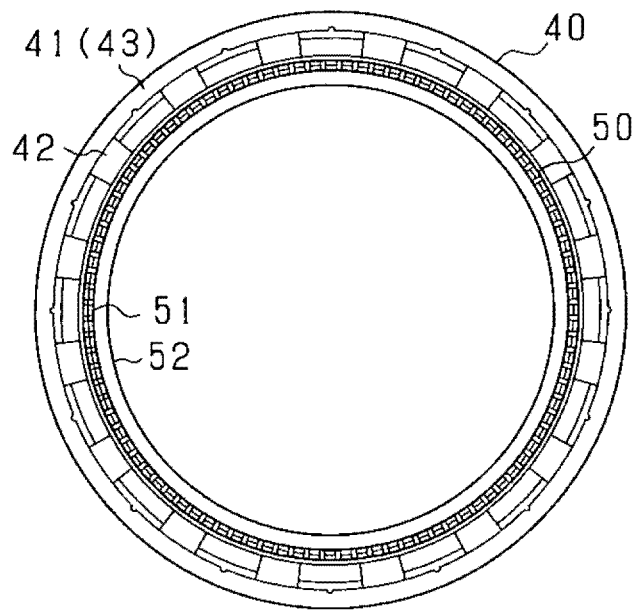
FIG. 22 is a transverse sectional view of a rotor and a stator in the second embodiment.
Figure 23:
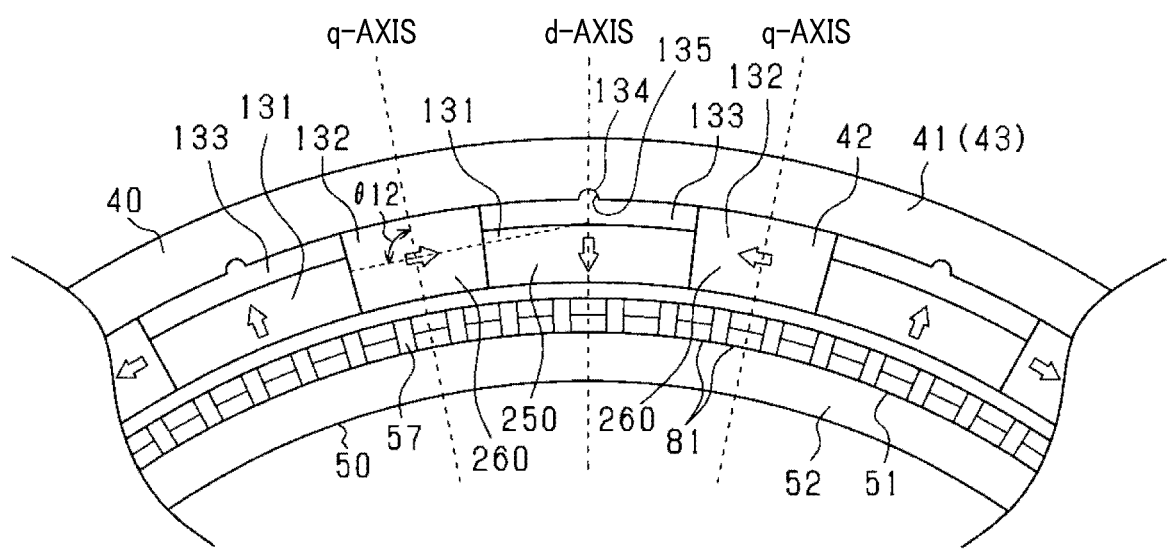
FIG. 23 is a partial enlarged view of FIG. 22.

The magnet unit 42 is, as clearly illustrated in FIGS. 22 and 23, made using a magnet array referred to as a Halbach array. Specifically, the magnet unit 42 is equipped with the first magnets 131 and the second magnets 132. The first magnets 131 have a magnetization direction (i.e., an orientation of a magnetization vector thereof) oriented in the radial direction of the magnet unit 42. The second magnets 132 have a magnetization direction (i.e., an orientation of the magnetization vector thereof) oriented in the circumferential direction of the magnet unit 42. The first magnets 131 are arrayed at a given interval away from each other in the circumferential direction. Each of the second magnets 132 is disposed between the first magnets 131 arranged adjacent each other in the circumferential direction. The first magnets 131 and the second magnets 132 are each implemented by a rare-earth permanent magnet, such as a neodymium magnet.

The first magnets 131 are arranged away from each other in the circumferential direction so as to have N-poles and S-poles which are created in radially inner portions thereof and face the stator 50. The N-poles and the S-poles are arranged alternately in the circumferential direction. The second magnets 132 are arranged to have N-poles and S-poles alternately located adjacent the first magnets 131 in the circumferential direction. The cylinder 43 which surrounds the magnets 131 and 132 may be formed as a soft magnetic core made of a soft magnetic material and which functions as a back core. The magnet unit 42 in this embodiment are designed to have the easy axis of magnetization oriented in the same way as in the first embodiment relative to the d-axis and the q-axis in the d-q axis coordinate system.

The magnetic members 133 each of which is made of a soft magnetic material are disposed radially outside the first magnets 131, in other words, close to the cylinder 43 of the magnet holder 41. Each of the magnetic members 133 may be made of magnetic steel sheet, soft iron, or a dust core material. Each of the magnetic members 133 has a length identical with that of the first magnet 131 (especially, a length of an outer periphery of the first magnet 131) in the circumferential direction. An assembly made up of each of the first magnets 131 and a corresponding one of the magnetic members 133 has a thickness identical with that of the second magnet 132 in the radial direction. In other words, each of the first magnets 131 has the thickness smaller than that of the second magnet 132 by that of the magnetic member 133 in the radial direction. The magnets 131 and 132 and the magnetic members 133 are firmly secured to each other using, for example, adhesive agent. In the magnet unit 42, the radial outside of the first magnets 131 faces away from the stator 50. The magnetic members 133 are located on the opposite side of the first magnets 131 to the stator 50 in the radial direction (i.e., farther away from the stator 50).

Each of the magnetic members 133 has the key 134 in a convex shape which is formed on the outer periphery thereof and protrudes radially outside the magnetic member 133, in other words, protrudes into the cylinder 43 of the magnet holder 41. The cylinder 43 has the key grooves 135 which are formed in an inner peripheral surface thereof in a concave shape and in which the keys 134 of the magnetic members 133 are fit. The protruding shape of the keys 134 is contoured to conform with the recessed shape of the key grooves 135. As many of the key grooves 135 as the keys 134 of the magnetic members 133 are formed. The engagement between the keys 134 and the key grooves 135 serves to eliminate misalignment or a positional deviation of the first magnets 131, the second magnets 132, and the magnet holder 41 in the circumferential direction (i.e. a rotational direction). The keys 134 and the key grooves 135 (i.e., convexities and concavities) may be formed either on the cylinders 43 of the magnet holder 41 or in the magnetic members 133, respectively. Specifically, the magnetic members 133 may have the key grooves 135 in the outer periphery thereof, while the cylinder 43 of the magnet holder 41 may have the keys 134 formed on the inner periphery thereof.

The magnet unit 42 has the first magnets 131 and the second magnets 132 alternately arranged to increase the magnetic flux density in the first magnets 131. This results in concentration of magnetic flux on one surface of the magnet unit 42 to enhance the magnetic flux close to the stator 50.

The layout of the magnetic members 133 radially arranged outside the first magnets 131, in other words, farther away from the stator 50 reduces partial magnetic saturation occurring radially outside the first magnets 131, thereby alleviating a risk of demagnetization in the first magnets 131 arising from the magnetic saturation. This results in an increase in magnetic force produced by the magnet unit 42. In other words, the magnet unit 42 in this embodiment is viewed to have portions which are usually subjected to the demagnetization and replaced with the magnetic members 133.

Figure 24A:
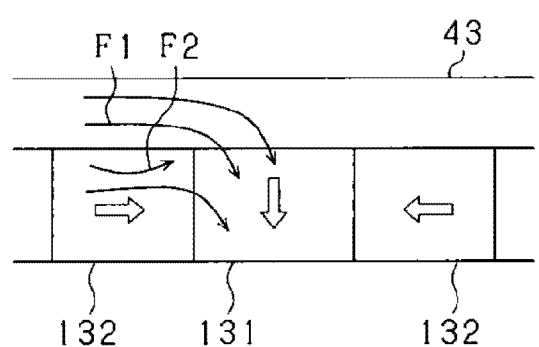
FIGS. 24A and 24B are views demonstrating flows of magnetic flux in a magnet unit.
Figure 24B:
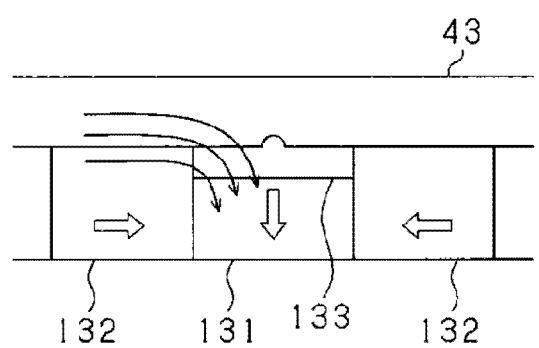

FIGS. 24(a) and 24(b) are illustrations which demonstrate flows of magnetic flux in the magnet unit 42. FIG. 24(a) illustrates a conventional structure in which the magnet unit 42 is not equipped with the magnetic members 133. FIG. 24(b) illustrates the structure in this embodiment in which the magnet unit 42 is equipped with the magnetic members 133. FIGS. 24(a) and 24(b) are linearly developed views of the cylinder 43 of the magnet holder 41 and the magnet unit 42. Lower sides of FIGS. 24(a) and 24(b) are closer to the stator 50, while upper sides thereof are farther away from the stator 50.

In the structure shown in FIG. 24(a), a magnetic flux-acting surface of each of the first magnets 131 and a side surface of each of the second magnets 132 are placed in contact with the inner peripheral surface of the cylinder 43. A magnetic flux-acting surface of each of the second magnets 132 is placed in contact with the side surface of one of the first magnets 131. Such layout causes a combined magnetic flux to be created in the cylinder 43. The combined magnetic flux is made up of a magnetic flux F1 which passes outside the second magnet 132 and then enters the surface of the first magnets 131 contacting the cylinder 43 and a magnetic flux which flows substantially parallel to the cylinder 43 and attracts a magnetic flux F2 produced by the second magnet 132. This leads to a risk that the magnetic saturation may occur near the surface of contact between the first magnet 131 and the second magnet 132 in the cylinder 43

In the structure in FIG. 24(b) wherein each of the magnetic members 133 is disposed between the magnetic flux-acting surface of the first magnet 131 and the inner periphery of the cylinder 43 farther away from the stator 50, the magnetic flux is permitted to pass through the magnetic member 133. This minimizes the magnetic saturation in the cylinder 43 and increases resistance against the demagnetization.

The structure in FIG. 24(b), unlike FIG. 24(a), functions to eliminate the magnetic flux F2 facilitating the magnetic saturation. This effectively enhances the permeance in the whole of the magnetic circuit, thereby ensuring the stability in properties of the magnetic circuit under elevated temperature.

As compared with radial magnets used in conventional SPM rotors, the structure in FIG. 24(b) has an increased length of the magnetic path passing through the magnet. This results in a rise in permeance of the magnet which enhances the magnetic force to increase the torque. Further, the magnetic flux concentrates on the center of the d-axis, thereby increasing the sine wave matching percentage. Particularly, the increase in torque may be achieved effectively by shaping the waveform of the current to a sine or trapezoidal wave under PWM control or using 120° excitation switching ICs.

In a case where the stator core 52 is made of magnetic steel sheets, the thickness of the stator core 52 in the radial direction thereof is preferably half or greater than half the thickness of the magnet unit 42 in the radial direction. For instance, it is preferable that the thickness of the stator core 52 in the radial direction is greater than half the thickness of the first magnets 131 arranged at the pole-to-pole center in the magnet unit 42. It is also preferable that the thickness of the stator core 52 in the radial direction is smaller than that of the magnet unit 42. In this case, a magnet magnetic flux is approximately IT, while the saturation magnetic flux density in the stator core 52 is 2 T. The leakage of magnetic flux to inside the inner periphery of the stator core 52 is avoided by selecting the thickness of the stator core 52 in the radial direction to be greater than half that of the magnet unit 42.

Magnets arranged to have the Halbach structure or the polar anisotropic structure usually have an arc-shaped magnetic path, so that the magnetic flux may be increased in proportion to a thickness of ones of the magnets which handle a magnetic flux in the circumferential direction. In such a structure, the magnetic flux flowing through the stator core 52 is thought of as not exceeding the magnetic flux flowing in the circumferential direction. In other words, when the magnetic flux produced by the magnets is 1 T, while ferrous metal whose saturation magnetic flux density is 2 T is used to make the stator core 52, a light weight and compact electrical rotating machine may be produced by selecting the thickness of the stator core 52 to be greater than half that of the magnets. The demagnetizing field is usually exerted by the stator 50 on the magnetic field produced by the magnets, so that the magnetic flux produced by the magnets will be 0.9 T or less. The magnetic permeability of the stator core may, therefore, be properly kept by selecting the thickness of the stator core to be half that of the magnets.

Modifications of the above structure will be described below.

(Modification 1)

Figure 25:
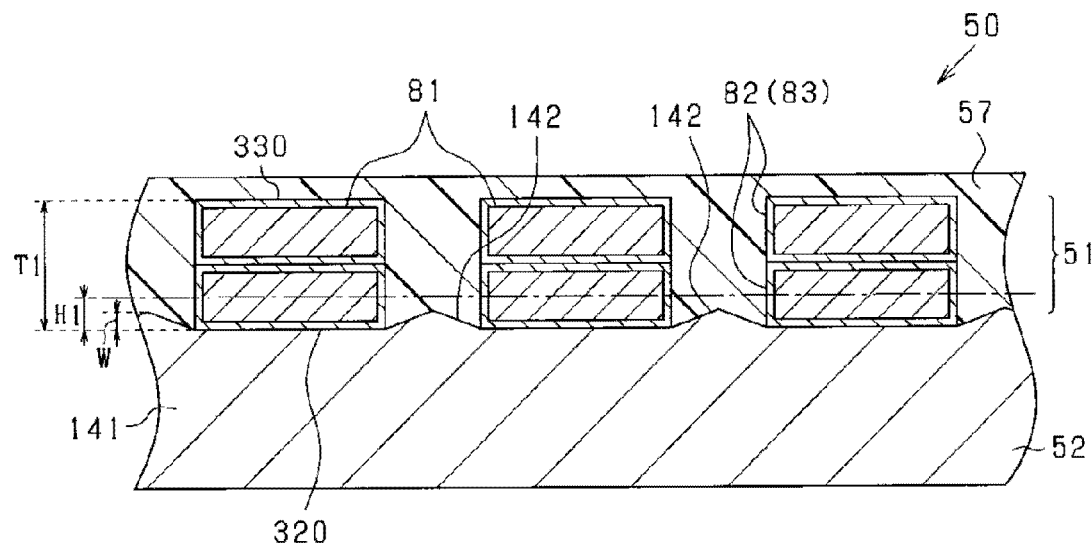
FIG. 25 is a sectional view of a stator in a modification 1.

In the above embodiment, the outer peripheral surface of the stator core 52 has a curved surface without any irregularities. The plurality of conductor groups 81 are arranged at a given interval away from each other on the outer peripheral surface of the stator core 52. This layout may be changed. For instance, the stator core 52 illustrated in FIG. 25 is equipped with the circular ring-shaped yoke 141 and the protrusions 142. The yoke 141 is located on the opposite side (i.e., a lower side, as viewed in the drawing) of the stator winding 51 to the rotor 40 in the radial direction. Each of the protrusions 142 protrudes into a gap between a respective two of the straight sections 83 arranged adjacent each other in the circumferential direction. The protrusions 142 are arranged at a given interval away from each other in the circumferential direction radially outside the yoke 141, i.e., close to the rotor 40. Each of the conductor groups 81 of the stator winding 51 engages the protrusions 142 in the circumferential direction, in other words, the protrusions 142 are used as positioners to position and array the conductor groups 81 in the circumferential direction. The protrusions 142 correspond to conductor-to-conductor members.

A radial thickness of each of the protrusions 142 from the yoke 141, in other words, a distance W, as illustrated in FIG. 25, between the inner surface 320 of the straight sections 82 which is placed in contact with the yoke 141 and the top of the protrusion 412 in the radial direction of the yoke 141 is selected to be smaller than half a radial thickness (as indicated by H1 in the drawing) of the straight sections 83 arranged adjacent the yoke 141 in the radial direction. In other words, non-conductive members (i.e., the sealing members 57) preferably each occupy three-fourths of a dimension (i.e., thickness) T1 (i.e., twice the thickness of the conductors 82, in other words, a minimum distance between the surface 320 of the conductor group 81 placed in contact with the stator core 52 and the surface 330 of the conductor group 81 facing the rotor 40) of the conductor groups (i.e., conductors) 81 in the radial direction of the stator winding 51 (i.e., the stator core 52). Such selection of the thickness of the protrusions 142 causes each of the protrusions 142 not to function as a tooth between the conductor groups 81 (i.e., the straight sections 83) arranged adjacent each other in the circumferential direction, so that there are no magnetic paths which would usually be formed by the teeth. The protrusions 142 need not necessarily to be arranged between a respective circumferentially adjacent two of all the conductor groups 81, but however, a single protrusion 142 may be disposed at least only between two of the conductor groups 81 which are arranged adjacent each other in the circumferential direction. For instance, the protrusions 142 may be disposed away from each other in the circumferential direction at equal intervals each of which corresponds to a given number of the conductor groups 81. Each of the protrusions 142 may be designed to have any shape, such as a rectangular or arc-shape.

The straight sections 83 may alternatively be arranged in a single layer on the outer peripheral surface of the stator core 52. In a broad sense, the thickness of the protrusions 142 from the yoke 141 in the radial direction may be smaller than half that of the straight sections 83 in the radial direction.

If an imaginary circle whose center is located at the axial center of the rotating shaft 11 and which passes through the radial centers of the straight sections 83 placed adjacent the yoke 141 in the radial direction is defined, each of the protrusions 142 may be shaped to protrude only within the imaginary circle, in other words, not to protrude radially outside the imaginary circle toward the rotor 40.

The above structure in which the protrusions 142 have the limited thickness in the radial direction and do not function as teeth in the gaps between the straight sections 83 arranged adjacent each other in the circumferential direction enables the adjacent straight sections 83 to be disposed closer to each other as compared with a case where teeth are provided in the gaps between the straight sections 83. This enables a sectional area of the conductor body 82a to be increased, thereby reducing heat generated upon excitation of the stator winding 51. The absence of the teeth enables magnetic saturation to be eliminated to increase the amount of electrical current delivered to the stator winding 51. It is, however, possible to alleviate the adverse effects arising from an increase in amount of heat generated by the increase in electrical current delivered to the stator winding 51. The stator winding 51, as described above, has the turns 84 which are shifted in the radial direction and equipped with the interference avoiding portions with the adjacent turns 84, thereby enabling the turns 84 to be disposed away from each other in the radial direction. This enhances the heat dissipation from the turns 84. The above structure is enabled to optimize the heat dissipating ability of the stator 50.

The radial thickness of the protrusions 142 may not be restricted by the dimension H1 in FIG. 25 as long as the yoke 141 of the stator core 52 and the magnet unit 42 (i.e., each of the magnets 91 and 92) of the rotor 40 are arranged at a given distance away from each other. Specifically, the radial thickness of the protrusions 142 may be larger than or equal to the dimension H1 in FIG. 25 as long as the yoke 141 and the magnet unit 42 arranged 2 mm or more away from each other. For instance, in a case where the radial thickness of the straight section 83 is larger than 2 mm, and each of the conductor groups 81 is made up of the two conductors 82 stacked in the radial direction, each of the protrusions 142 may be shaped to occupy a region ranging to half the thickness of the straight section 83 not contacting the yoke 141, i.e., the thickness of the conductor 82 located farther away from the yoke 141. In this case, the above beneficial advantages will be obtained by increasing the conductive sectional area of the conductor groups 81 as long as the radial thickness of the protrusions 142 is at least H1×3/2.

Figure 26:
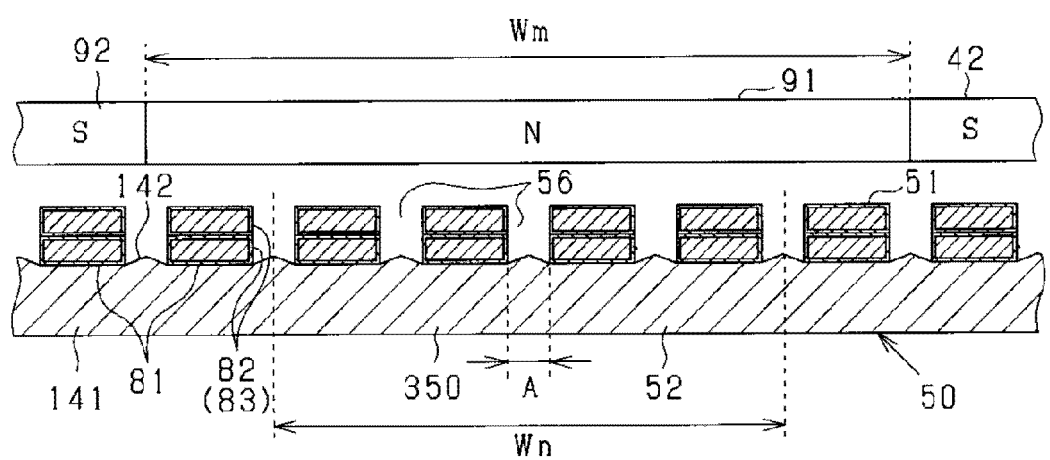
FIG. 26 is a sectional view of a stator in a modification 1.

The stator core 52 may be designed to have the structure illustrated in FIG. 26. FIG. 26 omits the sealing members 57, but the sealing members 57 may be used. FIG. 26 illustrates the magnet unit 42 and the stator core 52 as being arranged linearly for the sake of simplicity.

In the structure of FIG. 26, the stator 50 has the protrusions 142 as conductor-to-conductor members each of which is arranged between a respective two of the conductors 82 (i.e., the straight sections 83) located adjacent each other in the circumferential direction. The stator 50 is equipped with the portions 350 each of which magnetically operates along with one of the magnetic poles (i.e., an N-pole or an S-pole) of the magnet unit 42 when the stator winding 51 is excited. The portions 350 extend in the circumferential direction of the stator 50. If each of the portions 350 has a length Wn in the circumferential direction of the stator 50, the sum of widths of the protrusions 142 lying in a range of this length Wn (i.e., the total dimension of the protrusions 412 in the circumferential direction of the stator 50 in the range of length Wn) is defined as Wt, the saturation magnetic flux density of the protrusions 412 is defined as Bs, a width of the magnet unit 42 equivalent to one of the magnetic poles of the magnet unit 42 in the circumferential direction of the magnet unit 42 is defined as Wm, and the remanent flux density in the magnet unit 42 is defined as Br, the protrusions 142 are made of a magnetic material meeting a relation of:

$$Wt \times Bs \leq Wm \times Br \quad (1).$$

The range Wn is defined to contain ones of the conductor groups 81 which are arranged adjacent each other in the circumferential direction and which overlap in time of excitation thereof with each other. It is advisable that a reference (i.e., a border) used in defining the range Wn be set to the center of the gap 56 between the conductor groups 81. For instance, in the structure illustrated in FIG. 26, the plurality of conductor groups 81 lying in the range Wn include the first, the second, the third, and the fourth conductor groups 81 where the first conductor group 81 is closest to the magnetic center of the N-pole. The range Wn is defined to include the total of those four conductor groups 81. Ends (i.e., outer limits) of the range Wn are defined to lie at the centers of the gaps 56.

In FIG. 26, the range Wn contains half of the protrusion 142 inside each of the ends thereof. The total of the four protrusions 142 lie in the range Wn. If the width of each of the protrusions 142 (i.e., a dimension of the protrusion 142 in the circumferential direction of the stator 50, in other words, an interval between the adjacent conductor groups 81) is defined as A, the sum of widths Wt of the protrusions 142 lying in the range Wn meets a relation of Wt=½A+A+A+A+½A=4A.

Specifically, the three-phase windings of the stator winding 51 in this embodiment are made in the form of distributed windings. In the stator winding 51, the number of the protrusions 142 for each pole of the magnet unit 42, that is, the number of the gaps 56 each between the adjacent conductor groups 81 is selected to be "the number of phases×Q" where Q is the number of the conductors 82 for each phase which are placed in contact with the stator core 52. In other words, in the case where the conductors 82 are stacked in the radial direction of the rotor 40 to constitute each of the conductor groups 81, Q is the number of inner ones of the conductors 82 of the conductor groups 81 for each phase. In this case, when the three-phase windings of the stator winding 51 are excited in a given sequence, the protrusions 142 for two of the three-phases within each pole are magnetically excited. The total circumferential width Wt of the protrusions 142 excited upon excitation of the stator winding 51 within a range of each pole of the magnet unit 42, therefore, meets a relation of "the number of the phases excited×Q×A=2×2×A where A is the width of each of the protrusions 142 (i.e., the gap 56) in the circumferential direction.

The total width Wt is determined in the above way. Additionally, the protrusions 142 of the stator core 52 are made of magnetic material meeting the above equation (1). The total width Wt is also viewed as being equivalent to a circumferential dimension of where the relative magnetic permeability is expected to become greater than one within each pole. The total width Wt may alternatively be determined as a circumferential width of the protrusions 142 in each pole with some margin. Specifically, since the number of the protrusions 142 for each pole of the magnet unit 42 is given by the number of phases×Q, the width of the protrusions 412 in each pole (i.e., the total width Wt) may be given by the number of phases×Q×A=3×2×A=6A.

The distributed winding, as referred to herein, means that there is a pair of poles (i.e., the N-pole and the S-pole) of the stator winding 51 for each pair of magnetic poles. The pair of poles of the stator winding 51, as referred to herein, is made of the two straight sections 83 in which electrical current flows in opposite directions and the turn 84 electrically connecting them together. Note that a short pitch winding or a full pitch winding may be viewed as an equivalent of the distributed winding as long as it meets the above conditions.

Next, the case of a concentrated winding will be described below. The concentrated winding, as referred to herein, means that the width of each pair of magnetic poles is different from that of each pair of poles of the stator winding 51. An example of the concentrated winding includes a structure in which there are three conductor groups 81 for each pair of magnetic poles, in which there are three conductor groups 81 for two pairs of magnetic poles, in which there are nine conductor groups 81 for four pairs of magnetic poles, or in which there are nine conductor groups 81 for five pairs of magnetic poles.

In the case where the stator winding 51 is made in the form of the concentrated winding, when the three-phase windings of the stator winding 51 are excited in a given sequence, a portion of the stator winding 51 for two phases is excited. This causes the protrusions 142 for two phases to be magnetically excited. The circumferential width Wt of the protrusions 142 which is magnetically excited upon excitation of the stator winding in a range of each pole of the magnet unit 42 is given by Wt=A×2. The width Wt is determined in this way. The protrusions 142 are made of magnetic material meeting the above equation (1). In the above described case of the concentrated winding, the sum of widths of the protrusions 142 arranged in the circumferential direction of the stator 50 within a region surrounded by the conductor groups 81 for the same phase is defined as A. The dimension Wm in the concentrated winding is given by [an entire circumference of a surface of the magnet unit 42 facing the air gap]×[the number of phases]÷[the number of the distributed conductor groups 81].

Usually, a neodymium magnet, a samarium-cobalt magnet, or a ferrite magnet whose value of BH is higher than or equal to 20[MGOe (kJ/m^3)] has Bd=1.0 T or more. Iron has Br=2.0 T or more. The protrusions 142 of the stator core 52 may, therefore, be made of magnetic material meeting a relation of Wt<½×Wm for realizing a high-power motor.

In a case where each of the conductors 82 is, as described later, equipped with the outer coated layer 182, the conductors 82 may be arranged in the circumferential direction of the stator core with the outer coated layers 182 placed in contact with each other. In this case, the width Wt may be viewed to be zero or equivalent to thicknesses of the outer coated layers 182 of the conductors 82 contacting with each other.

The structure illustrated in FIG. 25 or 26 is designed to have conductor-to-conductor members (i.e., the protrusions 142) which are too small in size for the magnet-produced magnetic flux in the rotor 40. The rotor 40 is implemented by a surface permanent magnet rotor which has a flat surface and a low inductance, and does not have a salient pole in terms of a magnetic resistance. Such a structure enables the inductance of the stator 50 to be decreased, thereby reducing a risk of distortion of the magnetic flux caused by the switching time gap in the stator winding 51, which minimizes the electrical erosion of the bearings 21 and 22.

(Modification 2)

Figure 27:
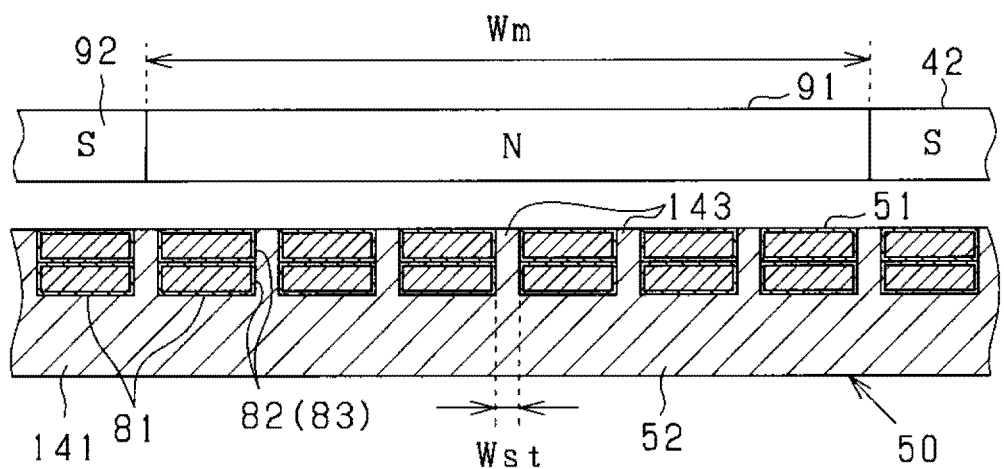
FIG. 27 is a sectional view of a stator in a modification 2.

The stator 50 equipped with the conductor-to-conductor members made to meet the above equation may be designed to have the following structure. In FIG. 27, the stator core 52 is equipped with the teeth 143 as conductor-to-conductor members which are formed in an outer peripheral portion (an upper portion, as viewed in the drawing) of the stator core 52. The teeth 143 protrude from the yoke 141 and are arranged at a given interval away from each other in the circumferential direction of the stator core 52. Each of the teeth 143 has a thickness identical with that of the conductor group 81 in the radial direction. The teeth 143 have side surfaces placed in contact with the conductors 82 of the conductor groups 81. The teeth 143 may alternatively be located away from the conductors 82 through gaps.

The teeth 143 are shaped to have a restricted width in the circumferential direction. Specifically, each of the teeth 143 has a stator tooth which is very thin for the volume of magnets. Such a structure of the teeth 143 serves to achieve saturation by the magnet-produced magnetic flux at 1.8 T or more to reduce the permeance, thereby decreasing the inductance.

If a surface area of a magnetic flux-acting surface of the magnet unit 42 facing the stator 50 for each pole is defined as Sm, and the remanent flux density of the magnet unit 42 is defined as Br, the magnetic flux in the magnet unit 42 will be Sm×Br. A surface area of each of the teeth 143 facing the rotor 40 is defined as St. The number of the conductors 83 for each phase is defined as m. When the teeth 143 for two phases within a range of one pole are magnetically excited upon excitation of the stator winding 51, the magnetic flux in the stator 50 is expressed by St×m×2×Bs. The decrease in inductance may be achieved by selecting the dimensions of the teeth 143 to meet a relation of:

$$St \times m \times 2 \times Bs \leq Sm \times Br \quad (2).$$

In a case where the dimension of the magnet unit 42 is identical with that of the teeth 143 in the axial direction, the above equation (2) may be rewritten as an equation of:

$$Wst \times m \times 2 \times Bs \leq Wm \times Br \quad (3)$$

where Wm is the circumferential width of the magnet unit 42 for each pole, and Wst is the circumferential width of the teeth 143. For example, when Bs=2 T, Br=1 T, and m=2, the equation (3) will be Wst<Wm/8. In this case, the decrease in inductance may be achieved by selecting the width Wst of the teeth 143 to be smaller than one-eighth (⅛) of the width Wm of the magnet unit 42 for one pole. When m is one, the width Wst of the teeth 143 is preferably selected to be smaller than one-fourth (¼) of the width Wm of the magnet unit 42 for one pole.

"Wst×m×2" in the equation (3) corresponds to a circumferential width of the teeth 143 magnetically excited upon excitation of the stator winding 51 in a range of one pole of the magnet unit 42.

The structure in FIG. 27 is, like in FIGS. 25 and 26, equipped with the conductor-to-conductor members (i.e., the teeth 143) which are very small in size for the magnet-produced magnetic flux in the rotor 40. Such a structure is capable of reducing the inductance of the stator 50 to alleviate a risk of distortion of the magnetic flux arising from the switching time gap in the stator winding 51, which minimizes the probability of the electrical erosion of the bearings 21 and 22. Note that the definitions of parameters, such as Wt, Wn, A, and Bs, associated with the stator 50 or parameters, such as Wm and Br, associated with the magnet unit 42 may refer to those in the above described modification 1.

(Modification 3)

Figure 28:
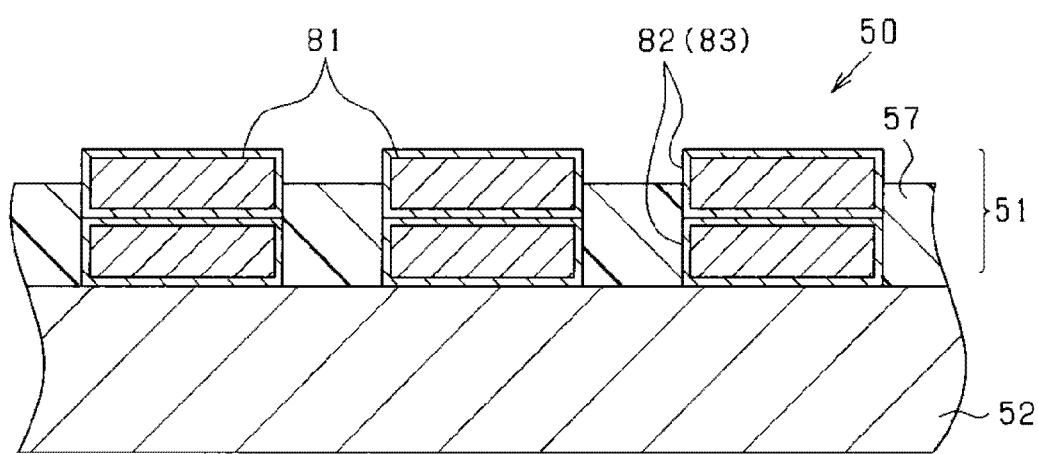
FIG. 28 is a sectional view of a stator in a modification 3.

The above embodiment has the sealing members 57 which cover the stator winding 51 and occupy a region including all of the conductor groups 81 radially outside the stator core 52, in other words, lie in a region where the thickness of the sealing members 57 is larger than that of the conductor groups 81 in the radial direction. This layout of the sealing members 57 may be changed. For instance, the sealing members 57 may be, as illustrated in FIG. 28, designed so that the conductors 82 protrude partially outside the sealing members 57. Specifically, the sealing members 57 are arranged so that portions of the conductors 82 that are radially outermost portions of the conductor groups 81 are exposed outside the sealing members 57 toward the stator 50. In this case, the thickness of the sealing members 57 in the radial direction may be identical with or smaller than that of the conductor groups 81.

(Modification 4)

Figure 29:
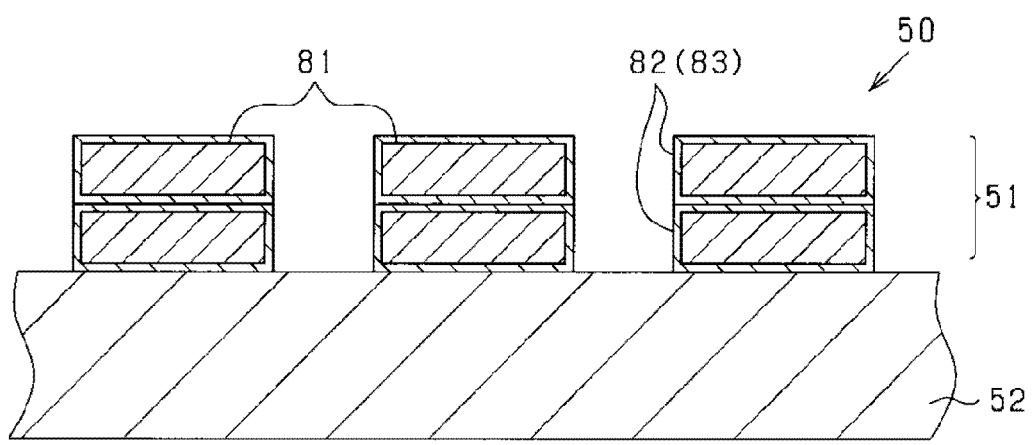
FIG. 29 is a sectional view of a stator in a modification 4.

The stator 50 may be, as illustrated in FIG. 29, designed not to have the sealing members 57 covering the conductor groups 81, i.e., the stator winding 51. In this case, a gap is created between the adjacent conductor groups 81 arranged in the circumferential direction without a conductor-to-conductor member therebetween. In other words, no conductor-to-conductor member is disposed between the conductor groups 81 arranged in the circumferential direction. Air may be arranged in the gaps between the conductor groups 81. The air may be viewed as a non-magnetic member or an equivalent thereof whose Bs is zero (0).

(Modification 5)

The conductor-to-conductor members of the stator 50 may be made of a non-magnetic material other than resin. For instance, a non-metallic material, such as SUS304 that is austenitic stainless steel.

(Modification 6)

The stator 50 may be designed not to have the stator core 52. Specifically, the stator 50 is made of the stator winding 51 shown in FIG. 12. The stator winding 51 of the stator 50 may be covered with a sealing member. The stator 50 may alternatively be designed to have an annular winding retainer made from non-magnetic material such as synthetic resin instead of the stator core 52 made from soft magnetic material.

(Modification 7)

Figure 30:
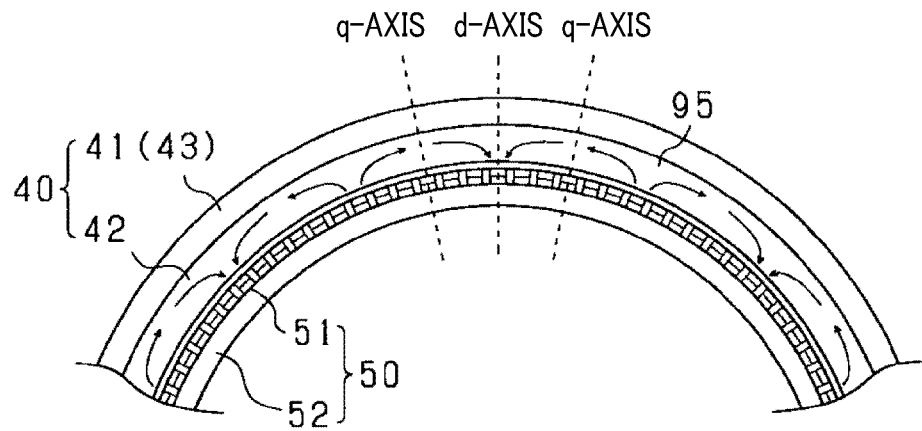
FIG. 30 is a sectional view of a stator in a modification 7.

The structure in the first embodiment uses the magnets 91 and 92 arranged in the circumferential direction to constitute the magnet unit 42 of the rotor 40. The magnet unit 42 may be made using an annular permanent magnet. For instance, the annular magnet 95 is, as illustrated in FIG. 30, secured to a radially inner periphery of the cylinder 43 of the magnet holder 41. The annular magnet 95 is equipped with a plurality of different magnetic poles whose polarities are arranged alternately in the circumferential direction of the annular magnet 95. The magnet 95 lies integrally both on the d-axis and the q-axis. The annular magnet 95 has a magnetic orientation directed in the radial direction on the d-axis of each magnetic pole and a magnetic orientation directed in the circumferential direction on the q-axis between the magnetic poles, thereby creating arc-shaped magnetic paths.

The annular magnet 95 may be designed to have an easy axis of magnetization directed parallel or near parallel to the d-axis near the d-axis and also to have an easy axis of magnetization directed perpendicular or near perpendicular to the q-axis near the q-axis, thereby creating the arc-shaped magnetic paths.

(Modification 8)

This modification is different in operation of the controller 110 from the above embodiment or modifications. Only differences from those in the first embodiment will be described below.

Figure 31:
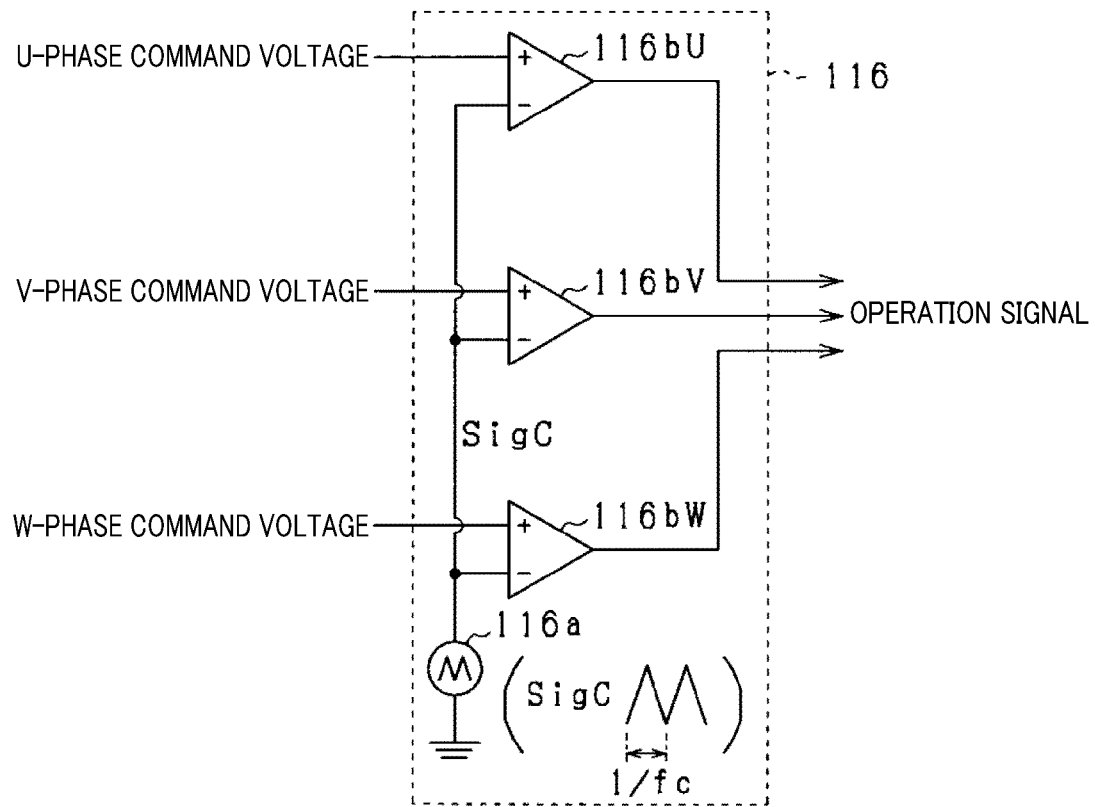
FIG. 31 is a functional block diagram which illustrates a portion of operations of an operation signal generator in a modification 8.

The operations of the operation signal generators 116 and 126 illustrated in FIG. 20 and the operation signal generators 130a and 130b illustrated in FIG. 21 will first be discussed below using FIG. 31. The operations executed by the operation signal generators 116, 126, 130a, and 130b are basically identical with each other. Only the operation of the operation signal generator 116 will, therefore, be described below for the sake of simplicity.

The operation signal generator 116 includes the carrier generator 116a, the U-phase comparator 116bU, the V-phase comparator 116bV, and the W-phase comparator 116bW. The carrier generator 116a produces and outputs the carrier signal SigC in the form of a triangle wave signal.

The U-, V-, and W-phase comparators 116bU, 116bV, and 116bW receive the carrier signal SigC outputted by the carrier generator 116a and the U-, V-, and W-phase command voltages produced by the three-phase converter 115. The U-, V-, and W-phase command voltages are produced, for example, in the form of a sine wave and outputted 120° out of electrical phase with each other.

The U-, V-, and W-phase comparators 116bU, 116bV, and 116bW compare the U-, V-, and W-phase command voltages with the carrier signal SigC to produce operation signals for the switches Sp and Sn of the upper and lower arms in the first inverter 101 for the U-, V-, and W-phase windings under PWM (Pulse Width Modulation) control. Specifically, the operation signal generator 116 works to produce operation signals for the switches Sp and Sn of the upper and lower arms for the U-, V-, and W-phase windings under the PWM control based on comparison of levels of signals derived by normalizing the U-, V-, and W-phase command voltages using the power supply voltage with a level of the carrier signal SigC. The driver 117 is responsive to the operation signals outputted by the operation signal generator 116 to turn on or off the switches Sp and Sn in the first inverter 101 for the U-, V-, and W-phase windings.

The controller 110 alters the carrier frequency fc of the carrier signal SigC, i.e., a switching frequency for each of the switches Sp and Sn. The carrier frequency fc is altered to be higher in a low torque range or a high-speed range in the rotating electrical machine 10 and alternatively lower in a high torque range in the rotating electrical machine 10. This altering is achieved in order to minimize a deterioration in ease of control of electrical current flowing through each of the U-, V-, and W-phase windings.

In brief, the core-less structure of the stator 50 serves to reduce the inductance in the stator 50. The reduction in inductance usually results in a decrease in electrical time constant in the rotating electrical machine 10. This leads to a risk that a ripple of current flowing through each of the phase windings may be increased, thereby resulting in the deterioration in ease of control of the current flowing through the phase winding, which causes control divergence. The adverse effects of the above deterioration on the ease of control usually become higher when the current (e.g., an effective value of the current) flowing through the winding lies in a low current region than when the current lies in a high current range. In order to alleviate such a problem, the controller 110 in this embodiment is designed to alter the carrier frequency fc.

How to alter the carrier frequency fc will be described below with reference to FIG. 32. This operation of the operation signal generator 116 is executed by the controller 110 cyclically at a given interval.

First, in step S10, it is determined whether electrical current flowing through each of the three-phase windings 51a lies in the low current range. This determination is made to determine whether torque now produced by the rotating electrical machine 10 lies in the low torque range. Such a determination may be achieved according to the first method or the second method, as discussed below.

(First Method)

The estimated torque value of the rotating electrical machine 10 is calculated using the d-axis current and the q-axis current converted by the d-q converter 112. If the estimated torque value is determined to be lower than a torque threshold value, it is concluded that the current flowing through the winding 51a lies in the low current range. Alternatively, if the estimated torque value is determined to be higher than or equal to the torque threshold value, it is concluded that the current lies in the high current range. The torque threshold value is selected to be half, for example, the degree of starting torque (also called locked rotor torque) in the rotating electrical machine 10.

(Second Method)

If an angle of rotation of the rotor 40 measured by an angle sensor is determined to be higher than or equal to a speed threshold value, it is determined that the current flowing through the winding 51a lies in the low current range, that is, in the high speed range. The speed threshold value may be selected to be a rotational speed of the rotating electrical machine 10 when a maximum torque produced by the rotating electrical machine 10 is equal to the torque threshold value.

If a NO answer is obtained in step S10, meaning that the current lies in the high current range, then the routine proceeds to step S11 wherein the carrier frequency fc is set to the first frequency fL.

Alternatively, if a YES answer is obtained in step S10, then the routine proceeds to step S12 wherein the carrier frequency fc is set to the second frequency fH that is higher than the first frequency fL.

As apparent from the above discussion, the carrier frequency fc when the current flowing through each of the three-phase windings lies in the low current range is selected to be higher than that when the current lies in the high current range. The switching frequency for the switches Sp and Sn is, therefore, increased in the low current range, thereby minimizing a rise in current ripple to ensure the stability in controlling the current.

When the current flowing through each of the three-phase windings lies in the high current range, the carrier frequency fc is selected to be lower than that when the current lies in the low current range. The current flowing through the winding in the high current range usually has an amplitude larger than that when the current lies in the low current range, so that the rise in current ripple arising from the reduction in inductance has a low impact on the ease of control of the current. It is, therefore, possible to set the carrier frequency fc in the high current range to be lower than that in the low current range, thereby reducing a switching loss in the inverters 101 and 102.

This modification is capable of realizing the following modes.

Figure 32:
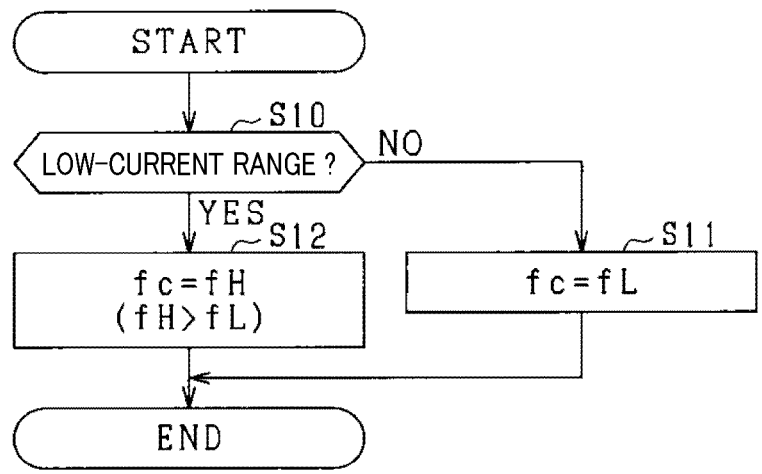
FIG. 32 is a flowchart representing a sequence of steps to execute a carrier frequency altering operation.

If a YES answer is obtained in step S10 in FIG. 32 when the carrier frequency fc is set to the first frequency fL, the carrier frequency fc may be changed gradually from the first frequency fL to the second frequency fH.

Alternatively, if a NO answer is obtained in step S10 when the carrier frequency fc is set to the second frequency fH, the carrier frequency fc may be changed gradually from the second frequency fH to the first frequency fL.

The operation signals for the switches may alternatively be produced using SVM (Space Vector Modulation) instead of PWM. The above alteration of the switching frequency may also be performed.

(Modification 9)

Figure 33A:
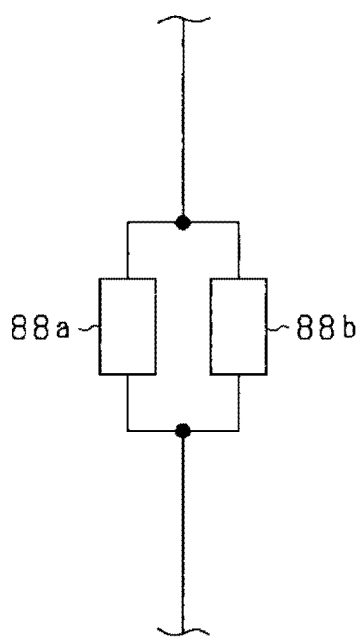
FIGS. 33A, 33B and 33C are views which illustrate connections of conductors constituting a conductor group in a modification 9.
Figure 33B:
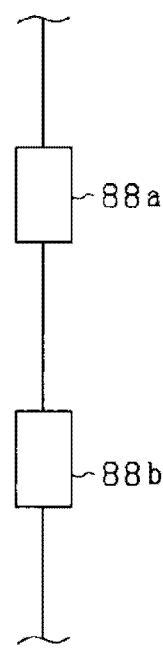

In each of the embodiments, two pairs of conductors making up the conductor groups 81 for each phase are, as illustrated in FIG. 33(a), arranged parallel to each other. FIG. 33(a) is a view which illustrates an electrical connection of the first and second conductors 88a and 88b that are the two pairs of conductors. The first and second conductors 88a and 88b may alternatively be, as illustrated in FIG. 33(b), connected in series with each other instead of the connection in FIG. 33(a).

Figure 34:
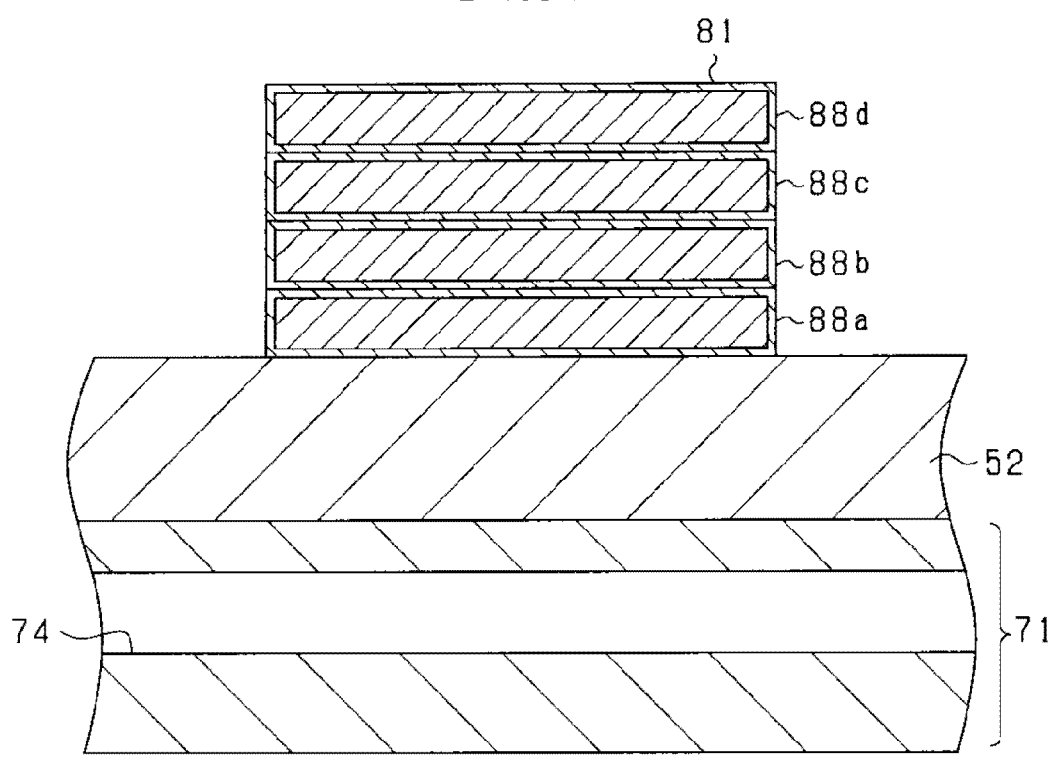
FIG. 34 is a view which illustrates a stack of four pairs of conductors in a modification 4.

Three or more pairs of conductors may be stacked in the form of multiple layers. FIG. 34 illustrates four pairs of conductors: the first to fourth conductors 88a to 88d which are stacked. The first conductor 88a, the second conductor 88b, the third conductor 88c, and the fourth conductor 88d are arranged in this order from the stator core 52 in the radial direction.

Figure 33C:
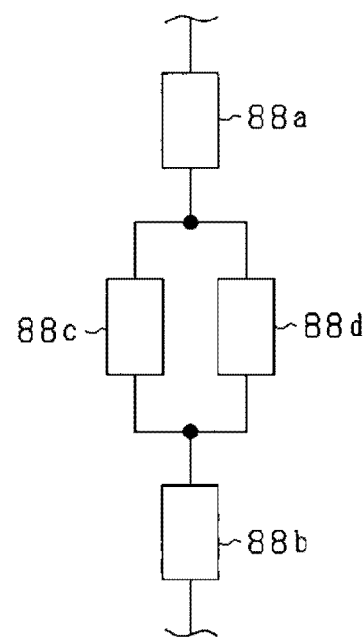

The third and fourth conductors 88c and 88d are, as illustrated in FIG. 33(c), connected in parallel to each other. The first conductor 88a is connected to one of joints of the third and fourth conductors 88c and 88d. The second conductor 88b is connected to the other joint of the third and fourth conductors 88c and 88d. The parallel connection of conductors usually results in a decrease in current density of those conductors, thereby minimizing thermal energy produced upon energization of the conductors. Accordingly, in the structure in which a cylindrical stator winding is installed in a housing (i.e., the unit base 61) with the coolant path 74 formed therein, the first and second conductors 88a and 88b which are connected in non-parallel to each other are arranged close to the stator core 52 placed in contact with the unit base 61, while the third and fourth conductors 88c and 88d which are connected in parallel to each other are disposed farther away from the stator core 52. This layout equalizes the cooling ability of the conductors 88a to 88d stacked in the form of multiple layers.

The conductor group 81 including the first to fourth conductors 88a to 88d may have a thickness in the radial direction which is smaller than a circumferential width of the conductor groups 81 for one phase within a region of one pole.

(Modification 10)

Figure 35:
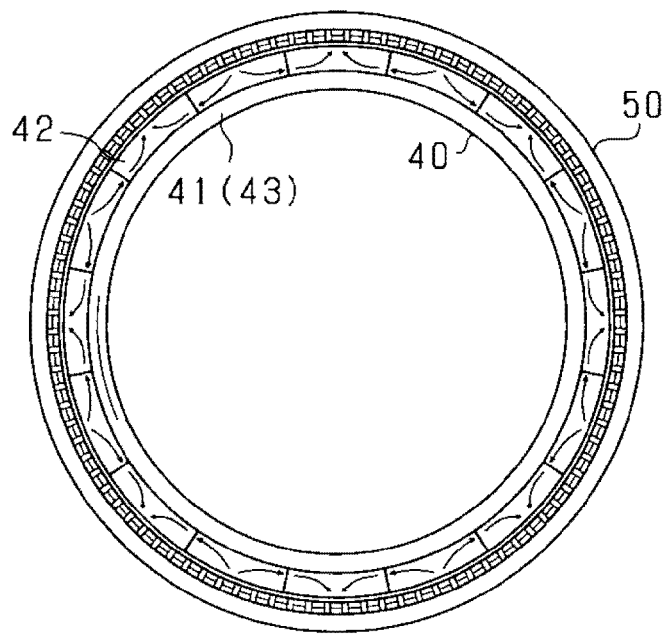
FIG. 35 is a transverse sectional view of an inner rotor type rotor and a stator in a modification 10.
Figure 36:
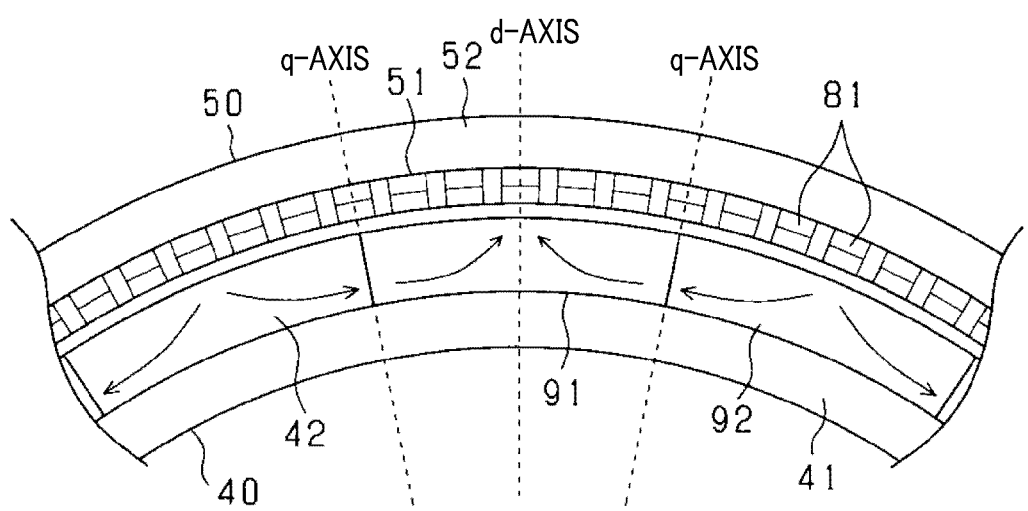
FIG. 36 is a partial enlarged view of FIG. 35.

The rotating electrical machine 10 may alternatively be designed to have an inner rotor structure (i.e., an inward rotating structure). In this case, the stator 50 may be mounted, for example, on a radial outside within the housing 30, while the rotor 40 may be disposed on a radial inside within the housing 30. The inverter unit 60 may be mounted one or both axial sides of the stator 50 or the rotor 40. FIG. 35 is a transverse sectional view of the rotor 40 and the stator 50. FIG. 36 is an enlarged view which partially illustrates the rotor 40 and the stator 50 in FIG. 35.

The inner rotor structure in FIGS. 35 and 36 is substantially identical with the outer rotor structure in FIGS. 8 and 9 except for the layout of the rotor 40 and the stator 50 in the radial direction. In brief, the stator 50 is equipped with the stator winding 51 having the flattened conductor structure and the stator core 52 with no teeth. The stator winding 51 is installed radially inside the stator core 52. The stator core 52, like the outer rotor structure, has any of the following structures.

(A) The stator 50 has the conductor-to-conductor members each of which is disposed between the conductor portions in the circumferential direction. As the conductor-to-conductor members, magnetic material is used which meets a relation of Wt×Bs≤Wm×Br where Wt is a width of the conductor-to-conductor members in the circumferential direction within one magnetic pole, Bs is the saturation magnetic flux density of the conductor-to-conductor members, Wm is a width of the magnet unit equivalent to one magnetic pole in the circumferential direction, and Br is the remanent flux density in the magnetic unit.

(B) The stator 50 has the conductor-to-conductor members each of which is disposed between the conductor portions in the circumferential direction. The conductor-to-conductor members are each made of a non-magnetic material.

(C) The stator 50 has no conductor-to-conductor member disposed between the conductor portions in the circumferential direction.

The same is true of the magnets 91 and 92 of the magnet unit 42. Specifically, the magnet unit 42 is made up of the magnets 91 and 92 each of which is magnetically oriented to have the easy axis of magnetization which is directed near the d-axis to be more parallel to the d-axis than that near the q-axis which is defined on the boundary of the magnetic poles. The details of the magnetization direction in each of the magnets 91 and 92 are the same as described above. The magnet unit 42 may be the annular magnet 95 (see FIG. 30).

Figure 37:
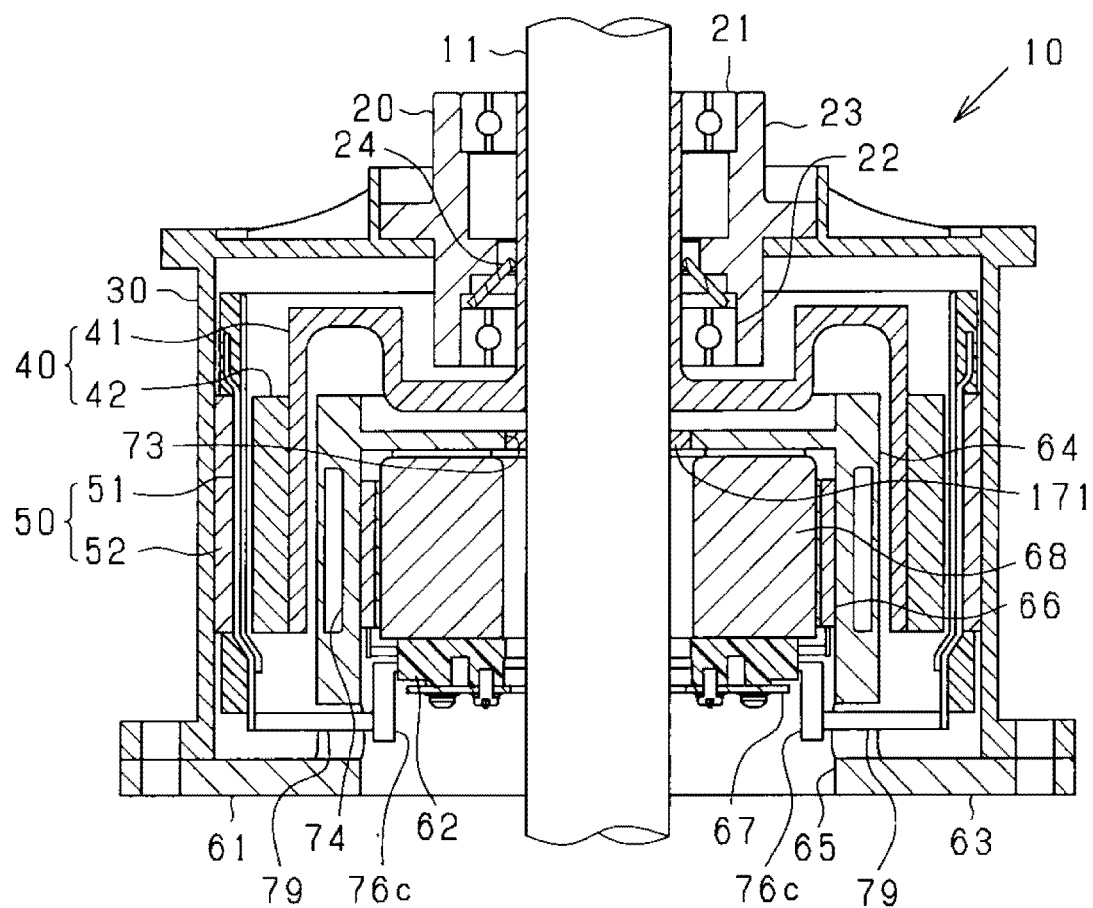
FIG. 37 is a longitudinal sectional view of an inner rotor type rotating electrical machine.

FIG. 37 is a longitudinal sectional view of the rotating electrical machine 10 designed to have the inner rotor structure. FIG. 37 corresponds to FIG. 2. Differences from the structure in FIG. 2 will be described below in brief. In FIG. 37, the annular stator 50 is retained inside the housing 30. The rotor 40 is disposed inside the stator 50 with an air gap therebetween to be rotatable. The bearings 21 and 22 are, like in FIG. 2, offset from the axial center of the rotor 40 in the axial direction of the rotor 40, so that the rotor 40 is retained in the cantilever form. The inverter 60 is mounted inside the magnet holder 41 of the rotor 40.

Figure 38:
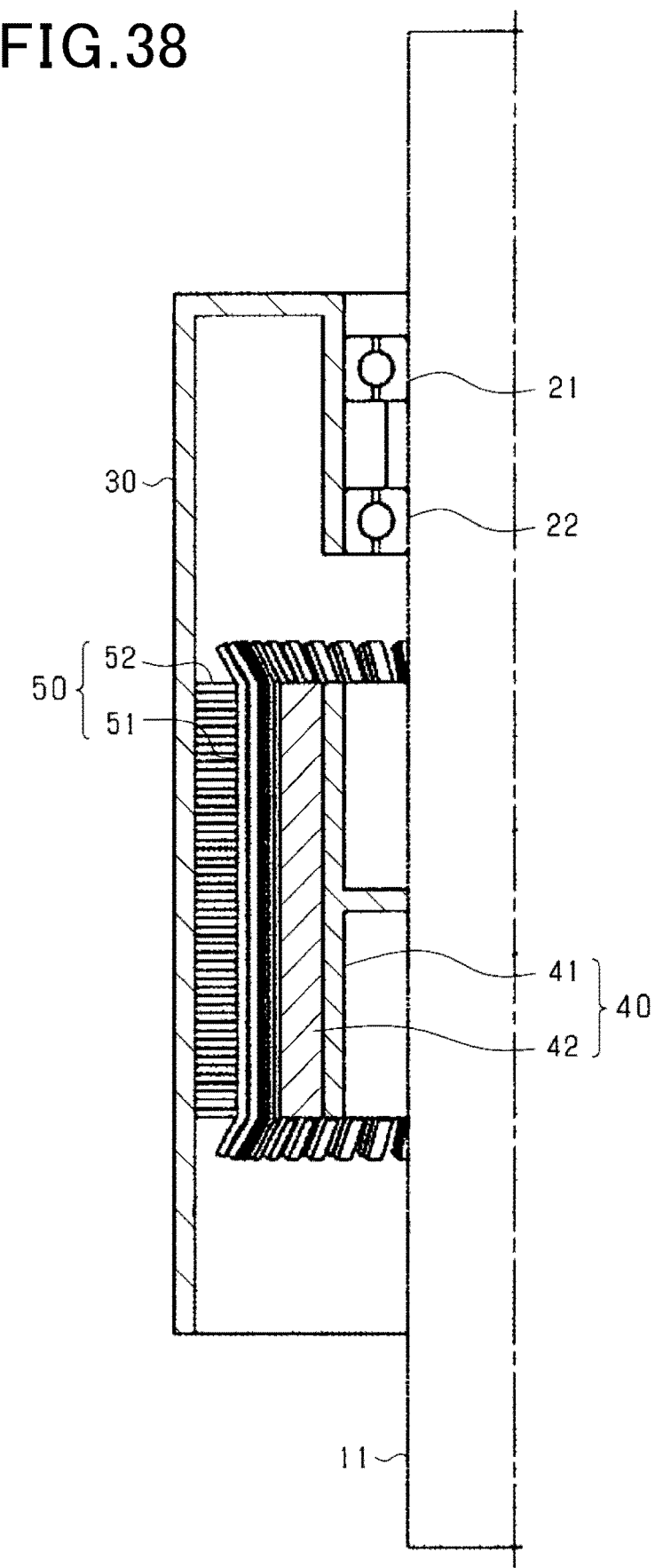
FIG. 38 is a longitudinal sectional view which schematically illustrates a structure of an inner rotor type rotating electrical machine.

FIG. 38 illustrates the inner rotor structure of the rotating electrical machine 10 which is different from that described above. The housing 30 has the rotating shaft 11 retained by the bearings 21 and 22 to be rotatable. The rotor 40 is secured to the rotating shaft 11. Like the structure in FIG. 2, each of the bearings 21 and 22 is offset from the axial center of the rotor 40 in the axial direction of the rotor 40. The rotor 40 is equipped with the magnet holder 41 and the magnet unit 42.

The rotating electrical machine 10 in FIG. 38 is different from that in FIG. 37 in that the inverter unit 60 is not located radially inside the rotor 40. The magnet holder 41 is joined to the rotating shaft 11 radially inside the magnet unit 42. The stator 50 is equipped with the stator winding 51 and the stator core 52 and secured to the housing 30. Note that the definitions of parameters, such as Wt, Wn, Wm, and Bs, associated with the stator 50 or parameters, such as θ11, θ12, X1, X2, Wm, and Br, associated with the magnet unit 42 may refer to those in the above described first embodiment or the modification 1.

(Modification 11)

Figure 39:
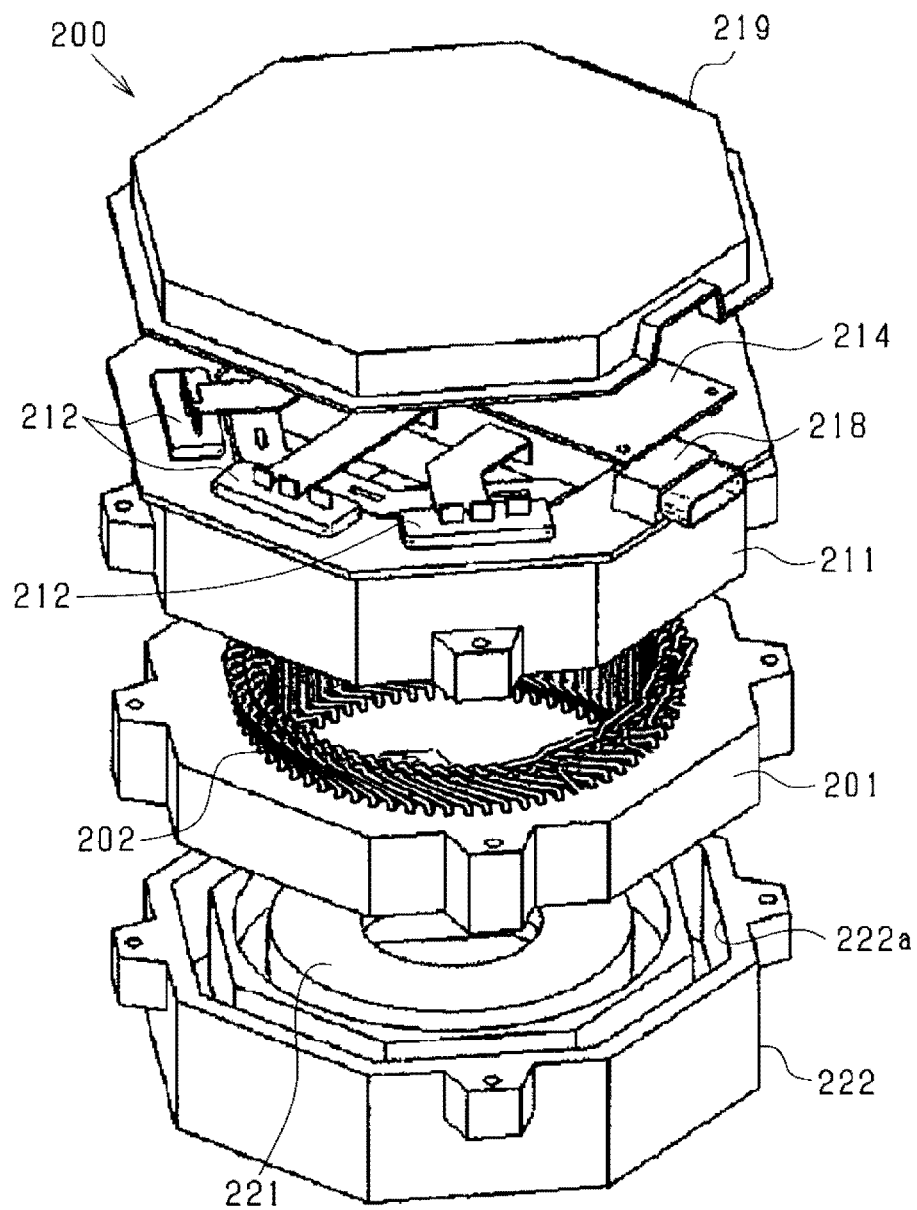
FIG. 39 is a view which illustrates a structure of an inner rotor type rotating electrical machine in a modification 11.
Figure 40:
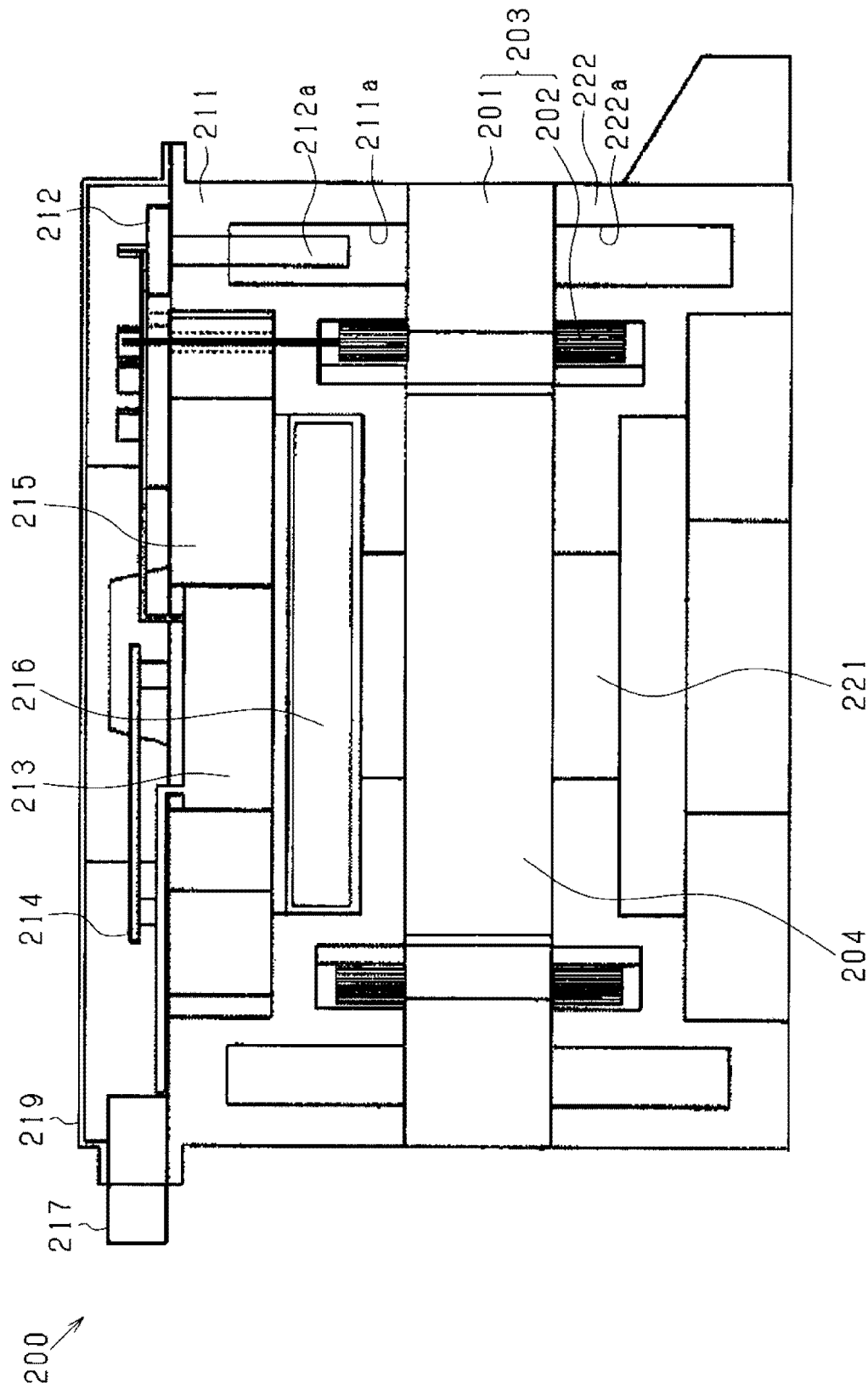
FIG. 40 is a view which illustrates a structure of an inner rotor type rotating electrical machine in a modification 11.

The inner rotor structure of a rotating electrical machine which is different from that described above will be discussed below. FIG. 39 is an exploded view of the rotating electrical machine 200. FIG. 40 is a sectional side view of the rotating electrical machine 200. In the following discussion, a vertical direction is based on the orientation of the rotating electrical machine 200.

The rotating electrical machine 200, as illustrated in FIGS. 39 and 40, includes the stator 203 and the rotor 204. The stator 203 is equipped with the annular stator core 201 and the multi-phase stator winding 202. The rotor 204 is disposed inside the stator core 201 to be rotatable. The stator 203 works as an armature. The rotor 204 works as a field magnet. The stator core 201 is made of a stack of silicon steel plates. The stator winding 202 is installed in the stator core 201. Although not illustrated, the rotor 204 is equipped with a rotor core and a plurality of permanent magnet arranged in the form of a magnet unit. The rotor core has formed therein a plurality of holes which are arranged at equal intervals away from each other in the circumferential direction of the rotor core. The permanent magnets which are magnetized to have magnetization directions changed alternately in adjacent magnetic poles are disposed in the holes of the rotor core. The permanent magnets of the magnet unit may be designed, like in FIG. 23, to have a Halbach array structure or a similar structure. The permanent magnets of the magnet unit may alternatively be made of anisotropic magnets, as described with reference to FIG. 9 or 30, in which the magnetic orientation (i.e., the magnetization direction) extends in an arc-shape between the d-axis which is defined on the magnetic center and the q-axis which is defined on the boundary of the magnetic poles.

The stator 203 may be made to have one of the following structures.

(A) The stator 203 has the conductor-to-conductor members each of which is disposed between the conductor portions in the circumferential direction. As the conductor-to-conductor members, magnetic material is used which meets a relation of Wt×Bs≤Wm×Br where Wt is a width of the conductor-to-conductor members in the circumferential direction within one magnetic pole, Bs is the saturation magnetic flux density of the conductor-to-conductor members, Wm is a width of the magnet unit equivalent to one magnetic pole in the circumferential direction, and Br is the remanent flux density in the magnet unit.

(B) The stator 203 has the conductor-to-conductor members each of which is disposed between the conductor portions in the circumferential direction. The conductor-to-conductor members are each made of a non-magnetic material.

(C) The stator 203 has no conductor-to-conductor member disposed between the conductor portions in the circumferential direction.

The rotor 204 has the magnet unit which is made up of a plurality of magnets each of which is magnetically oriented to have the easy axis of magnetization which is directed near the d-axis to be more parallel to the d-axis than that near the q-axis which is defined on the boundary of the magnetic poles.

The annular inverter case 211 is disposed on one end side of an axis of the rotating electrical machine 200. The inverter case 211 has a lower surface placed in contact with an upper surface of the stator core 201. The inverter case 211 has disposed therein a plurality of power modules 212 constituting an inverter circuit, the smoothing capacitors 213 working to reduce a variation in voltage or current (i.e., a ripple) resulting from switching operations of semiconductor switches, the control board 214 equipped with a controller, the current sensor 215 working to measure a phase current, and the resolver stator 216 serving as a rotational speed sensor for the rotor 204. The power modules 212 are equipped with IGBTs serving as semiconductor switches and diodes.

The inverter case 211 has the power connector 217 which is disposed on a circumferential edge thereof for connection with a dc circuit for a battery mounted in a vehicle. The inverter case 211 also has the signal connector 218 which is disposed on the circumferential edge thereof for achieving transmission of signals between the rotating electrical machine 200 and a controller installed in the vehicle. The inverter case 211 is covered with the top cover 219. The dc power produced by the battery installed in the vehicle is inputted into the power connector 217, converted by the switches of the power modules 212 to an alternating current, and then delivered to phase windings of the stator winding 202.

The bearing unit 221 and the annular rear case 222 are disposed on the opposite end side of the axis of the stator core to the inverter case 211. The bearing unit 221 retains a rotation axis of the rotor 204 to be rotatable. The rear case 222 has the bearing unit 221 disposed therein. The bearing unit 221 is equipped with, for example, two bearings and offset from the center of the length of the rotor 204 toward one of the ends of the length of the rotor 204. The bearing unit 221 may alternatively be engineered to have a plurality of bearings disposed on both end sides of the stator core 201 opposed to each other in the axial direction, so that the bearings retain both the ends of the rotation shaft. The rear case 222 is fastened to a gear case or a transmission of the vehicle using bolts, thereby securing the rotating electrical machine 200 to the vehicle.

The inverter case 211 has formed therein the cooling flow path 211a through which cooling medium flows. The cooling flow path 211a is defined by closing an annular recess formed in a lower surface of the inverter case 211 by an upper surface of the stator core 201. The cooling flow path 211a surrounds a coil end of the stator winding 202. The cooling flow path 211a has the module cases 212a of the power modules 212 disposed therein. Similarly, the rear case 222 has formed therein the cooling flow path 222a which surrounds a coil end of the stator winding 202. The cooling flow path 222a is defined by closing an annular recess formed in an upper surface of the rear case 222 by a lower surface of the stator core 201. Note that the definitions of parameters, such as Wt, Wn, Wm, and Bs, associated with the stator 50 or parameters, such as θ11, θ12, X1, X2, Wm, and Br, associated with the magnet unit 42 may refer to those in the above described first embodiment or the modification 1.

(Modification 12)

Figure 41:
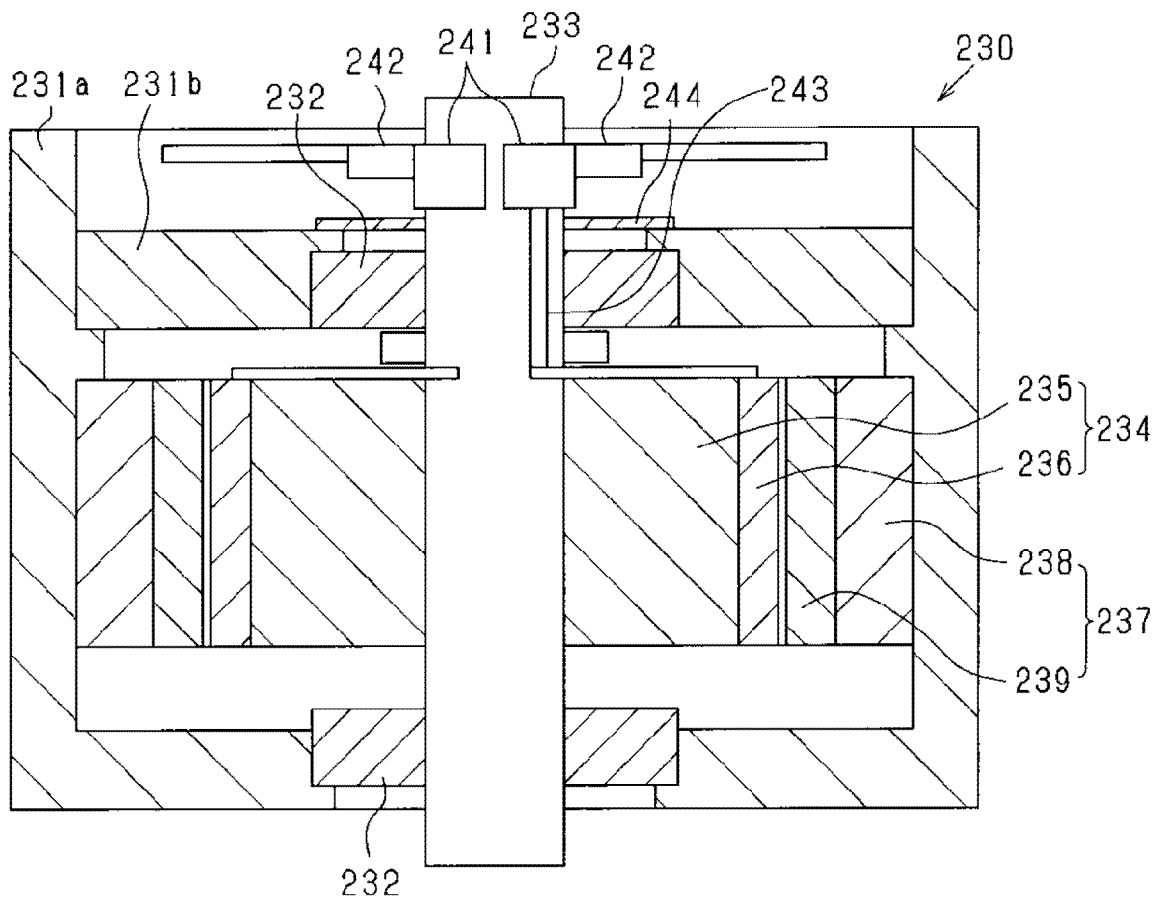
FIG. 41 is a view which illustrates a structure of a revolving armature type of rotating electrical machine in a modification 12.

The above discussion has referred to the revolving-field type of rotating electrical machines, but a revolving armature type of rotating electrical machine may be embodied. FIG. 41 illustrates the revolving armature type of rotating electrical machine 230.

The rotating electrical machine 230 in FIG. 41 has the bearing 232 retained by the housings 231*a* and 231*b*. The bearing 232 retains the rotating shaft 233 to be rotatable. The bearing 232 is made of, for example, an oil-impregnated bearing in which a porous metal is impregnated with oil. The rotating shaft 233 has secured thereto the rotor 234 which works as an armature. The rotor 234 includes the rotor core 235 and the multi-phase rotor winding 236 secured to an outer periphery of the rotor core 235. The rotor core 235 of the rotor 234 is designed to have the slot-less structure. The multi-phase rotor winding 236 has the flattened conductor structure as described above. In other words, the multi-phase rotor winding 236 is shaped to have an area for each phase which has a dimension in the circumferential direction which is larger than that in the radial direction.

The stator 237 is disposed radially outside the rotor 234. The stator 237 works as a field magnet. The stator 237 includes the stator core 238 and the magnet unit 239. The stator core 238 is secured to the housing 231*a*. The magnet unit 239 is attached to an inner periphery of the stator core 238. The magnet unit 239 is made up of a plurality of magnets arranged to have magnetic poles alternately arrayed in the circumferential direction. Like the magnet unit 42 described above, the magnet unit 239 is magnetically oriented to have the easy axis of magnetization which is directed near the d-axis to be more parallel to the d-axis than that near the q-axis that is defined on a boundary between the magnetic poles. The magnet unit 239 is equipped with magnetically oriented sintered neodymium magnets whose intrinsic coercive force is 400 [kA/m] or more and whose remanent flux density is 1.0 [T] or more.

The rotating electrical machine 230 in this embodiment is engineered as a two-pole three-coil brush coreless motor. The multi-phase rotor winding 236 is made of three coils. The magnet unit 239 is designed to have two poles. A ratio of the number of poles and the number of coils in typical brush motors is 2:3, 4:10, or 4:21 depending upon intended use.

The rotating shaft 233 has the commutator 241 secured thereto. A plurality of brushes 242 are arranged radially outside the commutator 241. The commutator 241 is electrically connected to the multi-phase rotor winding 236 through the conductors 234 embedded in the rotating shaft 233. The commutator 241, the brushes 242, and the conductors 243 are used to deliver dc current to the multi-phase rotor winding 236. The commutator 241 is made up of a plurality of sections arrayed in a circumferential direction thereof depending upon the number of phases of the multi-phase rotor winding 236. The brushes 242 may be connected to a dc power supply, such as a storage battery, using electrical wires or using a terminal block.

The rotating shaft 233 has the resinous washer 244 disposed between the bearing 232 and the commutator 241. The resinous washer 244 serves as a sealing member to minimize leakage of oil seeping out of the bearing 232, implemented by an oil-impregnated bearing, to the commutator 241.

(Modification 13)

Each of the conductors 82 of the stator winding 51 of the rotating electrical machine 10 may be designed to have a stack of a plurality of insulating coatings or layers laid on each other. For instance, each of the conductors 82 may be made by covering a bundle of a plurality of insulating layer-coated conductors (i.e., wires) with an insulating layer, so that the insulating layer (i.e., an inner insulating layer) of each of the conductors 82 is covered with the insulating layer (i.e., an outer insulating layer) of the bundle. The outer insulating layer is preferably designed to have an insulating ability greater than that of the inner insulating layer. Specifically, the thickness of the outer insulating layer is selected to be larger than that of the inner insulating layer. For instance, the outer insulating layer has a thickness of 100 μm, while the inner insulating layer has a thickness of 40 μm. Alternatively, the outer insulating layer may have a permittivity lower than that of the inner insulating layer. Each of the conductors 82 may have any of the above structure. Each wire is preferably made of a collection of conductive members or fibers.

As apparent from the above discussion, the rotating electrical machine 10 becomes useful in a high-voltage system of a vehicle by increasing the insulation ability of the outermost layer of the conductor 82. The above structure enables the rotating electrical machine 10 to be driven in low pressure conditions such as highlands.

(Modification 14)

Each of the conductors 82 equipped with a stack of a plurality of insulating layers may be designed to have at least one of a linear expansion coefficient and the degree of adhesion strength different between an outer one and an inner one of the insulating layers. The conductors 82 in this modification are illustrated in FIG. 42.

Figure 42:
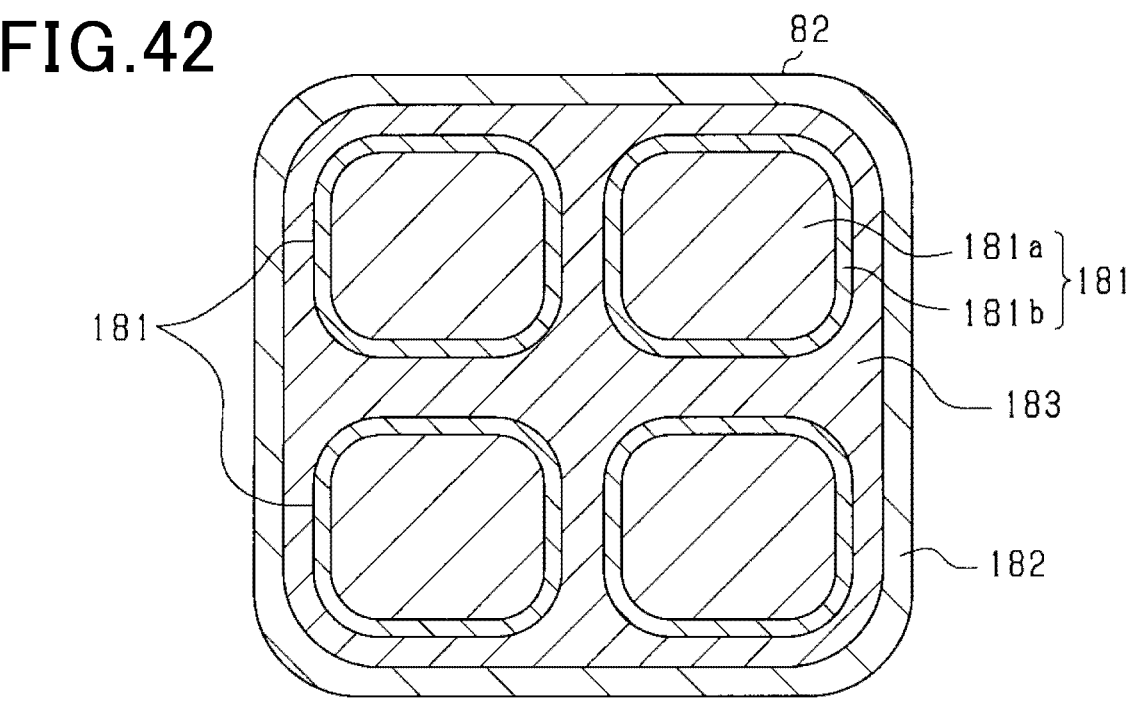
FIG. 42 is a sectional view which illustrates a structure of a conductor in a modification 14.

In FIG. 42, the conductor 82 includes a plurality of (four in the drawing) wires 181, the outer coated layer 182 (i.e, an outer insulating layer) with which the wires 181 are covered and which is made of, for example, resin, and the intermediate layer 183 (i.e., an intermediate insulating layer) which is disposed around each of the wires 181 within the outer coated layer 182. Each of the wires 181 includes the conductive portion 181*a* made of copper material and the conductor-coating layer (i.e., an inner insulating layer) made of electrical insulating material. The outer coated layer 182 serves to electrically insulate between phase-windings of the stator winding. Each of the wires 181 is preferably made of a collection of conductive members or fibers.

The intermediate layer 183 has a linear expansion coefficient higher than that of the coated layer 181*b*, but lower than that of the outer coated layer 182. In other words, the linear expansion coefficient of the conductor 82 is increased from an inner side to an outer side thereof. Typically, the outer coated layer 182 is designed to have a linear expansion coefficient higher than that of the coated layer 181*b*. The intermediate layer 183, as described above, has a linear expansion coefficient intermediate between those of the coated layer 181*b* and the outer coated layer 182 and thus serves as a cushion to eliminate a risk that the inner and outer layers may be simultaneously broken.

Each of the wires 181 of the conductor 82 has the conductive portion 181*a* and the coated layer 181*b* adhered to the conductive portion 181*a*. The coated layer 181*b* and the intermediate layer 183 are also adhered together. The intermediate layer 183 and the outer coated layer 182 are adhered together. Such joints have a strength of adhesion decreasing toward an outer side of the conductor 82. In other words, the strength of adhesion between the conductive portion 181a and the coated layer 181b is lower than that between the coated layer 181b and the intermediate layer 183 and between the intermediate layer 183 and the outer coated layers 182. The strength of adhesion between the coated layer 181b and the intermediate layer 183 may be higher than or identical with that between the intermediate layer 183 and the outer coated layers 182. Usually, the strength of adhesion between, for example, two coated layers may be measured as a function of a tensile strength required to peel the coated layers away from each other. The strength of adhesion of the conductor 82 is selected in the above way to minimize the risk that the inner and outer layers may be broken together arising from a temperature difference between inside and outside the conductor 82 when heated or cooled.

Usually, the heat generation or temperature change in the rotating electrical machine results in copper losses arising from heat from the conductive portion 181a of the wire 181 and from an iron core. These two types of loss result from the heat transmitted from the conductive portion 181a in the conductor 82 or from outside the conductor 82. The intermediate layer 183 does not have a heat source. The intermediate layer 183 has the strength of adhesion serving as a cushion for the coated layer 181b and the outer coated layer 182, thereby eliminating the risk that the coated layer 181b and the outer coated layer 182 may be simultaneously broken. This enables the rotating electrical machine to be used in conditions, such as in vehicles, wherein a resistance to high pressure is required, or the temperature greatly changes.

In addition, the wire 181 may be made of enamel wire with a layer (i.e., the coated layer 181b) coated with resin, such as PA, PI or PAI. Similarly, the outer coated layer 182 outside the wire 181 is preferably made of PA, PI, and PAI and has a large thickness. This minimizes a risk of breakage of the outer coated layer 182 caused by a difference in linear expansion coefficient. Instead of use of PA, PI, PAI to make the outer coated layer 182 having a large thickness, material, such as PPS, PEEK, fluorine, polycarbonate, silicon, epoxy, polyethylene naphthalate, or LCP which has a dielectric permittivity lower than that of PI or PAI is preferably used to increase the conductor density of the rotating electrical machine. The use of such resin enhances the insulating ability of the outer coated layer 182 even when it has a thickness smaller than or equal to that of the coated layer 181b and increases the occupancy of the conductive portion. Usually, the above resin has the degree of electric permittivity higher than that of an insulating layer of enamel wire. Of course, there is an example where the state of formation or additive results in a decrease in electric permittivity thereof. Usually, PPS and PEEK is higher in linear expansion coefficient than an enamel-coated layer, but lower than another type of resin and thus is useful only for the outer of the two layers.

The strength of adhesion of the two types of coated layers arranged outside the wire 181 (i.e., the intermediate insulating layer and the outer insulating layer) to the enamel coated layer of the wire 181 is preferably lower than that between the copper wire and the enamel coated layer of the wire 181, thereby minimizing a risk that the enamel coated layer and the above two types of coated layers are simultaneously broken.

In a case where the stator is equipped with a water cooling mechanism, a liquid cooling mechanism, or an air cooling mechanism, thermal stress or impact stress is thought of as being exerted first on the outer coated layers 182. The thermal stress or the impact stress is decreased by partially bonding the insulating layer of the wire 181 and the above two types of coated layers together even if the insulation layer is made of resin different from those of the above two types of coated layers. In other words, the above described insulating structure may be created by placing a wire (i.e., an enamel wire) and an air gap and also arranging fluorine, polycarbonate, silicon, epoxy, polyethylene naphthalate, or LCP. In this case, adhesive which is made from epoxy, low in electric permittivity, and also low in linear expansion coefficient is preferably used to bond the outer coated layer and the inner coated layer together. This eliminates breakage of the coated layers caused by friction arising from vibration of the conductive portion or breakage of the outer coated layer due to the difference in linear expansion coefficient as well as the mechanical strength.

The outermost layer which serves to ensure the mechanical strength or securement of the conductor 82 having the above structure is preferably made from resin material, such as epoxy, PPS, PEEK, or LCP which is easy to shape and similar in dielectric constant or linear expansion coefficient to the enamel coated layer, typically in a final process for a stator winding.

Typically, the resin potting is made using urethane or silicon. Such resin, however, has a linear expansion coefficient approximately twice that of other types of resin, thus leading to a risk that thermal stress is generated when the resin is subjected to the resin potting, so that it is sheared. The above resin is, therefore, unsuitable for use where requirements for insulation are severe and 60V or more. The final insulation process to make the outermost layer using injection molding techniques with epoxy, PPS, PEEK, or LCP satisfies the above requirements.

(Modification 15)

The distance DM between a surface of the magnet unit 42 which faces the armature and the axial center of the rotor in the radial direction may be selected to be 50 mm or more. For instance, the distance DM, as illustrated in FIG. 4, between the radial inner surface of the magnet unit 42 (i.e., the first and second magnets 91 and 92) and the center of the axis of the rotor 40 may be selected to be 50 mm or more.

The small-sized slot-less structure of the rotating electrical machine whose output is several tens or hundreds watt is known which is used for models. The inventors of this application have not seen examples where the slot-less structure is used with large-sized industrial rotating electrical machines whose output is more than 10 kW. The inventors have studied the reason for this.

Modern major rotating electrical machines are categorized into four main types: a brush motor, a squirrel-cage induction motor, a permanent magnet synchronous motor, a reluctance motor.

Brush motors are supplied with exciting current using brushes. Large-sized brush motors, therefore, have an increased size of brushes, thereby resulting in complex maintenance thereof. With the remarkable development of semiconductor technology, brushless motors, such as induction motors, have been used instead. In the field of small-sized motors, a large number of coreless motors have also come on the market in terms of low inertia or economic efficiency.

Squirrel-cage induction motors operate on the principle that a magnetic field produced by a primary stator winding is received by a secondary stator core to deliver induced current to bracket-type conductors, thereby creating magnetic reaction field to generate torque. In terms of small-size and high-efficiency of the motors, it is inadvisable that the stator and the rotor be designed not to have iron cores.

Reluctance motors are motors designed to use a change in reluctance in an iron core. It is, thus, inadvisable that the iron core be omitted in principle.

In recent years, permanent magnet synchronous motors have used an IPM (Interior Permanent Magnet) rotor. Especially, most large-sized motors use an IPM rotor unless there are special circumstances.

IPM motors has properties of producing both magnet torque and reluctance torque. The ratio between the magnet torque and the reluctance torque is timely controlled using an inverter. For these reasons, the IMP motors are thought of as being compact and excellent in ability to be controlled.

Figure 43:
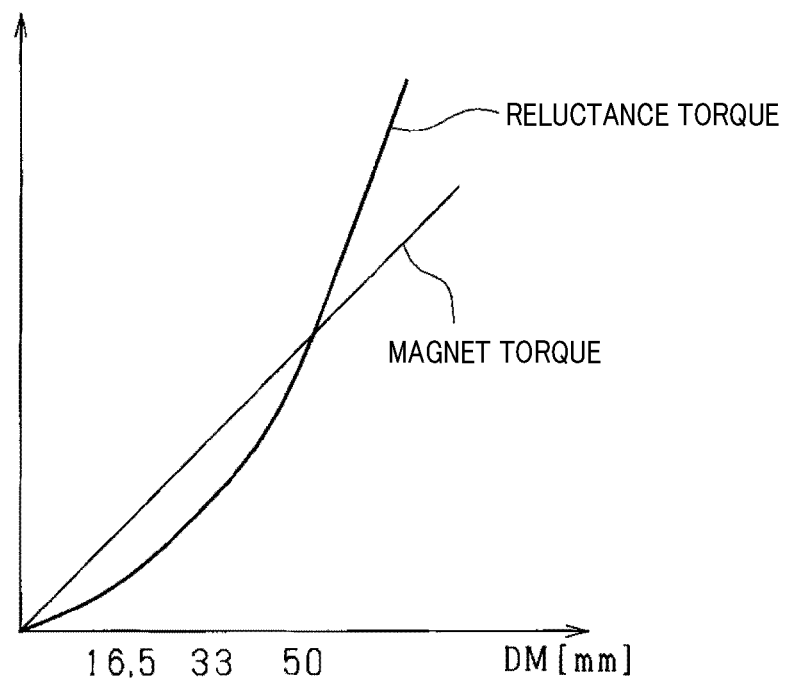
FIG. 43 is a view which illustrates a relation among reluctance torque, magnet torque, and distance DM.

According to analysis by the inventors, torque on the surface of a rotor producing the magnet torque and the reluctance torque is expressed in FIG. 43 as a function of the distance DM between the surface of the magnet unit which faces the armature and the center of the axis of the rotor, that is, the radius of a stator core of a typical inner rotor indicated on the horizontal axis.

The potential of the magnet torque, as can be seen in the following equation (eq1), depends upon the strength of magnetic field created by a permanent magnet, while the potential of the reluctance torque, as can be seen in the following equation (eq2), depends upon the degree of inductance, especially, on the q-axis.

The magnet torque=$k \cdot \Psi \cdot q$ (eq1)

The reluctance torque=$k \cdot (Lq-Ld) \cdot Iq \cdot Id$ (eq2)

Comparison between the strength of magnetic field produced by the permanent magnet and the degree of inductance of a winding using the distance DM shows that the strength of magnetic field created by the permanent magnet, that is, the amount of magnetic flux $\Psi$ is proportional to a total area of a surface of the permanent magnet which faces the stator. In case of a cylindrical stator, such a total area is a cylindrical surface area of the permanent magnet. Technically speaking, the permanent magnet has an N-pole and an S-pole, the amount of magnetic flux $\Psi$ is proportional to half the cylindrical surface area. The cylindrical surface area is proportional to the radius of the cylindrical surface and the length of the cylindrical surface. When the length of the cylindrical surface is constant, the cylindrical surface area is proportional to the radius of the cylindrical surface.

Figure 44:
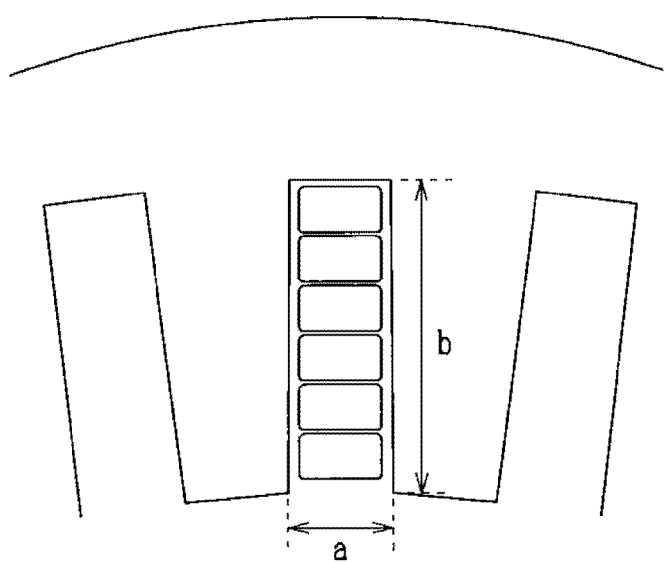
FIG. 44 is a view which illustrates teeth.

The inductance Lq of the winding depends upon the shape of the iron core, but its sensitivity is low and rather proportional to the square of the number of turns of the stator winding, so that it is strongly dependent upon the number of the turns. The inductance L is expressed by a relation of $L=\mu \cdot N^2 \times S/\delta$ where $\mu$ is permeability of a magnetic circuit, N is the number of turns, S is a sectional area of the magnetic circuit, and $\delta$ is an effective length of the magnetic circuit. The number of turns of the winding depends upon the size of space occupied by the winding. In the case of a cylindrical motor, the number of turns, therefore, depends upon the size of space occupied by the winding of the stator, in other words, areas of slots in the stator. The slot is, as demonstrated in FIG. 44, rectangular, so that the area of the slot is proportional to the product of a and b where a is the width of the slot in the circumferential direction, and b is the length of the slot in the radial direction.

The width of the slot in the circumferential direction becomes large with an increase in diameter of the cylinder, so that the width is proportional to the diameter of the cylinder. The length of the slot in the radial direction is proportional to the diameter of the cylinder. The area of the slot is, therefore, proportional to the square of the diameter of the cylinder. It is apparent from the above equation (eq2) that the reluctance torque is proportional to the square of current in the stator. The performance of the rotating electrical machine, therefore, depends upon how much current is enabled to flow in the rotating electrical machine, that is, depends upon the areas of the slots in the stator. The reluctance is, therefore, proportional to the square of the diameter of the cylinder for a cylinder of constant length. Based on this fact, a relation of the magnetic torque and the reluctance torque with the distance DM is shown by plots in FIG. 43.

The magnet torque is, as shown in FIG. 43, increased linearly as a function of the distance DM, while the reluctance torque is increased in the form of a quadratic function as a function of the distance DM. FIG. 43 shows that when the distance DM is small, the magnetic torque is dominant, while the reluctance torque becomes dominant with an increase in diameter of the stator core. The inventors of this application have arrived at the conclusion that an intersection of lines expressing the magnetic torque and the reluctance torque in FIG. 43 lies near 50 mm that is the radius of the stator core. It seems that it is difficult for a motor whose output is 10 kW and whose stator core has a radius much larger than 50 mm to omit the stator core because the use of the reluctance torque is now mainstream. This is one of reasons why the slot-less structure is not used in large-sized motors.

The rotating electrical machine using an iron core in the stator always faces a problem associated with the magnetic saturation of the iron core. Particularly, radial gap type rotating electrical machines has a longitudinal section of the rotating shaft which is of a fan shape for each magnetic pole, so that the further inside the rotating electrical machine, the smaller the width of a magnetic circuit, so that inner dimensions of teeth forming slots in the core become a factor of the limit of performance of the rotating electrical machine. Even if a high performance permanent magnet is used, generation of magnetic saturation in the permanent magnet will lead to a difficulty in producing a required degree of performance of the permanent magnet. It is necessary to design the permanent magnet to have an increased inner diameter in order to eliminate a risk of generation of the magnetic saturation, which results in an increase size of the rotating electrical machine.

For instance, a typical rotating electrical machine with a distributed three-phase winding is designed so that three to six teeth serve to produce a flow of magnetic flux for each magnetic pole, but encounters a risk that the magnetic flux may concentrate on a leading one of the teeth in the circumferential direction, thereby causing the magnetic flux not to flow uniformly in the three to six teeth. For instance, the flow of magnetic flux concentrates on one or two of the teeth, so that the one or two of the teeth in which the magnetic saturation is occurring will move in the circumferential direction with rotation of the rotor, which may lead to a factor causing the slot ripple.

For the above reasons, it is required to omit the teeth in the slot-less structure of the rotating electrical machine whose distance DM is 50 mm or more to eliminate the risk of generation of the magnetic saturation. The omission of the teeth, however, results in an increase in magnetic resistance in magnetic circuits of the rotor and the stator, thereby decreasing torque produced by the rotating electrical machine. The reason for such an increase in magnetic resistance is that there is, for example, a large air gap between the rotor and the stator. The slot-less structure of the rotating electrical machine whose distance DM is 50 mm or more, therefore, has room for improvement for increasing the output torque. There are numerous beneficial advantages to use the above torque-increasing structure in the slot-less structure of rotating electrical machines whose distance DM is 50 mm or more. Not only the outer rotor type rotating electrical machines, but also the inner rotor type rotating electrical machines are preferably designed to have the distance DM of 50 mm or more between the surface of the magnet unit which faces the armature and the center of the axis of the rotor in the radial direction.

First Embodiment as a Wheel Driving Apparatus

Figure 45:
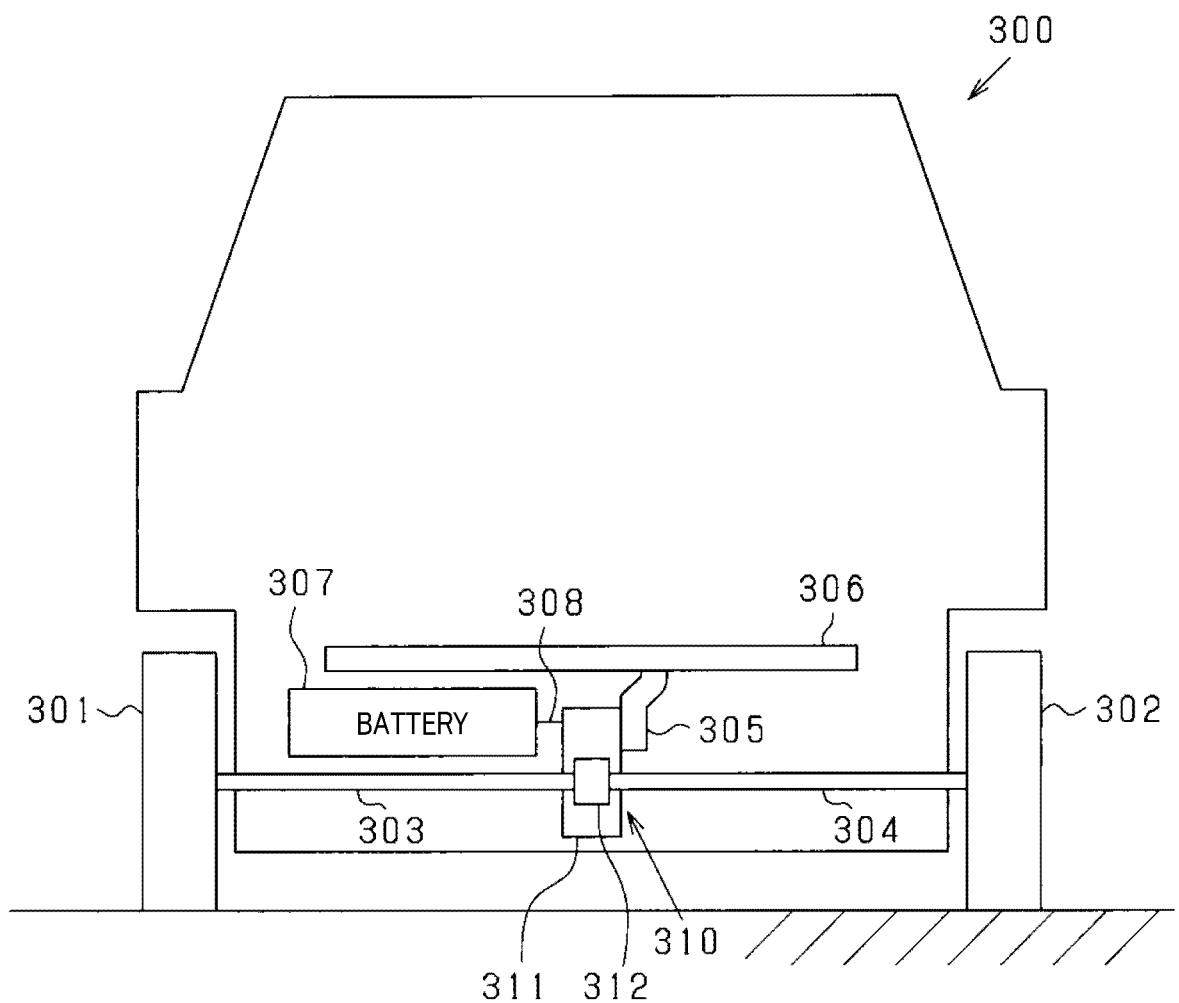
FIG. 45 is a schematic diagram which illustrates an overview of a wheel driving apparatus of a vehicle according to a first embodiment.

Next, a first embodiment of a configuration in which the rotating electrical machine is used in a wheel driving apparatus that rotates wheels of a vehicle will be described. FIG. 45 is a schematic diagram of an overview of the wheel driving apparatus.

As shown in FIG. 45, a vehicle 300 includes left and right wheels 301 and 302. The wheels 301 and 302 are rotated by rotation of axles 303 and 304. The left and right axles 303 and 304 extend in a horizontal direction. In addition, the left and right axles 303 and 304 are coaxially provided and supported by a suspension apparatus, not shown, so as to freely rotate. Although not shown in FIG. 45, for example, a brake apparatus that is configured by a disk brake is provided on an extension in an axial direction from each of the axles 303 and 304.

A wheel driving apparatus 310 includes a rotating electrical machine 311 and a differential apparatus 312. Rotational power is applied to each of the left and right wheels 301 and 302 by rotation of the rotating electrical machine 311. The wheel driving apparatus 310 is fixed to a vehicle body portion (such as a vehicle body frame 306) of the vehicle 300, with a stay 305 therebetween. A battery 307 is mounted in the vehicle 300. The battery 307 is connected to the rotating electrical machine 311 via an electric power line 308.

For example, the vehicle 300 is a four-wheeled vehicle that has front-side wheels and rear-side wheels. The wheel driving apparatus 310 is provided in either of the front-side wheels and the rear-side wheels. That is, either of the front-side wheels and the rear-side wheels is driving wheels, and the other is driven wheels. However, the configuration may be such that the wheel driving apparatus 310 is provided in both the front-side wheels and the rear-side wheels in the vehicle 300. In addition, the vehicle 300 may be a vehicle that includes only a single set of the pair of left and right wheels 301 and 302. Alternatively, the vehicle 300 may be a vehicle that includes three sets or more of the pair of left and right wheels 301 and 302.

Figure 46:
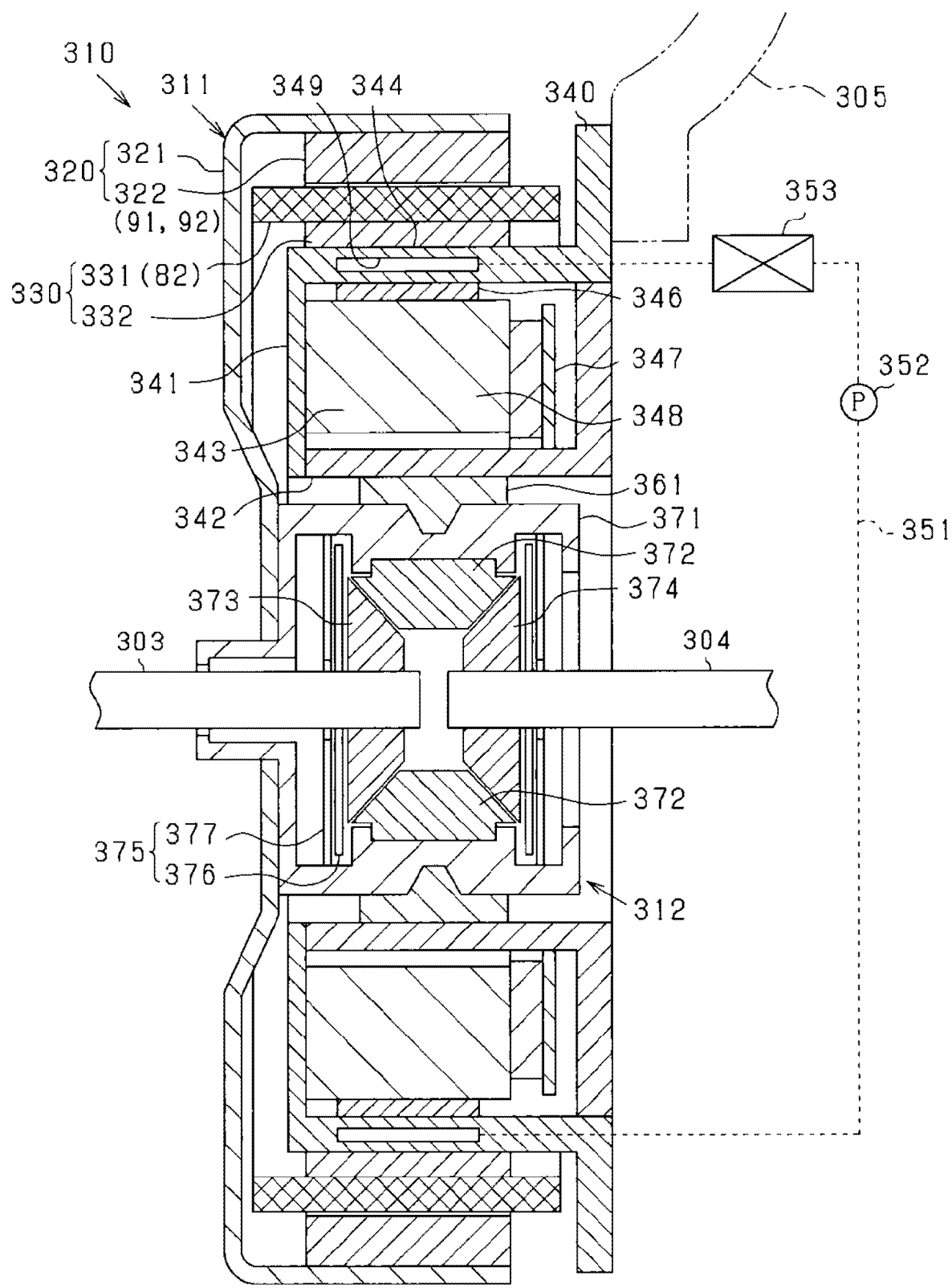
FIG. 46 is a longitudinal sectional view which illustrates a configuration of the wheel driving apparatus.
Figure 47:
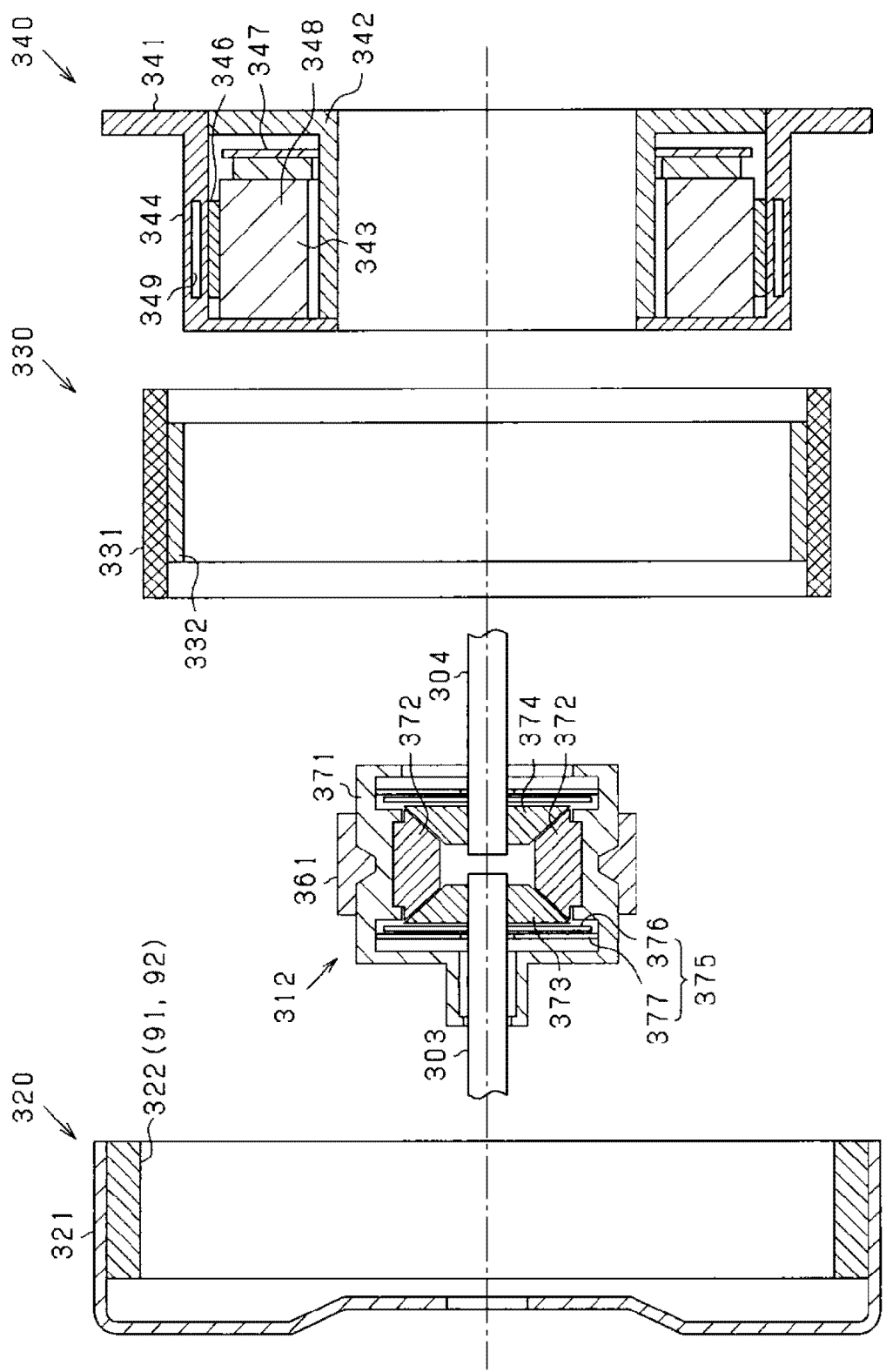
FIG. 47 is an exploded sectional view which illustrates main configurations of the wheel driving apparatus in an exploded manner.

Next, a detailed configuration of the wheel driving apparatus 310 will be described. FIG. 46 is a longitudinal sectional view of the wheel driving apparatus 310, taken at a position that is a rotational center of the axles 303 and 304. FIG. 47 is an exploded sectional view which illustrates main configurations of the wheel driving apparatus 310 in an exploded manner.

The rotating electrical machine 311 is an outer-rotor-type, surface-magnet-type rotating electrical machine. As a basic configuration, the rotating electrical machine 311 includes a rotor 320, a stator 330, and an inverter unit 340. The main configurations of the rotating electrical machine 311 are similar to those of the above-described rotating electrical machine 10, shown in FIG. 1 and the like. Here, the configuration of the rotating electrical machine 311 will be described in comparison to that of the rotating electrical machine 10, while descriptions of similar configurations are omitted as appropriate. Here, the rotor 40, the stator 50, and the inverter unit 60 of the rotating electrical machine 10 shown in FIG. 1 and the like respectively correspond to the rotor 320, the stator 330, and the inverter unit 340 of the rotating electrical machine 311 according to the present embodiment. However, the number of poles, the number of phases, and the dimension (size) of each component can be set as appropriate.

The rotor 320 includes a magnet holder 321 and an annular magnet unit 322 that is provided on an inner side in the radial direction of the magnet holder 321. The magnet holder 321 has a substantially cylindrical shape and provides a function as a magnet holding member. The magnet holder 321 is fixed to the axle 303 on the left side so as to be capable of integrally rotating therewith.

The magnet unit 322 has a circular annular shape and is configured by a plurality of permanent magnets that are arranged such that polarities alternately change along the circumferential direction of the rotor 320. That is, the magnet unit 322 has a plurality of magnetic poles in the circumferential direction. For example, the permanent magnets are fixed to the magnet holder 321 by adhesion. The magnet unit 322 has the configuration that is described as the magnet unit 42 in FIG. 8 and FIG. 9 according to the first embodiment. As the permanent magnet, a sintered neodymium magnet of which the intrinsic coercive force is equal to or greater than 400 [kA/m] and the remanent flux density Br is equal to or greater than 1.0 [T] is used.

In a manner similar to the magnet unit 42 in FIG. 9 and the like, the magnet unit 322 has a first magnet 91 and a second magnet 92, each of which is an anisotropic magnet and differs from the other in polarity. As described in FIG. 8 and FIG. 9, in each of the magnets 91 and 92, the orientation of the easy axis of magnetization differs between the d-axis side (a portion closer to the d-axis) and the q-axis side (a portion closer to the q-axis). The orientation of the easy axis of magnetization on the d-axis side is an orientation that is close to a direction that is parallel to the d-axis. The orientation of the easy axis of magnetization on the q-axis side is an orientation that is close to a direction that is orthogonal to the q-axis. In addition, a circular arc-shaped magnet magnetic path is formed by an orientation that is based on the orientations of the easy axes of magnetization. Here, in each of the magnets 91 and 92, the easy axis of magnetization may be oriented to be parallel to the d-axis on the d-axis side. The easy axis of magnetization may be oriented to be orthogonal to the q-axis on the q-axis side.

In each of the magnets 91 and 92, magnet magnetic flux on the d-axis is made stronger on the d-axis, and change in magnetic flux near the q-axis is suppressed. As a result, the magnets 91 and 92 in which changes in surface magnetic flux become gradual from the q-axis towards the d-axis at each magnetic pole can be suitably actualized. Here, as the magnet unit 322, the configuration of the magnet unit 42 shown in FIG. 22 and FIG. 23 or the configuration of the magnet unit 42 shown in FIG. 30 can also be used.

The stator 330 is provided on an inner side in the radial direction of the rotor 320. The stator 330 includes a multiple-phase (such as a six-phase) stator winding 331 that is formed so as to be wound into a substantially cylindrical (annular) shape, and a stator core 332 that is arranged on an inner side in the radial direction of the stator winding 331 and serves as a base member. The stator winding 331 is arranged so as to oppose the circular annular magnet unit 322 with a predetermined air gap therebetween.

In a manner similar to the above-described stator 50, the stator 330 is characterized by having a slot-less structure. The stator 330 also has a flattened conductor structure in the stator winding 331. The stator 330 has a configuration that is similar to that of the stator 50 shown in FIG. 8 to FIG. 16. That is, in a manner similar to the stator core 52, the stator core 332 is formed by a plurality of electromagnetic steel plates being stacked in the axial direction and has a circular cylindrical shape that has a predetermined thickness in the radial direction. The stator winding 331 is assembled on an outer side in the radial direction that is the rotor 320 side of the stator core 332. The stator winding 331 has a configuration that is similar to that of the stator winding 51. An outer peripheral surface of the stator core 332 has a curved shape with no unevenness. A plurality of conductors (conductor groups) are arranged on the outer peripheral surface of the stator core 332 at a predetermined interval in the circumferential direction.

The stator 330 is that in which any of the following (A) to (C) is used.

(A) In the stator 330, an inter-conductor member is provided between conductor portions in the circumferential direction. In addition, a magnetic material is used as the inter-conductor member. The magnetic material meets a a relation of Wt×Bs≤Wm×Br where Wt is a width dimension in the circumferential direction of the inter-conductor member for a single magnetic pole, Bs is the saturation magnetic flux density of the inter-conductor member, Wm is a width dimension in the circumferential direction of a magnet portion for a single magnetic pole, and Br is the remanent flux density of the magnet portion.

(B) In the stator 330, an inter-conductor member is provided between conductor portions in the circumferential direction. In addition, as the inter-conductor member, a non-magnetic material is used.

(C) In the stator 330, an inter-conductor member is not provided between conductor portions in the circumferential direction.

As a result of the configuration of the stator 330 such as this, inductance is reduced, compared to that of a rotating electrical machine that has a typical teeth structure in which teeth (iron core) for establishing a magnetic path are provided between conductor portions as the stator winding. Specifically, inductance can be reduced to ¹⁄₁₀ or less.

The configuration of the conductors on the stator core 332 and the conductor groups that compose a plurality of layers in the radial direction (that is, the configuration of the conductor portions) is similar to that of the conductors 82 (conductor groups 81) shown in FIG. 10 and FIG. 11, described above. Each conductor 82 has a horizontal cross-section that has a flattened rectangular shape. A molding material (insulating member) that is composed of a resin or the like is interposed between the conductors 82 (conductor groups 81) that are arranged in the radial direction. In this case, the stator winding 331 is integrally molded together with the stator core 332 by the molding material. Here, as shown in FIG. 13, the conductor 82 is configured as a collection of a plurality of wires 86. The stator winding 331 is formed by being wound in a circular annular shape by distributed winding.

The inverter unit 340 includes a cylindrical outer case 341 that is fixed to the vehicle body portion with the stay 305 therebetween, an inner case 342 that is formed into a cylindrical shape that is smaller in diameter than the outer case 341 and is fixed to the outer case 341, and an electrical component 343 that is housed in an annular housing space that is surrounded by the outer case 341 and the inner case 342. The outer case 341 and the inner case 342 are sealed by a sealing member, such as a gasket or an O-ring, that is provided in a joining portion of the outer case 341 and the inner case 342. The configuration of the inverter unit 340 substantially corresponds to that of the inverter unit 60 shown in FIG. 6. However, the inverter unit 340 differs in that the electrical component 343 is housed in the annular space that is surrounded by the outer case 341 and the inner case 342. The inverter unit 340 corresponds to an "electrical unit". The outer case 341 and the inner case 342 correspond to a "case member".

For example, the outer case 341 and the inner case 342 are composed of carbon fiber reinforced plastic (CFRP). The outer case 341 has a cylindrical portion 344 that extends in the axial direction. The stator core 332 is assembled on an outer side in the radial direction of the cylindrical portion 344. As a result, the stator 330 and the inverter unit 340 are integrated.

The electrical component 343 includes a plurality of semiconductor modules 346, a control board 347, and a capacitor module 348. These electrical components configure an inverter circuit (electric power converter). As a result of the inverter circuit that is configured by the electrical component 343, a power-running function for sending a current to each phase winding of the stator winding 331 for each phase and rotating the rotor 320, and a power generation function for outputting generated electric power by a three-phase alternating current of the stator winding 331 that flows in accompaniment with the rotation of the axles 303 and 304 are actualized. Here, the electrical component 343 may provide only either of the power-running function or the power generation function.

The capacitor module 348 is configured by a plurality of smoothing capacitors being arranged in an annular shape. The plurality of semiconductor modules 346 are arranged in the circumferential direction on an outer peripheral surface of the capacitor module 348. For example, the semiconductor module 346 includes a semiconductor switching element such as a MOSFET or an IGBT. The semiconductor modules 346 are arranged so as to be sandwiched between the cylindrical portion 344 and the capacitor module 348.

In addition to or instead of the above-described semiconductor modules 346, control board 347, and capacitor module 348, other electrical components related to motor driving, such as a transformer and an angle sensor, may be housed in the annular space formed by the outer case 341 and the inner case 342.

Furthermore, a cooling water path 349 (coolant path) through which cooling water that serves as a coolant flows is formed in the cylindrical portion 344 (annular outer wall portion) of the outer case 341. Heat that is generated in the semiconductor modules 346 is released to the cooling water that flows through the cooling water path 349. The cooling water path 349 is formed in an annular shape so as to surround the electrical component 343 (the semiconductor modules 346 and the capacitor module 348).

A water cooling system that sends the cooling water through the cooling water path 349 in the outer case 341 includes a circulation path 351 that circulates the cooling water through a path that includes the cooling water path 349. In addition, the water cooling system includes a pump 352 and a heat releasing apparatus 353 that are provided on the circulation path 351. The pump 352 is an electric pump. For example, the heat releasing apparatus 353 is a radiator that releases heat from the cooling water into the atmosphere. In the outer case 341, the cooling water path 349 is provided in an annular shape so as to surround the electrical component 343. When the pump 352 is driven, the cooling water flows in from an inlet portion that is provided in the annular cooling water path 349. The cooling water flows out from an outlet portion.

The stator 330 is arranged on the outer side of the cylindrical portion 344. The electrical component 343 is arranged on the inner side of the cylindrical portion 344. Therefore, heat from the stator 330 is transmitted to the cylindrical portion 344 from the outer side thereof. In addition, heat from the electrical component 343 (such as heat from the semiconductor modules 346) is transmitted to the cylindrical portion 344 from the inner side. In this case, the stator 330 and the electrical component 343 can be simultaneously cooled. Heat from heat generating members in the rotating electrical machine 311 can be efficiently released. Here, instead of the cooling water, a cooling oil can also be used as the coolant.

Next, the differential apparatus 312 will be described.

The differential apparatus 312 is integrally provided with the rotating electrical machine 311. Specifically, the differential apparatus 312 is assembled on the inner side in the radial direction of the inverter unit 340 of the rotating electrical machine 311. More specifically, the rotating electrical machine 311 has a circular space that extends in the axial direction on the inner side of the inverter unit 340 (that is, on the inner side in the radial direction of the inner case 342). The differential apparatus 312 is arranged inside this circular space. In this case, in the rotating electrical machine 311, the rotor 320, the stator 330, and the inverter unit 340 are each provided in order from the outer side in the radial direction on a same axis of which the axles 303 and 304 are the center. The differential apparatus 312 is further provided on the inner side in the radial direction thereof.

The differential apparatus 312 includes a differential case 371, a plurality of (such as two) pinion gears 372 that are provided inside the differential case 371, a pair of side gears 373 and 374 that are also provided inside the differential case 371 and are respectively coupled with the left and right axles 303 and 304 by spline fitting or press fitting, and a differential limiting mechanism 375 that limits a differential in the differential apparatus 312.

The differential case 371 is fixed to the magnet holder 321 of the rotor 320 in the rotating electrical machine 311. As a result, the differential case 371 rotates together with the rotor 320. In addition, a circular annular bearing 361 is provided on an outer peripheral side of the differential case 317, between the differential case 371 and the inner peripheral surface of the inner case 342 of the inverter unit 340. For example, the bearing 361 is a ball bearing. The differential case 371 is supported by the bearing 361 so as to be capable of rotating in relation to the inverter unit 340.

In addition, the inner case 342 that is larger in diameter than the differential case 371 is concentrically arranged on the outer side in the radial direction of the differential case 371. The outer peripheral surface of the differential case 371 and the inner peripheral surface of the inner case 342 oppose each other with a predetermined distance therebetween. Furthermore, the bearing 361 is provided between the differential case 371 and the inner case 342, so as to surround the differential case 371. Here, the inner case 342 corresponds to an annular inner wall portion of a case member. In the differential case 371, one end surface of both end surfaces in the axial direction serves as a rotor fixing portion to which the magnet holder 321 of the rotor 320 is fixed. The outer peripheral surface of the differential case 371 serves as a bearing mounting portion to which the bearing 361 is mounted.

The plurality of pinion gears 372 are each composed of a bevel gear. The pinion gear 372 is arranged such that a tooth flank faces a center of the differential case 371. Each pinion gear 372 is provided inside the differential case 371 so as to be capable of rotating with a direction that is perpendicular to the axial direction of the axles 303 and 304 (such as an up/down direction in the drawing) as a rotation axis direction. During rotation of the differential case 371, the pinion gears 372 rotate together with the differential case 371, with the axles 303 and 304 as an axial center. Here, a number of pinion gears 372 may be arbitrarily prescribed based on designed strength. Two pinion gears 372 may be connected by a pinion shaft, and the pinion shaft is supported by a ball bearing, a needle bearing, or the like.

The pair of left and right side gears 373 and 374 are each composed of a bevel gear. The side gears 373 and 374 are arranged so as to oppose each other. The side gears 373 and 374 each mesh with the pinion gear 372. From the perspective of the pinion gears 372, the plurality of pinion gears 372 each mesh with the two left and right side gears 373 and 374.

As a result of the differential apparatus 312 configured as described above, for example, when a difference occurs in a load that is applied to each of the left and right wheels 301 and 302 when the vehicle 300 turns on a curved road, that is, when a difference in rotation speed occurs between a wheel on an inner side of the curved road and a wheel on an outer side of the curved road, the pinion gears 372 rotate with a direction orthogonal to the axial direction of the axles 303 and 304 as the axial center. As a result, the rotation of the differential case 371 (that is, the rotation of the rotating electrical machine 311) is transmitted so as to be apportioned at rotation speeds that differ between the side gears 373 and 374.

In addition, for example, the differential limiting mechanism 375 is a multiple-disc, clutch-type limited slip differential (LSD). The differential limiting mechanism 375 is provided in each of the left and right axles 303 and 304. The differential limiting mechanism 375 includes an inner plate 376 that is fixed to the axle 303 or 304 side (side gear 373 or 374 side) and an outer plate 377 that is fixed to the differential case 371 side. The plates 376 and 377 are arranged in an alternating manner.

Here, in a state in which differential limit has not occurred, each of the plates 376 and 377 is rotated. In this state, mutual frictional force is not generated in the plates 376 and 377 at the axles 303 and 304. In contrast, in a state in which differential limit occurs, for example, the side gear is pushed in an outward direction on the side of the axle that has the greater rotation speed, of the left and right axles 303 and 304. As a result, the inner plate 376 moves in the outward direction together with the side gear and is pressed against the outer plate 377. In this case, a driving force of the differential case 371 is transmitted to the axles 303 and 304 through the outer plate 377 and the inner plate 376. The differential function of the differential apparatus 312 is thereby limited.

In the wheel driving apparatus 310 configured as described above, the differential case 371 is fixed to the magnet holder 321 of the rotor 320. Therefore, the differential case 371 is rotated by the rotation of the rotor 320 at the same rotation speed. In this case, a reduction ratio of the axles 303 and 304 in relation to the rotation of the rotating electrical machine 311 is 1.

The rotating electrical machine 311 according to the present embodiment is the outer-rotor-type rotating electrical machine. Therefore, inertia in a rotating state is greater than that of an inner-rotor-type rotating electrical machine.

For example, the inertia is thought to be four times that of the inner-rotor-type rotating electrical machine, at maximum. Therefore, a low-vibration wheel driving apparatus 310 can be actualized.

In addition, as described above, inductance is reduced compared to that in a typical teeth structure in which the teeth (iron core) between the conductor portions are provided in the stator 330. Therefore, reduction in mechanical time constant in the rotating electrical machine 311 can be achieved. For example, improvement in responsiveness when the vehicle 300 is started can be actualized.

Here, when an assumption is made that the inertia is increased by 4 times at maximum and inductance L is 1/10 or less, compared to those of a conventional rotating electrical machine that has the typical teeth structure, in the rotating electrical machine 311 according to the present embodiment, a mechanical response speed of wheel driving is thought to be 2.5 times that of the conventional rotating electrical machine, at minimum. In addition, based on samples by the disclosers of the present application, it is confirmed that the inductance L is 1/100 or less, and the mechanical response speed of wheel driving is 25 times or greater, compared to those of a conventional product. In this case, driving torque that substantially exceeds 1,000 Nm can be actualized in the wheel driving apparatus 310, while the reduction ratio from the rotating electrical machine 311 to the axle side is set to 1 and deterioration in responsiveness is prevented.

Even when application of the wheel driving apparatus 310 to, not only a vehicle, but also a train is considered, under an assumption that a general range of speed is about over 200 to 300 km/h at maximum, and a wheel diameter is typically about 14 to 30 inches, the rotation speed of the rotating electrical machine 311 rarely exceeds 2,000 to 3,000 rpm, and applicable frequency is an extremely low frequency. When an eight-pole rotating electrical machine that is common in vehicles is used, the frequency is a low frequency of about 200 Hz. In a conventional system, design is typically performed under an assumption that an eight-pole motor is driven at 1,000 to 2,000 Hz as a result of an increase ratio being set to 10 or the like.

In this regard, in the rotating electrical machine 311 according to the present embodiment, in accompaniment with the decrease in inductance, the electrical time constant also becomes 1/10 or less, and more specifically, 1/100 or less compared to that of a conventional product. Therefore, the configuration is advantageous in terms of achieving multipolarization. Here, it is known that, as a result of multipolarization of the rotating electrical machine being achieved, anti-demagnetization capability of a magnetic circuit thereof, and an amplitude of vibrations attributed to cogging torque, detent torque, and electromagnetic torque ripple are decreased. A reason for this is that a single flux loop becomes extremely small as a result of multipolarization, thereby causing magnetic resistance to decrease. In addition, a number of times that electromagnetic action and reaction occur in a single rotation increases, and a difference in mechanical amplitude decreases at a high frequency as a result of an interval between peaks of a torque waveform becoming extremely narrow.

In the rotating electrical machine 311, the magnetic poles are preferably 16 poles or more. As a result, the vehicle 300 can be configured to have half the noise and vibration of a conventional system.

In addition, in accompaniment with the decrease in inductance, a current frequency can be increased. When the current frequency of a conventional motor is 1,000 to 2,000 Hz, frequencies that are 10 times higher, that is, 10,000 to 20,000 Hz or higher are applicable.

As an existing rotating electrical machine, for example, a rotating electrical machine in which the inductance is about 1 mH is known. However, in a high-inductance rotating electrical machine such as this, power factor becomes poor. The current does not rise at a fast frequency. An issue may occur in that a maximum current value cannot be sent.

In the rotating electrical machine 311 according to the present embodiment, the number of poles can be set to 80 poles or more. Therefore, compared to an eight-pole rotating electrical machine, anti-demagnetization capability can be enhanced by several fold (such as three-fold). In addition, with electromagnetic torque ripple at 1/10 or less, the rotating electrical machine 311 can be operated quietly and even in ultrahigh temperatures or less. Weight reduction of the rotating electrical machine 311 is also possible. The weight can be reduced to 1/3, compared to that of a conventional apparatus that exhibits identical performance.

Figure 48:
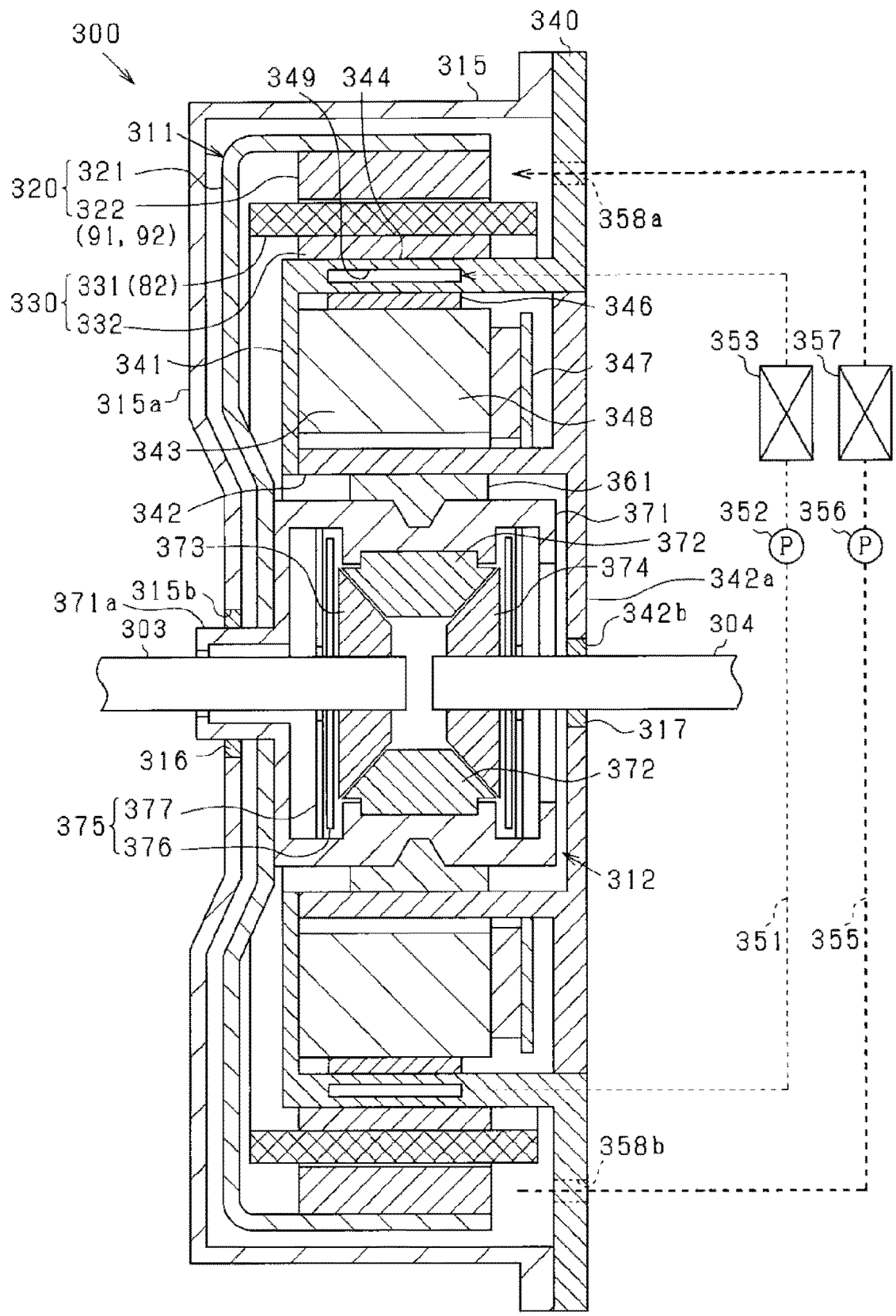
FIG. 48 is a sectional view which illustrates an oil cooling structure of the wheel driving apparatus.

The rotating electrical machine 311 may also be configured to include a housing member H that forms a closed space and houses the rotor 320, the stator 330, and the differential apparatus 312 in the closed space. Specifically, as shown in FIG. 48, the rotating electrical machine 311 has a bottomed, circular cylindrical outer housing 315. The outer housing 315 has an end plate portion 315a on one end side in the axial direction. The other end side is open. FIG. 48 is a sectional view for describing an oil cooling structure of the wheel driving apparatus 310.

The outer housing 315 is assembled to the outer case 341 of the inverter unit 340 in the opening-side end portion thereof, in a state in which the outer housing 315 surrounds the rotor 320 and the stator 330. In a center portion of the end plate portion 315a of the outer housing 315, an opening 315b into which a small-diameter cylinder portion 371a of the differential case 371 is inserted is provided. A sealing member 316 that seals a space between the end plate portion 315a and an outer peripheral surface of the small-diameter cylinder portion 371a is provided in the opening 315b. For example, the sealing member 316 may be a sliding seal that is composed of a resin material.

In addition, the inner case 342 that is assembled to the inner side of the outer case 341 in the rotating electrical machine 311 has a shielding portion 342a that shields an opening portion that is a side of the differential apparatus 312. In an opening 342b that is provided in a center portion of the shielding portion 342a, a sealing member 317 that seals a space between the shielding portion 342a and the outer peripheral surface of the axle 304 is provided. For example, the sealing member 317 may be a sliding seal that is composed of a resin material.

In the configuration in FIG. 48, the housing member H is configured by the outer housing 315, the outer case 341, and the inner case 342. A closed space is formed inside the housing member H. In addition, a circulation system that circulates a lubricating oil through a path that includes the closed space is provided. The circulation system includes a circulation path 355 that circulates the lubricating oil. The circulation system also includes a pump 356 and a heat-releasing apparatus 357 that are provided on the circulation path 355. The circulation path 355 and the pump 356 correspond to a "circulating portion". The heat-releasing apparatus 357 corresponds to a "heat releasing portion".

The circulation path 355 is provided so as to connect an inlet portion 358a and an outlet portion 358b. The inlet portion 358a is provided in an upper portion in a vertical direction and the outlet portion 358b is provided in a lower portion in the vertical direction of either of the outer housing 315 and the outer case 341 that serve as the housing member H. The pump 356 is an electric pump. For example, the heat releasing apparatus 357 is a radiator that releases heat from the lubricating oil into the atmosphere. When the pump 356 is driven, the lubricating oil flows inside the rotating electrical machine 311 from the inlet portion 358a. The lubricating oil flows out from the outlet portion 358b. Here, in the differential case 371, a through hole that allows the lubricating oil to pass may be provided in the outer peripheral portion that forms the circular cylindrical shape.

When the wheel driving apparatus 310 is in operation, in accompaniment with driving of the pump 356, the lubricating oil flows into the rotating electrical machine 311 from the inlet portion 358a, via the heat releasing apparatus 35. The lubricating oil is then supplied to each section of the rotating electrical machine 311 and is also supplied to the differential apparatus 312. As a result, lubrication and cooling in each section of the rotating electrical machine 311 and the differential apparatus 312 are performed. In addition, the lubricating oil flows out from the outlet portion 358b to the circulation path 355. Subsequently, the lubricating oil again flows into the rotating electrical machine 311 via the heat releasing apparatus 357. At this time, inside the housing member H, the lubricating oil flows so as to pass through the outer side in the radial direction of the cooling water path 349 in the outer case 341 (the periphery of the outer case 341).

Here, as a configuration in which the lubricating oil is stored inside the housing member H, the stored lubricating oil may be circulated through the circulation path 355 and drawn upward inside the housing member H in accompaniment with the rotation of the rotor 320. For example, depending on settings of a filling amount of the lubricating oil inside the housing member H and a circulation amount per time through the circulation path 355, the rotor 320 can draw up the lubricating oil inside the housing member H. In this case, the lubricating oil that is drawn upward by the rotor 320 is dispersed to the stator 330, the differential apparatus 312, and the like, and lubrication and cooling are performed.

When the water cooling system in which the cooling water is sent through the cooling water path 349 in the outer case 341 and the circulation system for the lubricating oil are compared, the cooling water is preferably lower in temperature than the lubricating oil, taking into consideration an operation temperature range of the IGBT and the like in the semiconductor module 346. For example, water temperature may be cooled to 65° C. or below by the heat releasing apparatus 353 in the water cooling system, and water temperature may be cooled to 80° C. or below by the heat releasing apparatus 357 in the circulation system.

Cooling by the cooling water (coolant) and cooling by the lubricating oil can be consolidated into a single system. In this case, for example, first, the lubricating oil that flows through the circulation path 355 (that is, the lubricating oil that has passed through the heat-releasing apparatus 357) is sent into the coolant path (cooling water path 349) in the outer case 341 and subsequently supplied to each section of the rotating electrical machine 311 and the differential apparatus 312. The coolant path may be provided with an inlet portion that leads to the circulation path 355 and an outlet portion that leads into the housing member H. Then, the lubricating oil is subsequently returned to the circulation path 355. As a result of the present configuration, first, cooling of the electrical component 343 and the stator 330 is performed by the lubricating oil from which heat has been released by the heat releasing apparatus 357. Cooling of other sections is performed thereafter. That is, cooling of the electrical component 343 and the stator 330 is preferentially performed. Here, the interior of the housing member H and the interior of the coolant path (cooling water path 349) in the outer case 341 may be filled with the lubricating oil.

In the rotating electrical machine 311 configured as described above, the differential apparatus 312 is concentrically arranged with the rotor 320 in a hollow portion that is provided on the inner side in the radial direction of a magnetic circuit portion that is configured by the rotor 320 and the stator 330. That is, the rotor 320 and the stator 330 of the rotating electrical machine 330, and the differential apparatus 312 are arranged in a stacked state in the radial direction and concentrically arranged with the axles 303 and 304 as the axial center. In this case, through effective use of an annular space that is formed around the axles 303 and 304 inside the rotating electrical machine 311, the wheel driving apparatus 310 in which the rotating electrical machine 311 and the differential apparatus 312 are integrated can be suitably actualized while increase in physical size is suppressed.

In the rotating electrical machine 311 configured as described above, as a result of the teeth (iron core) between the conductor portions (the conductors 82 of the stator winding 331) arranged in the circumferential direction in the stator 330 being made smaller or eliminated, torque limitation that is attributed to magnetic saturation that occurs between the conductor portions is suppressed. In addition, as a result of the conductor portion being formed into a thin, flat shape, torque reduction is suppressed. In this case, even when an outer-diameter dimension of the rotating electrical machine 311 is identical, the hollow portion on the inner side in the radial direction of the magnetic circuit portion can be expanded as a result of the stator 330 being made thinner. The differential apparatus 312 can be suitably arranged using the hollow portion.

In addition, in the rotating electrical machine 311, inductance is reduced compared to that in a typical teeth structure in which the teeth (iron core) between the conductor portions are provided in the stator 330. Specifically, the inductance can be reduced to $\frac{1}{10}$ or less. Therefore, reduction in mechanical time constant in the rotating electrical machine 311 can be achieved. For example, improvement in responsiveness when the vehicle is started can be actualized.

Furthermore, in the rotating electrical machine 311, a circular arc-shaped magnet magnetic path is formed by an orientation that is based on the orientations of the easy axes of magnetization in the magnet unit 322. As a result, the magnetic flux on the d-axis can be made stronger. The torque of the rotating electrical machine 311 can be increased even through use of a thin magnet. In this case, the hollow portion on the inner side in the radial direction of the magnetic circuit portion that is configured by the rotor 320 and the stator 330 can be expanded. The differential apparatus 312 can be suitably arranged using the hollow portion.

Because the rotating electrical machine 311 is the outer-rotor-type rotating electrical machine, inertia in the rotating state is greater than that of an inner-rotor-type rotating electrical machine. Therefore, the low-vibration wheel driving apparatus 310 can be actualized.

The electrical component 343 (electrical component) that configures the electric power converter is arranged in an annular shape in the annular space that is formed on the inner side in the radial direction of the magnetic circuit portion that is configured by the rotor 320 and the stator 330, and the outer side in the radial direction of the differential case 371. As a result, in the rotating electrical machine 311, the rotor 320, the stator 330, the electrical component 343, and the differential apparatus 312 are arranged in the radial direction of the rotating electrical machine 311 in a stacked state. In this case, a functionally consolidated wheel driving apparatus 310 can be suitably actualized while the annular space that is formed around the axles 303 and 304 inside the rotating electrical machine 311 is even more effectively used.

The differential case 371 is supported so as to freely rotate by the bearing 361 that is provided between the inner case 342 and the differential case 371 that are concentric with each other. In this case, through use of the case member (the outer case 341 and the inner case 342) that houses the electrical component 343, the bearing 361 can be suitably arranged in the stacked state in addition to the rotor 320 and the stator 330 of the rotating electrical machine 311, the differential apparatus 312, and the case member.

In the outer case 341 of the inverter unit 340, the stator 330 is fixed to the outer peripheral surface of the cylindrical portion 344, and the electrical component 343 (electric power converter) is arranged so as to be placed along the inner peripheral surface. Furthermore, the cooling water path 349 (coolant path) is formed in the cylindrical portion 344 of the outer case 341. In this case, as a result of the cooling water being sent through the cooling water path 349 that is provided in the cylindrical portion 344 of the outer case 341 that is positioned in an annular shape around the axles 303 and 304, the electrical component 343 can be suitably cooled.

The housing member H forms a closed space. In the housing member H, the lubricating oil that flows in from the circulation path 355 via the heat releasing apparatus 357 is sent through the outer side in the radial direction of the cooling water path 349. As a result, in the wheel driving apparatus 310, cooling of the electrical component 343 by the cooling water, and lubrication and cooling of each section in the housing member H by the lubricating oil can be suitably performed. In this case, the electrical component 343 and the stator 330 are mainly cooled by the cooling water that flows through the cooling water path 349. At the same time, the electrical component 343 and the stator 330 are cooled by the lubricating oil that flows on the outer side in the radial direction of the coolant water path 349 (the periphery of the outer case 341). In addition, in this case, lubrication and cooling of each section by the lubricating oil can be suitably performed while the lubricating oil is shared between the rotating electrical machine 311 and the differential apparatus 312.

Because the differential case 371 of the differential apparatus 312 is fixed to the rotor 320, the differential case 371 is rotated by the rotation of the rotor 320 at the same rotation speed. That is, the axles 303 and 304 can be rotated at a reduction ratio of 1 in relation to the rotation of the rotating electrical machine 311. In this case, the wheel driving apparatus 310 of which responsiveness of output to the axle side is favorable can be actualized while high-torque output to the axle side by the rotating electrical machine 311 becomes possible.

(Modification 1 of the Wheel Driving Apparatus)

Figure 49:
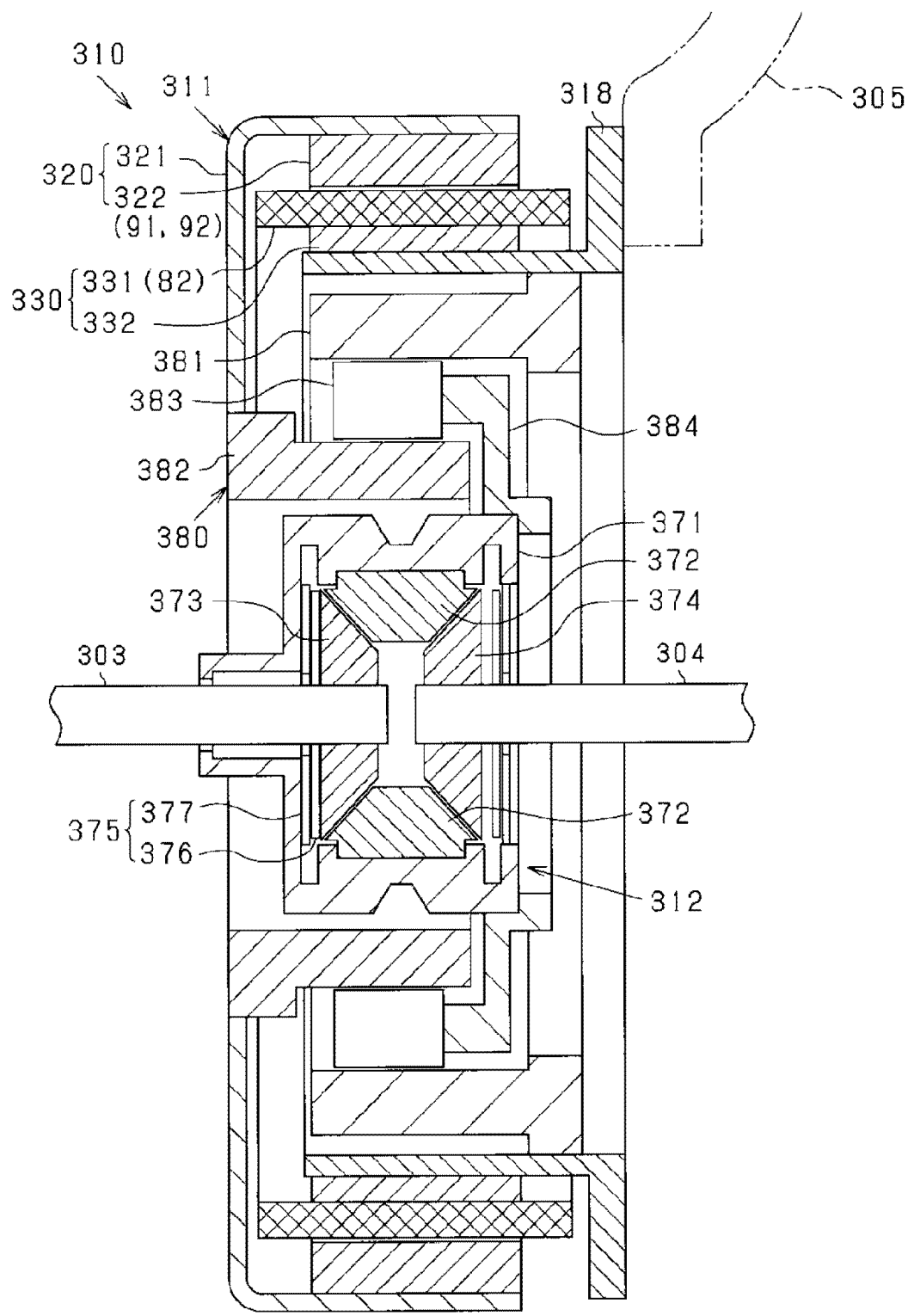
FIG. 49 is a sectional view which illustrates a configuration of a modification 1 of the wheel driving apparatus.

FIG. 49 is a sectional view which illustrates a configuration of the wheel driving apparatus 310 of another example. In the wheel driving apparatus 310 shown in FIG. 49, as a difference with the configuration in FIG. 46, a planetary gear mechanism 380 that serves as a transmission apparatus is provided. The planetary gear mechanism 380 is integrally provided in the rotating electrical machine 311.

In FIG. 49, the rotating electrical machine 311 includes a substantially circular cylindrical housing 318 that is fixed to the vehicle body portion of the vehicle 300, with the stay 305 therebetween. The stator 330 is fixed on an outer side in the radial direction of the housing 318. A configuration in which the magnet unit 322 of the rotor 320 is arranged on the outer side in the radial direction of the stator 330 is identical to the configuration described above. Electrical components such as the semiconductor modules 346, the control board 347, and the capacitor module 348 are not shown. However, for example, these electrical components are provided in a position away from the rotating electrical machine 311 in the radial direction or the axial direction.

In the rotating electrical machine 311 according to the present embodiment, the planetary gear mechanism 380 that decelerates the rotation of the rotor 320 at a predetermined reduction ratio is provided in an annular space that is formed on an inner peripheral side of the housing 318. In this case, unlike that in the configuration in FIG. 46, in the rotating electrical machine 311, the magnetic holder 321 of the rotor 320 is not fixed to the differential case 371 of the differential apparatus 312. The rotation of the rotor 320 is decelerated by the planetary gear mechanism 380 and transmitted to the differential case 371 side.

The planetary gear mechanism 380 includes a ring gear 381 that has internal teeth, a sun gear 382 that has external teeth, a plurality of pinion gears 383 that are arranged between the ring gear 381 and the sun gear 382 and mesh with the gears 381 and 382, and a carrier 384 that rotatably supports the plurality of pinion gears 383. The ring gear 381 is formed by a cylindrical member that is fixed to the housing 318 of the rotating electrical machine 311. The sun gear 382 is fixed to the magnet holder 321 of the rotor 320. The carrier 384 is fixed to the differential case 371. Fixing of the ring gear 381, the sun gear 382, and the carrier 384 is performed by welding, press-fitting, or the like. Therefore, during rotation of the rotor 320, the pinion gears 383 rotate based on the rotation of the sun gear 382. In addition, the differential case 371 integrally rotates with the carrier 384 in accompaniment with the rotation of the pinion gears 383.

In the above-described configuration, the rotation of the rotating electrical machine 311, that is, the rotation of the rotor 320, is decelerated at a predetermined reduction ratio that is prescribed by the planetary gear mechanism 380. The axles 303 and 304 rotate together with the differential case 371 at the rotation speed after deceleration. In this case, in a state in which the ring gear 381 is fixed, the carrier 384 rotates in a decelerated manner in relation to the rotation of the sun gear 382 (that is, the rotation of the rotor 320). As a result, power of the differential case 371 that rotates together with the carrier 384 increases. The increased power is transmitted to the left and right axles 303 and 304 through the differential case 371. In the present configuration, it is assumed that the reduction ratio of the planetary gear mechanism 380 is set to 2, and the torque of the rotating electrical machine 311 is increased by two-fold.

Although omitted in FIG. 49, as described in FIG. 48, a configuration in which a closed space by the outer housing is formed, and the interior of the closed space is filled with a lubricating oil is also possible.

In the wheel driving apparatus 310 of the present modification, the planetary gear mechanism 380 is arranged in the annular space that is provided on the outer side in the radial direction of the differential case 371, and the inner side in the radial direction of the magnetic circuit portion that is configured by the rotor 320 and the stator 330. That is, in the rotating electrical machine 311, the rotor 320, the stator 330, the planetary gear mechanism 380, and the differential apparatus 312 are arranged in a stacked state in the radial direction of the rotating electrical machine 311. In this case, the functionally consolidated wheel driving apparatus 310 can be suitably actualized while the annular space that is formed around the axles 303 and 304 inside the rotating electrical machine 311 is even more effectively used.

In the planetary gear mechanism 380, the ring gear 381 is fixed to the vehicle body portion of the vehicle 300, the sun gear 382 is fixed to the rotor 320, and the carrier 384 is fixed to the differential case 371. In this case, the planetary gear mechanism 380 is concentrically provided in the annular space between the differential case 371 and the magnetic circuit portion in the radial direction. In a manner similar to the rotor 320 and the stator 330 of the rotating electrical machine 311, and the differential apparatus 312, the planetary gear mechanism 330 is suitably arranged in a stacked manner.

Here, unlike that in the configuration in FIG. 49, in the planetary gear mechanism 380, the sun gear may be fixed to the vehicle body portion of the vehicle 300, the ring gear is fixed to the rotor 320, and the carrier is fixed to the differential case 371. In this case, the rotation of the rotating electrical machine 311, that is, the rotation of the rotor 320 is accelerated at a predetermined increase ratio by the planetary gear mechanism 380.

(Modification 2 of the Wheel Driving Apparatus)

Figure 50:
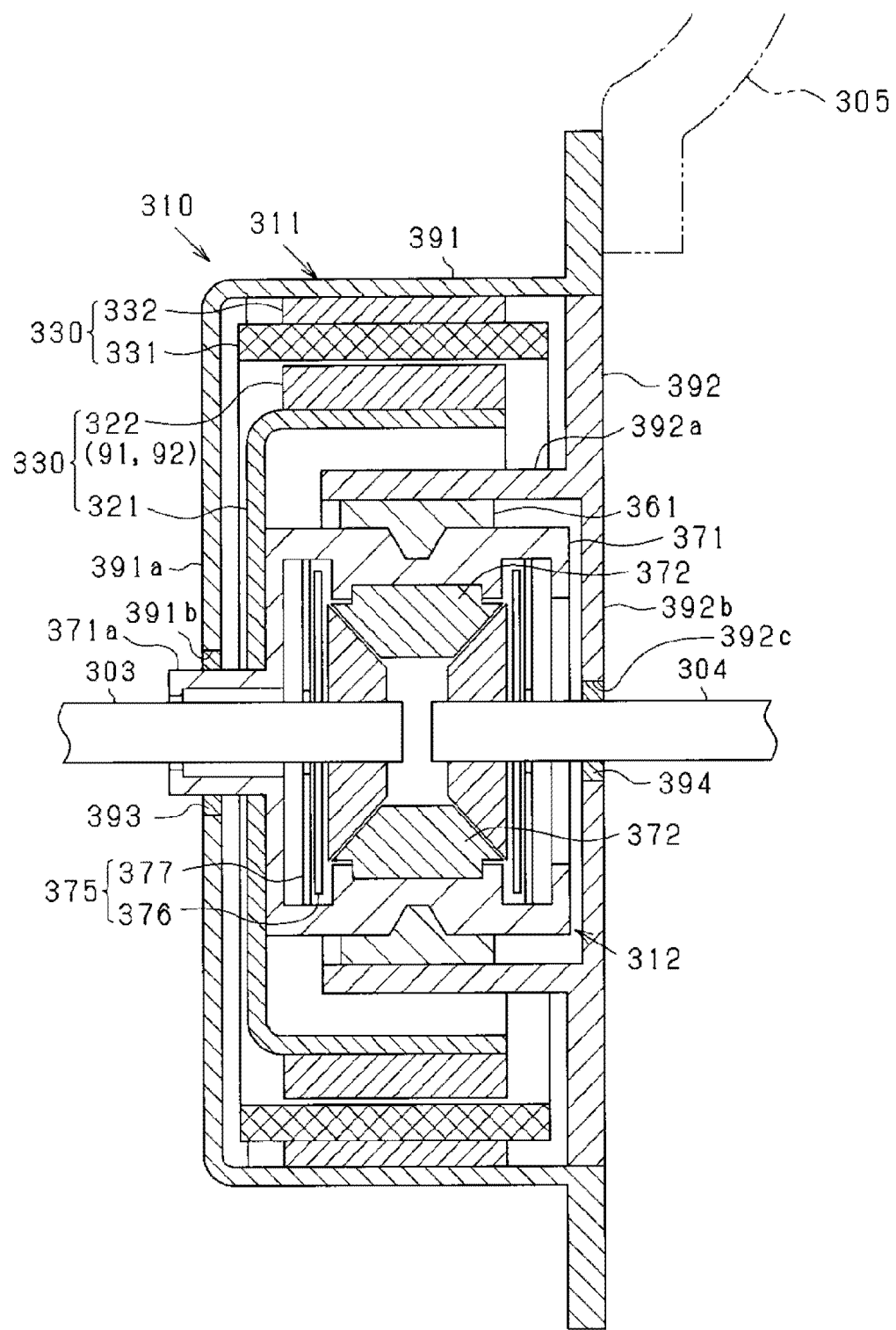
FIG. 50 is a sectional view which illustrates a configuration of a modification 2 of the wheel driving apparatus.

FIG. 50 is a sectional view which illustrates a configuration of the wheel driving apparatus 310 in which an inner-rotor-type, surface-magnet-type rotating electrical machine is used as the rotating electrical machine 311. Here, differences with the outer-rotor-type rotating electrical machine 311 described in FIG. 46 will be described.

The rotating electrical machine 311 in FIG. 50 has a bottomed, cylindrical outer housing 391 that is fixed to the vehicle body portion of the vehicle 300, with the stay 305 therebetween. The stator 330 is fixed on an inner side in the radial direction of the outer housing 391. The stator 330 includes the cylindrical stator winding 331 and the stator core 332 that is fixed on the outer side in the radial direction of the stator winding 331. The stator core 332 is fixed to an inner peripheral surface of the outer housing 391. In addition, the rotor 320 is rotatably provided on the inner side in the radial direction of the stator 330 with a predetermined air gap therebetween. The rotor 320 includes the magnet holder 321 and the magnet unit 322 that is fixed to the outer side in the radial direction of the magnet holder 321.

In the outer housing 391, an inner housing 392 that has a substantially cylindrical shape and is smaller in diameter than the outer housing 391 is fixed on the inner side in the radial direction of the outer housing 391. The outer housing 391 and the inner housing 392 are concentrically provided. The rotor 320 and the stator 330 are arranged in an annular space between the housings 391 and 392 in the radial direction. The differential apparatus 312 is provided on an inner side of a cylindrical portion 392a of the inner housing 392. In addition, the circular annular bearing 361 is provided on the outer peripheral side of the differential case 371, between the differential case 371 and an inner peripheral surface of the inner housing 392. As a result, the differential case 371 is supported by the bearing 361 so as to be capable of rotating in relation to the inner housing 392.

The outer housing 391 has an end plate portion 391a on one end side in the axial direction. In a center portion of the end plate portion 391a, an opening 391b into which the small-diameter cylinder portion 371a of the differential case 371 is inserted is provided. A sealing member 393 that seals a space between the end plate portion 391a and the outer peripheral surface of the small-diameter cylinder portion 371a is provided in the opening 391b. In addition, the inner housing 392 has a shielding portion 392b that shields an opening portion that is a side of the differential apparatus 312. In an opening 392c that is provided in a center portion of the shielding portion 392b, a sealing member 394 that seals a space between the shielding portion 392b and the outer peripheral surface of the axle 304 is provided. For example, the sealing members 393 and 394 may be sliding seals that are composed of a resin material.

A closed space that is formed by the outer housing 391 and the inner housing 392 may be filled with a lubricating oil.

Here, in the rotating electrical machine 311 shown in FIG. 50, the electrical component 343 that configures the electric power converter (inverter circuit) and the planetary gear mechanism 380 that serves as the transmission apparatus are not provided on the inner side in the radial direction of the magnetic circuit portion, that is, the inner side of the rotor 320. However, this configuration can be modified. For example, an annular space on the inner side in the radial direction of the magnetic circuit portion may be expanded by radial-direction dimensions of the rotor 320 and the stator 330 being increased, and at least either of the electrical component 343 and the planetary gear mechanism 380 is arranged in the expanded annular space.

Second Embodiment as the Wheel Driving Apparatus

Figure 51:
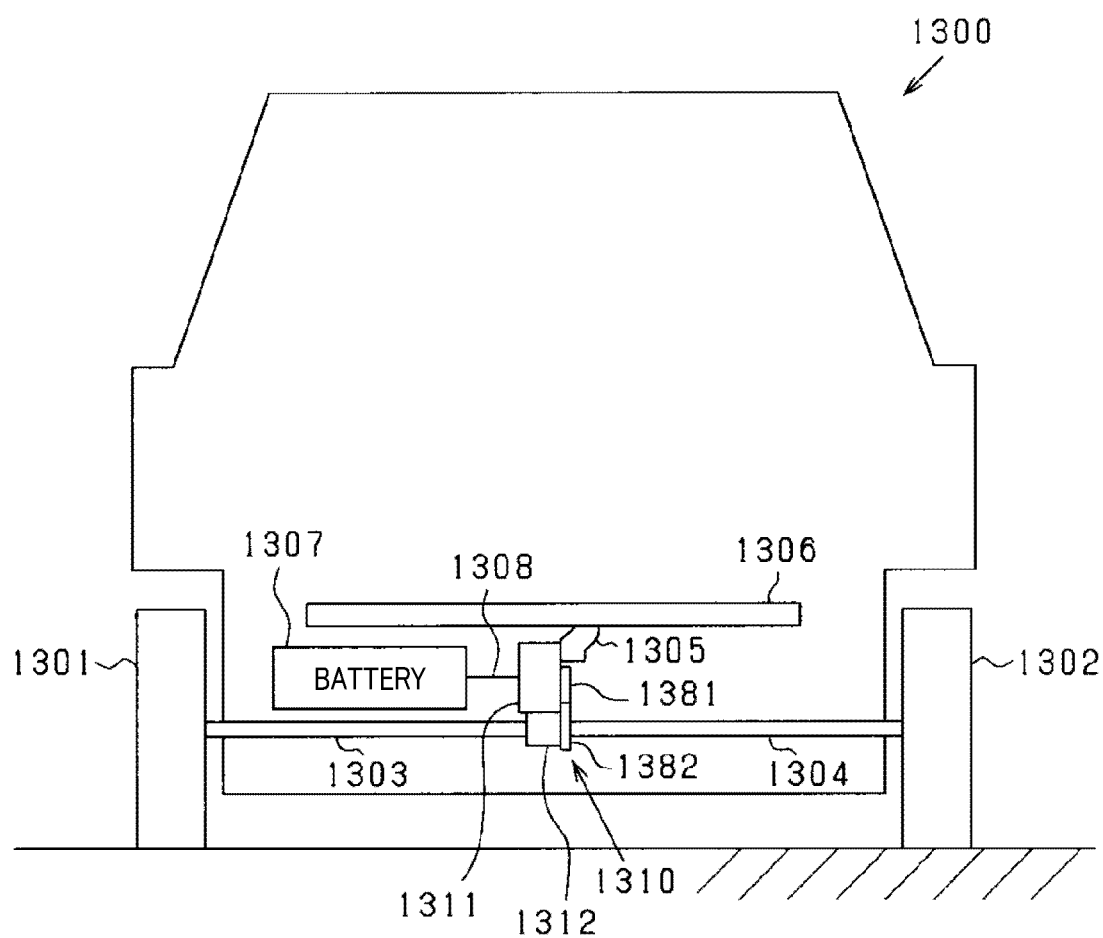
FIG. 51 is a schematic diagram which illustrates an overview of a wheel driving apparatus of a vehicle according to a second embodiment.

Next, a second embodiment of a configuration in which the rotating electrical machine is used in a wheel driving apparatus that rotates wheels of a vehicle will be described. FIG. 51 is a schematic diagram of an overview of the wheel driving apparatus.

As shown in FIG. 51, a vehicle 1300 includes left and right wheels 1301 and 1302. The wheels 1301 and 1302 are rotated by rotation of axles 1303 and 1304. The left and right axles 1303 and 1304 extend in a horizontal direction. In addition, the left and right axles 1303 and 1304 are coaxially provided and supported by a suspension apparatus, not shown, so as to freely rotate. Although not shown in FIG. 51, for example, a brake apparatus that is configured by a disk brake is provided on an extension in an axial direction from each of the axles 1303 and 1304.

A wheel driving apparatus 1310 includes a rotating electrical machine 1311 and a differential apparatus 1312. Rotational power is applied to each of the left and right wheels 1301 and 1302 by rotation of the rotating electrical machine 1311. The wheel driving apparatus 1310 is fixed to a vehicle body portion (such as a vehicle body frame 1306) of the vehicle 1300, with a stay 1305 therebetween. A battery 1307 is mounted in the vehicle 1300. The battery 1307 is connected to the rotating electrical machine 1311 via an electric power line 1308.

For example, the vehicle 1300 is a four-wheeled vehicle that has front-side wheels and rear-side wheels. The wheel driving apparatus 1310 is provided in either of the front-side wheels and the rear-side wheels. That is, either of the front-side wheels and the rear-side wheels is driving wheels, and the other is driven wheels. However, the wheel driving apparatus 1310 may be provided in both the front-side wheels and the rear-side wheels in the vehicle 1300. In addition, the vehicle 1300 may be a vehicle that includes only a single set of the pair of left and right wheels 1301 and 1302. Alternatively, the vehicle 1300 may be a vehicle that includes three sets or more of the pair of left and right wheels 1301 and 1302.

Figure 52:
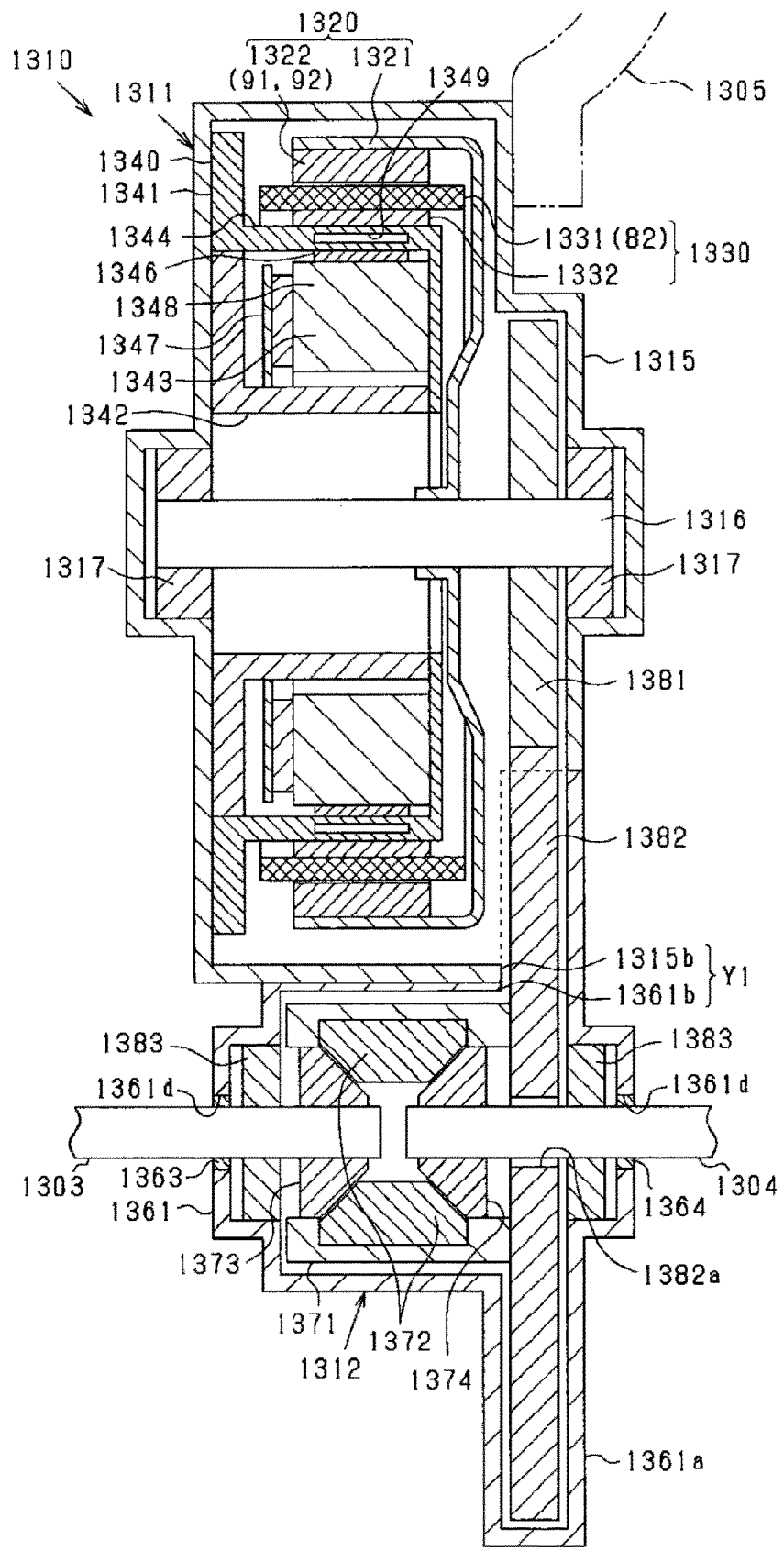
FIG. 52 is a longitudinal sectional view which illustrates a configuration of the wheel driving apparatus.
Figure 53:
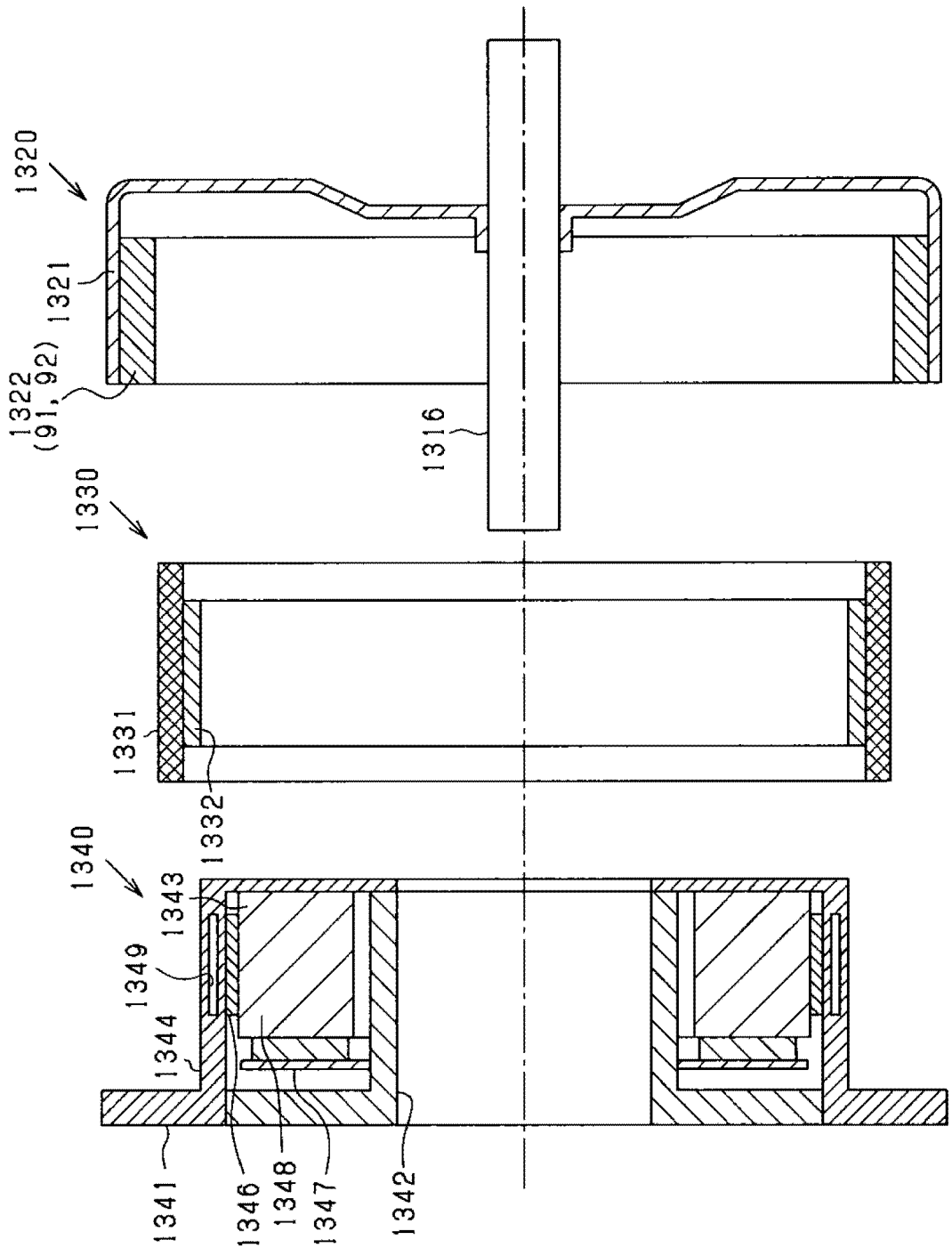
FIG. 53 is an exploded sectional view which illustrates a rotating electrical machine in an exploded manner.
Figure 54:
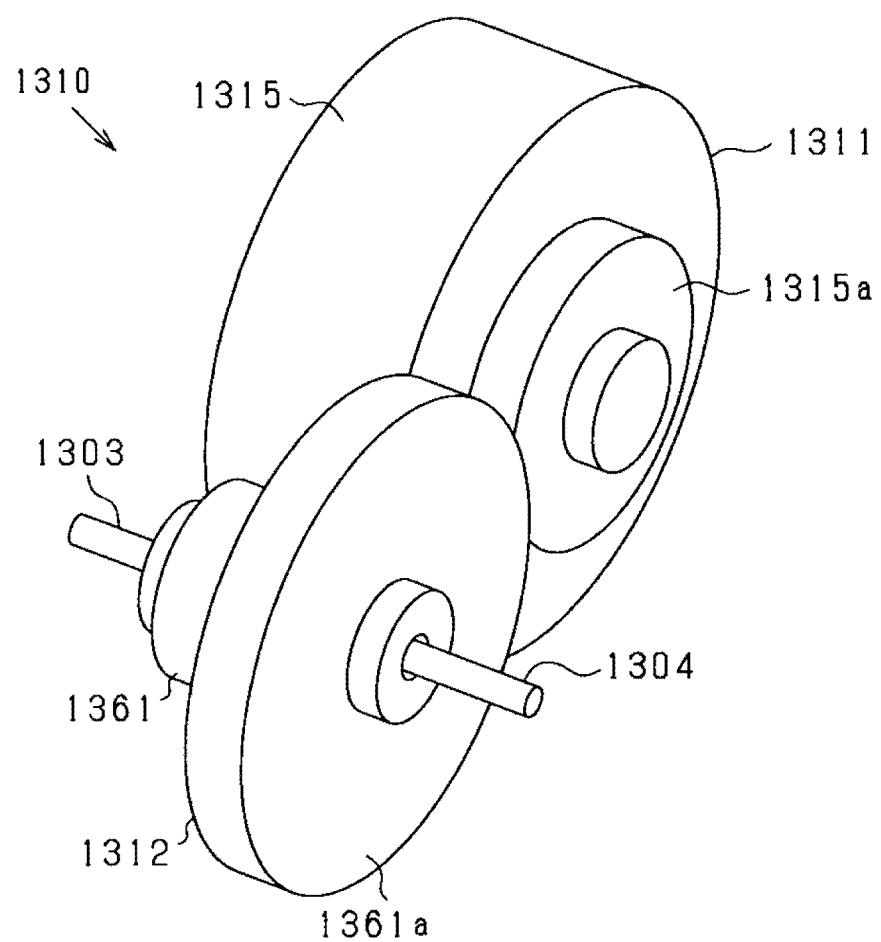
FIG. 54 is a perspective view which illustrates an outer appearance of the wheel driving apparatus.

Next, a detailed configuration of the wheel driving apparatus 1310 will be described. FIG. 52 is a longitudinal sectional view which illustrates the configuration of the wheel driving apparatus 1310 on a vertical cross-section that is taken at a position that is the rotational center of the axles 1303 and 1304. FIG. 53 is an exploded sectional view which illustrates the rotating electrical machine 1311 of the wheel driving apparatus 131 in an exploded manner. FIG. 54 is a perspective view which illustrates an outer appearance of the wheel driving apparatus 1310. According to the present embodiment, in the wheel driving apparatus 1310, the rotating electrical machine 1311 and the differential apparatus 1312 are capable of rotating on center axes that differ from each other. The respective center axes are provided in parallel with each other.

The rotating electrical machine 1311 is the outer-rotor-type, surface-magnet-type rotating electrical machine. As a basic configuration, the rotating electrical machine 1311 includes a rotor 1320, a stator 1330, and an inverter unit 1340. The rotating electrical machine 1311 includes a motor housing 1315 that forms an outer shell thereof. In addition, the rotating electrical machine 1311 includes the rotor 1320, the stator 1330, and the inverter unit 1340 in a state in which the rotor 1320, the stator 1330, and the inverter unit 1340 are housed inside the motor housing 1315. The rotor 1320, the stator 1330, and the inverter unit 1340 are provided so as to be stacked inward and outward in the radial direction. For example, as a result of the motor housing 1315 being fixed to the stay 1305, the rotating electrical machine 1311 is fixed to a vehicle main body. The motor housing 1315 corresponds to a "first housing".

Main configurations of the rotating electrical machine 1311 are similar to those of the above-described rotating electrical machine 10, shown in FIG. 1 and the like. Here, the configuration of the rotating electrical machine 311 will be described in comparison to that of the rotating electrical machine 10, while descriptions of similar configurations are omitted as appropriate. Here, the rotor 40, the stator 50, and the inverter unit 60 of the rotating electrical machine 10 shown in FIG. 1 and the like respectively correspond to the rotor 1320, the stator 1330, and the inverter unit 1340 of the rotating electrical machine 1311 according to the present embodiment. However, the number of poles, the number of phases, and the dimension (size) of each component can be set as appropriate.

The rotor 1320 includes a magnet holder 1321 and an annular magnet unit 1322 that is provided on an inner side in the radial direction of the magnet holder 1321. The magnet holder 1321 has a substantially cylindrical shape and provides a function as a magnet holding member. The magnet holder 1321 is fixed to a rotation shaft 1316 so as to be capable of integrally rotating therewith. The rotation shaft 1316 is capable of freely rotating as a result of a pair of bearings 1317 that are provided inside the motor housing 1315. According to the present embodiment, the rotating electrical machine 1311 is provided so as to be oriented such that the rotation shaft 1316 is parallel to the axles 1303 and 1304.

The magnet unit 1322 has a circular annular shape and is configured by a plurality of permanent magnets that are arranged such that polarities alternately change along the circumferential direction of the rotor 1320. That is, the magnet unit 1322 has a plurality of magnetic poles in the circumferential direction. For example, the permanent magnets are fixed to the magnet holder 1321 by adhesion. The magnet unit 1322 has the configuration that is described as the magnet unit 42 in FIG. 8 and FIG. 9 according to the first embodiment. As the permanent magnet, a sintered neodymium magnet of which the intrinsic coercive force is equal to or greater than 400 [kA/m] and the remanent flux density Br is equal to or greater than 1.0 [T] is used.

In a manner similar to the magnet unit 42 in FIG. 9 and the like, the magnet unit 1322 has the first magnet 91 and the second magnet 92, each of which is an anisotropic magnet and differs from the other in polarity. As described in FIG. 8 and FIG. 9, in each of the magnets 91 and 92, the orientation of the easy axis of magnetization differs between the d-axis side (a portion closer to the d-axis) and the q-axis side (a portion closer to the q-axis). The orientation of the easy axis of magnetization on the d-axis side is an orientation that is close to a direction that is parallel to the d-axis. The orientation of the easy axis of magnetization on the q-axis side is an orientation that is close to a direction that is orthogonal to the q-axis. In addition, a circular arc-shaped magnet magnetic path is formed by an orientation that is based on the orientations of the easy axes of magnetization. Here, in each of the magnets 91 and 92, the easy axis of magnetization may be oriented to be parallel to the d-axis on the d-axis side. The easy axis of magnetization may be oriented to be orthogonal to the q-axis on the q-axis side.

In each of the magnets 91 and 92, magnet magnetic flux on the d-axis is made stronger on the d-axis, and change in magnetic flux near the q-axis is suppressed. As a result, the magnets 91 and 92 in which changes in surface magnetic flux become gradual from the q-axis towards the d-axis at each magnetic pole can be suitably actualized. Here, as the magnet unit 1322, the configuration of the magnet unit 42 shown in FIG. 22 and FIG. 23 or the configuration of the magnet unit 42 shown in FIG. 30 can also be used.

The stator 1330 is provided on an inner side in the radial direction of the rotor 1320. The stator 1330 includes a multiple-phase (such as a six-phase) stator winding 1331 that is formed so as to be wound into a substantially cylindrical (annular) shape, and a stator core 1332 that is arranged on an inner side in the radial direction of the stator winding 1331 and serves as a base member. The stator winding 1331 is arranged so as to oppose the circular annular magnet unit 1322 with a predetermined air gap therebetween.

In a manner similar to the above-described stator 50, the stator 1330 is characterized by having a slot-less structure. The stator 1330 also has a flattened conductor structure in the stator winding 1331. The stator 1330 has a configuration that is similar to that of the stator 50 shown in FIG. 8 to FIG. 16. That is, in a manner similar to the stator core 52, the stator core 1332 is formed by a plurality of electromagnetic steel plates being stacked in the axial direction and has a circular cylindrical shape that has a predetermined thickness in the radial direction. The stator winding 1331 is assembled on an outer side in the radial direction that is the rotor 1320 side of the stator core 1332. The stator winding 1331 has a configuration that is similar to that of the stator winding 51. An outer peripheral surface of the stator core 1332 has a curved shape with no unevenness. A plurality of conductors (conductor groups) are arranged on the outer peripheral surface of the stator core 1332 at a predetermined interval in the circumferential direction.

The stator 330 is that in which any of the following (A) to (C) is used.

(A) In the stator 330, an inter-conductor member is provided between conductor portions in the circumferential direction. In addition, a magnetic material is used as the inter-conductor member. The magnetic material meets a relation of Wt×Bs≤Wm×Br where Wt is a width dimension in the circumferential direction of the inter-conductor member for a single magnetic pole, Bs is the saturation magnetic flux density of the inter-conductor member, Wm is a width dimension in the circumferential direction of a magnet portion for a single magnetic pole, and Br is the remanent flux density of the magnet portion.

(B) In the stator 1330, an inter-conductor member is provided between conductor portions in the circumferential direction. In addition, as the inter-conductor member, a non-magnetic material is used.

(C) In the stator 1330, an inter-conductor member is not provided between conductor portions in the circumferential direction.

As a result of the configuration of the stator 1330 such as this, inductance is reduced, compared to that of a rotating electrical machine that has a typical teeth structure in which teeth (iron core) for establishing a magnetic path are provided between conductor portions as the stator winding Specifically, inductance can be reduced to ¹/₁₀ or less.

The configuration of the conductors on the stator core 1332 and the conductor groups that compose a plurality of layers in the radial direction (that is, the configuration of the conductor portions) is similar to that of the conductors 82 (conductor groups 81) shown in FIG. 10 and FIG. 11, described above. Each conductor 82 has a horizontal cross-section that has a flattened rectangular shape. A molding material (insulating member) that is composed of a resin or the like is interposed between the conductors 82 (conductor groups 81) that are arranged in the radial direction. In this case, the stator winding 1331 is integrally molded together with the stator core 1332 by the molding material. Here, as shown in FIG. 13, the conductor 82 is configured as a collection of a plurality of wires 86. The stator winding 1331 is formed by being wound in a circular annular shape by distributed winding.

The inverter unit 1340 includes a cylindrical outer case 1341 that is fixed to the motor housing 1315, an inner case 1342 that is formed into a cylindrical shape that is smaller in diameter than the outer case 1341 and is fixed to the outer case 1341, and an electrical component 1343 that is housed in an annular housing space that is surrounded by the outer case 1341 and the inner case 1342. The configuration of the inverter unit 1340 substantially corresponds to that of the inverter unit 60 shown in FIG. 6. However, the inverter unit 1340 differs in that the electrical component 1343 is housed in the annular space that is surrounded by the outer case 1341 and the inner case 1342.

For example, the outer case 1341 and the inner case 1342 are composed of carbon fiber reinforced plastic (CFRP). The outer case 1341 has a cylindrical portion 1344 that extends in the axial direction. The stator core 1332 is assembled on an outer side in the radial direction of the cylindrical portion 1344. As a result, the stator 1330 and the inverter unit 1340 are integrated.

The electrical component 1343 includes a plurality of semiconductor modules 1346, a control board 1347, and a capacitor module 1348. These electrical components configure an inverter circuit (electric power converter). As a result of the inverter circuit that is configured by the electrical component 1343, a power-running function for sending a current to each phase winding of the stator winding 1331 for each phase and rotating the rotor 1320, and a power generation function for outputting generated electric power by a three-phase alternating current of the stator winding 1331 that flows in accompaniment with the rotation of the axles 1303 and 1304 are actualized. Here, the electrical component 1343 may provide only either of the power-running function and the power generation function.

The capacitor module 1348 is configured by a plurality of smoothing capacitors being arranged in an annular shape. The plurality of semiconductor modules 1346 are arranged in the circumferential direction on an outer peripheral surface of the capacitor module 1348. For example, the semiconductor module 1346 includes a semiconductor switching element such as a MOSFET or an IGBT. The semiconductor modules 1346 are arranged so as to be sandwiched between the cylindrical portion 1344 and the capacitor module 1348.

In addition to or instead of the above-described semiconductor modules 1346, control board 1347, and capacitor module 1348, other electrical components related to motor driving, such as a transformer and an angle sensor, may be housed in the annular space formed by the outer case 1341 and the inner case 1342.

Furthermore, a cooling water path 1349 (coolant path) through which cooling water that serves as a coolant flows is formed in the cylindrical portion 1344 (annular outer wall portion) of the outer case 1341. Heat that is generated in the semiconductor modules 1346 is released to the cooling water that flows through the cooling water path 1349. The cooling water path 1349 is formed in an annular shape so as to surround the electrical component 1343 (the semiconductor modules 1346 and the capacitor module 1348).

Figure 55:
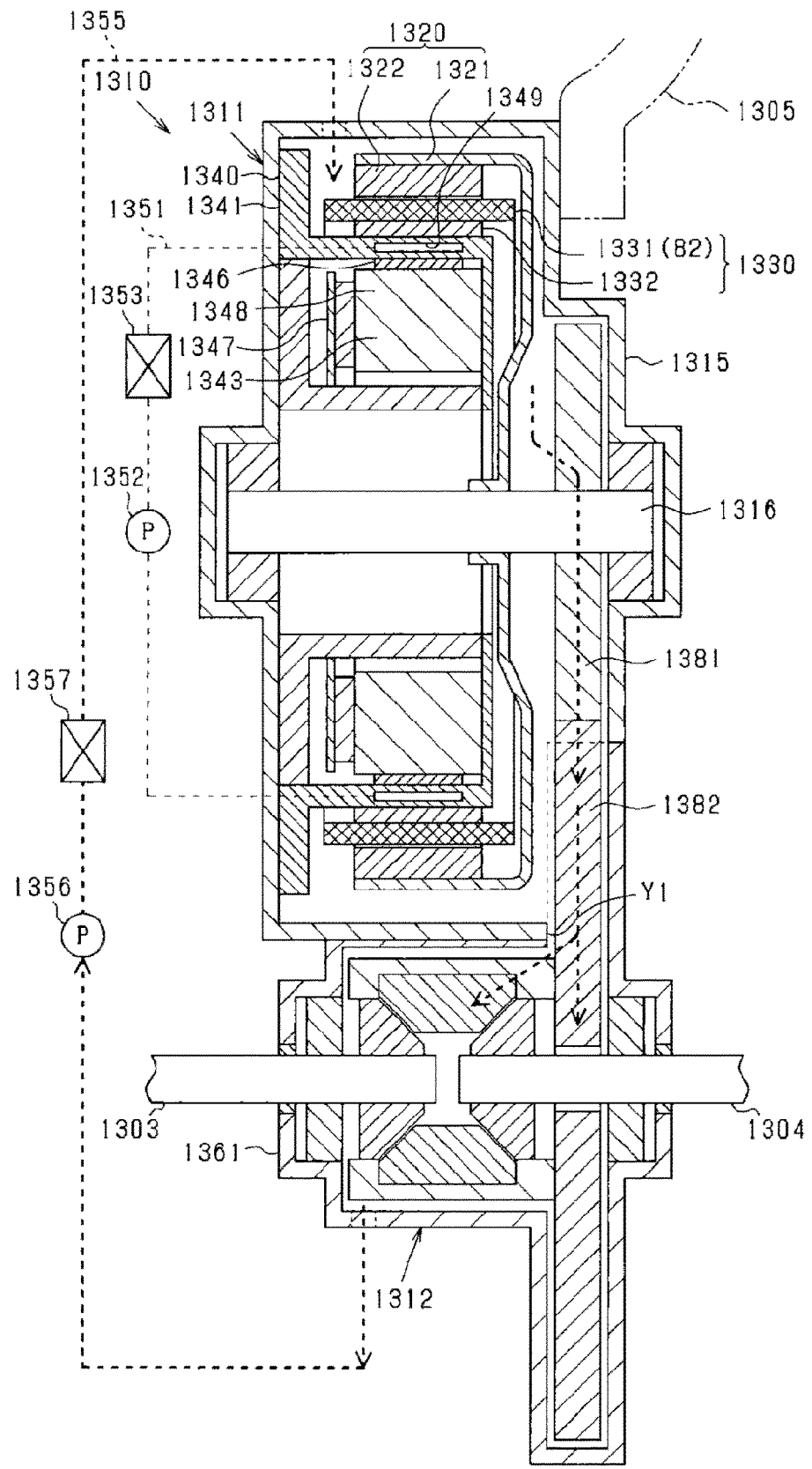
FIG. 55 is a diagram which illustrates a configuration related to cooling in the wheel driving apparatus.

As shown in FIG. 55, a water cooling system that sends the cooling water through the cooling water path 1349 in the outer case 1341 includes a circulation path 1351 that circulates the cooling water through a path that includes the cooling water path 1349. In addition, the water cooling system includes a pump 1352 and a heat releasing apparatus 1353 that are provided on the circulation path 1351. The pump 1352 is an electric pump. For example, the heat releasing apparatus 1353 is a radiator that releases heat from the cooling water into the atmosphere. In the outer case 1341, the cooling water path 1349 is provided in an annular shape so as to surround the electrical component 1343. When the pump 1352 is driven, the cooling water flows in from an inlet portion that is provided in the annular cooling water path 1349. The cooling water flows out from an outlet portion.

The stator 1330 is arranged on the outer side of the cylindrical portion 1344. The electrical component 1343 is arranged on the inner side of the cylindrical portion 1344. Therefore, heat from the stator 1330 is transmitted to the cylindrical portion 1344 from the outer side thereof. In addition, heat from the electrical component 1343 (such as heat from the semiconductor modules 1346) is transmitted to the cylindrical portion 3144 from the inner side. In this case, the stator 1330 and the electrical component 1343 can be simultaneously cooled. Heat from heat generating members in the rotating electrical machine 1311 can be efficiently released.

Returning to FIG. 52, in the rotation shaft 1316, a first gear 1381 is fixed to one end side in the axial direction thereof. The first gear 1381 is fixed to the rotation shaft 1316 by press-fitting or key coupling. For example, the first gear 1381 is composed of a spur gear, a helical gear, or a herringbone gear. The first gear 1381 is housed in a gear housing portion 1315a that is molded into a circular plate shape in a protruding manner in the motor housing 1315. The first gear 1381 rotates together with the rotor 1320 and the rotation shaft 1316 in accompaniment with rotation driving of the rotating electrical machine 1311 inside the motor housing 1315.

Here, in the configuration shown in FIG. 52, the magnet holder 1321 and the first gear 1381 are fixed on the same side in the left/right direction of the rotation shaft 1316. That is, the circular cylindrical open portion of the magnet holder 1321 is on a side (left side in FIG. 52) opposite the first gear 1381. However, instead of the configuration shown in FIG. 52, the magnet holder 1321 and the first gear 1381 may be fixed on differing sides in the left/right direction of the rotation shaft 1316. That is, the circular cylindrical open portion of the magnet holder 1321 may be on the same side (right side in FIG. 52) as the first gear 1381.

Next, the differential apparatus 1312 will be described.

The differential apparatus 1312 includes a differential housing 1361 that forms an outer shell thereof. As a result of the differential housing 1361 being fixed to the motor housing 1315 of the rotating electrical machine 1311, the rotating electrical machine 1311 and the differential apparatus 1312 are integrated as the wheel driving apparatus 1310. The housings 1315 and 1316 on the rotating electrical machine 1311 side and the differential apparatus 1312 side are arranged side-by-side in a direction orthogonal to the axial direction of the axles 1303 and 1304. As shown in FIG. 54, the motor housing 1315 and the differential housing 1361 are each formed into a circular cylindrical shape. Outer surfaces of the motor housing 1315 and the differential housing 1361 are joined to each other and integrated. The differential housing 1361 is provided so as to surround a differential case 1371 and a second gear 1382, described hereafter. The differential housing 1361 corresponds to a "second housing".

The second gear 1382 that is capable of coaxially rotating with the axles 1303 and 1304 is housed in the differential housing 1361. For example, in a manner similar to the first gear 1381, the second gear 1382 is composed of a spur gear, a helical gear, or a herringbone gear. The second gear 1382 is provided in a meshed state with the first gear 1381. The second gear 1382 is housed in a gear housing portion 1361a that is molded into a circular plate shape in the differential housing 1361. The second gear 1382 rotates together with the first gear 1381. The first gear 1381 and the second gear 1382 configure a transmission apparatus.

According to the present embodiment, a number of teeth S1 of the first gear 1381 and a number of teeth S2 of the second gear 1382 are S1<S2. During rotation driving of the rotating electrical machine 1311, the rotation speed of the rotating electrical machine 1311 is decelerated based on a reduction ratio of the transmission apparatus (the first gear 1381 and the second gear 1382). According to the present embodiment, the reduction ratio is set to 8 or less. More specifically, the reduction ratio is set to about 3. However, the gear ratio can be arbitrarily set. A setting in which the reduction ratio is set to 10 or greater or a setting in which the gear ratio is an increase ratio (a reduction ratio of less than 1) can also be made.

A hole 1382a is formed in a center of the second gear 1382. The axle 1304 is inserted into the hole 1382a in a non-contacting state. In addition, a bearing 1383 that rotatably supports each of the left and right axles 1303 and 1304 is housed inside the differential housing 1361.

Here, the housings 1315 and 1361 on the rotating electrical machine 1311 side and the differential apparatus 1312 side are fixed to each other. In addition, spaces within the housings 1315 and 1361 are interconnected by a communicating portion Y1. Specifically, openings 1315b and 1361b are respectively provided in the housings 1315 and 1361 on the respective coupling sides. The openings 1315b and 1361b are interconnected as the communicating portion Y1. The first gear 1381 and the second gear 1382 are in the meshed state through the communicating portion Y1.

The differential housing 1361 is provided with insertion holes 1361c and 1361d into which the axles 1303 and 1304 are inserted. Sealing members 1363 and 1364 that seal spaces between the differential housing 1361 and the outer peripheral surfaces of the axles 1303 and 1304 are provided in the insertion holes 1361c and 1361d. For example, the sealing members 1363 and 1364 may be sliding seals that are composed of a resin material.

The differential apparatus 1312 includes the differential case 1371, a plurality of (such as two) pinion gears 1372 that are provided inside the differential case 1371, and a pair of side gears 1373 and 1374 that are also provided inside the differential case 1371 and are respectively coupled with the left and right axles 1303 and 1304 by spline fitting or press fitting.

The differential case 1371 is fixed to a side surface of the second gear 1382. As a result, the differential case 1371 rotates together with the second gear 1382. The plurality of pinion gears 1372 are each composed of a bevel gear. The pinion gear 1372 is arranged such that a tooth flank faces the center of the differential case 1371. Each pinion gear 1372 is provided inside the differential case 1371 so as to be capable of rotating with a direction that is perpendicular to the axial direction of the axles 1303 and 1304 (such as an up/down direction in the drawing) as a rotation axis direction. During rotation of the differential case 1371, the pinion gears 1372 rotate together with the differential case 1371, with the axles 1303 and 1304 as an axial center. Here, a number of pinion gears 1372 may be arbitrarily prescribed based on designed strength. The two pinion gears 1372 may be connected by a pinion shaft, and the pinion shaft is supported by a ball bearing, a needle bearing, or the like.

The pair of left and right side gears 1373 and 1374 are each composed of a bevel gear. The side gears 1373 and 3174 are arranged so as to oppose each other. The side gears 1373 and 1374 each mesh with the pinion gear 1372. From the perspective of the pinion gears 1372, the plurality of pinion gears 1372 each mesh with the two left and right side gears 1373 and 1374.

As a result of the differential apparatus 1312 configured as described above, for example, when a difference occurs in a load that is applied to each of the left and right wheels 1301 and 1302 when the vehicle 1300 turns on a curved road, that is, when a difference in rotation speed occurs between a wheel on an inner side of the curved road and a wheel on an outer side of the curved road, the pinion gears 1372 rotate with a direction orthogonal to the axial direction of the axles 1303 and 1304 as the axial center. As a result, the rotation of the differential case 1371, that is, the rotation of the second gear 1382 that is transmitted from the first gear 1381 on the rotating electrical machine 1311 side is transmitted so as to be apportioned at rotation speeds that differ between the side gears 1373 and 1374.

Here, for example, a differential limiting mechanism that is composed of a multiple-disc clutch-type LSD may be integrally provided in the differential apparatus 1312.

The position of the rotation shaft 1316 of the rotating electrical machine 1311 in relation to the axles 1303 and 1304 may be arbitrary in the vertical direction and the horizontal direction. For example, in terms of a positional relationship in the vertical direction, the rotation shaft 1316 of the rotating electrical machine 1311 may be arranged in an arbitrary position that is above the axles 1303 and 1304 in the vertical direction and below the axles 1303 and 1304 in the vertical direction. Alternatively, in terms of a positional relationship in the horizontal direction, the rotation shaft 1316 of the rotating electrical machine 1311 may be arranged in an arbitrary position that is towards the front of the vehicle or towards the rear of the vehicle in relation to the axles 1303 and 1304.

In addition, the wheel driving apparatus 1310 according to the present embodiment includes a circulation system that circulates a lubricating oil. Specifically, as shown in FIG. 55, the wheel driving apparatus 1310 is provided with a circulation path 1355 that connects the motor housing 1315 on the rotating electrical machine 1311 side and the differential housing 1361 on the differential apparatus 1312 side. A pump 1356 and a heat releasing apparatus 1357 that serves as a heat releasing portion are provided on the circulation path 1355. The pump 1356 is an electric pump. The lubricating oil is circulated through the circulation path 1355 by the pump 1356 being driven. For example, the heat releasing apparatus 1357 is a radiator that releases heat from the lubricating oil into the atmosphere. The pump 1356 may be integrally provided with the rotating electrical machine 1311. Alternatively, the pump 1356 may be integrally provided with the differential apparatus 1312.

In FIG. 55, the rotating electrical machine 1311 is arranged above the differential apparatus 1312 in the vertical direction. That is, the rotation shaft 1316 is provided above the axles 1303 and 1304 in the vertical direction. In addition, as indicated by broken-line arrows, the lubricating oil flows into the motor housing 1315 (the rotating electrical machine 1311 side) from the circulation path 1355, and the lubricating oil flows out from the differential housing 1361 to the circulation path 1355.

When the wheel driving apparatus 1310 is in operation, in accompaniment with driving of the pump 1356, the lubricating oil flows into the motor housing 1315 via the heat releasing apparatus 1357. The lubricating oil is then supplied to each section of the rotating electrical machine 1311 inside the motor housing 1315. In addition, the lubricating oil flows to the differential housing 1361 side through the communicating portion Y1 of the housings 1315 and 1361 while passing through the gears 1381 and 1382. Then, the lubricating oil subsequently passes through each section of the differential apparatus 1312 and flows out from the differential housing 1361 to the circulation path 1355. That is, the lubricating oil is circulated over a series of paths that is the circulation path 1355 the motor housing 1315 the communicating portion Y1 the differential housing 1361 the circulation path 1355. In the present configuration, the lubricating oil from which heat is released by the heat releasing apparatus 1357 is first supplied to the rotating electrical machine 1311 side. Therefore, cooling by the lubricating oil is preferentially performed in the rotating electrical machine 1311.

Instead of the above-described configuration, the rotation shaft 1316 may be provided below the axles 1303 and 1304 in the vertical direction. That is, the configuration in FIG. 55 is turned upside down. In this case, the lubricating oil flows into the differential housing 1361 (the differential apparatus 1312 side) from the circulation path 1355, and the lubricating oil flows out from the motor housing 1315 to the circulation path 1355.

In this configuration, when the wheel driving apparatus 1310 is in operation, in accompaniment with driving of the pump 1356, the lubricating oil flows into the differential housing 1361 via the heat releasing apparatus 1357. The lubricating oil is then supplied to each section of the differential apparatus 1312 inside the differential housing 1361. In addition, the lubricating oil flows to the motor housing 1315 side through the communicating portion Y1 of the housings 1315 and 1361, while passing through the gears 1381 and 1382. Then, the lubricating oil subsequently passes through each section of the rotating electrical machine 1311 and flows out from the motor housing 1315 to the circulation path 1355. In the present configuration, the lubricating oil from which heat is released by the heat releasing apparatus 1357 is first supplied to the differential apparatus 1312 side. Therefore, cooling by the lubricating oil is preferentially performed in the differential apparatus 1312.

Here, in the differential case 1371, a through hole that allows the lubricating oil to pass may be provided in the outer peripheral portion that forms the circular cylindrical shape. Either of the motor housing 1315 and the differential housing 1361 may serve as a storing portion in which the lubricating oil is stored. In addition, the interior of the motor housing 1315 and the interior of the differential housing 1361 may be filled with the lubricating oil.

The rotating electrical machine 1311 according to the present embodiment is the outer-rotor-type rotating electrical machine. Therefore, inertia in a rotating state is greater than that of an inner-rotor-type rotating electrical machine. For example, the inertia is thought to be four times that of the inner-rotor-type rotating electrical machine, at maximum. Therefore, a low-vibration wheel driving apparatus 1310 can be actualized.

In addition, as described above, inductance is reduced compared to that in a typical teeth structure in which the teeth (iron core) between the conductor portions are provided in the stator 1330. Therefore, reduction in mechanical time constant in the rotating electrical machine 1311 can be achieved. For example, improvement in responsiveness when the vehicle 1300 is started can be actualized.

Here, when an assumption is made that the inertia is increased by 4 times at maximum and inductance L is $\frac{1}{10}$ or less, compared to those of a conventional rotating electrical machine that has the typical teeth structure, in the rotating electrical machine 1311 according to the present embodiment, a mechanical response speed of wheel driving is thought to be 2.5 times that of the conventional rotating electrical machine, at minimum. In addition, based on samples by the disclosers of the present application, it is confirmed that the inductance L is $\frac{1}{100}$ or less, and the mechanical response speed of wheel driving is 25 times or greater, compared to those of a conventional product. In this case, driving torque that substantially exceeds 4,000 Nm can be actualized in the wheel driving apparatus 1310, while the reduction ratio from the rotating electrical machine 1311 to the axle side is set to 8 or less and deterioration in responsiveness is prevented.

Even when application of the wheel driving apparatus 1310 to, not only a vehicle, but also a train is considered, under an assumption that a general range of speed is about over 200 to 300 km/h at maximum, and a wheel diameter is typically about 14 to 30 inches, the rotation speed of the rotating electrical machine 1311 rarely exceeds 2,000 to 3,000 rpm, and the applicable frequency is a low frequency. When an eight-pole rotating electrical machine that is common in vehicles is used, the frequency is about half of that of a conventional product. That is, the frequency is a low frequency of about 600 Hz. In a conventional system, design is typically performed under an assumption that an eight-pole motor is driven at 1,000 to 2,000 Hz as a result of an increase ratio being set to 10 or the like.

In this regard, in the rotating electrical machine 1311 according to the present embodiment, in accompaniment with the decrease in inductance, the electrical time constant also becomes $1/10$ or less, and more specifically, $1/100$ or less compared to that of a conventional product. Therefore, the configuration is advantageous in terms of achieving multi-polarization. Here, it is known that, as a result of multipolarization of the rotating electrical machine being achieved, anti-demagnetization capability of a magnetic circuit thereof, and an amplitude of vibrations attributed to cogging torque, detent torque, and electromagnetic torque ripple are decreased. A reason for this is that a single flux loop becomes extremely small as a result of multipolarization, thereby causing magnetic resistance to decrease. In addition, a number of times that electromagnetic action and reaction occur in a single rotation increases, and a difference in mechanical amplitude decreases at a high frequency as a result of an interval between peaks of a torque waveform becoming extremely narrow.

In the rotating electrical machine 1311, the magnetic poles are preferably 16 poles or more. As a result, the vehicle 1300 can be configured to have half the noise and vibration of a conventional system.

In addition, in accompaniment with the decrease in inductance, a current frequency can be increased. When the current frequency of a conventional motor is 1,000 to 2,000 Hz, frequencies that are 10 times higher, that is, 10,000 to 20,000 Hz or higher are applicable.

As an existing rotating electrical machine, for example, a rotating electrical machine in which the inductance is about 1 mH is known. However, in a high-inductance rotating electrical machine such as this, power factor becomes poor. The current does not rise at a fast frequency. An issue may occur in that a maximum current value cannot be sent.

In the rotating electrical machine 1311 according to the present embodiment, the number of poles can be set to 80 poles or more. Therefore, compared to an eight-pole rotating electrical machine, anti-demagnetization capability can be enhanced by several fold (such as three-fold). In addition, with electromagnetic torque ripple at $1/10$ or less, the rotating electrical machine 1311 can be operated quietly and even in ultrahigh temperatures or less. Weight reduction of the rotating electrical machine 1311 is also possible. The weight can be reduced to $1/3$, compared to that of a conventional apparatus that exhibits identical performance.

In the wheel driving apparatus 1310 configured as described above, the motor housing 1315 on the rotating electrical machine 1311 side and the differential housing 1361 on the differential apparatus 1312 side are connected, and the first gear 1381 and the second gear 1382 are meshed. In this case, in particular, the spaces inside the housings 1315 and 1361 are interconnected by the communicating portion Y1, and the first gear 1381 and the second gear 1382 are in the meshed state through the communicating portion Y1. As a result, in a state in which the rotating electrical machine 1311 and the differential apparatus 1312 are arranged in proximity, power transmission therebetween can be suitably performed.

The motor housing 1315 and the differential housing 1361 are arranged side-by-side in a direction orthogonal to the axial direction of the axles 1303 and 1304. In addition, the rotating electrical machine 1311 is provided at an orientation at which the rotation shaft 1316 becomes parallel to the axles 1303 and 1304. In this case, in the wheel driving apparatus 1310 in which the rotating electrical machine 1311 and the differential apparatus 1312 are arranged side-by-side in the direction orthogonal to the axial direction of the axles 1303 and 1304, width dimensions (left/right-direction dimensions in FIG. 52) in the axial direction of the axles 1303 and 1304 can be minimized. As a result, in the vehicle 1300 in which the wheel driving apparatus 1310 is mounted, effective use of space on both sides sandwiching the wheel driving apparatus 1310 in the axial direction of the axles 1303 and 1304 can be made.

In the rotating electrical machine 1311 configured as described above, as a result of the teeth (iron core) between the conductor portions (the conductors 82 of the stator winding 1331) arranged in the circumferential direction in the stator 1330 being made smaller or eliminated, torque limitation that is attributed to magnetic saturation that occurs between the conductor portions is suppressed. In addition, as a result of the conductor portion being formed into a thin, flat shape, torque reduction is suppressed. In this case, an outer-shape dimension of the rotating electrical machine 1311 can be reduced by the stator 1330 being made thinner, while torque performance of the rotating electrical machine 1311 is maintained. Therefore, in the wheel driving apparatus 1310 in which the rotating electrical machine 1311 and the differential apparatus 1312 are arranged side-by-side, reduction of overall dimensions can be actualized.

In addition, in the rotating electrical machine 1311, inductance is reduced compared to that in a typical teeth structure in which the teeth (iron core) between the conductor portions are provided in the stator 1330. Specifically, the inductance can be reduced to $1/10$ or less. Therefore, reduction in mechanical time constant in the rotating electrical machine 1311 can be achieved. For example, improvement in responsiveness when the vehicle is started can be actualized.

Furthermore, in the rotating electrical machine 311, a circular arc-shaped magnet magnetic path is formed by an orientation that is based on the orientations of the easy axes of magnetization in the magnet unit 1322. As a result, the magnetic flux on the d-axis can be made stronger. The torque of the rotating electrical machine 1311 can be increased even through use of a thin magnet. In this case, the outer-shape dimension of the rotating electrical machine 1311 can be reduced in accompaniment with the magnet unit 1322 being made thinner. The rotating electrical machine 1311 and the differential apparatus 1312 can be compactly arranged in a consolidated manner.

The electrical component 1343 (electrical component) that configures the electric power converter is arranged in an annular shape in a hollow portion that is provided on the inner side in the radial direction of the magnetic circuit portion that is configured by the rotor 1320 and the stator 1330 in the rotating electrical machine. As a result, in the rotating electrical machine 1311, the rotor 1320, the stator 1330, and the electrical component 1343 are arranged in the radial direction of the rotating electrical machine 311 in a stacked state. The electrical component 1343 can be suitably arranged using the hollow portion that is further towards the inner side in the radial direction than the rotor 1320 and the stator 1330. As a result, reduction in size as the rotating electrical machine 1311 can be achieved. Moreover, size reduction of the wheel driving apparatus 1310 can be achieved.

In the wheel driving apparatus 1310, the lubricating oil is sent from the motor housing 1315 to the differential housing 1361 or from the differential housing 1361 to the motor housing 1315, through the communicating portion Y1. In this case, the lubricating oil can be sent between the rotating electrical machine 1311 and the differential apparatus 1312 via the first gear 1381 and the second gear 1382. As a result, lubrication and cooling can be suitably performed using the lubricating oil that is shared among the rotating electrical machine 1311, the differential apparatus 1312, and the transmission apparatus (the first gear 1381 and the second gear 1382).

The wheel driving apparatus 1310 according to the present embodiment is that in which an oil cooling mechanism is combined with a water cooling mechanism on the rotating electrical machine 1311 side. When the lubricating oil is circulated, cooling of the differential apparatus 1312 and the transmission apparatus can be performed by an amount of cooling surplus that is left over after cooling in the rotating electrical machine 1311.

In addition, the lubricating oil that flows in from the circulation path 1335 to one housing is sent to the other housing through the communicating portion Y1. The lubricating oil also flows out from the other housing to the circulation path 1355. In this case, either of the rotating electrical machine 1311 and the differential apparatus 1312 can be preferentially cooled by the lubricating oil, while the lubricating oil that is shared among the rotating electrical machine 1311, the differential apparatus 1312, and the transmission apparatus (the first gear 1381 and the second gear 1382) is used.

Modification According to the Second Embodiment

Figure 56:
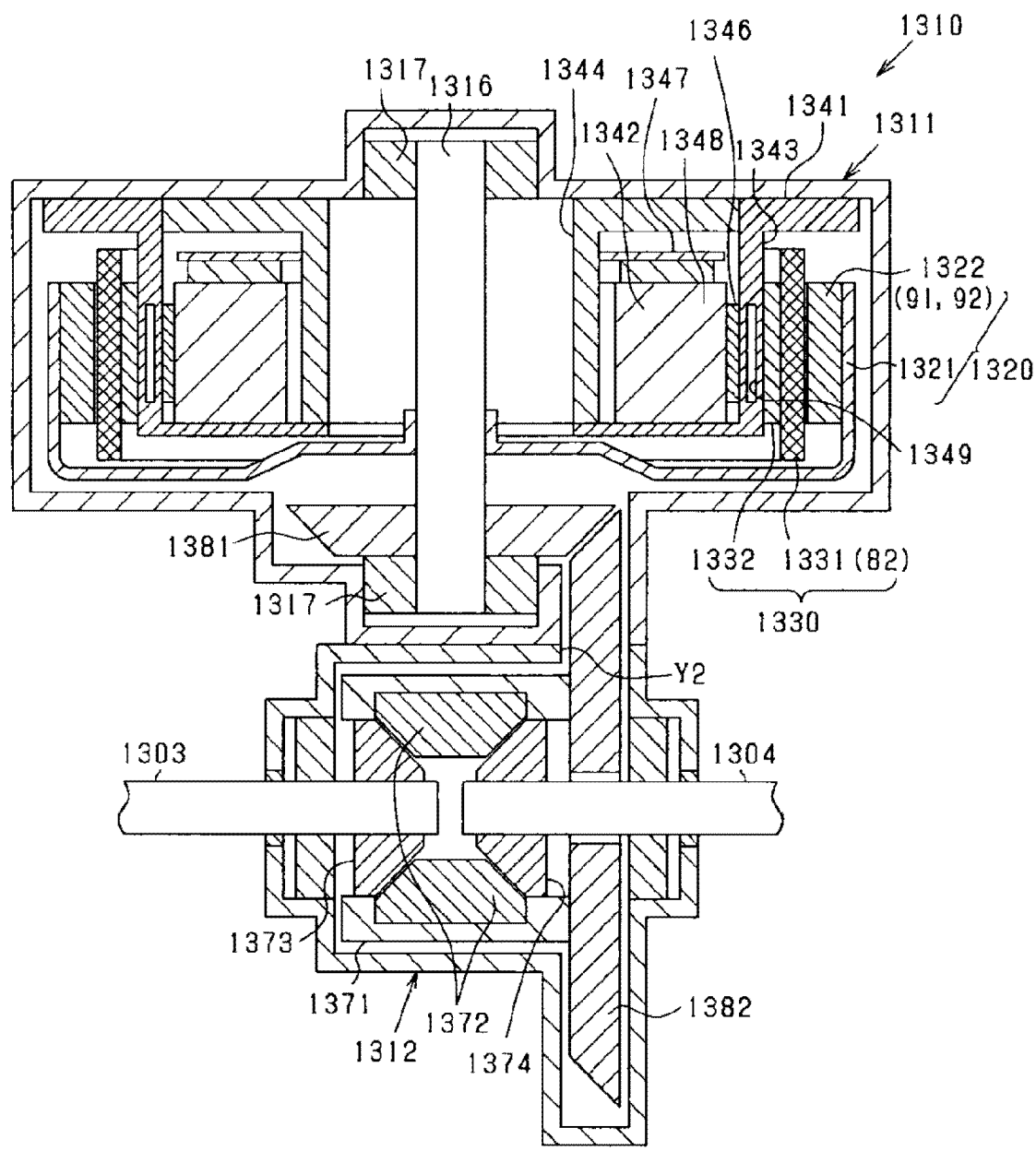
FIG. 56 is a sectional view which illustrates a configuration of a modification according to the second embodiment.

The rotating electrical machine 1311 of the present modification is shown in FIG. 56. In the rotating electrical machine 1311 in FIG. 56, in a manner similar to that in the above-described configuration shown in FIG. 52, the motor housing 1315 on the rotating electrical machine 1311 side and the differential housing 1361 on the differential apparatus 1312 side are arranged side-by-side in a direction orthogonal to the axial direction of the axles 1303 and 1304. Meanwhile, unlike that in the above-described configuration shown in FIG. 52, the motor housing 1315 and the differential housing 1361 are provided at an orientation at which the rotation shaft 1316 intersects the axles 1303 and 1304.

The first gear 1381 that is composed of a bevel gear is fixed to an end portion on the differential apparatus 1312 side of the rotation shaft 1316 of the rotating electrical machine 1311. In addition, the second gear 1382 that is composed of a bevel gear is housed inside the differential housing 1361 of the differential apparatus 1312 so as to be coaxial with the axles 1303 and 1304. The gears 1381 and 1382 are provided so as to be meshed with each other When the first gear 1381 rotates together with the rotor 1320, the second gear 1382 rotates in accompaniment, and power is transmitted to the differential apparatus 1312 side. According to the present embodiment, a rotation in the horizontal direction of the rotor 1320 is converted to a rotation in the vertical direction by the gears 1381 and 1382.

The housings 1315 and 1362 on the rotating electrical machine 1311 side and the differential apparatus 1312 side are fixed to each other. In addition, spaces inside the housings 1315 and 1361 are interconnected by a communicating portion Y2. In this case, the first gear 1381 and the second gear 1382 are in a meshed state through the communicating portion Y2. In addition, movement of the lubricating oil from one housing to the other housing can be performed in the housings 1315 and 1361 through the communicating portion Y2.

In the present modification, the motor housing 1315 and the differential housing 1361 are arranged side-by-side in a direction orthogonal to the axial direction of the axles 1303 and 1304. In addition, the rotating electrical machine 1311 is provided at an orientation at which the rotation shaft 1316 intersects the axles 1303 and 1304. In this case, in the wheel driving apparatus 1310 in which the rotating electrical machine 1311 and the differential apparatus 1312 are arranged side-by-side in a direction orthogonal to the axial direction of the axles 1303 and 1304, width dimensions (left/right-direction dimensions in FIG. 56) in the direction orthogonal to the axial direction of the axles 1303 and 1304 can be minimized. As a result, in the vehicle 1300 in which the wheel driving apparatus 1310 is mounted, effective use of space in the direction orthogonal to the axial direction of the axles 1303 and 1304 can be made.

Here, a direction in which the rotation shaft 1316 of the rotating electrical machine 1311 extends in relation to the axles 1303 and 1304 may be arbitrary in the vertical direction and the horizontal direction. For example, a configuration in which the rotation shaft 1316 extends so as to be either of above the axles 1303 and 1304 in the vertical direction and below the axles 1303 and 1304 in the vertical direction, a configuration in which the rotation shaft 1316 extends towards either of the front of the vehicle and the rear of the vehicle in relation to the axles 1303 and 1304, or the like can be actualized.

(Other Modifications)

Modifications other than those described above will be listed below.

The stator winding 51 of the rotating electrical machine 10 may be designed to have only the single straight section 83 of the conductor 82 arranged in the radial direction. Alternatively, a plurality of straight sections 83, for example, three, four, five, or six straight sections 83 may be stacked on each other in the radial direction.

For example, the structure illustrated in FIG. 2 has the rotating shaft 11 extending outside the ends of length of the rotating electrical machine 10, but however, may alternatively be designed to have the rotating shaft 11 protruding outside only one of the ends of the rotating electrical machine 10. In this case, it is advisable that a portion of the rotating shaft 11 which is retained by the bearing unit 20 in the cantilever form be located on one of the ends of the rotating electrical machine, and that the rotating shaft 11 protrude outside such an end of the rotating electrical machine. This structure has the rotating shaft 11 not protruding inside the inverter unit 60, thus enabling a wide inner space of the inverter unit 60, i.e., the cylinder 71 to be used.

The above structure of the rotating electrical machine 10 uses non-conductive grease in the bearings 21 and 22, but however, may alternatively be designed to have conductive grease in the bearings 21 and 22. For instance, conductive grease containing metallic particles or carbon particles may be used.

A bearing or bearings may be mounted on only one or both axial ends of the rotor 40 for retaining the rotating shaft 11 to be rotatable. For example, the structure of FIG. 1 may have a bearing or bearings mounted on only one side or opposite sides of the inverter unit 60 in the axial direction.

The magnet holder 41 of the rotor 40 of the rotating electrical machine 10 has the intermediate portion 45 equipped with the inner shoulder 49a and the annular outer shoulder 49b, however, the magnet holder 41 may alternatively be designed to have the flat intermediate portion 45 without the shoulders 49a and 49b.

The conductor body 82a of each of the conductors 82 of the stator winding 51 of the rotating electrical machine 10 is made of a collection of the wires 86, however, may alternatively be formed using a square conductor having a rectangular cross section. The conductor 82 may alternatively be made using a circular conductor having a circular cross section or an oval cross section.

The rotating electrical machine 10 has the inverter unit 60 arranged radially inside the stator 50, but however, may alternatively be designed not to have the inverter 60 disposed inside the stator 50. This enables the stator 50 to have a radial inner void space in which parts other than the inverter unit 60 may be mounted.

The rotating electrical machine 10 may be designed not to have the housing 30. In this case, the rotor 40 or the stator 50 may be retained by a wheel or another part of a vehicle.

The disclosure of the present specification is not limited to the embodiments given as examples. The disclosure includes the embodiments given as examples, as well as modifications by a person skilled in the art based on the embodiments. For example, the disclosure is not limited to the combinations of components and/or elements described according to the embodiments. The disclosure can be carried out using various combinations. The disclosure may have additional sections that can be added to the embodiments. The disclosure includes that in which a component and/or element according to an embodiment has been omitted. The disclosure includes replacements and combinations of components and/or elements between one embodiment and another embodiment. The technical scope that is disclosed is not limited to the descriptions according to the embodiments. Several technical scopes that are disclosed are cited in the scope of claims. Furthermore, the technical scopes should be understood to include all modifications within the meaning and scope of equivalency of the scope of claims.

What is claimed is:

1. A wheel driving apparatus comprising:
a pair of axles that rotate left and right wheels of a vehicle;
a differential apparatus that is provided so as to be coupled with the axles; and
a rotating electrical machine that rotates the axles, wherein:
the rotating electrical machine includes
a cylindrical rotor that includes a magnet portion that includes a plurality of magnetic poles of which polarities alternate in a circumferential direction, and
a cylindrical stator that includes a multiple-phase stator winding, in which
the rotor and the stator are arranged in a state in which the magnet portion and the stator winding oppose each other inward and outward in a radial direction;
the differential apparatus includes
a differential case that rotates in accompaniment with a rotation of the rotor,
side gears that are housed in the differential case and respectively connected to the pair of axles, and
a pinion gear that is housed in the differential case and mutually meshes with the side gears;
the differential apparatus is concentrically arranged with the rotor in a hollow portion that is provided on an inner side in a radial direction of a magnetic circuit portion that is configured by the rotor and the stator in the rotating electrical machine;
the stator winding has conductor portions that are arranged in a position that opposes the rotor at a predetermined interval in the circumferential direction;
in the stator,
an inter-conductor member is provided between the conductor portions in the circumferential direction and a magnetic material or a non-magnetic material is used as the inter-conductor member, the magnetic material meeting a relation of Wt×Bs≤Wm×Br where Wt is a width dimension in the circumferential direction of the inter-conductor member for a single magnetic pole, Bs is a saturation magnetic flux density of the inter-conductor member, Wm is a width dimension in the circumferential direction of the magnet portion for a single magnetic pole, and Br is a remanent flux density of the magnet portion, or
an inter-conductor member is not provided between the conductor portions in the circumferential direction; and
the conductor portion has a thickness dimension in a radial direction thereof that is less than a width dimension in a circumferential direction thereof for a single phase within a single magnetic pole.

2. A wheel driving apparatus comprising:
a pair of axles that rotate left and right wheels of a vehicle;
a differential apparatus that is provided so as to be coupled with the axles; and
a rotating electrical machine that rotates the axles, wherein:
the rotating electrical machine includes
a cylindrical rotor that includes a magnet portion that includes a plurality of magnetic poles of which polarities alternate in a circumferential direction, and
a cylindrical stator that includes a multiple-phase stator winding, in which
the rotor and the stator are arranged in a state in which the magnet portion and the stator winding oppose each other inward and outward in a radial direction;
the differential apparatus includes
a differential case that rotates in accompaniment with a rotation of the rotor,
side gears that are housed in the differential case and respectively connected to the pair of axles, and
a pinion gear that is housed in the differential case and mutually meshes with the side gears;
the differential apparatus is concentrically arranged with the rotor in a hollow portion that is provided on an inner side in a radial direction of a magnetic circuit portion that is configured by the rotor and the stator in the rotating electrical machine; and
in the magnet portion, a magnet magnetic path is formed so as to be oriented to be parallel to a d-axis or close to parallel to the d-axis at portions located closer to the d-axis and so as to be oriented to be orthogonal to a q-axis or close to orthogonal to the q-axis at portions located closer to the q-axis.

3. A wheel driving apparatus comprising:
a pair of axles that rotate left and right wheels of a vehicle;
a differential apparatus that is provided so as to be coupled with the axles; and
a rotating electrical machine that rotates the axles, wherein
the rotating electrical machine includes
a cylindrical rotor that includes a magnet portion that includes a plurality of magnetic poles of which polarities alternate in a circumferential direction, and
a cylindrical stator that includes a multiple-phase stator winding, in which
the rotor and the stator are arranged in a state in which the magnet portion and the stator winding oppose each other inward and outward in a radial direction;
the differential apparatus includes
a differential case that rotates in accompaniment with a rotation of the rotor,
side gears that are housed in the differential case and respectively connected to the pair of axles, and a pinion gear that is housed in the differential case and mutually meshes with the side gears;

the differential apparatus is concentrically arranged with the rotor in a hollow portion that is provided on an inner side in a radial direction of a magnetic circuit portion that is configured by the rotor and the stator in the rotating electrical machine; and in the magnet portion, a circular arc-shaped magnet magnetic path is formed such that an easy axis of magnetization is oriented to be parallel to a d-axis or close to parallel to the d-axis at portions located closer to the d-axis, and an easy axis of magnetization is oriented to be orthogonal to a q-axis or close to orthogonal to the q-axis at portions located closer to the q-axis.

4. A wheel driving apparatus comprising:
a pair of axles that rotate left and right wheels of a vehicle;
a differential apparatus that is provided so as to be coupled with the axles; and
a rotating electrical machine that rotates the axles, wherein:
the rotating electrical machine includes
a cylindrical rotor that includes a magnet portion that includes a plurality of magnetic poles of which polarities alternate in a circumferential direction, and
a cylindrical stator that includes a multiple-phase stator winding, in which
the rotor and the stator are arranged in a state in which the magnet portion and the stator winding oppose each other inward and outward in a radial direction;
the differential apparatus includes
a differential case that rotates in accompaniment with a rotation of the rotor,
side gears that are housed in the differential case and respectively connected to the pair of axles, and
a pinion gear that is housed in the differential case and mutually meshes with the side gears;
the differential apparatus is concentrically arranged with the rotor in a hollow portion that is provided on an inner side in a radial direction of a magnetic circuit portion that is configured by the rotor and the stator in the rotating electrical machine; and
the rotating electrical machine is an outer-rotor-type rotating electrical machine in which the rotor is arranged on an outer side in the radial direction of the stator.

5. A wheel driving apparatus comprising:
a pair of axles that rotate left and right wheels of a vehicle;
a differential apparatus that is provided so as to be coupled with the axles; and
a rotating electrical machine that rotates the axles, wherein:
the rotating electrical machine includes
a cylindrical rotor that includes a magnet portion that includes a plurality of magnetic poles of which polarities alternate in a circumferential direction, and
a cylindrical stator that includes a multiple-phase stator winding, in which
the rotor and the stator are arranged in a state in which the magnet portion and the stator winding oppose each other inward and outward in a radial direction;
the differential apparatus includes
a differential case that rotates in accompaniment with a rotation of the rotor,
side gears that are housed in the differential case and respectively connected to the pair of axles, and
a pinion gear that is housed in the differential case and mutually meshes with the side gears;
the differential apparatus is concentrically arranged with the rotor in a hollow portion that is provided on an inner side in a radial direction of a magnetic circuit portion that is configured by the rotor and the stator in the rotating electrical machine, and
the wheel driving apparatus further comprises an electrical unit that includes
an annular case member that is provided in an annular space, the annular space being formed in a position on an inner side in the radial direction of the magnetic circuit portion and an outer side in the radial direction of the differential case; and
an electrical component that is housed in a housing space inside the case member and configures an electric power converter that is electrically connected to the stator winding.

6. The wheel driving apparatus according to claim 5, wherein:
the case member is fixed to a vehicle body portion of the vehicle;
an annular inner wall portion of the case member opposes an outer peripheral surface of the differential case; and
the differential case is supported so as to freely rotate by a bearing that is provided so as to surround the differential case between the inner wall portion and the differential case.

7. The wheel driving apparatus according to claim 5, wherein:
in an annular outer wall portion of the case member, the stator is fixed to an outer peripheral surface thereof and the electrical component is arranged so as to be placed along an inner peripheral surface; and
a coolant path through which a coolant flows is formed in the outer wall portion.

8. The wheel driving apparatus according to claim 7, further comprising:
a housing member that forms a closed space, and houses the rotor, the stator, and the differential apparatus inside the closed space;
a circulating portion that circulates a lubricating oil that fills an interior of the housing member; and
a heat releasing portion that performs heat releasing of the lubricating oil, wherein
the lubricating oil flows so as to pass through an outer side in the radial direction of the coolant path inside the housing member.

9. The wheel driving apparatus according to claim 1, further comprising:
a housing member that forms a closed space, and houses the rotor, the stator, and the differential apparatus in the closed space;
a circulating portion that circulates a lubricating oil that fills an interior of the housing member; and
a heat releasing portion that performs heat releasing of the lubricating oil.

10. The wheel driving apparatus according to claim 1, wherein:
the rotor is fixed to the differential case, and the rotor and the differential case integrally rotate.

11. The wheel driving apparatus according to claim 1, wherein:
a transmission apparatus that changes a speed of rotation of the rotor at a predetermined gear ratio is arranged in an annular space that is provided on an outer side in the radial direction of the differential case and on an inner side in the radial direction of the magnetic circuit portion.

12. The wheel driving apparatus according to claim 11, wherein:

the transmission apparatus is a planetary gear mechanism that includes a ring gear that has internal teeth, a sun gear that has external teeth, a plurality of pinion gears that are arranged between the ring gear and the sun gear and mesh with the gears, and a carrier that rotatably supports the plurality of pinion gears; and either of the ring gear and the sun gear is fixed to the vehicle body portion of the vehicle, the other of the ring gear and the sun gear is fixed to the rotor, and the carrier is fixed to the differential case.

13. A wheel driving apparatus comprising:

a pair of axles that are connected to left and right wheels of a vehicle;

a differential apparatus that is provided so as to be coupled with the axles; and a rotating electrical machine that rotates the axles, wherein the rotating electrical machine includes a rotor that includes a magnet portion that includes a plurality of magnetic poles of which polarities alternate in a circumferential direction, and is provided so as to be capable of integrally rotating with a rotation shaft, a cylindrical stator that includes a multiple-phase stator winding, a first gear that is fixed to the rotation shaft, and a first housing that houses the rotor, the stator, and the first gear, in which the rotor and the stator are arranged in a state in which the magnet portion and the stator winding oppose each other inward and outward in a radial direction, the differential apparatus includes a differential case that rotates in accompaniment with a rotation of the rotor, side gears that are housed in the differential case and respectively connected to the pair of axles, a pinion gear that is housed in the differential case and mutually meshes with the side gears, a second gear that is fixed to the differential case, and a second housing that is provided so as to surround the differential case and the second gear, in which the first housing and the second housing are fixed to each other, and spaces inside the housings are interconnected by a communicating portion, and the first gear and the second gear are in the meshed state through the communicating portion.

14. The wheel driving apparatus according to claim 13, wherein:

the first housing and the second housing are arranged side-by-side in a direction orthogonal to an axial direction of the axles; and the rotating electrical machine is provided at an orientation at which the rotation shaft is parallel to the axles.

15. The wheel driving apparatus according to claim 13, wherein:

the first housing and the second housing are arranged side-by-side in a direction orthogonal to an axial direction of the axles; and the rotating electrical machine is provided at an orientation at which the rotation shaft intersects the axles.

16. The wheel driving apparatus according to claim 13, wherein:

the stator winding has conductor portions that are arranged in a position that opposes the rotor at a predetermined interval in the circumferential direction; in the stator, an inter-conductor member is provided between the conductor portions in the circumferential direction and a magnetic material or a non-magnetic material is used as the inter-conductor member, the magnetic material meeting a relation of Wt×Bs≤Wm×Br where Wt is a width dimension in the circumferential direction of the inter-conductor member for a single magnetic pole, Bs is a saturation magnetic flux density of the inter-conductor member, Wm is a width dimension in the circumferential direction of the magnet portion for a single magnetic pole, and Br is a remanent flux density of the magnet portion, or an inter-conductor member is not provided between the conductor portions in the circumferential direction; and the conductor portion has a thickness dimension in a radial direction thereof that is less than a width dimension in a circumferential direction thereof for a single phase within a single magnetic pole.

17. The wheel driving apparatus according to claim 13, wherein:

the magnet portion has a magnet magnetic path that is oriented to be parallel to a d-axis or close to parallel to the d-axis at portions closer to the d-axis and oriented to be orthogonal to a q-axis or close to orthogonal to the q-axis at portions closer to the q-axis.

18. The wheel driving apparatus according to claim 13, wherein:

in the magnet portion, a circular arc-shaped magnet magnetic path is formed such that an easy axis of magnetization is oriented to be parallel to a d-axis or close to parallel to the d-axis at portions located closer to the d-axis, and an easy axis of magnetization is oriented to be orthogonal to a q-axis or close to orthogonal to the q-axis at portions located closer to the q-axis.

19. The wheel driving apparatus according to claim 13, wherein an electrical component that configures an electric power converter that is electrically connected to the stator winding is arranged in an annular shape in a hollow portion that is provided on an inner side in the radial direction of the magnetic circuit portion that is configured by the rotor and the stator in the rotating electrical machine.

20. The wheel driving apparatus according to claim 13 wherein:

the wheel driving apparatus is that in which a lubricating oil is circulated; and the lubricating oil can flow through the communicating portion from one housing to the other housing, of the first housing and the second housing.

21. The wheel driving apparatus according to claim 20, further comprising:

a circulation path of which one end side is connected to the one housing and another end side is connected to the other housing;

a pump that circulates the lubricating oil through the circulation path; and a heat releasing portion that is provided on the circulation path, wherein the lubricating oil that flows in from the circulation path to the one housing is sent to the other housing through the communicating portion, and flows out from the other housing to the circulation path.

* * * * *